US007194133B2

(12) United States Patent
Jinnai

(10) Patent No.: US 7,194,133 B2
(45) Date of Patent: Mar. 20, 2007

(54) METHODS FOR DETECTING SIMILARITY BETWEEN IMAGES, VOICES, OSCILLATION WAVES, MOVING IMAGES, AND SOLIDS AND METHODS FOR RECOVERING THE IMAGE, VOICE, ABNORMALITY IN A MACHINE, MOVING IMAGE, AND SOLID BY THE USE OF DETECTED VALUE THEREOF

(75) Inventor: Michihiro Jinnai, 2304-17, Yashimanishimachi, Takamatsu-shi, Kagawa (JP)

(73) Assignee: Michihiro Jinnai, Takamatsu (JP)

( * ) Notice: Subject to any disclaimer, the term of this patent is extended or adjusted under 35 U.S.C. 154(b) by 861 days.

(21) Appl. No.: 10/386,662

(22) Filed: Mar. 13, 2003

(65) Prior Publication Data

US 2003/0185443 A1    Oct. 2, 2003

(30) Foreign Application Priority Data

Mar. 13, 2002    (JP)    ............................. 2002-068231

(51) Int. Cl.
G06K 9/62    (2006.01)
G10L 15/00    (2006.01)
G10L 17/00    (2006.01)

(52) U.S. Cl. ...................................... 382/209; 704/246
(58) Field of Classification Search ................ 382/209, 382/218, 219, 220; 704/246
See application file for complete search history.

(56) References Cited

U.S. PATENT DOCUMENTS 6,170,333 B1    1/2001 Jinnai et al.

7,006,970 B2 *    2/2006 Jinnai et al. ................. 704/239
2002/0055839 A1    5/2002 Jinnai et al.

FOREIGN PATENT DOCUMENTS

| EP | 1189207 A2 * | 3/2002 |
| GB | 2 320 352 A | 6/1998 |
| JP | 10-253444 A | 9/1998 |
| JP | 2002-91481 A | 3/2002 |

OTHER PUBLICATIONS

A. Rostampour et al., "Shape Recognition Using Simple Measures of Projections," Computers and Communications 1988 Conference Proceedings, IEEE Comput. Soc. Mar. 16, 1988, pp. 474-479.

* cited by examiner

*Primary Examiner*—Joseph Mancuso
*Assistant Examiner*—Damon M Conover
(74) *Attorney, Agent, or Firm*—Birch, Stewart, Kolasch & Birch, LLP

(57) ABSTRACT

Disclosed is a method for obtaining an accurate detected value of a similarity between images or the like. Original standard and input pattern matrices, each having a feature quantity of an image as an element, are created (Sb1 and Sb3). A weighting vector having a value of a change rate of a kurtosis of a reference pattern vector composed of a reference shape as an element is created, and an original and weighted standard pattern matrix is calculated by a product-sum operation of an element value of the weighting vector and an element value of the original standard pattern matrix (Sb2). Then, an original and weighted input pattern matrix is calculated by a product-sum operation of the element value of the same weighting vector and an element value of the original input pattern matrix (Sb4), and a geometric distance value between the original standard pattern matrix and the original input pattern matrix is calculated as a cosine of an angle between the original and weighted standard pattern matrix and the original and weighted input pattern matrix (Sb5).

42 Claims, 69 Drawing Sheets

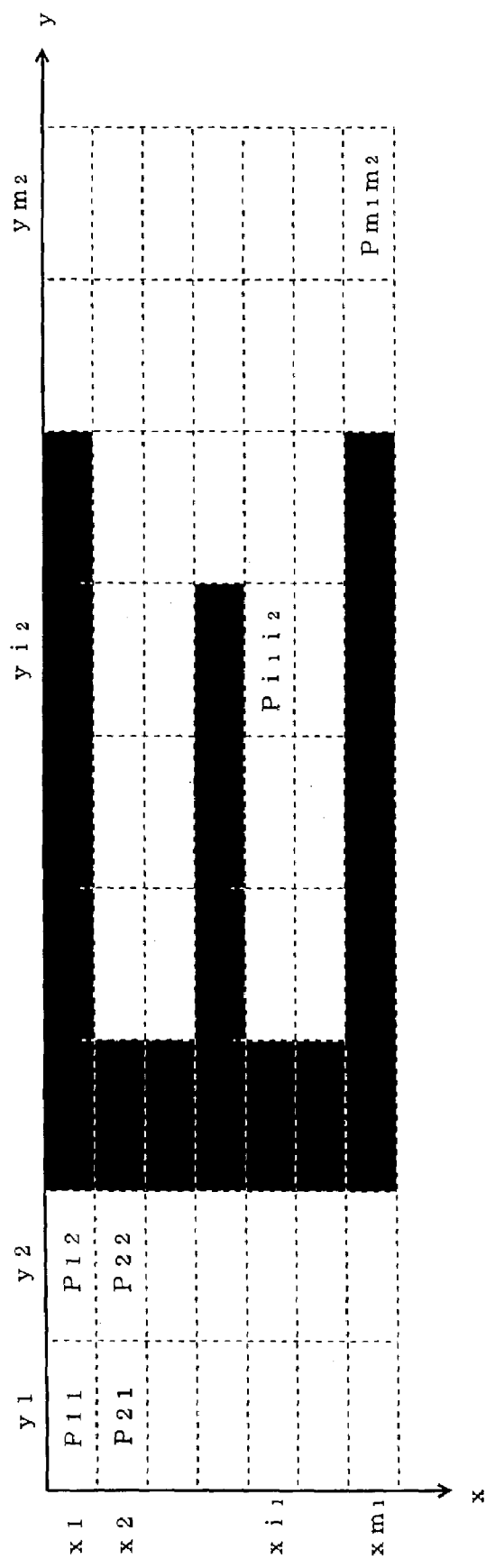

FIG. 2A  Original standard pattern matrix Ho

|    | y1 | y2 | ... | yi2 | ... | ym2 |
|----|----|----|-----|-----|-----|-----|
| x1 | ho11 | ho12 | | hoi12 | | ho1m2 |
| x2 | ho21 | ho22 | | ho2i2 | | ho2m2 |
| ... | | | | | | |
| xi1 | hoi11 | hoi12 | | hoi12 | | hoi1m2 |
| ... | | | | | | |
| xm1 | hom11 | hom12 | | homi2 | | hom1m2 |

FIG. 2B  Original input pattern matrix No

|    | y1 | y2 | ... | yi2 | ... | ym2 |
|----|----|----|-----|-----|-----|-----|
| x1 | no11 | no12 | | noi12 | | no1m2 |
| x2 | no21 | no22 | | no2i2 | | no2m2 |
| ... | | | | | | |
| xi1 | noi11 | noi12 | | noi12 | | noi1m2 |
| ... | | | | | | |
| xm1 | nom11 | nom12 | | nomi2 | | nom1m2 |

FIG. 3A  Standard pattern matrix H

|     | $y_1$ | $y_2$ | ... | $y_{i_2}$ | ... | $y_{m_2}$ |
|-----|-------|-------|-----|-----------|-----|-----------|
| $x_1$ | $h_{11}$ | $h_{12}$ | | $h_{1i_2}$ | | $h_{1m_2}$ |
| $x_2$ | $h_{21}$ | $h_{22}$ | | $h_{2i_2}$ | | $h_{2m_2}$ |
| ... | | | | | | |
| $x_{i_1}$ | $h_{i_11}$ | $h_{i_12}$ | | $h_{i_1i_2}$ | | $h_{i_1m_2}$ |
| ... | | | | | | |
| $x_{m_1}$ | $h_{m_11}$ | $h_{m_12}$ | | $h_{m_1i_2}$ | | $h_{m_1m_2}$ |

FIG. 3B  Input pattern matrix N

|     | $y_1$ | $y_2$ | ... | $y_{i_2}$ | ... | $y_{m_2}$ |
|-----|-------|-------|-----|-----------|-----|-----------|
| $x_1$ | $n_{11}$ | $n_{12}$ | | $n_{1i_2}$ | | $n_{1m_2}$ |
| $x_2$ | $n_{21}$ | $n_{22}$ | | $n_{2i_2}$ | | $n_{2m_2}$ |
| ... | | | | | | |
| $x_{i_1}$ | $n_{i_11}$ | $n_{i_12}$ | | $n_{i_1i_2}$ | | $n_{i_1m_2}$ |
| ... | | | | | | |
| $x_{m_1}$ | $n_{m_11}$ | $n_{m_12}$ | | $n_{m_1i_2}$ | | $n_{m_1m_2}$ |

Positive reference pattern vector $K_{j_1 j_2}^{(+)}$

Positive reference pattern vector
$K_{j_1 j_2}^{(+)}$

Positive reference pattern vector
$K_{j_1 j_2}^{(+)}$

Positive reference pattern vector $Kj_1j_2^{(+)}$

Positive reference pattern vector $K_{j_1 j_2}^{(+)}$

Positive reference pattern vector $K_{j_1 j_2}^{(+)}$

Reference pattern vector $K_{j_1 j_2}$

Weighting curve

Weighting vector $G_{j_1 j_2}$

FIG. 21
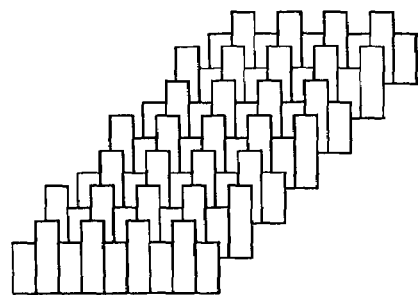
Input image 2
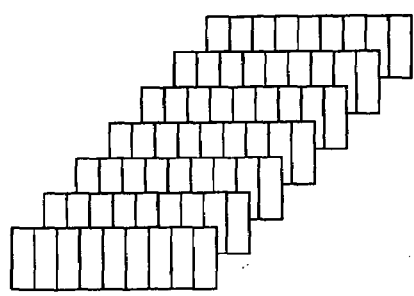
Standard image 1
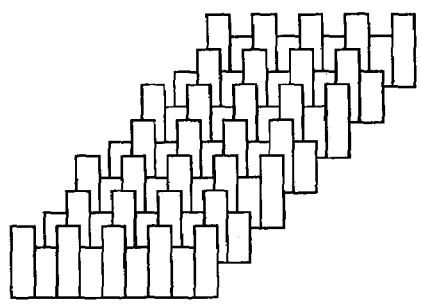
Input image 3
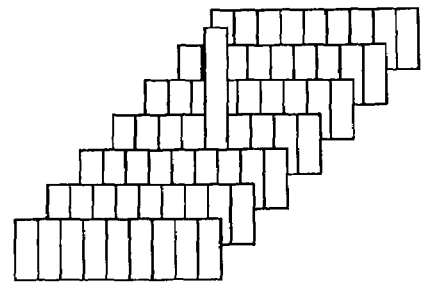
Input image 4
$d_{E2}$ / $d_{A2}$
$d_{E3}$ / $d_{A3}$
$d_{E4}$ / $d_{A4}$
Density, x, y

FIG. 22

Input image 2

Original input pattern matrix 2Ao $$\begin{pmatrix} \gamma & \delta & \gamma & \delta & \gamma & \delta & \gamma & \delta & \gamma \\ \delta & \gamma & \delta & \gamma & \delta & \gamma & \delta & \gamma & \delta \\ \gamma & \delta & \gamma & \delta & \gamma & \delta & \gamma & \delta & \gamma \\ \delta & \gamma & \delta & \gamma & \delta & \gamma & \delta & \gamma & \delta \\ \gamma & \delta & \gamma & \delta & \gamma & \delta & \gamma & \delta & \gamma \\ \delta & \gamma & \delta & \gamma & \delta & \gamma & \delta & \gamma & \delta \\ \gamma & \delta & \gamma & \delta & \gamma & \delta & \gamma & \delta & \gamma \end{pmatrix}$$

Standard image 1

Original standard pattern matrix 1Ao $$\begin{pmatrix} 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{pmatrix}$$

Input image 3

Original input pattern matrix 3Ao $$\begin{pmatrix} \varepsilon & \zeta & \varepsilon & \zeta & \varepsilon & \zeta & \varepsilon & \zeta & \varepsilon \\ \zeta & \varepsilon & \zeta & \varepsilon & \zeta & \varepsilon & \zeta & \varepsilon & \zeta \\ \varepsilon & \zeta & \varepsilon & \zeta & \varepsilon & \zeta & \varepsilon & \zeta & \varepsilon \\ \zeta & \varepsilon & \zeta & \varepsilon & \zeta & \varepsilon & \zeta & \varepsilon & \zeta \\ \varepsilon & \zeta & \varepsilon & \zeta & \varepsilon & \zeta & \varepsilon & \zeta & \varepsilon \\ \zeta & \varepsilon & \zeta & \varepsilon & \zeta & \varepsilon & \zeta & \varepsilon & \zeta \\ \varepsilon & \zeta & \varepsilon & \zeta & \varepsilon & \zeta & \varepsilon & \zeta & \varepsilon \end{pmatrix}$$

Where
$$\gamma = 1 - \frac{31}{32}\alpha$$
$$\delta = 1 + \alpha$$
$$\varepsilon = 1 + \frac{31}{32}\alpha$$
$$\zeta = 1 - \alpha$$
$$\eta = 1 - \alpha\sqrt{\frac{31}{32 \times 62}}$$
$$\theta = 1 + \alpha\sqrt{\frac{31 \times 62}{32}}$$

Input image 4

Original input pattern matrix 4Ao $$\begin{pmatrix} \eta & \eta & \eta & \eta & \eta & \eta & \eta & \eta \\ \eta & \eta & \eta & \eta & \eta & \eta & \eta & \eta \\ \eta & \eta & \eta & \eta & \eta & \eta & \eta & \eta \\ \eta & \eta & \eta & \eta & \theta & \eta & \eta & \eta \\ \eta & \eta & \eta & \eta & \eta & \eta & \eta & \eta \\ \eta & \eta & \eta & \eta & \eta & \eta & \eta & \eta \\ \eta & \eta & \eta & \eta & \eta & \eta & \eta & \eta \end{pmatrix}$$

FIG. 24

Input image 6

Original input pattern matrix 6Ao $$\begin{bmatrix} \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \phi & \omega & \omega & \omega & \omega \\ \omega & \omega & \phi & \omega & \omega & \omega & \omega & \omega & \omega \\ \omega & \omega & \omega & \omega & \omega & \omega & \omega & \omega & \omega \\ \omega & \omega & \omega & \omega & \omega & \omega & \omega & \omega & \omega \end{bmatrix}$$

$d_{E6} / d_{A6}$

Standard image 5

Original standard pattern matrix 5Ao $$\begin{bmatrix} \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \phi & \omega & \omega & \omega & \omega \\ \omega & \omega & \omega & \phi & \omega & \omega & \omega & \omega & \omega \\ \omega & \omega & \omega & \omega & \omega & \omega & \omega & \omega & \omega \\ \omega & \omega & \omega & \omega & \omega & \omega & \omega & \omega & \omega \end{bmatrix}$$

$\xleftrightarrow{d_{E7} \atop d_{A7}}$

Input image 7

Original input pattern matrix 7Ao $$\begin{bmatrix} \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \phi & \omega & \omega & \omega & \omega \\ \omega & \omega & \omega & \omega & \omega & \omega & \omega & \omega & \omega \\ \omega & \phi & \omega & \omega & \omega & \omega & \omega & \omega & \omega \\ \omega & \omega & \omega & \omega & \omega & \omega & \omega & \omega & \omega \end{bmatrix}$$

$d_{A8} \; d_{E8}$

Input image 8

Original input pattern matrix 8Ao $$\begin{bmatrix} \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \omega & \omega & \omega & \omega & \omega \\ \omega & \omega & \omega & \omega & \phi & \omega & \omega & \omega & \omega \\ \omega & \omega & \omega & \omega & \omega & \omega & \omega & \omega & \omega \\ \omega & \omega & \omega & \omega & \omega & \omega & \omega & \omega & \omega \\ \phi & \omega & \omega & \omega & \omega & \omega & \omega & \omega & \omega \end{bmatrix}$$

Where $\omega = 1 - \beta$ $\phi = 1 + \dfrac{61}{2}\beta$

FIG. 29
Input image 10
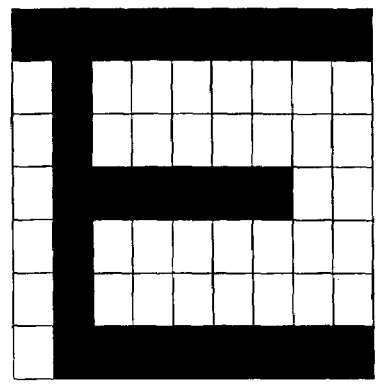
eE10
eA10
dE10
dA10
Standard image 9
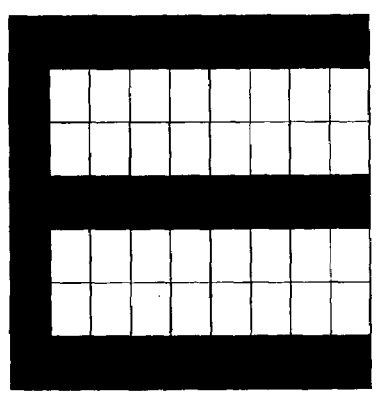
eE11
eA11
dE11
dA11
Input image 11
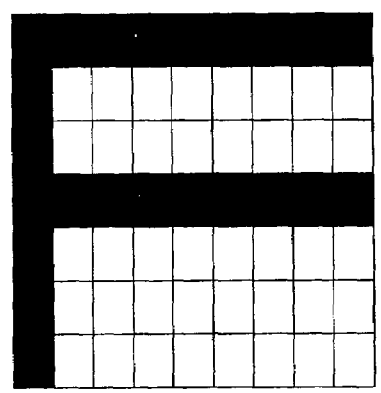
eE12
eA12
dE12
dA12
Input image 12
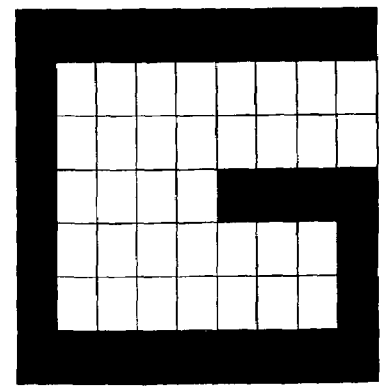

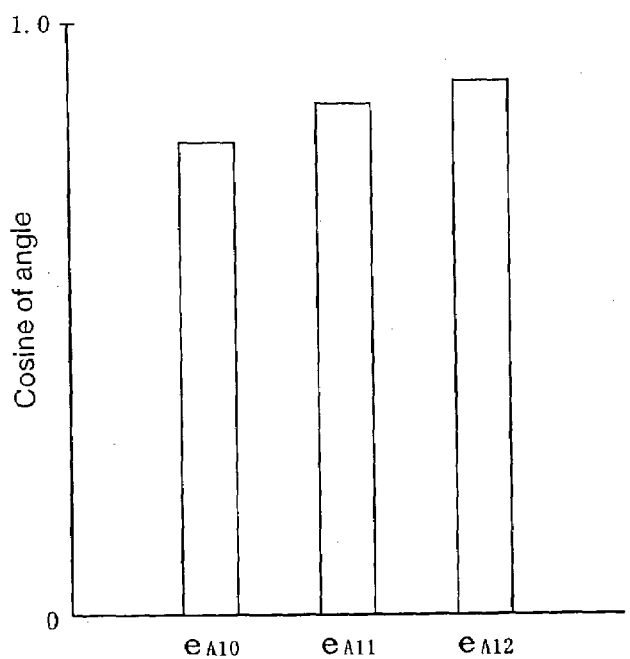
F I G. 32A
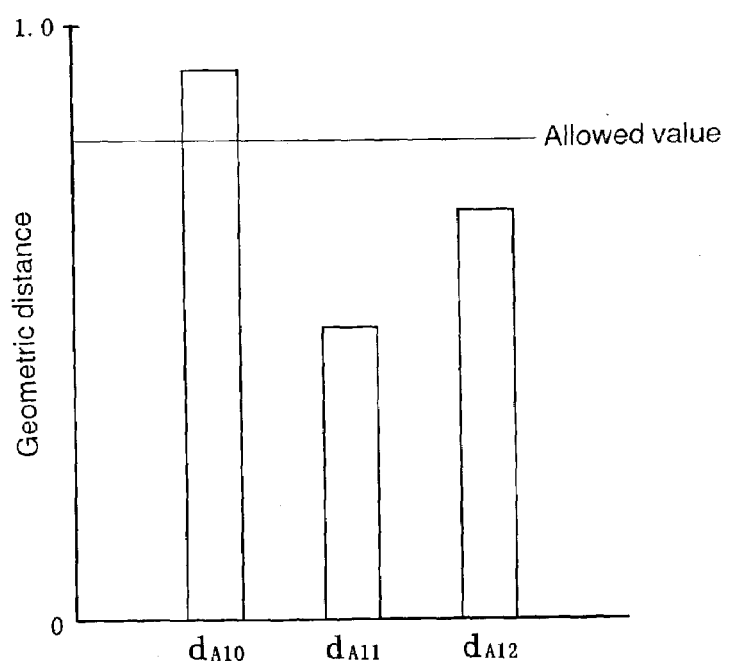
F I G. 32B

FIG. 45
Standard image 27　　　　　　　　Standard image 28
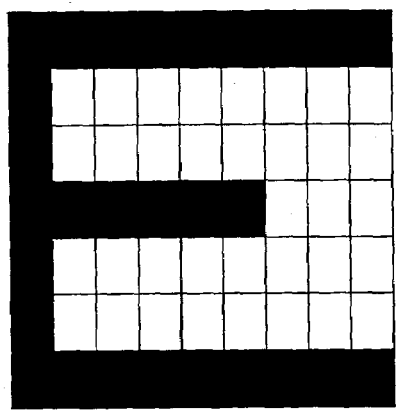 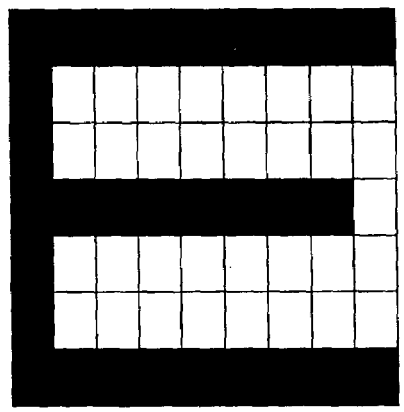
$dE27-28$
$dA27-28$
$dE27-30$　　$dE28-29$
$dA27-30$　　$dA28-29$
$dE27-29$　　　　　　　　　　　　$dE28-30$
$dA27-29$　　　　　　　　　　　　$dA28-30$
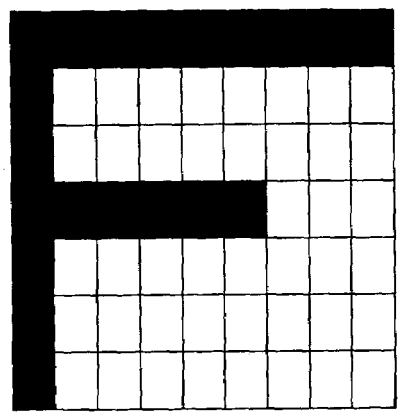 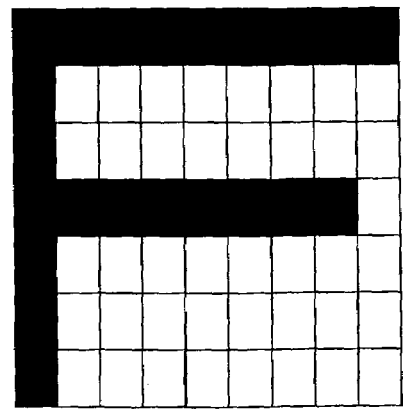
$dE29-30$
$dA29-30$
Standard image 29　　　　　　　　Standard image 30

F I G. 52A
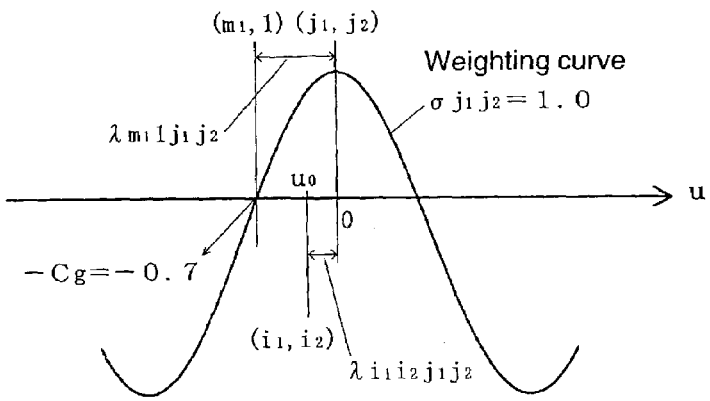
F I G. 52B
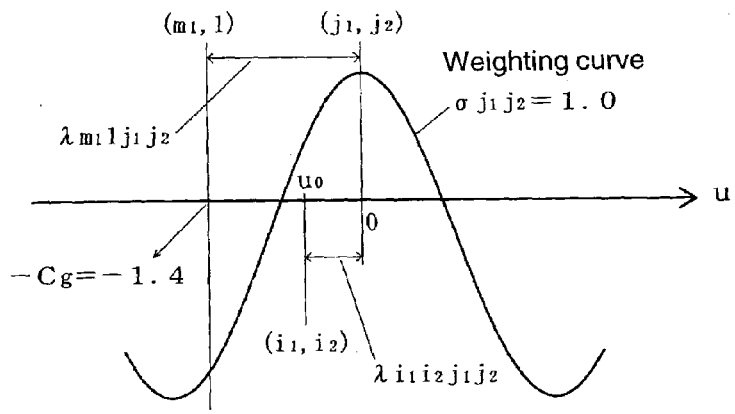
F I G. 52C
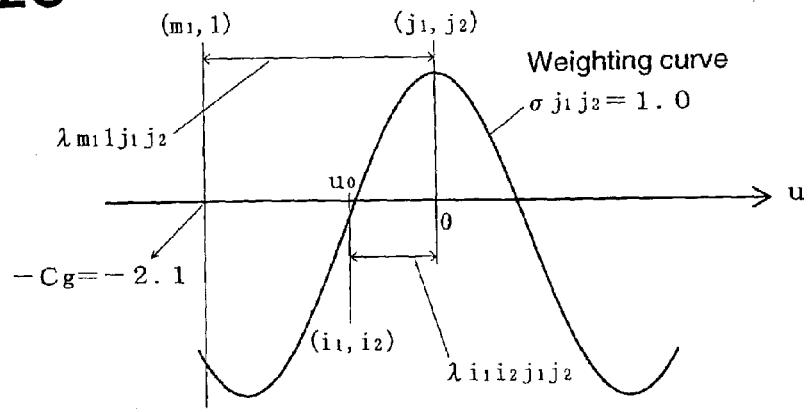

F I G. 60
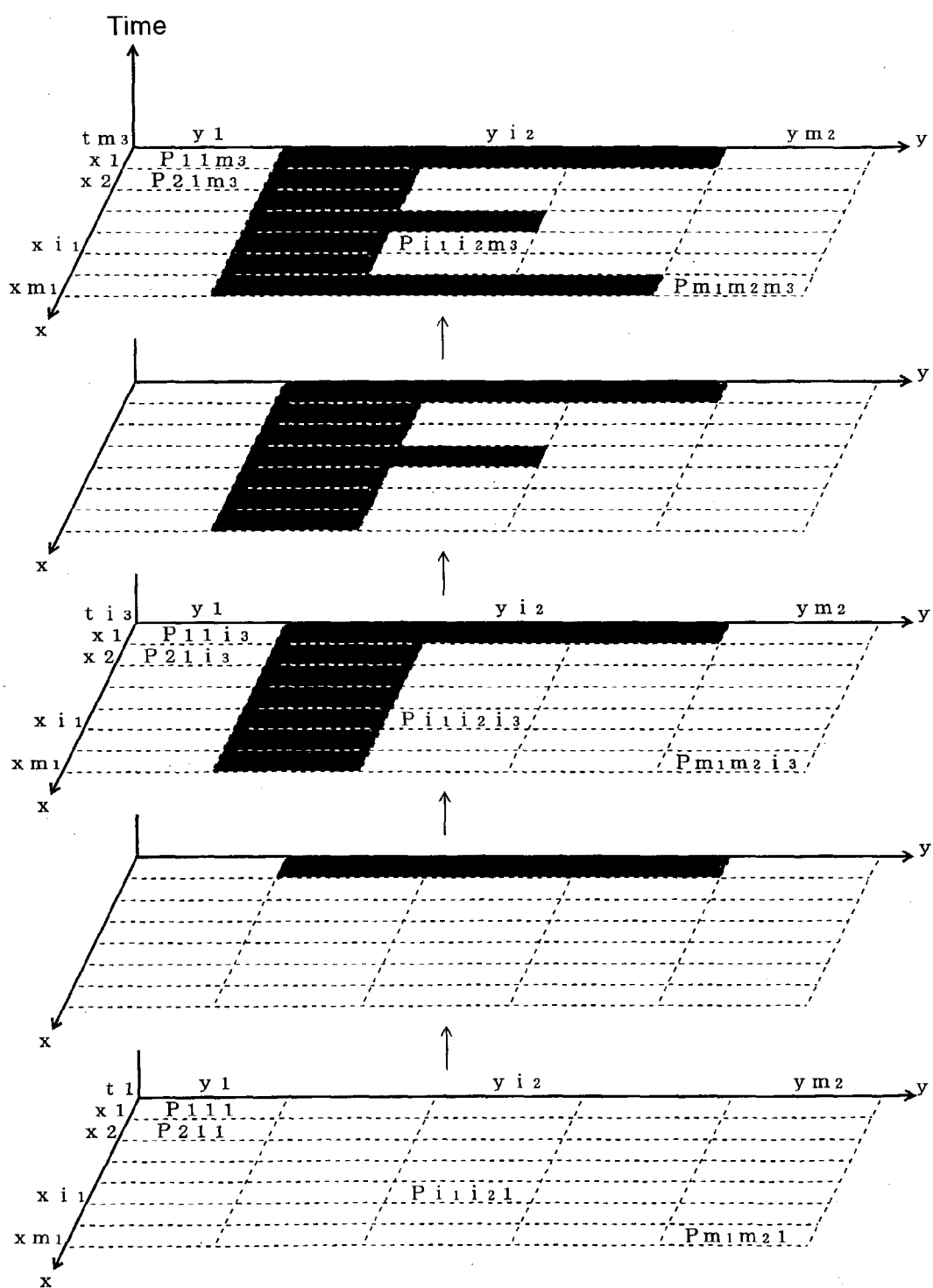

Normal curve

Positive reference pattern vector $K_{j_1 j_2 j_3}^{(+)}$

Negative reference pattern vector $K_{j_1 j_2 j_3}^{(-)}$

Normal curve

Positive reference pattern vector $Kj_1^{(+)}$

Negative reference pattern vector $Kj_1^{(-)}$

Reference pattern vector $K_{j_1}$

Weighting curve

Weighting vector $G_{j_1}$

FIG. 71A

Standard image 31

Input image 32

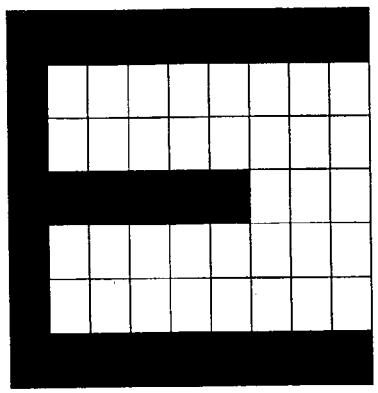 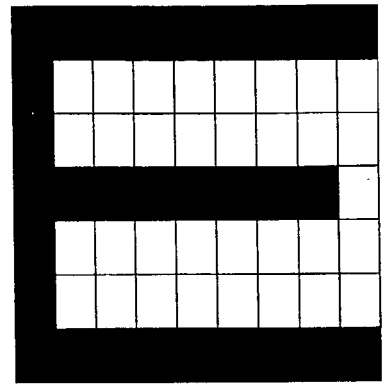

FIG. 71B

Original standard pattern matrix 31Ao $$\begin{pmatrix} 1 & 1 & 1 & 1 & 1 & 1 & 1 & 1 \\ 1 & 0 & 0 & 0 & 0 & 0 & 0 & 0 \\ 1 & 0 & 0 & 0 & 0 & 0 & 0 & 0 \\ 1 & 1 & 1 & 1 & 1 & 1 & 0 & 0 \\ 1 & 0 & 0 & 0 & 0 & 0 & 0 & 0 \\ 1 & 0 & 0 & 0 & 0 & 0 & 0 & 0 \\ 1 & 1 & 1 & 1 & 1 & 1 & 1 & 1 \end{pmatrix}$$

Original input pattern matrix 32Ao $$\begin{pmatrix} 1 & 1 & 1 & 1 & 1 & 1 & 1 & 1 \\ 1 & 0 & 0 & 0 & 0 & 0 & 0 & 0 \\ 1 & 0 & 0 & 0 & 0 & 0 & 0 & 0 \\ 1 & 1 & 1 & 1 & 1 & 1 & 1 & 0 \\ 1 & 0 & 0 & 0 & 0 & 0 & 0 & 0 \\ 1 & 0 & 0 & 0 & 0 & 0 & 0 & 0 \\ 1 & 1 & 1 & 1 & 1 & 1 & 1 & 1 \end{pmatrix}$$

FIG. 71C

Standard pattern matrix 31A $$\begin{pmatrix} \varepsilon & \varepsilon & \varepsilon & \varepsilon & \varepsilon & \varepsilon & \varepsilon & \varepsilon & \varepsilon \\ \varepsilon & 0 & 0 & 0 & 0 & 0 & 0 & 0 & 0 \\ \varepsilon & 0 & 0 & 0 & 0 & 0 & 0 & 0 & 0 \\ \varepsilon & \varepsilon & \varepsilon & \varepsilon & \varepsilon & \varepsilon & 0 & 0 & 0 \\ \varepsilon & 0 & 0 & 0 & 0 & 0 & 0 & 0 & 0 \\ \varepsilon & 0 & 0 & 0 & 0 & 0 & 0 & 0 & 0 \\ \varepsilon & \varepsilon & \varepsilon & \varepsilon & \varepsilon & \varepsilon & \varepsilon & \varepsilon & \varepsilon \end{pmatrix}$$

Where $\varepsilon = \dfrac{1}{28}$

Input pattern matrix 32A $$\begin{pmatrix} \zeta & \zeta & \zeta & \zeta & \zeta & \zeta & \zeta & \zeta \\ \zeta & 0 & 0 & 0 & 0 & 0 & 0 & 0 \\ \zeta & 0 & 0 & 0 & 0 & 0 & 0 & 0 \\ \zeta & \zeta & \zeta & \zeta & \zeta & \zeta & \zeta & 0 \\ \zeta & 0 & 0 & 0 & 0 & 0 & 0 & 0 \\ \zeta & 0 & 0 & 0 & 0 & 0 & 0 & 0 \\ \zeta & \zeta & \zeta & \zeta & \zeta & \zeta & \zeta & \zeta \end{pmatrix}$$

Where $\zeta = \dfrac{1}{30}$

FIG. 72
Standard image 33 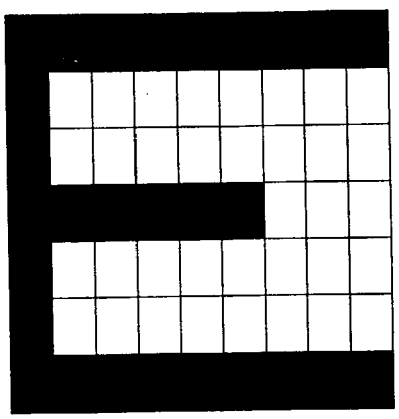
Standard image 34 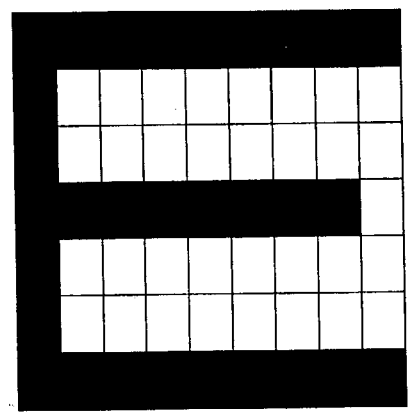
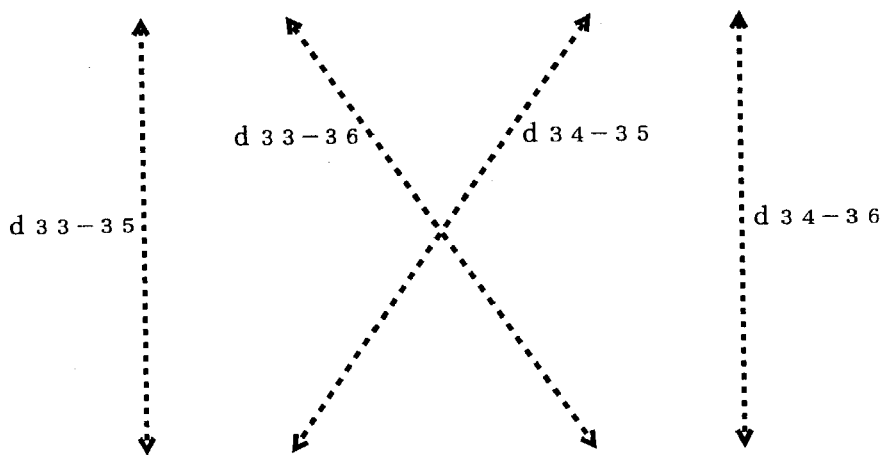
Standard image 35 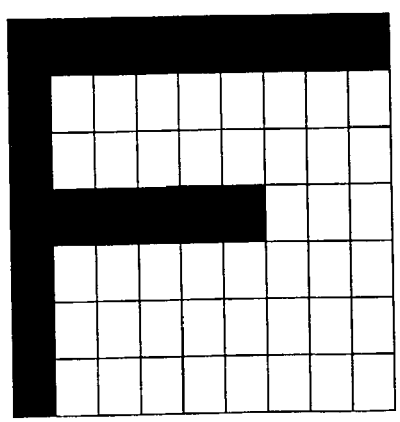
Standard image 36 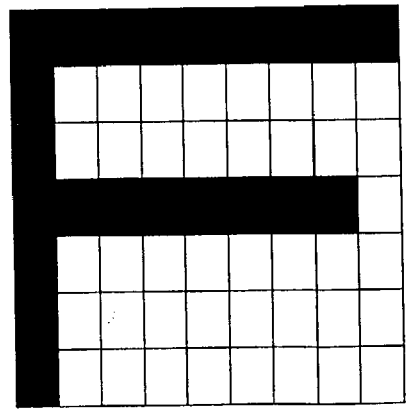

METHODS FOR DETECTING SIMILARITY BETWEEN IMAGES, VOICES, OSCILLATION WAVES, MOVING IMAGES, AND SOLIDS AND METHODS FOR RECOVERING THE IMAGE, VOICE, ABNORMALITY IN A MACHINE, MOVING IMAGE, AND SOLID BY THE USE OF DETECTED VALUE THEREOF

The entire disclosure of Japanese Patent Application No. 2002-68231 filed on Mar. 13, 2002 including specification, claims, drawings and summary is incorporated herein by reference in its entirety.

BACKGROUND OF THE INVENTION

1. Field of the Invention

The present invention relates to a method for detecting a similarity between standard information and input information and to a method for recognizing whether or not the input information is the standard information or for judging whether or not the input information is abnormal by use of a detected value of the similarity.

More specifically, the present invention relates to a method for detecting a similarity between a standard image and an input image with regard to characters or patterns and to a method for recognizing an image by use of a detected value of the similarity. Moreover, the present invention relates to a method for detecting a similarity between voices with regard to voices uttered by human beings and to a method for recognizing a voice by use of a detected value of the similarity. Furthermore, the present invention also relates to a method for detecting a similarity between oscillation waves with regard to sounds or oscillations generated by equipment or the like and to a method for judging an abnormality in a machine based on a detected value of the similarity. Still further, the present invention relates to a method for detecting a similarity between moving images and to a method for recognizing a moving image by use of a detected value of the similarity. Yet further, the present invention relates to a method for detecting a similarity between solids and to a method for recognizing a solid by use of a detected value of the similarity.

2. Description of the Related Art

An image recognition apparatus, in which a computer automatically recognizes an image such as a character and a pattern, is equipped with means for detecting a similarity between a standard image and an input image and recognizing the input image by use of a detected value of the similarity when a known image previously registered in the computer is set as the standard image and an unknown image newly inputted to the computer is set as the input image.

PRIOR ART

As a technology of detecting a similarity between a standard voice and an input voice as a geometric distance, the gazette of Japanese Patent Laid-Open No. Hei 10(1998)-253444 (Japanese Patent Application No. Hei 9(1997)-61007, Title of the Invention: Method for detecting abnormal sound and method for judging abnormality in machine by use of detected value thereof, and method for detecting similarity between oscillation waves and method for recognizing voice by use of detected value of similarity) is known. Hereinafter, this will be referred to as a prior art.

RELATED ART

As an improved technology of detecting a similarity between standard information and input information as a geometric distance, the applicant files Japanese Patent Application No. 2000-277749 (Title of the Invention: Method for detecting similarity between voices and method for recognizing voice by use of detected value thereof, method for detecting similarity between oscillation waves and method for judging abnormality in machine by use of detected value thereof, method for detecting similarity between images and method for recognizing image by use of detected value thereof, method for detecting similarity between solids and method for recognizing solid by use of detected value thereof, and method for detecting similarity between moving images and method for recognizing moving image by use of detected value thereof). Since Japanese Patent Application No. 2000-277749 is not laid open yet or is not a known prior art, this will be referred to as a related art.

The method for detecting a similarity between images in the related art (Japanese Patent Application No. 2000-277749) includes the steps of: previously registering a standard pattern matrix having, as an element, a feature quantity such as a density of a standard image; preparing an input pattern matrix having a feature quantity of an input image as an element; and calculating a geometric distance between the standard pattern matrix and the input pattern matrix. Moreover, the method for recognizing an image in the related art includes the step of: comparing a calculated value of the geometric distance with an arbitrarily set allowed value.

Namely, first, the method of the related art (Japanese Patent Application No. 2000-277749) divides a density of each pixel by the sum of the densities of the entire pixels to obtain a normalized density of each pixel uniformly for an image even if the image is a binary image such as a character. Then, the method creates a standard pattern matrix and an input pattern matrix by use of the normalized densities thus obtained, and detects an extent of similarity between the standard pattern matrix and the input pattern matrix as a geometric distance value.

Furthermore, second, the method of the related art (Japanese Patent Application No. 2000-277749) squares a ratio value obtained by dividing the maximum value of lengths between specified elements and elements in a pattern matrix by a constant of 1.4 to obtain a value of variance of a normal distribution. Moreover, the method weights a constant of 1 down the entire element numbers of a reference pattern vector, and irrespective of the element numbers of the reference pattern vector, the method substitutes an absolute value of a variation between an element value of the standard pattern matrix and an element value of the input pattern matrix with an increasing quantity of the reference pattern vector as it is. Namely, the method creates the reference pattern vector by use of a normal distribution having a fixed value of variance, and increases the reference pattern vector by use of increasing means having a fixed value of weight.

However, first, in the handwritten character recognition dealing binary images, even if the same character is written, generally, images having character portions different in the number of pixels for each writing occur in many cases. In the case where such binary images are normalized by the sum of the densities of the entire pixels, the normalized densities of the character portions have values different for each image, causing the similarity detection for the images to be inaccurate.

For example, FIG. 71A shows two examples of binary images of the alphabet "E", which are defined as a standard image 31 and an input image 32. Moreover, FIG. 71B shows an original standard pattern matrix 31Ao and an original input pattern matrix 32Ao, in which, in the standard image 31 and the input image 32, a density of a character portion is set at 1, a density of a background portion is set at 0, and these densities are set as elements. Here, the sums of the densities of the entire pixels of the original standard pattern matrix 31Ao and the original input pattern matrix 32Ao are 28 and 30, respectively. Furthermore, FIG. 71C shows a standard pattern matrix 31A and an input pattern matrix 32A, in which, in the original standard pattern matrix 31Ao and the original input pattern matrix 32Ao, the density of each pixel is divided by the sum of the densities of the entire pixels to obtain a normalized density of each pixel, and these normalized densities are set as elements.

For example, in FIG. 71A, the density of the first row/first column of the standard image 31 and the density of the first row/first column of the input image 32 are equal to each other. However, in FIG. 71C, the normalized density of the first row/first column of the standard pattern matrix 31A becomes $1/28$ ($=\epsilon$), and the normalized density of the first row/first column of the input pattern matrix 32A becomes $1/30$ ($=\zeta$). Accordingly, as an absolute value $|n11-h11|$ of a variation between an element value h11 of the standard pattern matrix 31A and an element value n11 of the input pattern matrix 32A, a value other than 0 appears. In the case where the density patterns of images are normalized by the sums of the densities of the entire pixels as described above, on the same positions of the standard image and the input image, the positions having an equal density, a variation appears between the element value of the standard pattern matrix and the element value of the input pattern matrix, causing an error in geometric distance value.

In order to cope with the foregoing problem, instead of the related art (Japanese Patent Application No. 2000-277749), a method is conceived, in which the density of each pixel is divided by the maximum value of the densities of the entire pixels to obtain the normalized density of each pixel. In this case, the normalized density of the character portion of the binary image becomes 1, and the normalized density of the background portion thereof becomes 0. Accordingly, in FIG. 7C, the absolute value $|n11-h11|$ of the variation between the element value h11 of the standard pattern matrix 31A and the element value n11 of the input pattern matrix 32A becomes 0. As described above, in the case of the binary image, it is conceived that the foregoing problem can be solved if the density pattern of the image is normalized by the maximum value of the densities of the entire pixels.

However, in the image recognition for binary images and images other than the binary images, both of which are mixedly present, generally, it is not previously known in many cases whether each input image is a binary image or an image other than the binary image. In such a case, judgment cannot be made as to which of the method for normalizing the density pattern of the image by the maximum value of the densities of the entire pixels or the method for normalizing the density pattern by the sum of the densities of the entire pixels is to be used for processing the input image.

Second, in the handwritten character recognition, even if the same character is written, a deformed character occurs for each writing. Therefore, a method is usually adopted, in which a large number of human beings write the same characters repeatedly, and a plurality of standard images are registered for each character.

For example, FIG. 72 shows two examples of binary images of the alphabet "E" and two example of binary images of the alphabet "F", which are defined as standard images 33 and 34 of "E" and standard images 35 and 36 of "F", respectively. The alphabet "E" and the alphabet "F" are different in category. Moreover, in FIG. 72, geometric distances between the respective standard images are schematically denoted as d33–34, d35–36, d33–35, d33–36, d34–35 and d34–36. Note that d33–34 indicated by a solid-line arrow is a geometric distance between the standard images 33 and 34 in the same category of "E", and that d35–36 indicated by a solid-line arrow is a geometric distance between the standard images 35 and 36 in the same category of "F". d33–35 and d33–36 indicated by broken-line arrows are geometric distances between the standard image 33 of "E" and the standard images 35 and 36 of "F", "E" and "F" being in different categories. d34–35 and d34–36 indicated by broken-line arrows are geometric distances between the standard image 34 of "E" and the standard images 35 and 36 of "F", "E" and "F" being in different categories.

Here, if the distance between the standard images in the same category is shortened, and simultaneously, the distance between the standard images in the different categories is elongated, then, as a result, separation of the standard image in the same category and the standard image in the different category is improved, and thus recognition performance when an input image is given is improved.

However, according to the method of the related art (Japanese Patent Application No. 2000-277749), the reference pattern vector is created by use of the normal distribution having the fixed value of variance, and the reference pattern vector is increased by use of the increasing means having the fixed value of weight. Therefore, the separation of the standard image in the same category and the standard image in the different category is fixed, and thus the recognition performance when an input image is given cannot be improved.

As described in the above first and second subjects, in the method of the related art (Japanese Patent Application No. 2000-277749), problems are inherent, in which the similarity between images cannot be detected precisely, and a sufficiently satisfactory precision for recognizing an image cannot be obtained.

The present invention was made in order to solve the foregoing problems. A first object of the present invention is to provide a method for detecting a similarity between images, which is capable of obtaining, from two pattern matrices that are a standard pattern matrix and an input pattern matrix, an accurate value of a geometric distance therebetween. In this case, the standard pattern matrix and the input pattern matrix may be substituted with an original standard pattern matrix and an original input pattern matrix that are pattern matrices not having been subjected to normalization. A second object of the present invention is to provide a method capable of recognizing an image based on a detected value of the similarity between the images with high precision.

A third object of the present invention is to provide a method for detecting a similarity between voices, which is capable of obtaining, from two pattern matrices that are a standard pattern matrix and an input pattern matrix, an accurate value of a geometric distance therebetween. In this case, the standard pattern matrix and the input pattern matrix may be substituted with an original standard pattern matrix and an original input pattern matrix. A fourth object of the present invention is to provide a method capable of recognizing a voice based on a detected value of the similarity between the voices with high precision.

A fifth object of the present invention is to provide a method for detecting a similarity between oscillation waves, which is capable of obtaining, from two pattern matrices that are a standard pattern matrix and an input pattern matrix, an accurate value of a geometric distance therebetween. In this case, the standard pattern matrix and the input pattern matrix may be substituted with an original standard pattern matrix and an original input pattern matrix. A sixth object of the present invention is to provide a method capable of judging an abnormality in a machine based on a detected value of the similarity between the oscillation waves with high precision.

A seventh object of the present invention is to provide a method for detecting a similarity between moving images, which is capable of obtaining, from two pattern matrix layers that are a standard pattern matrix layer and an input pattern matrix layer, an accurate value of a geometric distance therebetween. In this case, the standard pattern matrix layer and the input pattern matrix layer may be substituted with an original standard pattern matrix layer and an original input pattern matrix layer. An eighth object of the present invention is to provide a method capable of recognizing a moving image based on a detected value of the similarity between the moving images with high precision.

A ninth object of the present invention is to provide a method for detecting a similarity between solids, which is capable of obtaining, from two pattern matrix layers that are a standard pattern matrix layer and an input pattern matrix layer, an accurate value of a geometric distance therebetween. In this case, the standard pattern matrix layer and the input pattern matrix layer may be substituted with an original standard pattern matrix layer and an original input pattern matrix layer. A tenth object of the present invention is to provide a method capable of recognizing a solid based on a detected value of the similarity between the solids with high precision.

An eleventh object of the present invention is to provide a method for detecting a similarity between voices, which is capable of obtaining, from two pattern vectors that are a standard pattern vector and an input pattern vector, an accurate value of a geometric distance therebetween. In this case, the standard pattern vector and the input pattern vector may be substituted with an original standard pattern vector and an original input pattern vector. A twelfth object of the present invention is to provide a method capable of recognizing a voice based on a detected value of the similarity between the voices with high precision.

A thirteenth object of the present invention is to provide a method for detecting a similarity between oscillation waves, which is capable of obtaining, from two pattern vectors that are a standard pattern vector and an input pattern vector, an accurate value of a geometric distance therebetween. In this case, the standard pattern vector and the input pattern vector may be substituted with an original standard pattern vector and an original input pattern vector. A fourteenth object of the present invention is to provide a method capable of judging an abnormality in a machine based on a detected value of the similarity between the oscillation waves with high precision.

Note that the present invention was made by improving the method for calculating a value of a geometric distance, which is described in the related art (Japanese Patent Application No. 2000-277749) and the prior art (gazette of Japanese Patent Laid-Open No. Hei 10(1998)-253444).

SUMMARY OF THE INVENTION

In order to solve the foregoing problems, a first aspect of the present invention is a method for detecting a similarity between images, comprising the steps of:

(a) creating a standard pattern matrix having a feature quantity of a standard image as an element and an input pattern matrix having a feature quantity of an input image as an element;

(b) creating an arbitrary reference shape such as a normal distribution and a rectangle, the reference shape having a different value of variance for each specified element of the pattern matrices, creating a reference pattern vector having a value of the reference shape as an element, and creating a weighting vector having a value of a change rate of a kurtosis of the reference pattern vector as an element;

(c) obtaining a length between the specified element and each element of the standard pattern matrix to calculate a weighting vector element number proximate to a position apart from a center of the weighting vector by the length, and obtaining a value of a product of an element value of the element number of the weighting vector and an element value of each element of the standard pattern matrix to calculate a product-sum value obtained by adding the value of the product to each element of the standard pattern matrix;

(d) when calculating the product-sum value, obtaining the product-sum value while moving the specified element of the standard pattern matrix to a position of each element thereof, and creating a weighted standard pattern matrix having the product-sum value as an element value of the specified element;

(e) obtaining a length between the specified element and each element of the input pattern matrix to calculate a weighting vector element number proximate to a position apart from a center of the weighting vector by the length, and obtaining a value of a product of an element value of the element number of the weighting vector and an element value of each element of the input pattern matrix to calculate a product-sum value obtained by adding the value of the product to each element of the input pattern matrix;

(f) when calculating the product-sum value, obtaining the product-sum value while moving the specified element of the input pattern matrix to a position of each element thereof, and creating a weighted input pattern matrix having the product-sum value as an element value of the specified element; and (g) defining any of a square sum and a square root of the square sum of a value of a difference between the weighted standard pattern matrix and the weighted input pattern matrix for each element as a geometric distance value between the standard pattern matrix and the input pattern matrix.

A method for detecting a similarity between images of a second aspect of the present invention is characterized in that, instead of the weighting vector in the first aspect, a ratio value of mean values is obtained, the ratio value being obtained by dividing a mean geometric distance value between standard images in the same category by a mean geometric distance value between standard images in different categories, and a weighting vector having a value of a weighting factor minimizing the ratio value of the mean values as an element is created.

Moreover, a third aspect of the present invention is a method for recognizing an image, comprising the steps of: obtaining the geometric distance between the standard pattern matrix having the feature quantity of the standard image as an element and the input pattern matrix having the feature quantity of the input image as an element by the method for detecting a similarity between images of any one of the first and second aspects; comparing the obtained geometric distance value with an arbitrarily set allowed value; and judging the input image not to be the standard image when the geometric distance value is larger than the allowed value, and judging the input image to be the standard image when the geometric distance value is equal to/smaller than the allowed value.

Next, a fourth aspect of the present invention is another method for detecting a similarity between images, comprising the steps of:

(a) creating an original standard pattern matrix having a feature quantity of a standard image as an element and an original input pattern matrix having a feature quantity of an input image as an element;

(b) creating an arbitrary reference shape such as a normal distribution and a rectangle, the reference shape having a different value of variance for each specified element of the original pattern matrices, creating a reference pattern vector having a value of the reference shape as an element, and creating a weighting vector having a value of a change rate of a kurtosis of the reference pattern vector as an element;

(c) obtaining a length between the specified element and each element of the original standard pattern matrix to calculate a weighting vector element number proximate to a position apart from a center of the weighting vector by the length, and obtaining a value of a product of an element value of the element number of the weighting vector and an element value of each element of the original standard pattern matrix to calculate a product-sum value obtained by adding the value of the product to each element of the original standard pattern matrix;

(d) when calculating the product-sum value, obtaining the product-sum value while moving the specified element of the original standard pattern matrix to a position of each element thereof, and creating an original and weighted standard pattern matrix having the product-sum value as an element value of the specified element;

(e) obtaining a length between the specified element and each element of the original input pattern matrix to calculate a weighting vector element number proximate to a position apart from a center of the weighting vector by the length, and obtaining a value of a product of an element value of the element number of the weighting vector and an element value of each element of the original input pattern matrix to calculate a product-sum value obtained by adding the value of the product to each element of the original input pattern matrix;

(f) when calculating the product-sum value, obtaining the product-sum value while moving the specified element of the original input pattern matrix to a position of each element thereof, and creating an original and weighted input pattern matrix having the product-sum value as an element value of the specified element; and (g) defining a ratio value as a geometric distance value between the original standard pattern matrix and the original input pattern matrix, the ratio value being obtained by dividing a product-sum value of the original and weighted standard pattern matrix and the original and weighted input pattern matrix for each element by a square root of a square sum of each element of the original and weighted standard pattern matrix and a square root of a square sum of each element of the original and weighted input pattern matrix.

A method for detecting a similarity between images of a fifth aspect of the present invention is characterized in that, instead of the weighting vector in the fourth aspect, a difference value of mean values is obtained, the difference value being obtained by subtracting a mean geometric distance value between standard images in different categories from a mean geometric distance value between standard images in the same category, and a weighting vector having a value of a weighting factor maximizing the difference value of the mean values as an element is created.

Moreover, a sixth aspect of the present invention is a method for recognizing an image, comprising the steps of: obtaining the geometric distance between the original standard pattern matrix having the feature quantity of the standard image as an element and the original input pattern matrix having the feature quantity of the input image as an element by the method for detecting a similarity between images of any one of the fourth and fifth aspects; comparing the obtained geometric distance value with an arbitrarily set allowed value; and judging the input image not to be the standard image when the geometric distance value is smaller than the allowed value, and judging the input image to be the standard image when the geometric distance value is equal to/larger than the allowed value.

Next, a seventh aspect of the present invention is a method for detecting a similarity between voices, comprising the steps of:

(a) creating a standard pattern matrix having a feature quantity of a standard voice as an element and an input pattern matrix having a feature quantity of an input voice as an element;

(b) creating an arbitrary reference shape such as a normal distribution and a rectangle, the reference shape having a different value of variance for each specified element of the pattern matrices, creating a reference pattern vector having a value of the reference shape as an element, and creating a weighting vector having a value of a change rate of a kurtosis of the reference pattern vector as an element;

(c) obtaining a length between the specified element and each element of the standard pattern matrix to calculate a weighting vector element number proximate to a position apart from a center of the weighting vector by the length, and obtaining a value of a product of an element value of the element number of the weighting vector and an element value of each element of the standard pattern matrix to calculate a product-sum value obtained by adding the value of the product to each element of the standard pattern matrix;

(d) when calculating the product-sum value, obtaining the product-sum value while moving the specified element of the standard pattern matrix to a position of each element thereof, and creating a weighted standard pattern matrix having the product-sum value as an element value of the specified element;

(e) obtaining a length between the specified element and each element of the input pattern matrix to calculate a weighting vector element number proximate to a position apart from a center of the weighting vector by the length, and obtaining a value of a product of an element value of the element number of the weighting vector and an element value of each element of the input pattern matrix to calculate a product-sum value obtained by adding the value of the product to each element of the input pattern matrix;

(f) when calculating the product-sum value, obtaining the product-sum value while moving the specified element of the input pattern matrix to a position of each element thereof, and creating a weighted input pattern matrix having the product-sum value as an element value of the specified element; and (g) defining any of a square sum and a square root of the square sum of a value of a difference between the weighted standard pattern matrix and the weighted input pattern matrix for each element as a geometric distance value between the standard pattern matrix and the input pattern matrix.

A method for detecting a similarity between voices of an eighth aspect of the present invention is characterized in that, instead of the weighting vector in the seventh aspect, a ratio value of mean values is obtained, the ratio value being obtained by dividing a mean geometric distance value between standard voices in the same category by a mean geometric distance value between standard voices in different categories, and a weighting vector having a value of a weighting factor minimizing the ratio value of the mean values as an element is created.

Moreover, a ninth aspect of the present invention is a method for recognizing a voice, comprising the steps of: obtaining the geometric distance between the standard pattern matrix having the feature quantity of the standard voice as an element and the input pattern matrix having the feature quantity of the input voice as an element by the method for detecting a similarity between voices of any one of the seventh and eighth aspects; comparing the obtained geometric distance value with an arbitrarily set allowed value; and judging the input voice not to be the standard voice when the geometric distance value is larger than the allowed value, and judging the input voice to be the standard voice when the geometric distance value is equal to/smaller than the allowed value.

Next, a tenth aspect of the present invention is another method for detecting a similarity between voices, comprising the steps of:

(a) creating an original standard pattern matrix having a feature quantity of a standard voice as an element and an original input pattern matrix having a feature quantity of an input voice as an element;

(b) creating an arbitrary reference shape such as a normal distribution and a rectangle, the reference shape having a different value of variance for each specified element of the original pattern matrices, creating a reference pattern vector having a value of the reference shape as an element, and creating a weighting vector having a value of a change rate of a kurtosis of the reference pattern vector as an element;

(c) obtaining a length between the specified element and each element of the original standard pattern matrix to calculate a weighting vector element number proximate to a position apart from a center of the weighting vector by the length, and obtaining a value of a product of an element value of the element number of the weighting vector and an element value of each element of the original standard pattern matrix to calculate a product-sum value obtained by adding the value of the product to each element of the original standard pattern matrix;

(d) when calculating the product-sum value, obtaining the product-sum value while moving the specified element of the original standard pattern matrix to a position of each element thereof, and creating an original and weighted standard pattern matrix having the product-sum value as an element value of the specified element;

(e) obtaining a length between the specified element and each element of the original input pattern matrix to calculate a weighting vector element number proximate to a position apart from a center of the weighting vector by the length, and obtaining a value of a product of an element value of the element number of the weighting vector and an element value of each element of the original input pattern matrix to calculate a product-sum value obtained by adding the value of the product to each element of the original input pattern matrix;

(f) when calculating the product-sum value, obtaining the product-sum value while moving the specified element of the original input pattern matrix to a position of each element thereof, and creating an original and weighted input pattern matrix having the product-sum value as an element value of the specified element; and (g) defining a ratio value as a geometric distance value between the original standard pattern matrix and the original input pattern matrix, the ratio value being obtained by dividing a product-sum value of the original and weighted standard pattern matrix and the original and weighted input pattern matrix for each element by a square root of a square sum of each element of the original and weighted standard pattern matrix and a square root of a square sum of each element of the original and weighted input pattern matrix.

A method for detecting a similarity between voices of an eleventh aspect of the present invention is characterized in that, instead of the weighting vector in the tenth aspect, a difference value of mean values is obtained, the difference value being obtained by subtracting a mean geometric distance value between standard voices in different categories from a mean geometric distance value between standard voices in the same category, and a weighting vector having a value of a weighting factor maximizing the difference value of the mean values as an element is created.

Moreover, a twelfth aspect of the present invention is a method for recognizing a voice, comprising the steps of: obtaining the geometric distance between the original standard pattern matrix having the feature quantity of the standard voice as an element and the original input pattern matrix having the feature quantity of the input voice as an element by the method for detecting a similarity between voices of any one of the tenth and eleventh aspects; comparing the obtained geometric distance value with an arbitrarily set allowed value; and judging the input voice not to be the standard voice when the geometric distance value is smaller than the allowed value, and judging the input voice to be the standard voice when the geometric distance value is equal to/larger than the allowed value.

Next, a thirteenth aspect of the present invention is a method for detecting a similarity between oscillation waves, comprising the steps of:

(a) creating a standard pattern matrix having a feature quantity of a standard oscillation wave as an element and an input pattern matrix having a feature quantity of an input oscillation wave as an element;

(b) creating an arbitrary reference shape such as a normal distribution and a rectangle, the reference shape having a different value of variance for each specified element of the pattern matrices, creating a reference pattern vector having a value of the reference shape as an element, and creating a weighting vector having a value of a change rate of a kurtosis of the reference pattern vector as an element;

(c) obtaining a length between the specified element and each element of the standard pattern matrix to calculate a weighting vector element number proximate to a position apart from a center of the weighting vector by the length, and obtaining a value of a product of an element value of the element number of the weighting vector and an element value of each element of the standard pattern matrix to calculate a product-sum value obtained by adding the value of the product to each element of the standard pattern matrix;

(d) when calculating the product-sum value, obtaining the product-sum value while moving the specified element of the standard pattern matrix to a position of each element thereof, and creating a weighted standard pattern matrix having the product-sum value as an element value of the specified element;

(e) obtaining a length between the specified element and each element of the input pattern matrix to calculate a weighting vector element number proximate to a position apart from a center of the weighting vector by the length, and obtaining a value of a product of an element value of the element number of the weighting vector and an element value of each element of the input pattern matrix to calculate a product-sum value obtained by adding the value of the product to each element of the input pattern matrix;

(f) when calculating the product-sum value, obtaining the product-sum value while moving the specified element of the input pattern matrix to a position of each element thereof, and creating a weighted input pattern matrix having the product-sum value as an element value of the specified element; and (g) defining any of a square sum and a square root of the square sum of a value of a difference between the weighted standard pattern matrix and the weighted input pattern matrix for each element as a geometric distance value between the standard pattern matrix and the input pattern matrix.

A method for detecting a similarity between oscillation waves of a fourteenth aspect of the present invention is characterized in that, instead of the weighting vector in the thirteenth aspect, a ratio value of mean values is obtained, the ratio value being obtained by dividing a mean geometric distance value between standard oscillation waves in the same category by a mean geometric distance value between standard oscillation waves in different categories, and a weighting vector having a value of a weighting factor minimizing the ratio value of the mean values as an element is created.

Moreover, a fifteenth aspect of the present invention is a method for judging an abnormality in a machine, comprising the steps of: obtaining the geometric distance between the standard pattern matrix having the feature quantity of the standard oscillation wave as an element and the input pattern matrix having the feature quantity of the input oscillation wave as an element by the method for detecting a similarity between oscillation waves of any one of the thirteenth and fourteenth aspects; comparing the obtained geometric distance value with an arbitrarily set allowed value; and judging the machine to be abnormal when the geometric distance value is larger than the allowed value, and judging the machine to be normal when the geometric distance value is equal to/smaller than the allowed value.

Next, a sixteenth aspect of the present invention is another method for detecting a similarity between oscillation waves, comprising the steps of:

(a) creating an original standard pattern matrix having a feature quantity of a standard oscillation wave as an element and an original input pattern matrix having a feature quantity of an input oscillation wave as an element;

(b) creating an arbitrary reference shape such as a normal distribution and a rectangle, the reference shape having a different value of variance for each specified element of the original pattern matrices, creating a reference pattern vector having a value of the reference shape as an element, and creating a weighting vector having a value of a change rate of a kurtosis of the reference pattern vector as an element;

(c) obtaining a length between the specified element and each element of the original standard pattern matrix to calculate a weighting vector element number proximate to a position apart from a center of the weighting vector by the length, and obtaining a value of a product of an element value of the element number of the weighting vector and an element value of each element of the original standard pattern matrix to calculate a product-sum value obtained by adding the value of the product to each element of the original standard pattern matrix;

(d) when calculating the product-sum value, obtaining the product-sum value while moving the specified element of the original standard pattern matrix to a position of each element thereof, and creating an original and weighted standard pattern matrix having the product-sum value as an element value of the specified element;

(e) obtaining a length between the specified element and each element of the original input pattern matrix to calculate a weighting vector element number proximate to a position apart from a center of the weighting vector by the length, and obtaining a value of a product of an element value of the element number of the weighting vector and an element value of each element of the original input pattern matrix to calculate a product-sum value obtained by adding the value of the product to each element of the original input pattern matrix;

(f) when calculating the product-sum value, obtaining the product-sum value while moving the specified element of the original input pattern matrix to a position of each element thereof, and creating an original and weighted input pattern matrix having the product-sum value as an element value of the specified element; and (g) defining a ratio value as a geometric distance value between the original standard pattern matrix and the original input pattern matrix, the ratio value being obtained by dividing a product-sum value of the original and weighted standard pattern matrix and the original and weighted input pattern matrix for each element by a square root of a square sum of each element of the original and weighted standard pattern matrix and a square root of a square sum of each element of the original and weighted input pattern matrix.

A method for detecting a similarity between oscillation waves of a seventeenth aspect of the present invention is characterized in that, instead of the weighting vector in the sixteenth aspect, a difference value of mean values is obtained, the difference value being obtained by subtracting a mean geometric distance value between standard oscillation waves in different categories from a mean geometric distance value between standard oscillation waves in the same category, and a weighting vector having a value of a weighting factor maximizing the difference value of the mean values as an element is created.

Moreover, an eighteenth aspect of the present invention is a method for judging an abnormality in a machine, comprising the steps of: obtaining the geometric distance between the original standard pattern matrix having the feature quantity of the standard oscillation wave as an element and the original input pattern matrix having the feature quantity of the input oscillation wave as an element by the method for detecting a similarity between oscillation waves of any one of the sixteenth and seventeenth aspects; comparing the obtained geometric distance value with an arbitrarily set allowed value; and judging the machine to be abnormal when the geometric distance value is smaller than the allowed value, and judging the machine to be normal when the geometric distance value is equal to/larger than the allowed value.

Next, a nineteenth aspect of the present invention is a method for detecting a similarity between moving images, comprising the steps of:

(a) creating a standard pattern matrix layer having a feature quantity of a standard moving image as an element and an input pattern matrix layer having a feature quantity of an input moving image as an element;

(b) creating an arbitrary reference shape such as a normal distribution and a rectangle, the reference shape having a different value of variance for each specified element of the pattern matrix layers, creating a reference pattern vector having a value of the reference shape as an element, and creating a weighting vector having a value of a change rate of a kurtosis of the reference pattern vector as an element;

(c) obtaining a length between the specified element and each element of the standard pattern matrix layer to calculate a weighting vector element number proximate to a position apart from a center of the weighting vector by the length, and obtaining a value of a product of an element value of the element number of the weighting vector and an element value of each element of the standard pattern matrix layer to calculate a product-sum value obtained by adding the value of the product to each element of the standard pattern matrix layer;

(d) when calculating the product-sum value, obtaining the product-sum value while moving the specified element of the standard pattern matrix layer to a position of each element thereof, and creating a weighted standard pattern matrix layer having the product-sum value as an element value of the specified element;

(e) obtaining a length between the specified element and each element of the input pattern matrix layer to calculate a weighting vector element number proximate to a position apart from a center of the weighting vector by the length, and obtaining a value of a product of an element value of the element number of the weighting vector and an element value of each element of the input pattern matrix layer to calculate a product-sum value obtained by adding the value of the product to each element of the input pattern matrix layer;

(f) when calculating the product-sum value, obtaining the product-sum value while moving the specified element of the input pattern matrix layer to a position of each element thereof, and creating a weighted input pattern matrix layer having the product-sum value as an element value of the specified element; and (g) defining any of a square sum and a square root of the square sum of a value of a difference between the weighted standard pattern matrix layer and the weighted input pattern matrix layer for each element as a geometric distance value between the standard pattern matrix layer and the input pattern matrix layer.

A method for detecting a similarity between moving images of a twentieth aspect of the present invention is characterized in that, instead of the weighting vector in the nineteenth aspect, a ratio value of mean values is obtained, the ratio value being obtained by dividing a mean geometric distance value between standard moving images in the same category by a mean geometric distance value between standard moving images in different categories, and a weighting vector having a value of a weighting factor minimizing the ratio value of the mean values as an element is created.

Moreover, a twenty-first aspect of the present invention is a method for recognizing a moving image, comprising the steps of: obtaining the geometric distance between the standard pattern matrix layer having the feature quantity of the standard moving image as an element and the input pattern matrix layer having the feature quantity of the input moving image as an element by the method for detecting a similarity between moving images of any one of the nineteenth and twentieth aspects; comparing the obtained geometric distance value with an arbitrarily set allowed value; and judging the input moving image not to be the standard moving image when the geometric distance value is larger than the allowed value, and judging the input moving image to be the standard moving image when the geometric distance value is equal to/smaller than the allowed value.

Next, a twenty-second aspect of the present invention is another method for detecting a similarity between moving images, comprising the steps of:

(a) creating an original standard pattern matrix layer having a feature quantity of a standard moving image as an element and an original input pattern matrix layer having a feature quantity of an input moving image as an element;

(b) creating an arbitrary reference shape such as a normal distribution and a rectangle, the reference shape having a different value of variance for each specified element of the original pattern matrix layers, creating a reference pattern vector having a value of the reference shape as an element, and creating a weighting vector having a value of a change rate of a kurtosis of the reference pattern vector as an element;

(c) obtaining a length between the specified element and each element of the original standard pattern matrix layer to calculate a weighting vector element number proximate to a position apart from a center of the weighting vector by the length, and obtaining a value of a product of an element value of the element number of the weighting vector and an element value of each element of the original standard pattern matrix layer to calculate a product-sum value obtained by adding the value of the product to each element of the original standard pattern matrix layer;

(d) when calculating the product-sum value, obtaining the product-sum value while moving the specified element of the original standard pattern matrix layer to a position of each element thereof, and creating an original and weighted standard pattern matrix layer having the product-sum value as an element value of the specified element;

(e) obtaining a length between the specified element and each element of the original input pattern matrix layer to calculate a weighting vector element number proximate to a position apart from a center of the weighting vector by the length, and obtaining a value of a product of an element value of the element number of the weighting vector and an element value of each element of the original input pattern matrix layer to calculate a product-sum value obtained by adding the value of the product to each element of the original input pattern matrix layer;

(f) when calculating the product-sum value, obtaining the product-sum value while moving the specified element of the original input pattern matrix layer to a position of each element thereof, and creating an original and weighted input pattern matrix layer having the product-sum value as an element value of the specified element; and (g) defining a ratio value as a geometric distance value between the original standard pattern matrix layer and the original input pattern matrix layer, the ratio value being obtained by dividing a product-sum value of the original and weighted standard pattern matrix layer and the original and weighted input pattern matrix layer for each element by a square root of a square sum of each element of the original and weighted standard pattern matrix layer and a square root of a square sum of each element of the original and weighted input pattern matrix layer.

A method for detecting a similarity between moving images of a twenty-third aspect of the present invention is characterized in that, instead of the weighting vector in the twenty-second aspect, a difference value of mean values is obtained, the difference value being obtained by subtracting a mean geometric distance value between standard moving images in different categories from a mean geometric distance value between standard moving images in the same category, and a weighting vector having a value of a weighting factor maximizing the difference value of the mean values as an element is created.

Moreover, a twenty-fourth aspect of the present invention is a method for recognizing a moving image, comprising the steps of: obtaining the geometric distance between the original standard pattern matrix layer having the feature quantity of the standard moving image as an element and the original input pattern matrix layer having the feature quantity of the input moving image as an element by the method for detecting a similarity between moving images of any one of the twenty-second and twenty-third aspects; comparing the obtained geometric distance value with an arbitrarily set allowed value; and judging the input moving image not be the standard moving image when the geometric distance value is smaller than the allowed value, and judging the input moving image to be the standard moving image when the geometric distance value is equal to/larger than the allowed value.

Next, a twenty-fifth aspect of the present invention is a method for detecting a similarity between solids, comprising the steps of:

(a) creating a standard pattern matrix layer having a feature quantity of a standard solid as an element and an input pattern matrix layer having a feature quantity of an input solid as an element;

(b) creating an arbitrary reference shape such as a normal distribution and a rectangle, the reference shape having a different value of variance for each specified element of the pattern matrix layers, creating a reference pattern vector having a value of the reference shape as an element, and creating a weighting vector having a value of a change rate of a kurtosis of the reference pattern vector as an element;

(c) obtaining a length between the specified element and each element of the standard pattern matrix layer to calculate a weighting vector element number proximate to a position apart from a center of the weighting vector by the length, and obtaining a value of a product of an element value of the element number of the weighting vector and an element value of each element of the standard pattern matrix layer to calculate a product-sum value obtained by adding the value of the product to each element of the standard pattern matrix layer;

(d) when calculating the product-sum value, obtaining the product-sum value while moving the specified element of the standard pattern matrix layer to a position of each element thereof, and creating a weighted standard pattern matrix layer having the product-sum value as an element value of the specified element;

(e) obtaining a length between the specified element and each element of the input pattern matrix layer to calculate a weighting vector element number proximate to a position apart from a center of the weighting vector by the length, and obtaining a value of a product of an element value of the element number of the weighting vector and an element value of each element of the input pattern matrix layer to calculate a product-sum value obtained by adding the value of the product to each element of the input pattern matrix layer;

(f) when calculating the product-sum value, obtaining the product-sum value while moving the specified element of the input pattern matrix layer to a position of each element thereof, and creating a weighted input pattern matrix layer having the product-sum value as an element value of the specified element; and (g) defining any of a square sum and a square root of the square sum of a value of a difference between the weighted standard pattern matrix layer and the weighted input pattern matrix layer for each element as a geometric distance value between the standard pattern matrix layer and the input pattern matrix layer.

A method for detecting a similarity between solids of a twenty-sixth aspect of the present invention is characterized in that, instead of the weighting vector in the twenty-fifth aspect, a ratio value of mean values is obtained, the ratio value being obtained by dividing a mean geometric distance value between standard solids in the same category by a mean geometric distance value between standard solids in different categories, and a weighting vector having a value of a weighting factor minimizing the ratio value of the mean values as an element is created.

Moreover, a twenty-seventh aspect of the present invention is a method for recognizing a solid, comprising the steps of: obtaining the geometric distance between the standard pattern matrix layer having the feature quantity of the standard solid as an element and the input pattern matrix layer having the feature quantity of the input solid as an element by the method for detecting a similarity between solids of any one of the twenty-fifth and twenty-sixth aspects; comparing the obtained geometric distance value with an arbitrarily set allowed value; and judging the input solid not to be the standard solid when the geometric distance value is larger than the allowed value, and judging the input solid to be the standard solid when the geometric distance value is equal to/smaller than the allowed value.

Next, a twenty-eighth aspect of the present invention is another method for detecting a similarity between solids, comprising the steps of:

(a) creating an original standard pattern matrix layer having a feature quantity of a standard solid as an element and an original input pattern matrix layer having a feature quantity of an input solid as an element;

(b) creating an arbitrary reference shape such as a normal distribution and a rectangle, the reference shape having a different value of variance for each specified element of the original pattern matrix layers, creating a reference pattern vector having a value of the reference shape as an element, and creating a weighting vector having a value of a change rate of a kurtosis of the reference pattern vector as an element;

(c) obtaining a length between the specified element and each element of the original standard pattern matrix layer to calculate a weighting vector element number proximate to a position apart from a center of the weighting vector by the length, and obtaining a value of a product of an element value of the element number of the weighting vector and an element value of each element of the original standard pattern matrix layer to calculate a product-sum value obtained by adding the value of the product to each element of the original standard pattern matrix layer;

(d) when calculating the product-sum value, obtaining the product-sum value while moving the specified element of the original standard pattern matrix layer to a position of each element thereof, and creating an original and weighted standard pattern matrix layer having the product-sum value as an element value of the specified element;

(e) obtaining a length between the specified element and each element of the original input pattern matrix layer to calculate a weighting vector element number proximate to a position apart from a center of the weighting vector by the length, and obtaining a value of a product of an element value of the element number of the weighting vector and an element value of each element of the original input pattern matrix layer to calculate a product-sum value obtained by adding the value of the product to each element of the original input pattern matrix layer;

(f) when calculating the product-sum value, obtaining the product-sum value while moving the specified element of the original input pattern matrix layer to a position of each element thereof, and creating an original and weighted input pattern matrix layer having the product-sum value as an element value of the specified element; and (g) defining a ratio value as a geometric distance value between the original standard pattern matrix layer and the original input pattern matrix layer, the ratio value being obtained by dividing a product-sum value of the original and weighted standard pattern matrix layer and the original and weighted input pattern matrix layer for each element by a square root of a square sum of each element of the original and weighted standard pattern matrix layer and a square root of a square sum of each element of the original and weighted input pattern matrix layer.

A method for detecting a similarity between solids of a twenty-ninth aspect of the present invention is characterized in that, instead of the weighting vector in the twenty-eighth aspect, a difference value of mean values is obtained, the difference value being obtained by subtracting a mean geometric distance value between standard solids in different categories from a mean geometric distance value between standard solids in the same category, and a weighting vector having a value of a weighting factor maximizing the difference value of the mean values as an element is created.

Moreover, a thirtieth aspect of the present invention is a method for recognizing a solid, comprising the steps of: obtaining the geometric distance between the original standard pattern matrix layer having the feature quantity of the standard solid as an element and the original input pattern matrix layer having the feature quantity of the input solid as an element by the method for detecting a similarity between solids of any one of the twenty-eighth and twenty-ninth aspects; comparing the obtained geometric distance value with an arbitrarily set allowed value; and judging the input solid not be the standard solid when the geometric distance value is smaller than the allowed value, and judging the input solid to be the standard solid when the geometric distance value is equal to/larger than the allowed value.

Next, a thirty-first aspect of the present invention is another method for detecting a similarity between voices, comprising the steps of:

(a) creating a standard pattern vector having a feature quantity of a standard voice as an element and an input pattern vector having a feature quantity of an input voice as an element;

(b) creating an arbitrary reference shape such as a normal distribution and a rectangle, the reference shape having a different value of variance for each specified element of the pattern vectors, creating a reference pattern vector having a value of the reference shape as an element, and creating a weighting vector having a value of a change rate of a kurtosis of the reference pattern vector as an element;

(c) obtaining a length between the specified element and each element of the standard pattern vector to calculate a weighting vector element number proximate to a position apart from a center of the weighting vector by the length, and obtaining a value of a product of an element value of the element number of the weighting vector and an element value of each element of the standard pattern vector to calculate a product-sum value obtained by adding the value of the product to each element of the standard pattern vector;

(d) when calculating the product-sum value, obtaining the product-sum value while moving the specified element of the standard pattern vector to a position of each element thereof, and creating a weighted standard pattern vector having the product-sum value as an element value of the specified element;

(e) obtaining a length between the specified element and each element of the input pattern vector to calculate a weighting vector element number proximate to a position apart from a center of the weighting vector by the length, and obtaining a value of a product of an element value of the element number of the weighting vector and an element value of each element of the input pattern vector to calculate a product-sum value obtained by adding the value of the product to each element of the input pattern vector;

(f) when calculating the product-sum value, obtaining the product-sum value while moving the specified element of the input pattern vector to a position of each element thereof, and creating a weighted input pattern vector having the product-sum value as an element value of the specified element; and (g) defining any of a square sum and a square root of the square sum of a value of a difference between the weighted standard pattern vector and the weighted input pattern vector for each element as a geometric distance value between the standard pattern vector and the input pattern vector.

A method for detecting a similarity between voices of a thirty-second aspect of the present invention is characterized in that, instead of the weighting vector in the thirty-first aspect, a ratio value of mean values is obtained, the ratio value being obtained by dividing a mean geometric distance value between standard voices in the same category by a mean geometric distance value between standard voices in different categories, and a weighting vector having a value of a weighting factor minimizing the ratio value of the mean values as an element is created.

Moreover, a thirty-third aspect of the present invention is a method for recognizing a voice, comprising the steps of: obtaining the geometric distance between the standard pattern vector having the feature quantity of the standard voice as an element and the input pattern vector having the feature quantity of the input voice as an element by the method for detecting a similarity between voices of any one of the thirty-first and thirty-second aspects; comparing the obtained geometric distance value with an arbitrarily set allowed value; and judging the input voice not to be the standard voice when the geometric distance value is larger than the allowed value, and judging the input voice to be the standard voice when the geometric distance value is equal to/smaller than the allowed value.

Next, a thirty-fourth aspect of the present invention is still another method for detecting a similarity between voices, comprising the steps of:

(a) creating an original standard pattern vector having a feature quantity of a standard voice as an element and an original input pattern vector having a feature quantity of an input voice as an element;

(b) creating an arbitrary reference shape such as a normal distribution and a rectangle, the reference shape having a different value of variance for each specified element of the original pattern vectors, creating a reference pattern vector having a value of the reference shape as an element, and creating a weighting vector having a value of a change rate of a kurtosis of the reference pattern vector as an element;

(c) obtaining a length between the specified element and each element of the original standard pattern vector to calculate a weighting vector element number proximate to a position apart from a center of the weighting vector by the length, and obtaining a value of a product of an element value of the element number of the weighting vector and an element value of each element of the original standard pattern vector to calculate a product-sum value obtained by adding the value of the product to each element of the original standard pattern vector;

(d) when calculating the product-sum value, obtaining the product-sum value while moving the specified element of the original standard pattern vector to a position of each element thereof, and creating an original and weighted standard pattern vector having the product-sum value as an element value of the specified element;

(e) obtaining a length between the specified element and each element of the original input pattern vector to calculate a weighting vector element number proximate to a position apart from a center of the weighting vector by the length, and obtaining a value of a product of an element value of the element number of the weighting vector and an element value of each element of the original input pattern vector to calculate a product-sum value obtained by adding the value of the product to each element of the original input pattern vector;

(f) when calculating the product-sum value, obtaining the product-sum value while moving the specified element of the original input pattern vector to a position of each element thereof, and creating an original and weighted input pattern vector having the product-sum value as an element value of the specified element; and (g) defining a ratio value as a geometric distance value between the original standard pattern vector and the original input pattern vector, the ratio value being obtained by dividing a product-sum value of the original and weighted standard pattern vector and the original and weighted input pattern vector for each element by a square root of a square sum of each element of the original and weighted standard pattern vector and a square root of a square sum of each element of the original and weighted input pattern vector.

A method for detecting a similarity between voices of a thirty-fifth aspect of the present invention is characterized in that, instead of the weighting vector in the thirty-fourth aspect, a difference value of mean values is obtained, the difference value being obtained by subtracting a mean geometric distance value between standard voices in different categories from a mean geometric distance value between standard voices in the same category, and a weighting vector having a value of a weighting factor maximizing the difference value of the mean values as an element is created.

Moreover, a thirty-sixth aspect of the present invention is a method for recognizing a voice, comprising the steps of: obtaining the geometric distance between the original standard pattern vector having the feature quantity of the standard voice as an element and the original input pattern vector having the feature quantity of the input voice as an element by the method for detecting a similarity between voices of any one of the thirty-fourth and thirty-fifth aspects; comparing the obtained geometric distance value with an arbitrarily set allowed value; and judging the input voice not to be the standard voice when the geometric distance value is smaller than the allowed value, and judging the input voice to be the standard voice when the geometric distance value is equal to/larger than the allowed value.

Next, a thirty-seventh aspect of the present invention is another method for detecting a similarity between oscillation waves, comprising the steps of:

(a) creating a standard pattern vector having a feature quantity of a standard oscillation wave as an element and an input pattern vector having a feature quantity of an input oscillation wave as an element;

(b) creating an arbitrary reference shape such as a normal distribution and a rectangle, the reference shape having a different value of variance for each specified element of the pattern vectors, creating a reference pattern vector having a value of the reference shape as an element, and creating a weighting vector having a value of a change rate of a kurtosis of the reference pattern vector as an element;

(c) obtaining a length between the specified element and each element of the standard pattern vector to calculate a weighting vector element number proximate to a position apart from a center of the weighting vector by the length, and obtaining a value of a product of an element value of the element number of the weighting vector and an element value of each element of the standard pattern vector to calculate a product-sum value obtained by adding the value of the product to each element of the standard pattern vector;

(d) when calculating the product-sum value, obtaining the product-sum value while moving the specified element of the standard pattern vector to a position of each element thereof, and creating a weighted standard pattern vector having the product-sum value as an element value of the specified element;

(e) obtaining a length between the specified element and each element of the input pattern vector to calculate a weighting vector element number proximate to a position apart from a center of the weighting vector by the length, and obtaining a value of a product of an element value of the element number of the weighting vector and an element value of each element of the input pattern vector to calculate a product-sum value obtained by adding the value of the product to each element of the input pattern vector;

(f) when calculating the product-sum value, obtaining the product-sum value while moving the specified element of the input pattern vector to a position of each element thereof, and creating a weighted input pattern vector having the product-sum value as an element value of the specified element; and (g) defining any of a square sum and a square root of the square sum of a value of a difference between the weighted standard pattern vector and the weighted input pattern vector for each element as a geometric distance value between the standard pattern vector and the input pattern vector.

A method for detecting a similarity between oscillation waves of a thirty-eighth aspect of the present invention is characterized in that, instead of the weighting vector in the thirty-seventh aspect, a ratio value of mean values is obtained, the ratio value being obtained by dividing a mean geometric distance value between standard oscillation waves in the same category by a mean geometric distance value between standard oscillation waves in different categories, and a weighting vector having a value of a weighting factor minimizing the ratio value of the mean values as an element is created.

Moreover, a thirty-ninth aspect of the present invention is a method for judging an abnormality in a machine, comprising the steps of: obtaining the geometric distance between the standard pattern vector having the feature quantity of the standard oscillation wave as an element and the input pattern vector having the feature quantity of the input oscillation wave as an element by the method for detecting a similarity between oscillation waves of any one of the thirty-seventh and thirty-eighth aspects; comparing the obtained geometric distance value with an arbitrarily set allowed value; and judging the machine to be abnormal when the geometric distance value is larger than the allowed value, and judging the machine to be normal when the geometric distance value is equal to/smaller than the allowed value.

Next, a fortieth aspect of the present invention is still another method for detecting a similarity between oscillation waves, comprising the steps of:

(a) creating an original standard pattern vector having a feature quantity of a standard oscillation wave as an element and an original input pattern vector having a feature quantity of an input oscillation wave as an element;

(b) creating an arbitrary reference shape such as a normal distribution and a rectangle, the reference shape having a different value of variance for each specified element of the original pattern vectors, creating a reference pattern vector having a value of the reference shape as an element, and creating a weighting vector having a value of a change rate of a kurtosis of the reference pattern vector as an element;

(c) obtaining a length between the specified element and each element of the original standard pattern vector to calculate a weighting vector element number proximate to a position apart from a center of the weighting vector by the length, and obtaining a value of a product of an element value of the element number of the weighting vector and an element value of each element of the original standard pattern vector to calculate a product-sum value obtained by adding the value of the product to each element of the original standard pattern vector;

(d) when calculating the product-sum value, obtaining the product-sum value while moving the specified element of the original standard pattern vector to a position of each element thereof, and creating an original and weighted standard pattern vector having the product-sum value as an element value of the specified element;

(e) obtaining a length between the specified element and each element of the original input pattern vector to calculate a weighting vector element number proximate to a position apart from a center of the weighting vector by the length, and obtaining a value of a product of an element value of the element number of the weighting vector and an element value of each element of the original input pattern vector to calculate a product-sum value obtained by adding the value of the product to each element of the original input pattern vector;

(f) when calculating the product-sum value, obtaining the product-sum value while moving the specified element of the original input pattern vector to a position of each element thereof, and creating an original and weighted input pattern vector having the product-sum value as an element value of the specified element; and (g) defining a ratio value as a geometric distance value between the original standard pattern vector and the original input pattern vector, the ratio value being obtained by dividing a product-sum value of the original and weighted standard pattern vector and the original and weighted input pattern vector for each element by a square root of a square sum of each element of the original and weighted standard pattern vector and a square root of a square sum of each element of the original and weighted input pattern vector.

A method for detecting a similarity between oscillation waves of a forty-first aspect of the present invention is characterized in that, instead of the weighting vector in the fortieth aspect, a difference value of mean values is obtained, the difference value being obtained by subtracting a mean geometric distance value between standard oscillation waves in different categories from a mean geometric distance value between standard oscillation waves in the same category, and a weighting vector having a value of a weighting factor maximizing the difference value of the mean values as an element is created.

Moreover, a forty-second aspect of the present invention is a method for judging an abnormality in a machine, comprising the steps of: obtaining the geometric distance between the original standard pattern vector having the feature quantity of the standard oscillation wave as an element and the original input pattern vector having the feature quantity of the input oscillation wave as an element by the method for detecting a similarity between oscillation waves of any one of the fortieth and forty-first aspects; comparing the obtained geometric distance value with an arbitrarily set allowed value; and judging the machine to be abnormal when the geometric distance value is smaller than the allowed value, and judging the machine to be normal when the geometric distance value is equal to/larger than the allowed value.

BRIEF DESCRIPTION OF THE DRAWINGS

FIG. 1 is a diagram showing one example of an image of an alphabet "E" in one embodiment of the present invention.

FIG. 2A is a diagram showing a method for expressing an original standard pattern matrix on an (x-y) plane.

FIG. 2B is a diagram showing a method for expressing an original input pattern matrix on the (x-y) plane.

FIG. 3A is a diagram showing a method for expressing a standard pattern matrix on an (x-y) plane.

FIG. 3B is a diagram showing a method for expressing an input pattern matrix on the (x-y) plane.

FIG. 21 is a diagram showing examples of densities of a standard image and input images.

FIG. 22 is a diagram showing examples of original pattern matrices of the standard image and the input images, corresponding to those of FIG. 21.

FIG. 24 is a diagram showing examples of original pattern matrices of the standard image and the input images, corresponding to those of FIG. 23.

FIG. 29 is a diagram showing other examples of densities of a standard image and input images.

FIG. 32A is a bar graph showing values of cosines of angles between the standard image and the input image same as the standard image and between the standard image and the input images different from the standard image, the bar graph being obtained as a result of the experiment.

FIG. 32B is a bar graph showing values of geometric distances between the standard image and the input image same as the standard image and between the standard image and the input images different from the standard image, the bar graph being obtained as a result of the experiment.

FIG. 45 is diagrams showing two examples of binary images of an alphabet "E" and two examples of binary images of an alphabet "F".

FIGS. 52A to 52C are diagrams showing examples of expanding and contracting a u-axis with respect to the weighting curve created based on the change rate of the kurtoses of the normal curve.

FIG. 60 is a diagram showing one example of a moving image where an action of a pen that writes the alphabet "E" is imaged with passage of time.

FIG. 71A is a diagram showing examples of densities of a standard image and an input image with regard to a prior art.

FIG. 71B is a diagram showing examples of original pattern matrices with regard to the prior art.

FIG. 71C is a diagram showing examples of pattern matrices with regard to the prior art.

FIG. 72 is diagrams showing two examples of binary images of the alphabet "E" and two examples of binary images of the alphabet "F".

DETAILED DESCRIPTION OF THE PREFERRED EMBODIMENTS

Figure 4A:
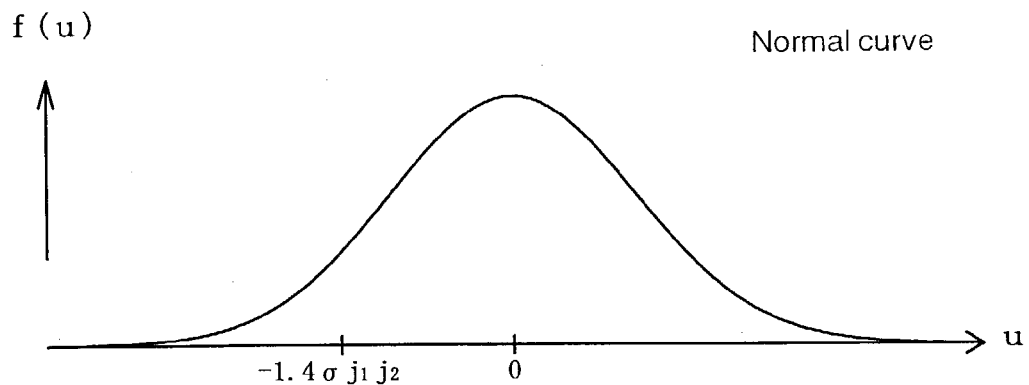
FIG. 4A is a diagram showing one example of a normal curve.

Hereinafter, description will be made for embodiments of the present invention.

[Description of Principles]

Description will be made for the principles of the present invention with regard to the case of using the normal distribution as a reference shape. Moreover, representing a pattern matrix (or an original pattern matrix), a pattern matrix layer (or an original pattern matrix layer), and a pattern vector (or an original pattern vector), with regard to a geometric distance between a standard pattern matrix and an input pattern matrix (or an original standard patter matrix and an original input pattern matrix), description will be made for the principles of the present invention.

[Principle 1]

First, in the related art (Japanese Patent Application No. 2000-277749) and the prior art (the gazette of Japanese Patent Laid-Open No. Hei 10(1998)-253444), a shape change between the standard pattern matrix and the input pattern matrix is substituted with shape changes of reference pattern vectors with values of the normal distribution as elements. Moreover, sizes in shape change of the reference pattern vectors are numerically evaluated as variations in kurtosis. Thus, a degree of the similarity between the standard pattern matrix and the input pattern matrix is detected as a value of the geometric distance.

Specifically, in the method described above, comparison is made in size between an element value of the standard pattern matrix and an element value of the input pattern matrix for each element of the pattern matrix, the reference pattern vector is changed in shape with regard to the entire elements in which the input pattern matrix is changed with respect to the standard pattern matrix, and thus a value of the kurtosis of the reference pattern vector changed in shape is directly obtained to calculate shape variations.

In order to solve the first subject, the present invention adopts a method to be described below instead of the above-described direct method. Namely, a value of a product of a change rate of the kurtosis of the reference pattern vector and a variation thereof is obtained, and a value of a product sum is obtained by adding the value of the product to the entire elements in which the input pattern matrix is changed with respect to the standard pattern matrix. Thus, shape variations are calculated. Even by use of this method, approximately the same result can be acquired. Next, the shape variations can be decomposed into two operations below: a product-sum operation of an element value of a weighting vector having, as an element, the value of a change rate of the kurtosis of the reference pattern vector and an element value of the standard pattern matrix; and a product-sum operation of an element value of the weighting vector and an element value of the input pattern matrix.

Accordingly, creation of a weighted standard pattern matrix by the product-sum operation of the element value of the weighting vector and the element value of the standard pattern matrix and creation of a weighted input pattern matrix by the product-sum operation of the element value of the weighting vector and the element value of the input pattern matrix can be carried out independently of each other. Consequently, the conventional calculation for the Euclid distance is carried out by use of the weighted standard pattern matrix and the weighted input pattern matrix, thus making it possible to calculate the value of the geometric distance.

Meanwhile, also for the original standard pattern matrix and the original input pattern matrix, which are created without normalizing a density pattern of an image, similarly to the above, the element value of the weighting vector and the element value of the original standard pattern matrix are subjected to the product-sum operation to create an original and weighted standard pattern matrix. Moreover, the element value of the weighting vector and the element value of the original input pattern matrix are subjected to the product-sum operation to create the original and weighted input pattern matrix. By use of the original and weighted standard pattern matrix and the original and weighted input pattern matrix, the conventional calculation for a cosine of an angle is carried out, thus making it possible to calculate the value of the geometric distance.

Concretely, a normal distribution having a different variance for each specified element of the pattern matrix is created, a reference pattern vector having a value of the normal distribution as an element is created, and a weighting vector having a value of a change rate of a kurtosis of the reference pattern vector as an element is previously created. Then, a length between a specified element and each element of the standard pattern matrix (or the original standard pattern matrix) is obtained, and an element number of a weighting vector proximate to a position apart from the center of the weighting vector by the length is calculated. Then, a value of a product of an element value of the element number of the weighting vector and an element value of each element of the standard pattern matrix (or the original standard pattern matrix) is obtained. Thus, a product-sum value is calculated by adding the product value to each element of the standard pattern matrix (or the original standard pattern matrix).

In this case, the product-sum value is obtained while moving the specified element of the standard pattern matrix (or the original standard pattern matrix) to the position of each element, and thus a weighted standard pattern matrix (or an original and weighted standard pattern matrix) having the product-sum value as an element value of the specified element is created.

Similarly, a length between a specified element and each element of the input pattern matrix (or the original input pattern matrix) is obtained, and an element number of a weighting vector proximate to a position apart from the center of the weighting vector by the length is calculated. Then, a value of a product of an element value of the element number of the weighting vector and an element value of each element of the input pattern matrix (or the original input pattern matrix) is obtained. Thus, a product-sum value is calculated by adding the product value to each element of the input pattern matrix (or the original input pattern matrix).

In this case, the product-sum value is obtained while moving the specified element of the input pattern matrix (or the original input pattern matrix) to the position of each element, and thus a weighted input pattern matrix (or an original and weighted input pattern matrix) having the product-sum value as an element value of the specified element is created.

Next, a square root of a square sum or the square sum itself of a difference value between each element of the weighted standard pattern matrix and each element of the weighted input pattern matrix is detected as a value of the geometric distance between the standard pattern matrix and the input pattern matrix. Meanwhile, the product-sum value of each element of the original and weighted standard pattern matrix and each element of the original and weighted input pattern matrix are divided by a square root of a square sum of each element of the original and weighted standard pattern matrix and a square root of a square sum of each element of the original and weighted input pattern matrix. Thus, a ratio value thereof is obtained, which is defined as a value of the geometric distance between the original standard pattern matrix and the original input pattern matrix.

[Principle 2]

Second, in the related art (Japanese Patent Application No. 2000-277749), a square of a ratio value obtained by dividing the maximum value of a length between a specified element and each element of a pattern matrix by a constant of 1.4 is defined as a variance value of the normal distribution. Moreover, in the same related art and the prior art (the gazette of Japanese Patent Laid-Open No. Hei 10(1998)-253444 (Japanese Patent Application No. Hei 9(1997)-61007)), a constant of 1 is weighted down each of the entire element numbers of the reference pattern vector, and an absolute value of each variation between the element value of the standard pattern matrix and the element value of the input pattern matrix is substituted into an increasing quantity of the reference pattern vector as it is irrespective of the element number of the reference pattern vector.

Specifically, in the method described above, the reference pattern vector is created by use of a normal distribution having a fixed variance value, and the reference pattern vector is increased by use of increasing means having a fixed weight value.

In order to solve the second subject, the present invention adopts a method to be described below instead of the above-described fixed method. Specifically, in the case where the reference pattern vector is created by use of a normal distribution having a variable variance value, and in the case of increasing the reference pattern vector by use of increasing means having a variable weight value, a change occurs in the value of the geometric distance between the pattern matrices (or between the original pattern matrices). Accordingly, by adjusting the variance value and the weight value, a distance between the standard pattern matrices (or between the original standard pattern matrices) in the same category can be shortened, and simultaneously, a distance between the standard pattern matrices (or between the original standard pattern matrices) in the different categories can be elongated. Consequently, separation of the standard pattern matrix (or the original standard pattern matrix) in the same category and the standard pattern matrix (or the original standard pattern matrix) in the different category is improved, and thus recognition performance when the input pattern matrix (or the original input pattern matrix) is given is improved.

Concretely, a ratio value of mean values is obtained by dividing a mean geometric distance value between the standard pattern matrices in the same category by a mean geometric distance value between the standard pattern matrices in different categories, and a weighting vector having a value of a weighting factor minimizing the ratio value of the mean values as an element is created, and by use of this weighting vector, the value of the geometric distance between the standard pattern matrix and the input pattern matrix is detected. Meanwhile, a difference value of mean values is obtained by subtracting a mean geometric distance value between the original standard pattern matrices in different categories from a mean geometric distance value between the original standard pattern matrices in the same category, and a weighting vector having a value of a weighting factor maximizing the difference value of the mean values as an element is created. By use of this weighting vector, the value of the geometric distance between the original standard patter matrix and the original input pattern matrix is detected.

Note that the above description is established even if the reference shape is other than the normal distribution, for example, a rectangle. Moreover, the above description is established also for the pattern matrix layer (or the original pattern matrix layer) and the pattern vector (or the original pattern vector). Here, the pattern matrix layer (or the original pattern matrix layer) is constituted of a plurality of pattern matrices (or original pattern matrices) in the case where an object to be processed is three-dimensional such as a moving image and a solid.

The value of the geometric distance as described above detects the shape change of the pattern matrix (or the shape change of the original pattern matrix) between the standard image and the input image accurately. Moreover, the above geometric distance value detects the similarity between the standard voice and the input voice accurately, and detects the similarity between the standard oscillation wave and the input oscillation wave accurately. Furthermore, the geometric distance value detects the shape change of the pattern matrix layer (or the shape change of the original pattern matrix layer) between the standard moving image and the input moving image accurately, and detects the similarity between the standard solid and the input solid accurately. Still further, the geometric distance value detects the shape change of the patter vector (or the shape change of the original pattern vector) between the standard voice and the input voice accurately, and detects the similarity between the standard oscillation wave and the input oscillation wave accurately.

Accordingly, by recognizing an image by use of the geometric distance value thus obtained, the shape change between the standard pattern matrix and the input pattern matrix (or between the original standard pattern matrix and the original input pattern matrix) can be detected accurately, and thus the precision of the image recognition can be significantly enhanced. Moreover, by recognizing a voice by use of the geometric distance value thus obtained, the shape change between the standard pattern matrix and the input pattern matrix (or between the original standard pattern matrix and the original input pattern matrix) can be detected accurately, and thus the precision of the voice recognition can be significantly enhanced. Moreover, by judging an abnormality in a machine by use of the geometric distance value thus obtained, the shape change between the standard pattern matrix and the input pattern matrix (or between the original standard pattern matrix and the original input pattern matrix) can be detected accurately, and thus the precision of the abnormality detection in the machine can be significantly enhanced. Moreover, by recognizing a moving image by use of the geometric distance value thus obtained, the shape change between the standard pattern matrix layer and the input pattern matrix layer (or between the original standard pattern matrix layer and the original input pattern matrix layer) can be detected accurately, and thus the precision of the moving image recognition can be significantly enhanced. Moreover, by recognizing a solid by use of the geometric distance value thus obtained, the shape change between the standard pattern matrix layer and the input pattern matrix layer (or between the original standard pattern matrix layer and the original input pattern matrix layer) can be detected accurately, and thus the precision of the solid recognition can be significantly enhanced. Moreover, by recognizing a voice by use of the geometric distance value thus obtained, the shape change between the standard pattern vector and the input pattern vector (or between the original standard pattern vector and the original input pattern vector) can be detected accurately, and thus the precision of the voice recognition can be significantly enhanced. Moreover, by judging an abnormality in a machine by use of the geometric distance value thus obtained, the shape change between the standard pattern vector and the input pattern vector (or between the original standard pattern vector and the original input pattern vector) can be detected accurately, and thus the precision of the abnormality detection in the machine can be significantly enhanced.

Hereinafter, description will be made for embodiments of the present invention with reference to the accompanying drawings. In these embodiments, description will be made for the following methods in the order of enumeration. The methods are: a method for recognizing an image, a method for recognizing a voice, and a method for judging an abnormality in a machine, all of which use a detected value of a similarity between two pattern matrices (or original pattern matrices not having been subjected to normalization); a method for recognizing a moving image, and a method for recognizing a solid, which use a detected value of a similarity between two pattern matrix layers (or original pattern matrix layers not having been subjected to normalization); and a method for recognizing a voice, and a method for judging an abnormality in a machine, which use a detected value of a similarity between two pattern vectors (or original pattern vectors not having been subjected to normalization).

Embodiment (I): Method for Recognizing Image (Two-Dimension)

Description will be made for the method for recognizing an image by use of a detected value of a similarity between two pattern matrices (or original pattern matrices). In this embodiment (I), in order to recognize an image, a density pattern of the image is normalized by the sum of densities of the entire pixels or the maximum value of the densities of the entire pixels, and thus a standard pattern matrix and an input pattern matrix are created. Moreover, a weighting vector having a value of a change rate in kurtosis of a reference pattern vector as an element is created. Then, an element value of the weighting vector and an element value of the standard pattern matrix are subjected to a product-sum operation, and thus a weighted standard pattern matrix is created. Independently thereof, the element value of the same weighting vector and an element value of the input pattern matrix are subjected to the product-sum operation, and thus a weighted input pattern matrix is created. Subsequently, a conventional calculation for the Euclid distance is carried out by use of these weighted standard pattern matrix and weighted input pattern matrix, and thus the similarity of the images is detected.

Meanwhile, an original standard pattern matrix and an original input pattern matrix are created without normalizing the density pattern of the image. Then, the element value of the weighting vector and an element value of the original standard pattern matrix are subjected to the product-sum operation, and thus an original and weighted standard pattern matrix is created. Independently thereof, the element value of the same weighting vector and an element value of the original input pattern matrix are subjected to the product-sum operation, and thus an original and weighted input pattern matrix is created. Subsequently, a conventional calculation for a cosine of an angle is carried out by use of these original and weighted standard pattern matrix and original and weighted input pattern matrix, and thus the similarity of the images is detected. As described above, in the detection of the similarity of the images, there are two ways where the density pattern of the image is normalized and not.

Furthermore, the element value of the weighting vector is adjusted so that a distance between standard pattern matrices (or between original standard pattern matrices) in the same category can be shortened, and that a distance between standard pattern matrices (or between original standard pattern matrices) in different categories can be elongated simultaneously. Then, the similarity of the images is detected by use of the weighting vector having been adjusted, and by use of a detected value thereof, the image is recognized. However, such adjustment of the weighting vector is not always necessary and can be omitted.

FIG. 1 is an example of an image of an alphabet "E". As shown in FIG. 1, the image is constituted of $m_1 \times m_2$ pieces of pixels obtained by partitioning the image into $m_1$ pieces in an x-direction and $m_2$ pieces in a y-direction. Here, a density of an image in a pixel that is $i_1$-th in the x-direction and $i_2$-th in the y-direction is defined as $Pi_1 i_2$.

Next, an original standard pattern matrix Ho having a density $Pi_1 i_2$ ($i_1$=1, 2, . . . , $m_1$) ($i_2$=1, 2, . . . , $m_2$) of a standard image as an element and an original input pattern matrix No having a density $Pi_1 i_2$ ($i_1$=1, 2, . . . , $m_1$) ($i_2$=1, 2, . . . , $m_2$) of an input image as an element are created. These original standard pattern matrix Ho and original input pattern matrix No are expressed as in the following equation 1. Note that the equation 1 expresses the shapes of the densities of the standard image and the input image by the $m_1 \times m_2$ pieces of element values of the original pattern matrix.

[Equation 1] (1)

$$Ho = \begin{bmatrix} ho11 & ho12 & \ldots & ho1i_2 & \ldots & ho1m_2 \\ ho21 & ho22 & \ldots & ho2i_2 & \ldots & ho2m_2 \\ \vdots & \vdots & & \vdots & & \vdots \\ hoi_11 & hoi_12 & \cdots & hoi_1i_2 & \cdots & hoi_1m_2 \\ \vdots & \vdots & & \vdots & & \vdots \\ hom_11 & hom_12 & \cdots & hom_1i_2 & \cdots & hom_1m_2 \end{bmatrix}$$

$$No = \begin{bmatrix} no11 & no12 & \cdots & no1i_2 & \cdots & no1m_2 \\ no21 & no22 & \cdots & no2i_2 & \cdots & no2m_2 \\ \vdots & \vdots & & \vdots & & \vdots \\ noi_11 & noi_12 & \cdots & noi_1i_2 & \cdots & noi_1m_2 \\ \vdots & \vdots & & \vdots & & \vdots \\ nom_11 & nom_12 & \cdots & nom_1i_2 & \cdots & nom_1m_2 \end{bmatrix}$$

Moreover, FIG. 2A shows the original standard pattern matrix Ho on an (x-y) plane, and similarly, FIG. 2B shows the original input pattern matrix No on an (x-y) plane. Here, $hoi_1 i_2$ denotes an element on $(xi_1, yi_2)$ of Ho, and $noi_1 i_2$ denotes an element on $(xi_1, yi_2)$ of No. In the related art (Japanese Patent Application No. 2000-277749), as processing, the density $Pi_1 i_2$ ($i_1$=1, 2, . . . , $m_1$) ($i_2$=1, 2, . . . , $m_2$) of the image is normalized by the sum of the densities of the entire pixels. Specifically, the normalized density $pi_1 i_2$ of the image in the pixel that is the $i_1$-th in the x-direction and the $i_2$-th in the y-direction is calculated by the following equation 2.

[Equation 2] (2)

$$pi_1 i_2 = \frac{Pi_1 i_2}{\sum_{j_1=1}^{m_1} \sum_{j_2=1}^{m_2} Pj_1 j_2}$$

$(i_1 = 1, 2, 3, \ldots, m_1)$ $(i_2 = 1, 2, 3, \ldots, m_2)$

Moreover, in the case of a binary image and so on, the density $Pi_1 i_2$ ($i_1$=1, 2, . . . , $m_1$) ($i_2$=1, 2, . . . , $m_2$) of the image is normalized by the maximum value of the densities of the entire pixels. Specifically, the normalized density $pi_1 i_2$ of the image in the pixel that is the $i_1$-th in the x-direction and the $i_2$-th in the y-direction can be calculated by the following equation 3. Note that a symbol max$\{Pj_1 j_2\}$ in the equation 3 implies the maximum value of a density $Pj_1 j_2$ ($j_1$=1, 2, . . . , $m_1$) ($j_2$=1, 2, . . . , $m_2$) of the image.

[Equation 3] (3)

$$pi_1i_2 = \frac{Pi_1i_2}{\max\{Pj_1j_2\}}$$

$(i_1 = 1, 2, 3, \ldots, m_1)$ $(i_2 = 1, 2, 3, \ldots, m_2)$

Here, the shape of the normalized density by the equation 2 and the shape of the normalized density by the equation 3 are similar to each other. Therefore, whichever of the equation 2 and the equation 3 may be used, a similar discussion to be described later is established.

Next, a standard pattern matrix H having a normalized density $pi_1i_2$ ($i_1=1, 2, \ldots, m_1$) ($i_2=1, 2, \ldots, m_2$) of the standard image as an element and an input pattern matrix N having a normalized density $pi_1i_2$ ($i_1=1, 2, \ldots, m_1$) ($i_2=1, 2, \ldots, m_2$) of the input image as an element are created. These standard pattern matrix H and input pattern matrix N are expressed as in the following equation 4. Note that the equation 4 expresses the shapes of the normalized densities of the standard image and the input image by the $m_1 \times m_2$ pieces of element values of the pattern matrices.

[Equation 4] (4)

$$H = \begin{bmatrix} h11 & h12 & \cdots & h1i_2 & \cdots & h1m_2 \\ h21 & h22 & \cdots & h2i_2 & \cdots & h2m_2 \\ \vdots & \vdots & & \vdots & & \vdots \\ hi_11 & hi_12 & \cdots & hi_1i_2 & \cdots & hi_1m_2 \\ \vdots & \vdots & & \vdots & & \vdots \\ hm_11 & hm_12 & \cdots & hm_1i_2 & \cdots & hm_1m_2 \end{bmatrix}$$

$$N = \begin{bmatrix} n11 & n12 & \cdots & n1i_2 & \cdots & n1m_2 \\ n21 & n22 & \cdots & n2i_2 & \cdots & n2m_2 \\ \vdots & \vdots & & \vdots & & \vdots \\ ni_11 & ni_12 & \cdots & ni_1i_2 & \cdots & ni_1m_2 \\ \vdots & \vdots & & \vdots & & \vdots \\ nm_11 & nm_12 & \cdots & nm_1i_2 & \cdots & nm_1m_2 \end{bmatrix}$$

Moreover, FIG. 3A shows the standard pattern matrix H on an (x-y) plane, and similarly, FIG. 3B shows the input pattern matrix N on an (x-y) plane. Here, $hi_1i_2$ denotes an element on $(xi_1, yi_2)$ of H, and $ni_1i_2$ denotes an element on $(xi_1, yi_2)$ of N.

Figure 4B:
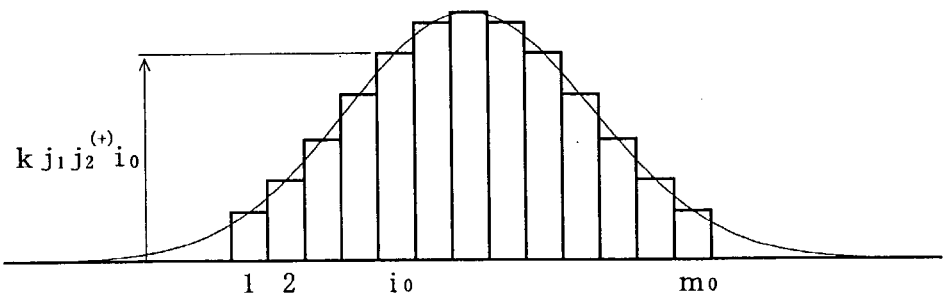
FIG. 4B is a diagram showing one example of a positive reference pattern vector having a value of the normal curve as an element.
Figure 4C:
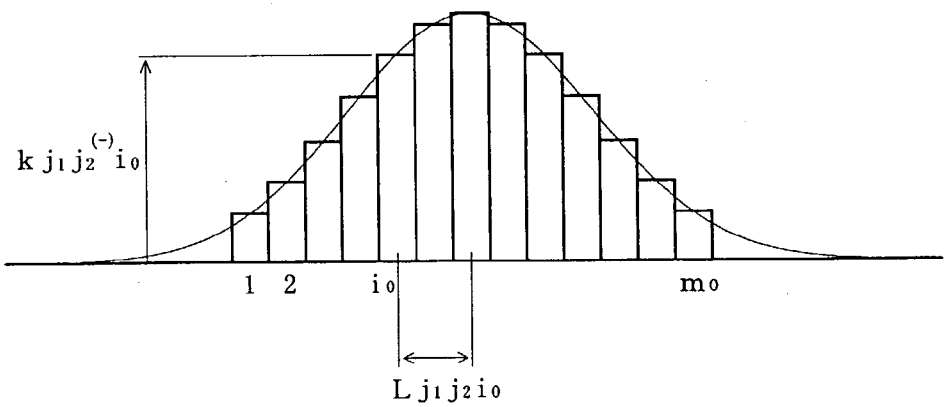
FIG. 4C is a diagram showing one example of a negative reference pattern vector having the value of the normal curve as an element.

In the related art (Japanese Patent Application No. 2000-277749), as shown in FIG. 4A, a graph of a normal distribution (normal curve) having a mean value: $\mu=0$ and a value of a variance $\sigma j_1 j_2^2$ is created. Moreover, as shown in FIGS. 4B and 4C, a positive reference pattern vector $Kj_1j_2^{(+)}$ and a negative reference pattern vector $Kj_1j_2^{(-)}$, each having a value of the same normal distribution as an element, are created.

Next, in the related art (Japanese Patent Application No. 2000-277749), the shape change between the standard pattern matrix H and the input pattern matrix N is substituted into shape changes of the positive reference pattern vector $Kj_1j_2^{(+)}$ and the negative reference pattern vector $Kj_1j_2^{(-)}$.

Specifically, with regard to the $i_1i_2$ element ($i_1=1, 2, \ldots, m_1$) ($i_2=1, 2, \ldots, m_2$) of the pattern matrix, an absolute value of the variation between the element value $hi_1i_2$ of the standard pattern matrix H and the element value $ni_1i_2$ of the input pattern matrix N is $|ni_1i_2 - hi_1i_2|$. In this case, as shown in the following equation 5, when $ni_1i_2$ is larger than $hi_1i_2$, an element value $kj_1j_2^{(+)}i_o$ of the positive reference pattern vector $Kj_1j_2^{(+)}$ is increased by the absolute value $|ni_1i_2 - hi_1i_2|$ of this variation. And when $ni_1i_2$ is smaller than $hi_1i_2$, an element value $kj_1j_2^{(-)}i_o$ of the negative reference pattern vector $Kj_1j_2^{(-)}$ is increased by the absolute value $|ni_1i_2 - hi_1i_2|$ of this variation.

[Equation 5]

for $i_1=1,2,3,\ldots, m_1$;
$i_2=1,2,3,\ldots, m_2$;
when $ni_1i_2 > hi_1i_2$,
$kj_1j^{(+)}i_0$ is increased by $|ni_1i_2-hi_1i_2|$,
when $ni_1i_2 < hi_1i_2$,
$kj_1j_2^{(-)}i_0$ is increased by $|ni_1i_2-hi_1i_2|$.
$\ldots\ldots\ldots (5)$
$(j_1=1,2,3,\ldots, m_1)$
$(j_2=1,2,3,\ldots, m_1)$ Subsequently, in the related art (Japanese Patent Application No. 2000-277749), with regard to the pair of reference pattern vectors (positive reference pattern vector $Kj_1j_2^{(+)}$ and negative reference pattern vector $Kj_1j_2^{(-)}$) changed in shape by the equation 5, a size of each shape change thereof is numerically evaluated as a variation in kurtosis. Namely, a kurtosis $Aj_1j_2^{(+)}$ of the positive reference pattern vector $Kj_1j_2^{(+)}$ and a kurtosis $Aj_1j_2^{(-)}$ of the negative reference pattern vector $Kj_1j_2^{(-)}$ are calculated by the following equation 6.

[Equation 6] (6)

$$Aj_1j_2^{(+)} = \frac{\left\{\sum_{i_0=1}^{m_0} kj_1j_2^{(+)}i_0\right\} \cdot \left\{\sum_{i_0=1}^{m_0} (Lj_1j_2i_0)^4 \cdot kj_1j_2^{(+)}i_0\right\}}{\left\{\sum_{i_0=1}^{m_0} (Lj_1j_2i_0)^2 \cdot kj_1j_2^{(+)}i_0\right\}^2}$$

$$Aj_1j_2^{(-)} = \frac{\left\{\sum_{i_0=1}^{m_0} kj_1j_2^{(-)}i_0\right\} \cdot \left\{\sum_{i_0=1}^{m_0} (Lj_1j_2i_0)^4 \cdot kj_1j_2^{(-)}i_0\right\}}{\left\{\sum_{i_0=1}^{m_0} (Lj_1j_2i_0)^2 \cdot kj_1j_2^{(-)}i_0\right\}^2}$$

$(j_1 = 1, 2, 3, \ldots, m_1)$
$(j_2 = 1, 2, 3, \ldots, m_2)$

Here, description will be made for the change rate in kurtosis of the reference pattern vector by use of typical examples shown in FIGS. 5A to 7B. Each of FIGS. 5A, 6A and 7A is a schematic diagram showing an example where only the $i_1i_2$ element ($i_1=2, 2, \ldots, m_1$) ($i_2=1, 2, \ldots, m_2$) of the input pattern matrix is increased by $\delta$ with respect to the standard pattern matrix, and thus one element of the positive reference pattern vector $Kj_1j_2^{(+)}$ is increased by the same value $\delta$.

Figure 5A:
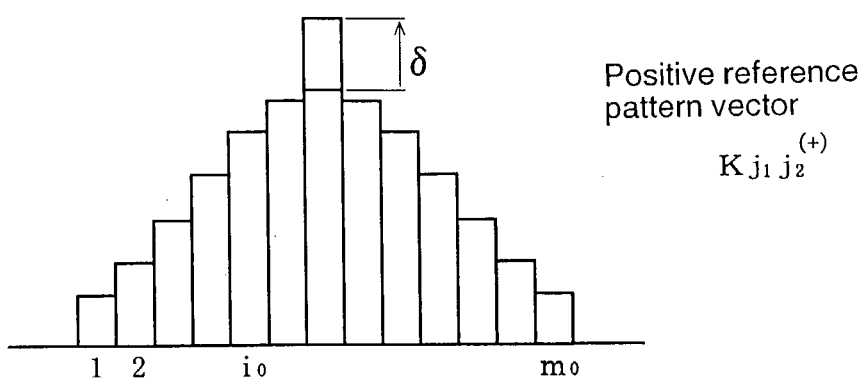
FIG. 5A is a diagram showing a case where only a center portion of the positive reference pattern vector is increased.
Figure 5B:
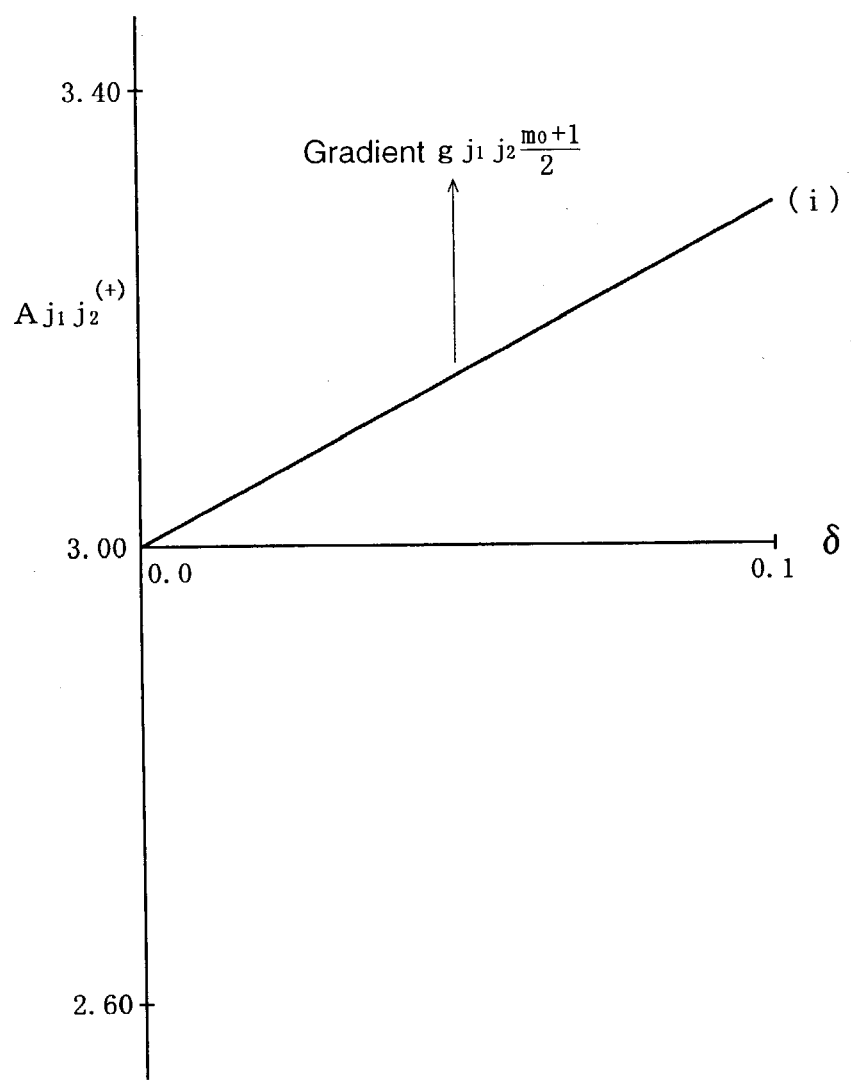
FIG. 5B is a graph showing a change of a kurtosis of the positive reference pattern vector with respect to an increasing quantity of the center portion of FIG. 5A.
Figure 6A:
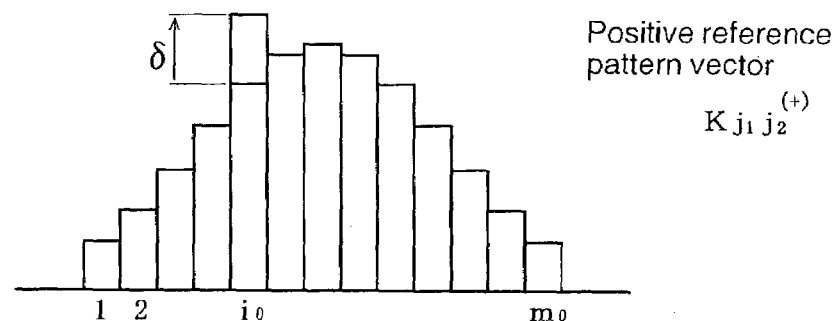
FIG. 6A is a diagram showing a case where only a side portion of the positive reference pattern vector is increased.
Figure 6B:
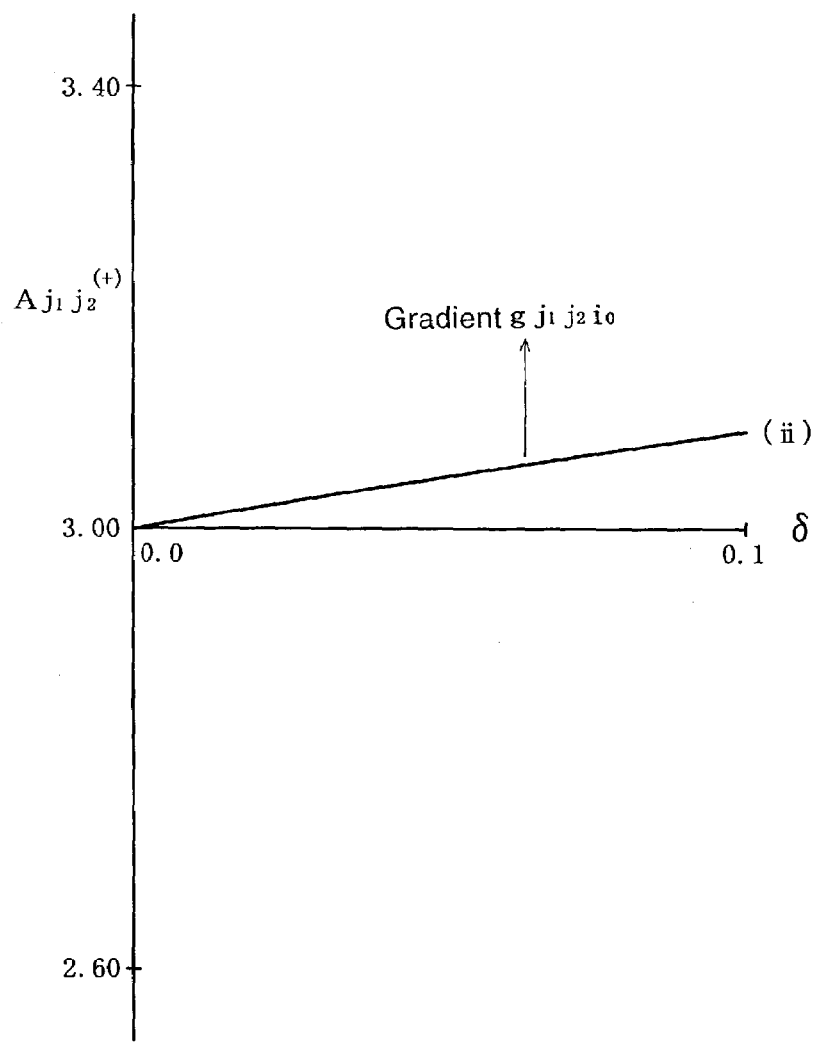
FIG. 6B is a graph showing a change of the kurtosis of the positive reference pattern vector with respect to an increasing quantity of the side portion of FIG. 6A.
Figure 7A:
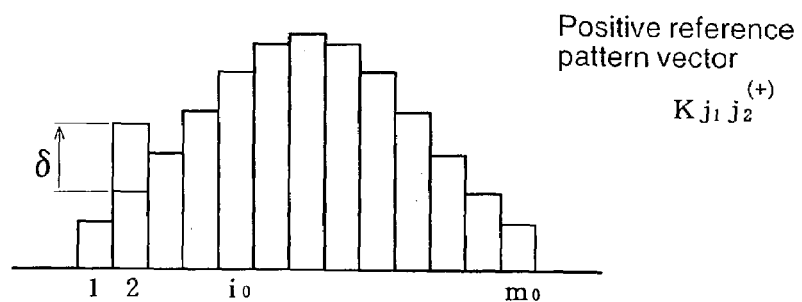
FIG. 7A is a diagram showing a case where only an edge portion of the positive reference pattern vector is increased.
Figure 7B:
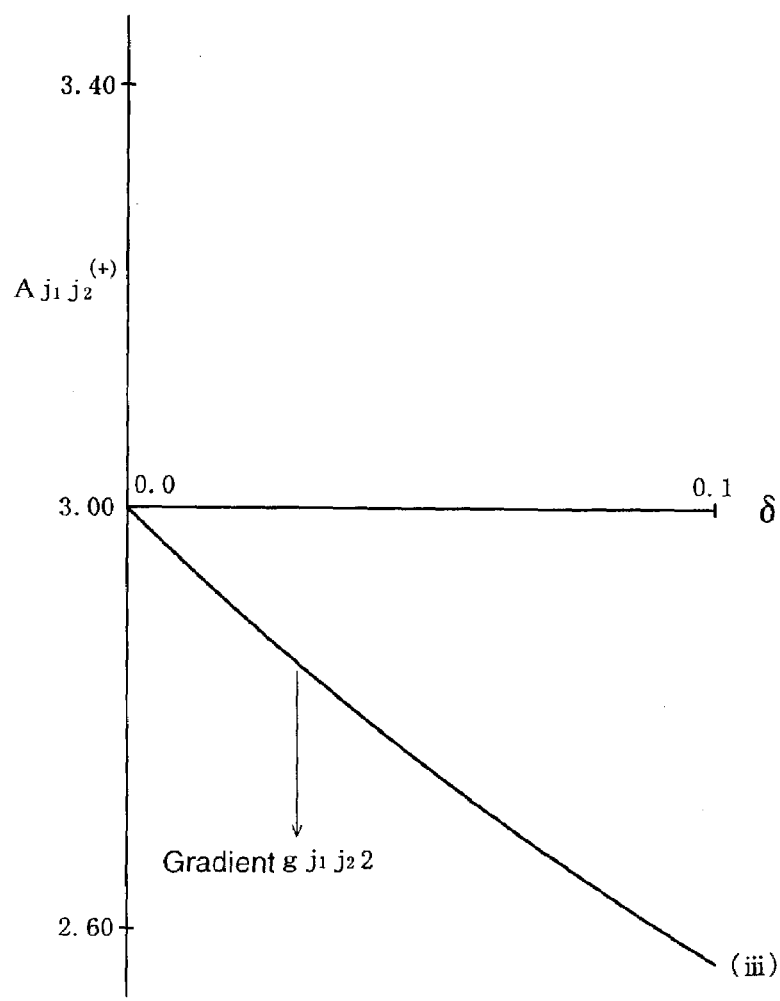
FIG. 7B is a graph showing a change of the kurtosis of the positive reference pattern vector with respect to an increasing quantity of the edge portion of FIG. 7A.

Moreover, each of FIGS. 5B, 6B and 7B shows the kurtosis $Aj_1j_2^{(+)}$ of the positive reference pattern vector $Kj^1j_2^{(+)}$ changed in shape as in each of FIGS. 5A, 6A and 7A, the kurtosis $Aj_1j_2^{(+)}$ being obtained directly by the equation 6 and represented in a graph denoted by each of codes (i) to (iii). Each of FIGS. 5B, 6B and 7B shows a state where a calculated value $Aj_1j_2^{(+)}$ of the kurtosis is changed when a value of δ is increased 0.0 to 0.1. Here, the absolute value of the variation between the element value of the standard pattern matrix and the element value of the input pattern matrix is defined as $|ni_1i_2-hi_1i_2|$, and δ is set as: $δ=|ni_1i_2-hi_1i_2|$.

(1) FIG. 5A shows an example where only a $(m_o+1)/2$-th element on a center portion of the positive reference pattern vector is increased by δ. In this case, in FIG. 5B, while the change of the kurtosis $Aj_1j_2^{(+)}$ with respect to the change of δ is shown by the graph denoted by the code (i), it is understood from the same drawing that the graph of the code (i) can be approximated to a straight line. Here, if a mean gradient of the graph of the code (i) is defined as $gj_1j_2(m_o+1)/2$, then a value of this gradient $gj_1j_2(m_o+1)/2$ becomes a change rate in kurtosis of the $(m_o+1)/2$-th element of the positive reference pattern vector.

(2) FIG. 6A shows an example where only an $i_o$-th element on a side portion of the positive reference pattern vector is increased by δ. In this case, in FIG. 6B, while the change of the kurtosis $Aj_1j_2^{(+)}$ with respect to the change of δ is shown by the graph denoted by the code (ii), it is understood from the same drawing that the graph of the code (ii) can be approximated to a straight line. Here, if a mean gradient of the graph of the code (ii) is defined as $gj_1j_2i_o$, then a value of this gradient $gj_1j_2i_o$ becomes a change rate in kurtosis of the $i_o$-th element of the positive reference pattern vector.

(3) FIG. 7A shows an example where only the second element on an edge portion of the positive reference pattern vector is increased by δ. In this case, in FIG. 7B, while the change of the kurtosis $Aj_1j_2^{(+)}$ with respect to the change of δ is shown by the graph denoted by the code (iii), it is understood from the same drawing that the graph of the code (iii) can be approximated to a straight line when the value of δ is small. Here, if a mean gradient of the graph of the code (iii) is defined as $gj_1j_22$, then a value of this gradient $gj_1j_22$ becomes a change rate in kurtosis of the second element of the positive reference pattern vector.

Note that, since the positive reference pattern vector $Kj_1j_2^{(+)}$ and the negative reference pattern vector $Kj_1j_2^{(-)}$ are vectors equivalent to each other, the above description for FIGS. 5A to 7B is also established for the negative reference pattern vector $Kj_1j_2^{(-)}$. Moreover, the above description for FIGS. 5A to 7B is always established irrespective of the value of the variance $σj_1j_22$.

As described above, in the methods of the related art and the prior art, the reference pattern vector is changed in shape by the equation 5, and the kurtosis value of the reference pattern vector changed in shape is obtained directly by the equation 6. From the above description, in the case of each of FIGS. 5A, 6A and 7A, it is understood that an approximate value of the kurtosis $Aj_1j_2^{(+)}$ can be calculated by an upper conditional equation of the following equation 7 instead of the above-described direct method. Specifically, the change rate in kurtosis of each element of the positive reference pattern vector $Kj_1j_2^{(+)}$ is previously calculated, and when only the $i_1i_2$ element of the input pattern matrix is increased with respect to the standard pattern matrix, and thus the $i_o$-th element ($i_0=1, 2, \ldots, m_o$) of the positive reference pattern vector is increased by the same value, then a value of a product of $gj_1j_2i_o$ and $|ni_1i_2-hi_1i_2|$ can be obtained to calculate the kurtosis value $Aj_1j_2^{(+)}$. In this case, the change rate of the kurtosis in the $i_o$-th element of the positive reference pattern vector is defined as $gj_1j_2i_o$, and the absolute value of the variation between the element value of the standard pattern matrix and the element value of the input pattern matrix is defined as $|ni_1i_2-hi_1i_2|$.

Similarly, when only the $i_1i_2$ element of the input pattern matrix is decreased with respect to the standard pattern matrix, and thus the $i_o$-th element ($i_0=1, 2, \ldots, m_o$) of the negative reference pattern vector is increased by the same value, then a value of a product of $gj_1j_2i_o$ and $|ni_1i_2-hi_1i_2|$ can be obtained to calculate a kurtosis value $Aj_1j_2^{(-)}$ by a lower conditional equation of the following equation 7. Note that the equation 7 is established only in the case where only one element of the positive reference pattern vector or the negative reference pattern vector is increased.

[Equation 7]

when $ni_1i_2 > hi_1i_2$,
$$Aj_1j_2^{(+)}=3+gj_1j_2i_0 \cdot |ni_1i_2-hi_1i_2|$$
when $ni_1i_2 < hi_1i_2$,
$$Aj_1j_2^{(-)}=3+gj_1j_2i_0 \cdot |ni_1i_2-hi_1i_2|$$
$$\cdots \cdots (7)$$
$$(j_1=1,2,3,\ldots,m_1)$$
$$(j_2=1,2,3,\ldots,m_2)$$

In the equation 7, $|ni_1i_2-hi_1i_2|$ is substituted with $(ni_1i_2-hi_1i_2)$ while considering signs thereof, and thus the following equation 8 is obtained.

[Equation 8]

when $ni_1i_2 > hi_1i_2$,
$$Aj_1j_2^{(+)}=3+gj_1j_2i_0 \cdot (ni_1i_2-hi_1i_2)$$
when $ni_1i_2 < hi_1i_2$,
$$Aj_1j_2^{(-)}=3-gj_1j_2i_0 \cdot (ni_1i_2-hi_1i_2)$$
$$\cdots \cdots (8)$$
$$(j_1=1,2,3,\ldots,m_1)$$
$$(j_2=1,2,3,\ldots,m_1)$$

Figure 8A:
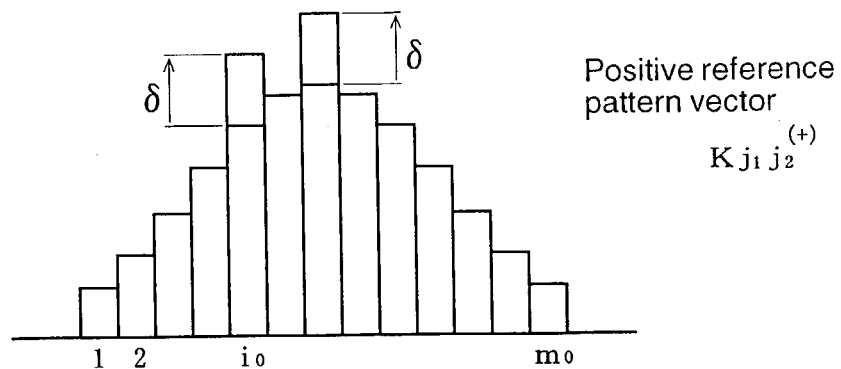
FIG. 8A is a diagram showing a case where the center and side portions of the positive reference pattern vector are increased simultaneously.
Figure 8B:
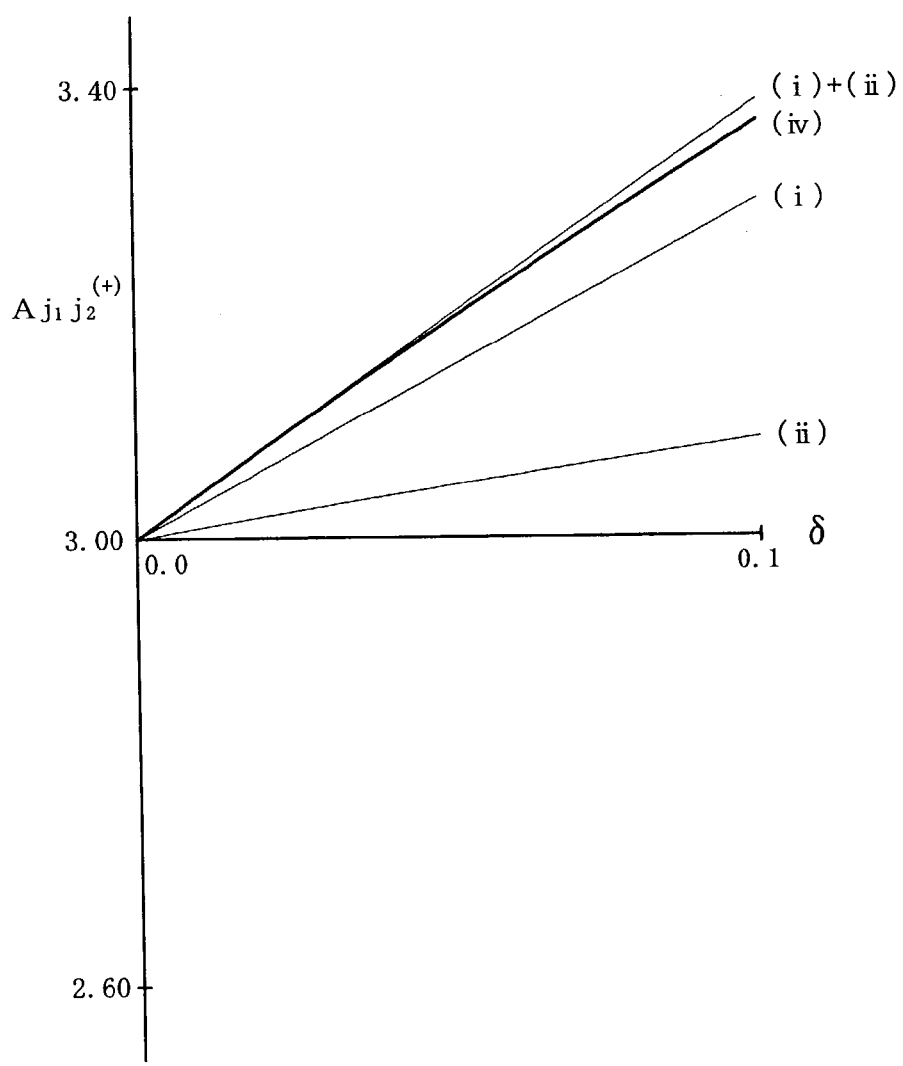
FIG. 8B is a graph showing changes of the kurtoses of the positive reference pattern vector with respect to increasing quantities of the center and side portions of FIG. 8A.
Figure 9A:
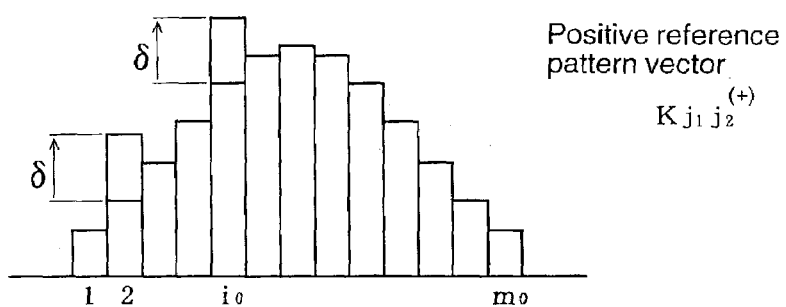
FIG. 9A is a diagram showing a case where the side and edge portions of the positive reference pattern vector are increased simultaneously.
Figure 9B:
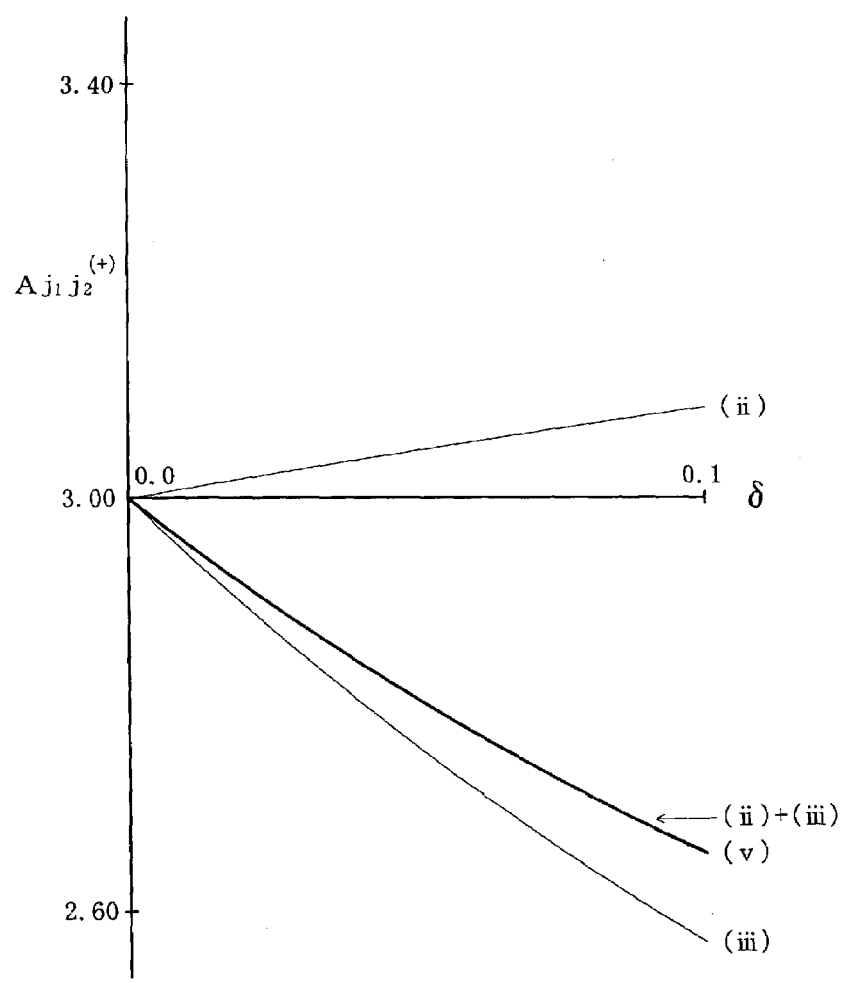
FIG. 9B is a graph showing changes of the kurtoses of the positive reference pattern vector with respect to increasing quantities of the side and edge portions of FIG. 9A.
Figure 10A:
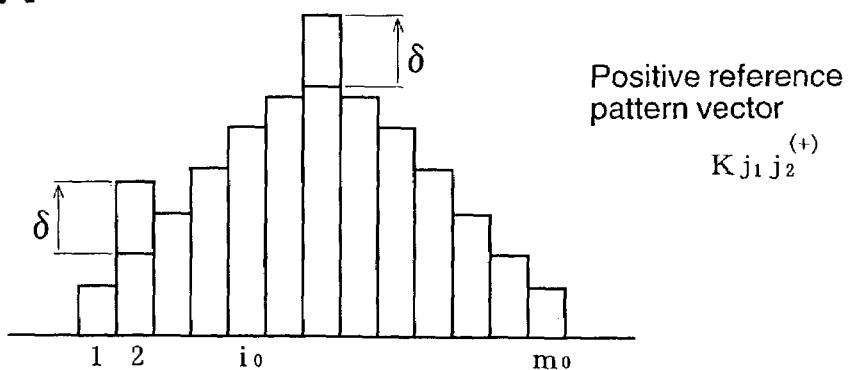
FIG. 10A is a diagram showing a case where the center and edge portions of the positive reference pattern vector are increased simultaneously.
Figure 10B:
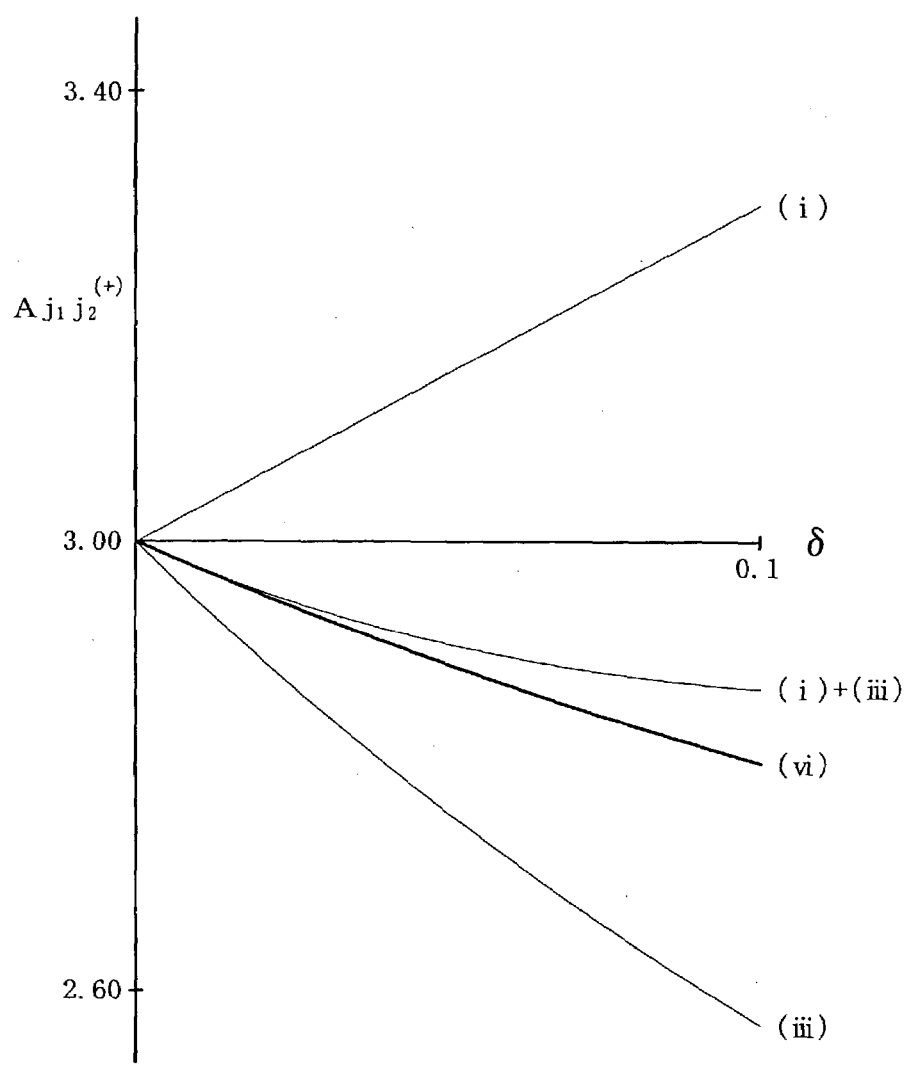
FIG. 10B is a graph showing changes of the kurtoses of the positive reference pattern vector with respect to increasing quantities of the center and edge portions of FIG. 10A.
Figure 11A:
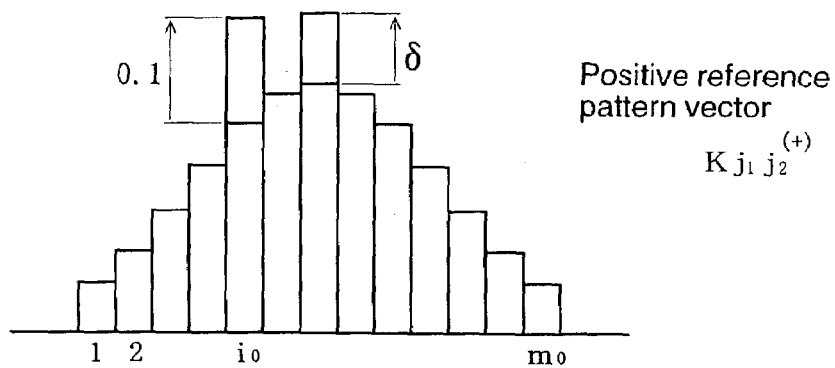
FIG. 11A is a diagram showing a case where the center and side portions of the positive reference pattern vector are increased simultaneously.
Figure 11B:
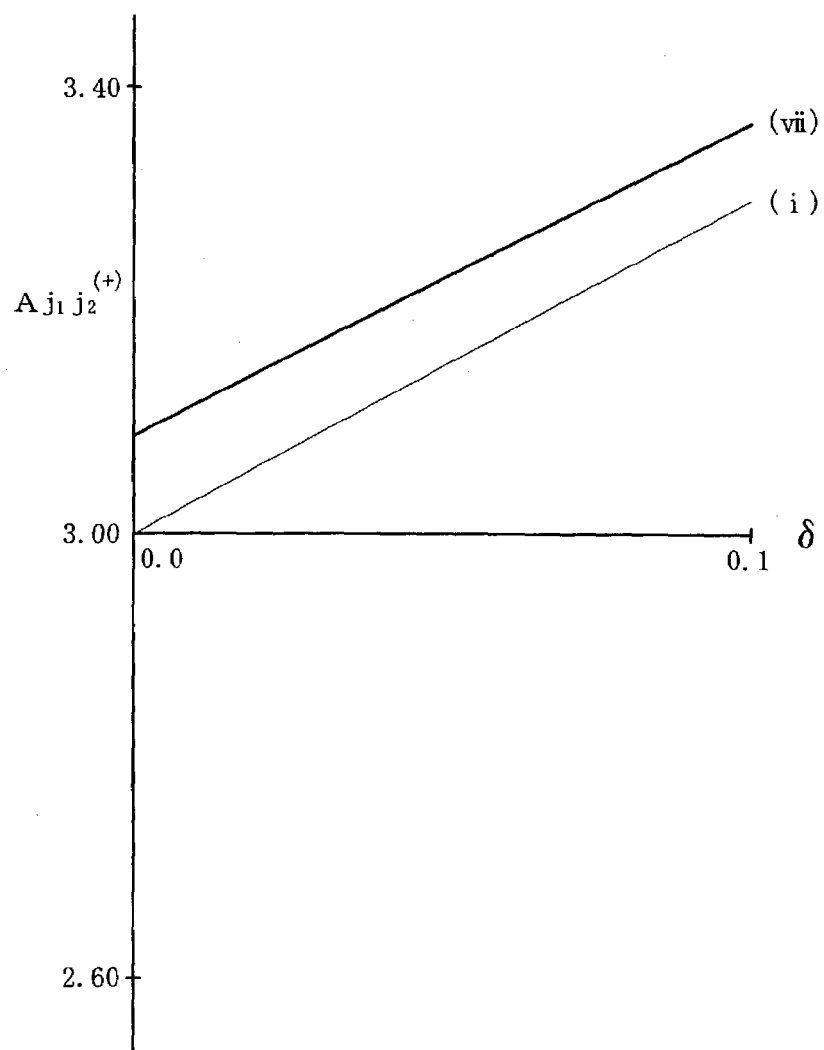
FIG. 11B is a graph showing changes of the kurtoses of the positive reference pattern vector with respect to increasing quantities of the center and side portions of FIG. 11A.
Figure 12A:
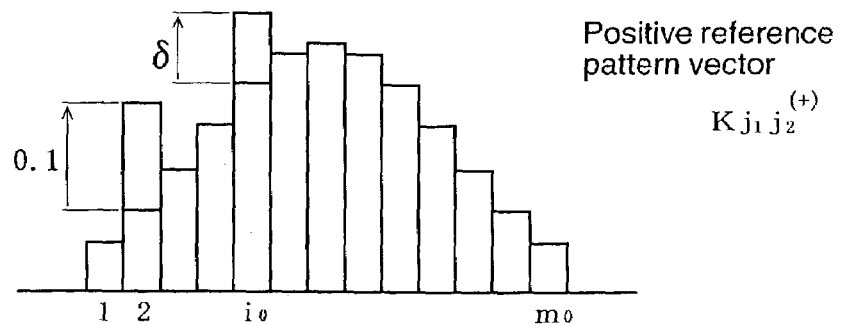
FIG. 12A is a diagram showing a case where the side and edge portions of the positive reference pattern vector are increased simultaneously.
Figure 12B:
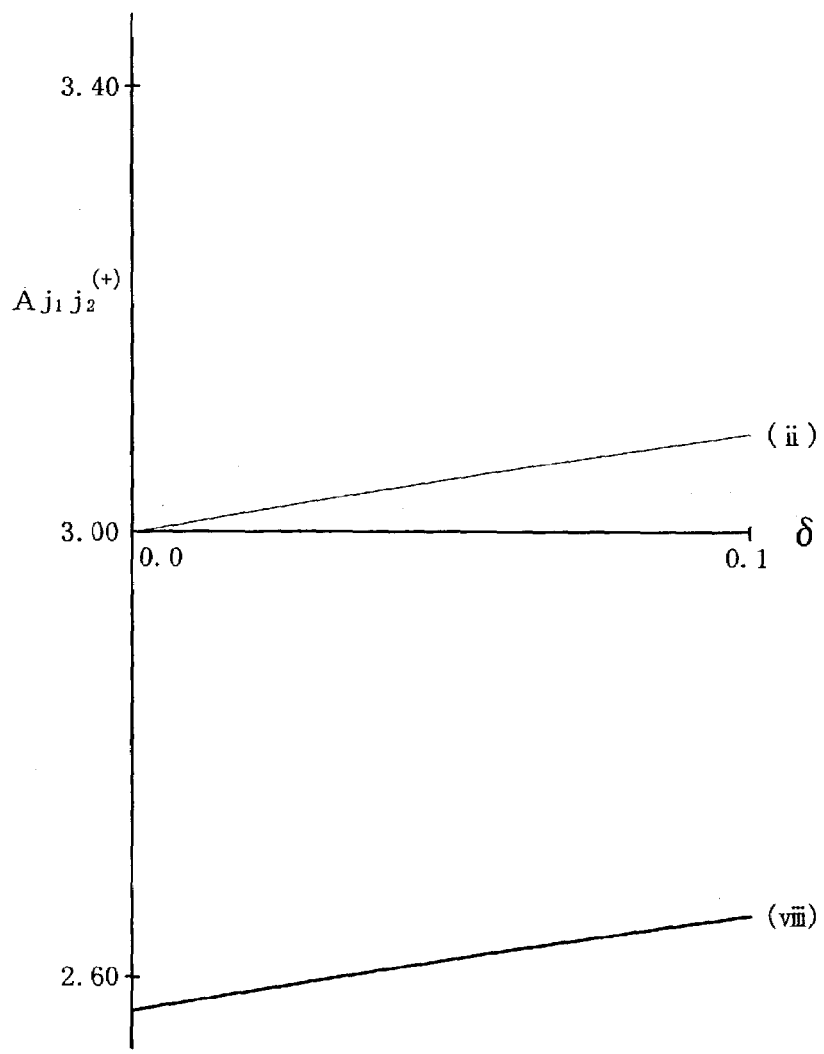
FIG. 12B is a graph showing changes of the kurtoses of the positive reference pattern vector with respect to increasing quantities of the side and edge portions of FIG. 12A.
Figure 13A:
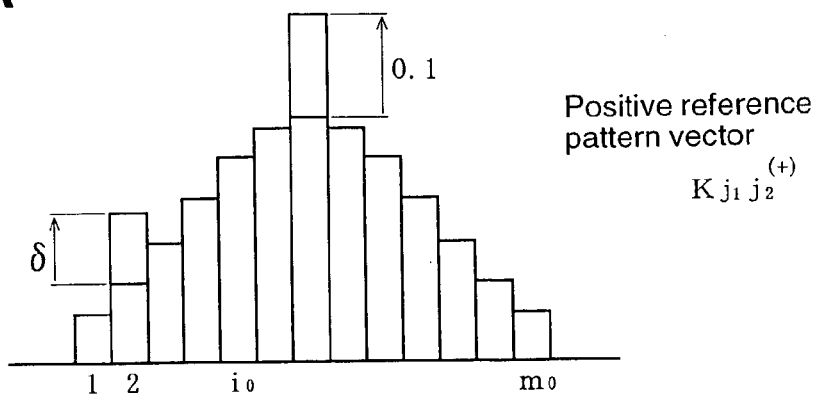
FIG. 13A is a diagram showing a case where the center and edge portions of the positive reference pattern vector are increased simultaneously.
Figure 13B:
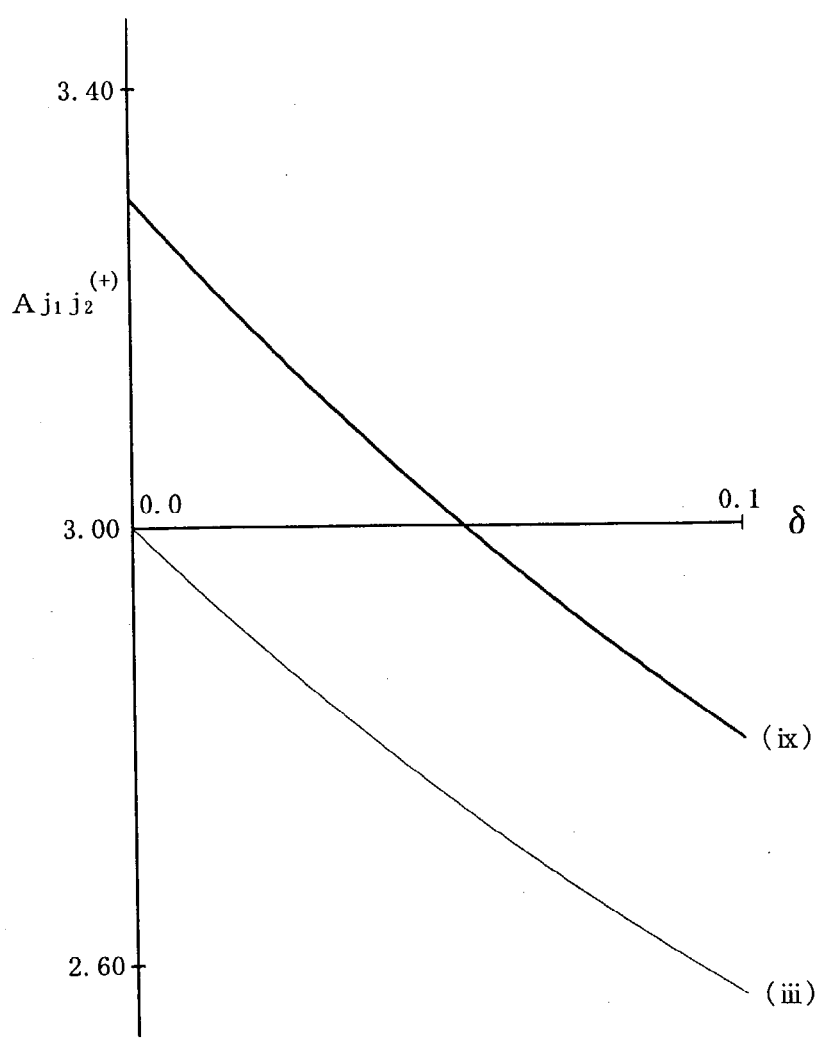
FIG. 13B is a graph showing changes of the kurtoses of the positive reference pattern vector with respect to increasing quantities of the center and edge portions of FIG. 13A.

Next, description will be made for a property of the change in kurtosis of the reference pattern vector by use of typical examples shown in FIGS. 8A to 13B. Each of FIGS. 8A, 9A and 10A is a schematic diagram showing an example where two elements of the input pattern matrix are simultaneously increased by δ with respect to the standard pattern matrix, and thus two elements of the positive reference pattern vector $Kj_1j_2^{(+)}$ are increased by the same value δ. Each of FIGS. 11A, 12A and 13A is a schematic diagram showing an example where one element of the input pattern matrix is increased by δ with respect to the standard pattern matrix, and another element is simultaneously increased by 0.1 with respect thereto, thus one element of the positive reference pattern vector $Kj_1j_2^{(+)}$ is increased by δ, and another element thereof is increased by 0.1 simultaneously.

Moreover, each of FIGS. 8B, 9B, 10B, 11B, 12B and 13B shows the kurtosis $Aj_1j_2^{(+)}$ of the positive reference pattern vector $Kj_1j_2^{(+)}$ changed in shape as in each of FIGS. 8A, 9A, 10A, 11A, 12A and 13A, the kurtosis $Aj_1j_2^{(+)}$ being obtained directly by the equation 6 and represented in a graph denoted by each of codes (iv) to (ix). Each of FIGS. 8B, 9B, 10B, 11B, 12B and 13B shows a state where a calculated value $Aj'j_2^{(+)}$ of the kurtosis is changed when a value of δ is increased from 0.0 to 0.1. Here, the absolute value of the variation between the element value of the standard pattern matrix and the element value of the input pattern matrix is defined as $|ni_1i_2-hi_1i_2|$, and δ is set as: $δ=|ni_1i_2-hi_1i_2|$.

(1) FIG. 8A shows an example where the $(m_o+1)/2$-th element on the center portion of the positive reference pattern vector and the $i_o$-th element on the side portion thereof are increased by δ simultaneously. In this case, in FIG. 8B, the change of the kurtosis $Aj_1j_2^{(+)}$ with respect to the change of $\delta$ is shown by the graph denoted by the code (iv). Moreover, a result obtained by adding the graph of the code (i) in FIG. 5B and the graph of the code (ii) in FIG. 6B is shown by a graph of a code (i)+(ii). From the same drawing, it is understood that the graph of the code (iv) is equal to the graph of the code (i)+(ii) approximately.

(2) FIG. 9A shows an example where the $i_o$-th element on the side portion of the positive reference pattern vector and the second element on the edge portion thereof are increased by $\delta$ simultaneously. In this case, in FIG. 9B, the change of the kurtosis $Aj_1j_2^{(+)}$ with respect to the change of $\delta$ is shown by the graph denoted by the code (v). Moreover, a result obtained by adding the graph of the code (ii) in FIG. 6B and the graph of the code (iii) in FIG. 7B is shown by a graph of a code (ii)+(iii). From the same drawing, it is understood that the graph of the code (v) is equal to the graph of the code (ii)+(iii) approximately.

(3) FIG. 10A shows an example where the $(m_o+1)/2$-th element on the center portion of the positive reference pattern vector and the second element on the edge portion thereof are increased by $\delta$ simultaneously. In this case, in FIG. 10B, the change of the kurtosis $Aj_1j_2^{(+)}$ with respect to the change of $\delta$ is shown by the graph denoted by the code (vi). Moreover, a result obtained by adding the graph of the code (i) in FIG. 5B and the graph of the code (iii) in FIG. 7B is shown by a graph of a code (i)+(iii). From the same drawing, it is understood that the graph of the code (vi) is equal to the graph of the code (i)+(iii) approximately when the value of $\delta$ is small.

(4) FIG. 11A shows an example where the $(m_o+1)/2$-th element on the center portion of the positive reference pattern vector is increased by $\delta$ and the $i_o$-th element on the side portion thereof is increased by 0.1 simultaneously. In this case, in FIG. 11B, the change of the kurtosis $Aj_1j_2^{(+)}$ with respect to the change of $\delta$ is shown by the graph denoted by the code (vii). Moreover, the graph of the code (i) in FIG. 5B is shown. From the same drawing, it is understood that the graph of the code (vii) is obtained by translating the graph of the code (i), and that a distance thereof is equal to the variation of the kurtosis in the case of $\delta=0.1$ in the graph of the code (ii) in FIG. 6B.

(5) FIG. 12A shows an example where the $i_o$-th element on the side portion of the positive reference pattern vector is increased by $\delta$ and the second element on the edge portion thereof is increased by 0.1 simultaneously. In this case, in FIG. 12B, the change of the kurtosis $Aj_1j_2^{(+)}$ with respect to the change of $\delta$ is shown by the graph denoted by the code (viii). Moreover, the graph of the code (ii) in FIG. 6B is shown. From the same drawing, it is understood that the graph of the code (viii) is obtained by translating the graph of the code (ii), and that a distance thereof is equal to the variation of the kurtosis in the case of $\delta=0.1$ in the graph of the code (iii) in FIG. 7B.

(6) FIG. 13A shows an example where the second element on the edge portion of the positive reference pattern vector is increased by $\delta$ and the $(m_o+1)/2$-th element on the center portion thereof is increased by 0.1 simultaneously. In this case, in FIG. 13B, the change of the kurtosis $Aj_1j_2^{(+)}$ with respect to the change of $\delta$ is shown by the graph denoted by the code (ix). Moreover, the graph of the code (iii) in FIG. 7B is shown. From the same drawing, it is understood that the graph of the code (ix) is obtained by translating the graph of the code (iii), and that a distance thereof is equal to the variation of the kurtosis in the case of $\delta=0.1$ in the graph of the code (i) in FIG. 5B.

Note that, since the positive reference pattern vector $Kj_1j_2^{(+)}$ and the negative reference pattern vector $Kj_1j_2^{(-)}$ are vectors equivalent to each other, the above description for FIGS. 8A to 13B is also established for the negative reference pattern vector $Kj_1j_2^{(-)}$. Moreover, the above description for FIGS. 8A to 13B is always established irrespective of the value of the variance $\sigma j_1j_2^2$.

From the above description, in the case of each of FIGS. 8A, 9A, 10A, 11A, 12A and 13A, it is understood that the approximate value of the kurtosis $Aj_1j_2^{(+)}$ can be calculated by adding the variation of the kurtosis obtained from each of FIGS. 5B, 6B and 7B instead of the direct method. Namely, with regard to the increased two elements of the positive reference pattern vector, each variation of the kurtosis is obtained by use of each of FIGS. 5B, 6B and 7B, and the sum value is obtained by adding the variation of the kurtosis, and thus the kurtosis value $Aj_1j_2^{(+)}$ can be calculated. Similarly, the kurtosis value $Aj_1j_2^{(-)}$ can be calculated.

The above is established also in the case where three or more elements of the input pattern matrix are simultaneously increased with respect to the standard pattern matrix, and thus three or more elements of the positive reference pattern vector $Kj_1j_2^{(+)}$ are simultaneously increased. Similarly, the above is established also in the case where three or more elements of the input pattern matrix are simultaneously decreased with respect to the standard pattern matrix, and thus three or more elements of the negative reference pattern vector $Kj_1j_2^{(-)}$ are simultaneously increased.

Accordingly, in the case where plural elements of the input pattern matrix are simultaneously increased with respect to the standard pattern matrix, and thus plural elements of the positive reference pattern vector are simultaneously increased, the kurtosis value $Aj_1j_2^{(+)}$ can be calculated by an upper conditional equation of the following equation 9. Specifically, the change rate in kurtosis of the $i_o$-th element of the positive reference pattern vector is defined as $gj_1j_2i_o$, and the variation between the element value of the standard pattern matrix and the element value of the input pattern matrix is defined as $(ni_1i_2-hi_1i_2)$. Then, a value of the product of $gj_1j_2i_o$ and $(ni_1i_2-hi_1i_2)$ is obtained, and a value of the sum is obtained by adding the value of the product to the entire elements of the input pattern matrix, which are increased with respect to the standard pattern matrix, and thus the kurtosis value $Aj_1j_2^{(+)}$ is calculated.

Similarly, in the case where plural elements of the input pattern matrix are simultaneously decreased with respect to the standard pattern matrix, and thus plural elements of the negative reference pattern vector are simultaneously increased, then, by a lower conditional equation of the following equation 9, a value of the product of $gj_1j_2i_o$ and $(ni_1i_2-hi_1i_2)$ is obtained, and a value of the sum is obtained by adding the value of the product to the entire elements of the input pattern matrix, which are decreased with respect to the standard pattern matrix, and thus the kurtosis value $Aj_1j_2^{(-)}$ is calculated.

[Equation 9] (9)

for all $i_1, i_2$ where $ni_1i_2 > hi_1i_2$, $$Aj_1j_2^{(+)} = 3 + \sum_{i_1=1}^{m_1} \sum_{i_2=1}^{m_2} gj_1j_2i_o \cdot (ni_1i_2 - hi_1i_2)$$

-continued for all $i_1, i_2$ where $ni_1i_2 < hi_1i_2$, $$Aj_1j_2^{(-)} = 3 - \sum_{i_1=1}^{m_1}\sum_{i_2=1}^{m_2} gj_1j_2i_0 \cdot (ni_1i_2 - hi_1i_2)$$

$(j_1 = 1, 2, 3, \ldots, m_1)$ $(j_2 = 1, 2, 3, \ldots, m_2)$

Incidentally, in the related art (Japanese Patent Application No. 2000-277749), by use of the kurtosis $Aj_1j_2^{(+)}$ of the positive reference pattern vector $Kj_1j_2^{(+)}$ and the kurtosis $Aj_1j_2^{(-)}$ of the negative reference pattern vector $Kj_1j_2^{(-)}$, both of which are calculated by the equation 6, a shape variation $Dj_1j_2$ is calculated by the following equation 10. Namely, the kurtosis values of the two reference pattern vectors $Kj_1j_2^{(+)}$ and $Kj_1j_2^{(-)}$ set initially to normal distribution shapes are both equal to 3. Therefore, the kurtosis variations of the positive and negative reference pattern vectors changed in shape by the equation 5 become $\{Aj_1j_2^{(+)}-3\}$ and $\{Aj_1j_2^{(-)}-3\}$, respectively. Accordingly, the variation in the positive direction becomes $\{Aj_1j_2^{(+)}-3\}$, the variation in the negative direction becomes $\{Aj_1j_2^{(+)}-3\}$, and the entire variation becomes a difference value therebetween. On the premise described above, the shape variation $Dj_1j_2$ is calculated.

[Equation 10]

$$Dj_1,j_2 = \{Aj_1j_2^{(+)} - 3\} - \{Aj_1j_2^{(-)} - 3\}$$
$$= Aj_1j_2^{(+)} - Aj_1j_2^{(-)}$$

$(j_1 1, 2, 3, \ldots, m_1)$ $(j_2 1, 2, 3, \ldots, m_2)$

Accordingly, the equation 9 is assigned to the equation 10 to obtain the following equation 11. Namely, in the case where the plural elements of the input pattern matrix with respect to the standard pattern matrix are increased and decreased simultaneously, and thus the plural elements of the positive and negative reference pattern vectors are increased simultaneously, then by the equation 11, the shape variation $Dj_1j_2$ can be calculated.

[Equation 11]

$$Dj_1j_2 = \sum_{i,j=1}^{m_1}\sum_{i_1=1}^{m_2} gj_1j_2i_0 \cdot (ni_1i_2 - hi_1i_2)$$

$$= \sum_{i_1=1}^{m_1}\sum_{i_2=1}^{m_2}\{gj_1j_2i_0 \cdot ni_1i_2 - gj_1j_2i_0 \cdot hi_1i_2\}$$

$$= \sum_{i_1=1}^{m_1}\sum_{i_2=1}^{m_2} gj_1j_2i_0 \cdot ni_1i_2 - \sum_{i_1=1}^{m_1}\sum_{i_2=1}^{m_2} gj_1j_2i_0 \cdot hi_1i_2$$

$(j_1 = 1, 2, 3, \ldots, m_1)$ $(j_2 = 1, 2, 3, \ldots, m_2)$

From the equation 11, it is understood that the shape variation $Dj_1j_2$ can be decomposed into a product-sum operation for the change rate $gj_1j_2i_o$ of the kurtosis of the reference pattern vector and the element value $hi_1i_2$ of the standard pattern matrix and a product-sum operation for the same change rate $gj_1j_2i_o$ and the element value $ni_1i_2$ of the input pattern matrix. In this connection, as shown in the following equation 12, the respective product-sum values are defined as $hgj_1j_2$ and $ngj_1j_2$.

[Equation 12] (12)

$$hgj_1j_2 = \sum_{i_1=1}^{m_1}\sum_{i_2=1}^{m_2} gj_1j_2i_0 \cdot hi_1i_2$$

$$ngj_1j_2 = \sum_{i_1=1}^{m_1}\sum_{i_2=1}^{m_2} gj_1j_2i_0 \cdot ni_1i_2$$

$(j_1 = 1, 2, 3, \ldots, m_1)$ $(j_2 = 1, 2, 3, \ldots, m_2)$

Next, description will be made for a method for calculating the change rate $gj_1j_2i_o$ ($i_o=1, 2, \ldots, m_o$) of the kurtosis and calculating the element number $i_o$ in the equation 12. Note that the positive reference pattern vector $Kj_1j_2^{(+)}$ and the negative reference pattern vector $Kj_1j_2^{(-)}$ are vectors equivalent to each other. Therefore, the change rate of the kurtosis of the positive reference pattern vector $Kj_1j_2^{(+)}$ and the change rate of the kurtosis of the negative reference pattern vector $Kj_1j_2^{(-)}$ are equal to each other (calculation methods thereof are equal). Moreover, as shown in the equation 12, it is not necessary to distinguish these vectors. Accordingly, in the description below, the positive and negative reference pattern vectors will be simply referred to as a reference pattern vector, excluding the signs $^{(+)}$ and $^{(-)}$.

Figure 14A:
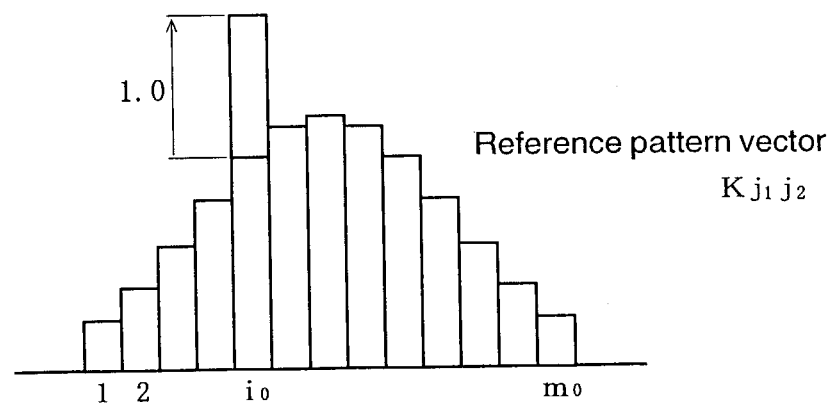
FIGS. 14A and 14B are diagrams showing an example of creating a weighting vector based on a change rate of a kurtosis of a reference pattern vector.
Figure 14B:
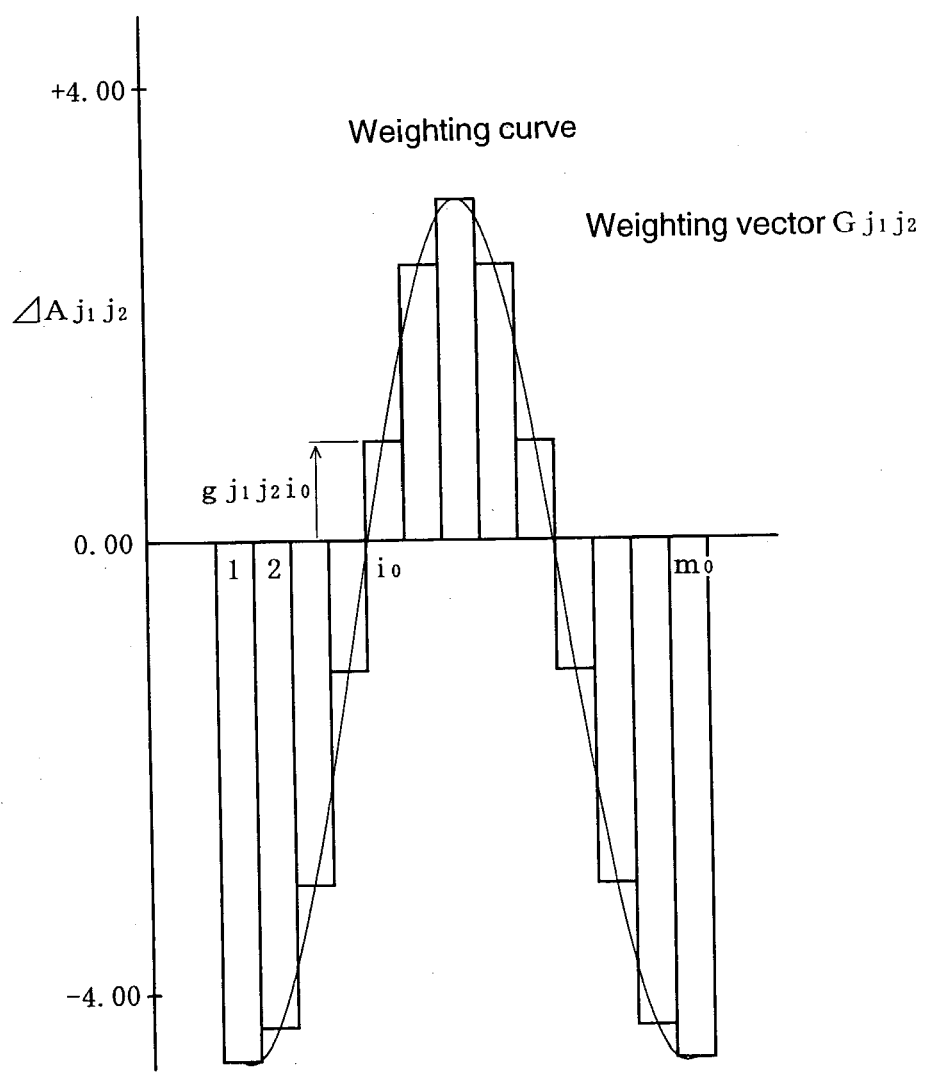

FIG. 14A is a schematic diagram showing an example where only the $i_o$-th element of the reference pattern vector $Kj_1j_2$ is increased by 1.0. Moreover, FIG. 14B is a graph (weighting curve) showing a state where the variation $\Delta Aj_1j_2$ of the kurtosis $Aj_1j_2$ of the reference pattern vector changed in shape as shown in FIG. 14A is directly obtained by the equation 6 and plotted on the position $i_o$ in FIG. 14B, and then a calculated value $\Delta Aj_1j_2$ of the kurtosis variation is changed when the $i_o$ is changed from 1 to $m_o$. Here in this weighting curve, the kurtosis variation when only the $i_o$-th element of the reference pattern vector is increased by 1.0 is plotted. Therefore, a function value of the weighting curve becomes equal to the change rate $gj_1j_2i_o$ in kurtosis in the $i_o$-th element ($i_o=1, 2, \ldots, m_o$) of the reference pattern vector. Moreover, FIG. 14B also shows a bar graph of which height is equal to the function value of the weighting curve. A weighting vector $Gj_1j_2$ having a height value of the bar graph as an element is created as shown in FIG. 14B, and is expressed as in the following equation 13. The equation 13 expresses the change rate in kurtosis of the reference pattern vector by the $m_o$ pieces of element values of the vector. While the equations 1 and 4 are matrices (two-dimension), the equation 13 is a vector (one-dimension).

[Equation 13]

$Gj_1j_2=(gj_1j_21, gj_1j_22, \ldots, gj_1j_2i_o, \ldots, gj_1j_2m_o)$ . . . . . . . . . . (13)

$(j_1=1,2,3,, \ldots, m_1)$ $(j_2=1,2,3,, \ldots, m_1)$

Figure 15A:
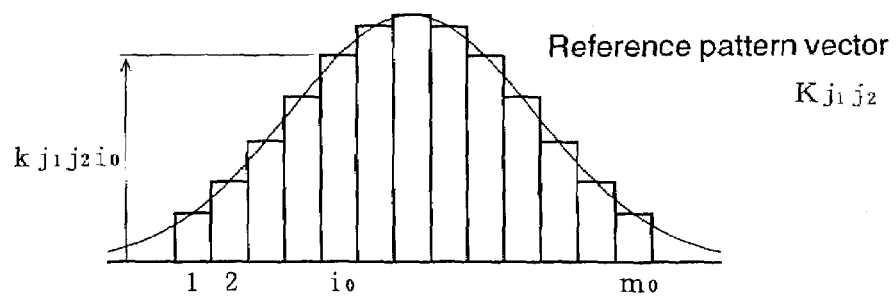
FIGS. 15A and 15B are diagrams showing a relationship between the normal curve and a weighting curve and a relationship between the reference pattern vector and the weighting vector.
Figure 15B:
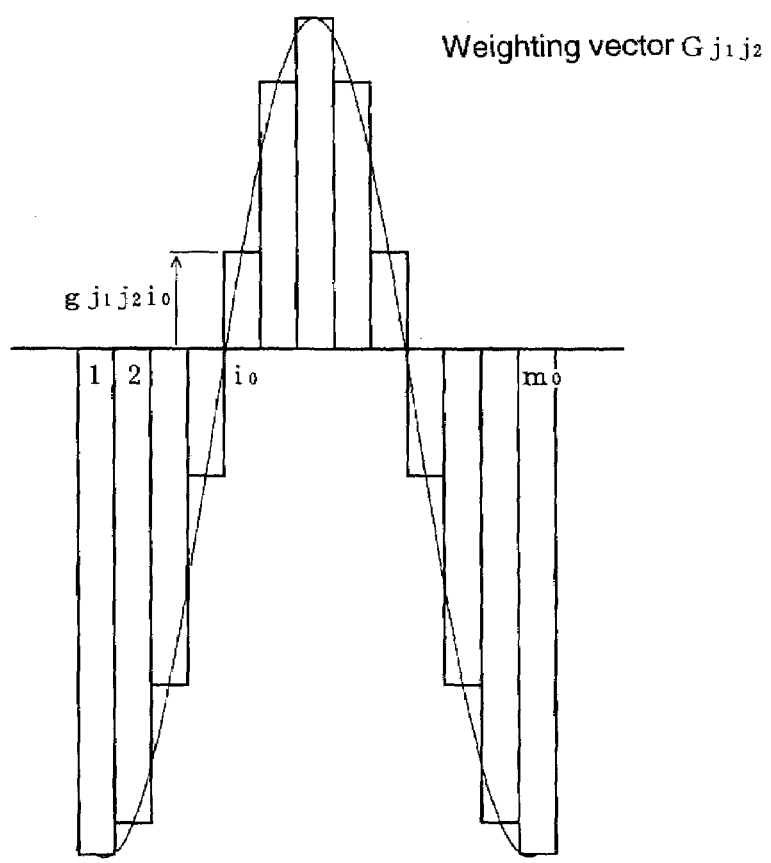

FIGS. 15A and 15B show a relationship between the normal curve and the weighting curve and a relationship between the reference pattern vector $Kj_1j_2$ and the weighting vector $Gj_1j_2$. FIG. 15A shows the normal curve having the value of the variance $\sigma j_1j_2^2$ and the reference pattern vector $Kj_1j_2$ having the function value of this normal curve as an element. FIG. 15B shows the weighting curve created based on the change rate in kurtosis of the reference pattern vector and the weighting vector $Gj_1j_2$ having the function value of this weighting curve as an element.

From FIGS. 15A and 15B, it is understood that the normal curve and the weighting curve correspond to each other, that the reference pattern vector $Kj_1j_2$ and the weighting vector $Gj_1j_2$ correspond to each other, and that indices $j_1j_2$, $i_o$ and $m_o$ of the reference pattern vector $Kj_1j_2$ and indices $j_1j_2$, $i_o$ and $m_o$ of the weighting vector $Gj_1j_2$ have the same values, respectively.

Figure 16:
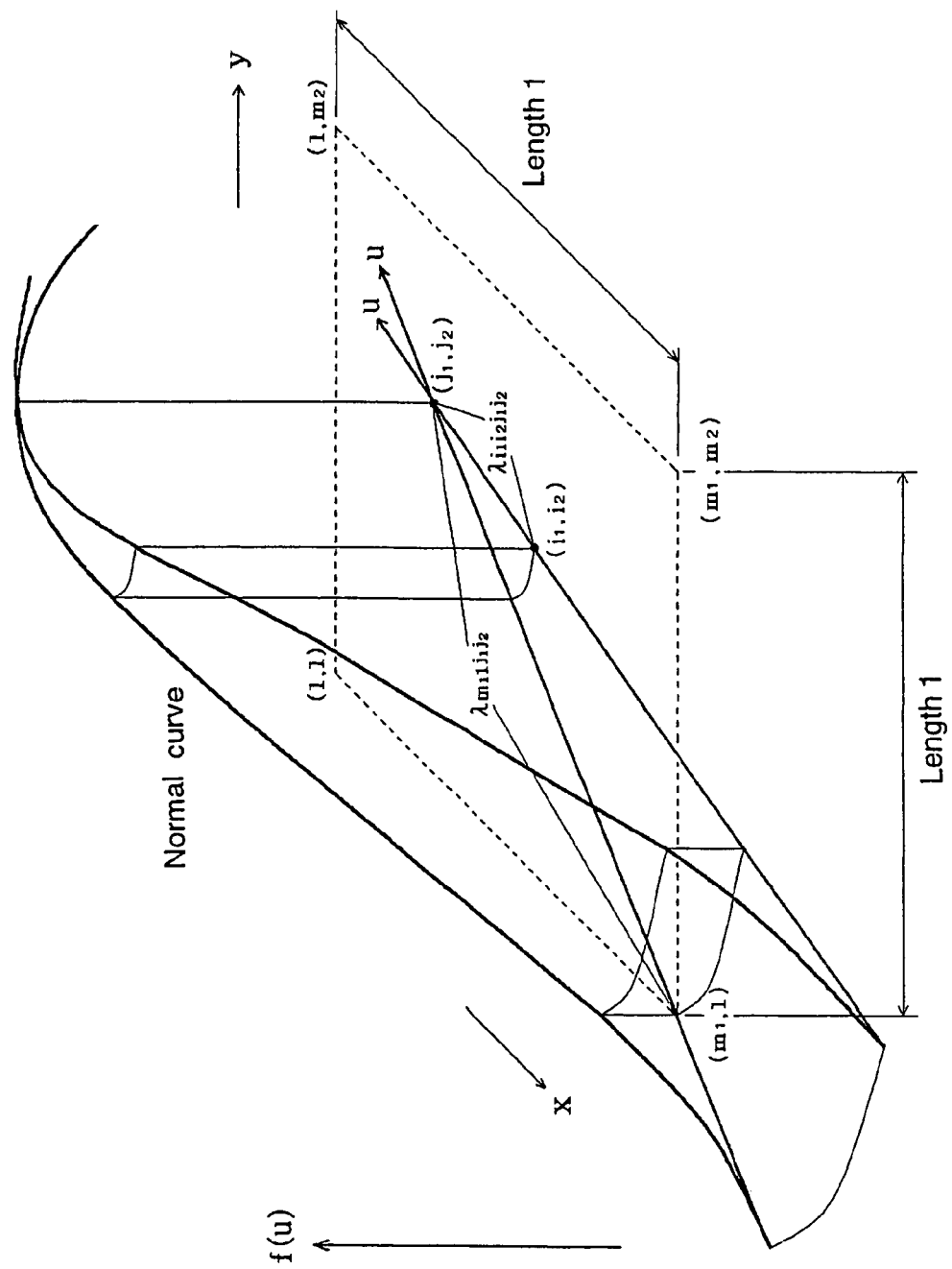
FIG. 16 is a diagram showing the normal curve on an (x-y) normalized plane three-dimensionally.
Figure 17:
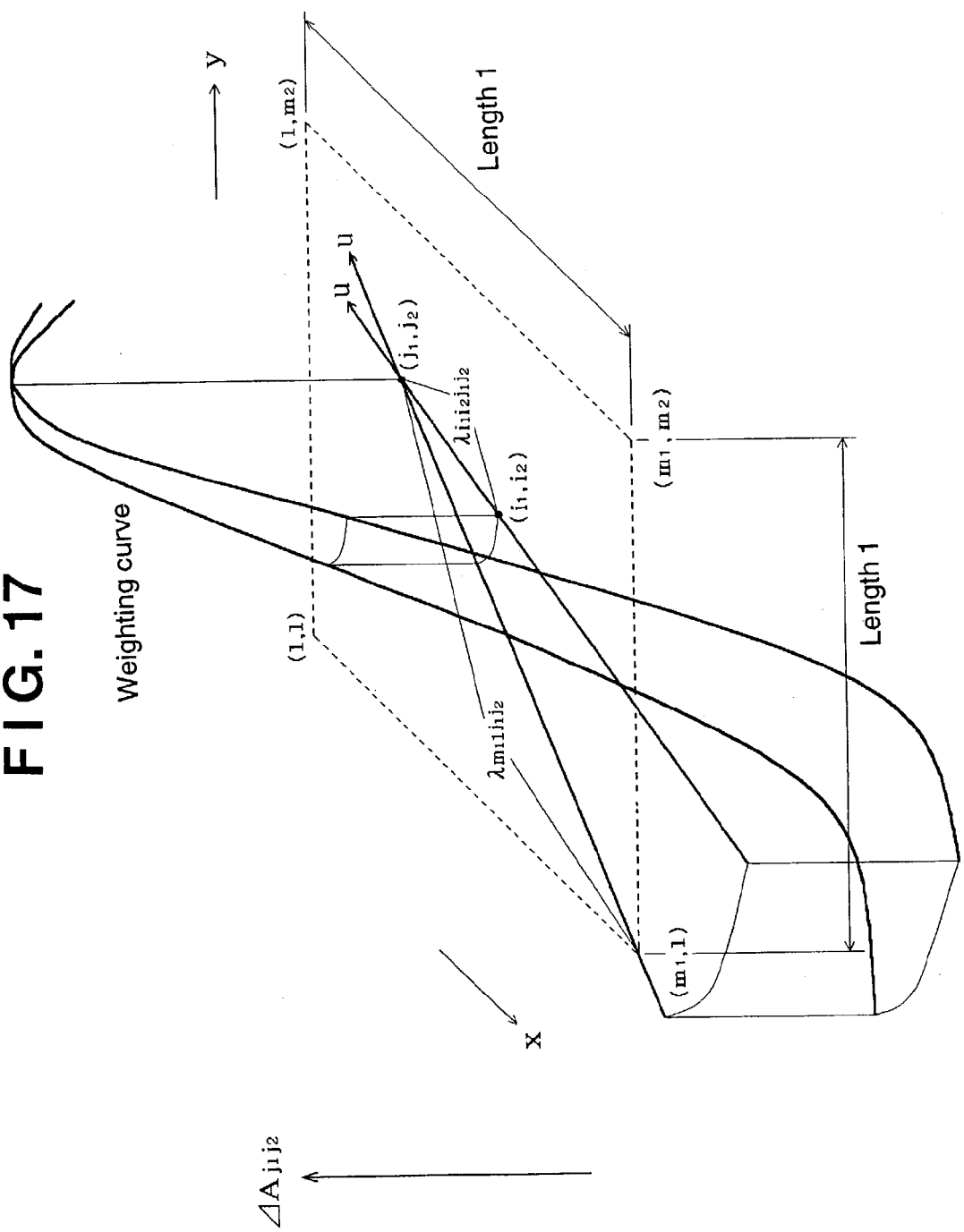
FIG. 17 is a diagram showing the weighting curve on the (x-y) normalized plane three-dimensionally.

Moreover, FIGS. 16 and 17 show a relationship between the normal curve and the weighting curve three-dimensionally: FIG. 16 shows normal curves on the (x-y)-normalized plane; and FIG. 17 shows weighting curves on the same (x-y)-normalized plane. In FIG. 16, two normal curves are shown. In one of the normal curves, a center line thereof passes through a point $(j_1, j_2)$, and is perpendicular to the (x-y)-normalized plane, and a u-axis thereof passes through a point $(m_1, 1)$. In the other thereof, a center line thereof passes through the point $(j_1, j_2)$, and is perpendicular to the above-described plane, and a u-axis thereof passes through a point $(i_1, i_2)$. Here, it is assumed that the variances $\sigma j_1 j_2^2$ of these two normal curves have the same value. Accordingly, when these two normal curves are rotated around the center line as an axis, the normal curves coincide with each other. FIG. 16 shows a state of obtaining a length $\lambda i_1 i_2 j_1 j_2$ between the point $(j_1, j_2)$ and the point $(i_1, i_2)$ to calculate a position apart from the center of the normal curve by the above-described length.

Similarly, in FIG. 17, two weighting curves are shown. In one of the weighting curves, a center line thereof passes through the point $(j_1, j_2)$, and is perpendicular to the (x-y)-normalized plane, and a u-axis thereof passes through the point $(m_1, 1)$. In the other thereof, a center line thereof passes through the point $(j_1, j_2)$, and is perpendicular to the above-described plane, and a u-axis thereof passes through the point $(i_1, i_2)$. Here, it is assumed that these two weighting curves are created based on the change rate in kurtosis of the same two normal curves shown in FIG. 16. Accordingly, when these two weighting curves are rotated around the center line as an axis, the weighting curves coincide with each other. FIG. 17 shows a state of obtaining a length $\lambda i_1 i_2 j_1 j_2$ between the point $(j_1, j_2)$ and the point $(i_1, i_2)$ to calculate a position apart from the center of the weighting curve by the above-described length. From FIGS. 16 and 17, it is understood that the normal curves and the weighting curves correspond to each other.

Figure 18:
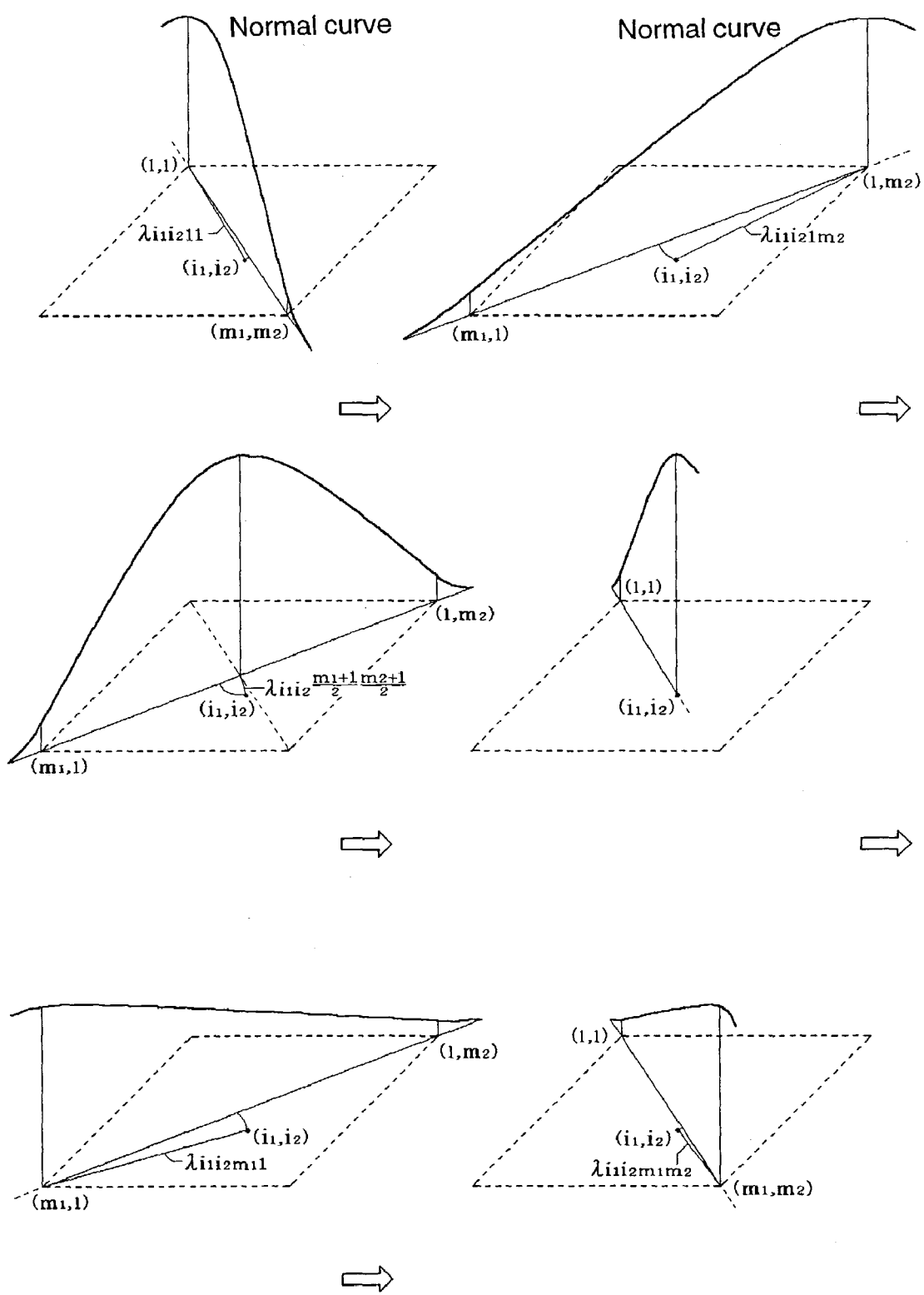
FIG. 18 is a diagram showing a change example of a value of variance of the normal curve and a change example of a length between the center of the normal curve and a point ($i_1$, $i_2$) when the center of the normal curve is moved.
Figure 19:
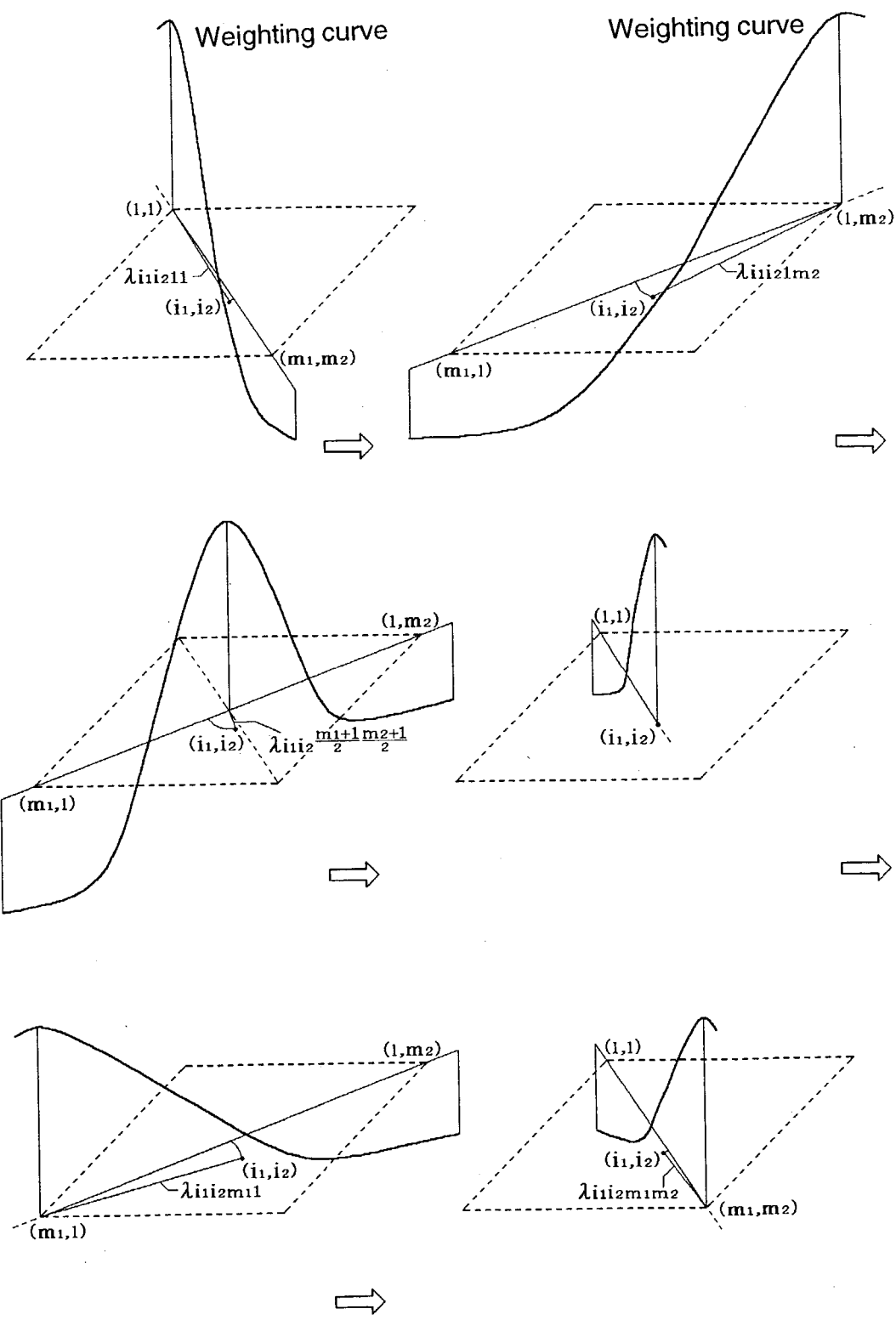
FIG. 19 is a diagram showing a change example of the weighting curve and a change example of a length between the center of the weighting curve and the point ($i_1$, $i_2$) when the center of the weighting curve is moved.

Moreover, FIGS. 18 and 19 show a relationship between movement of the center of a normal curve and movement of the center of a weighting curve. FIG. 18 shows normal curves having different variance values with regard to the respective cases where the center of the normal curve is moved to positions of the points $(j_1, j_2)$ $(j_1=1, 2, \ldots, m_1)$ $(j_2=1, 2, \ldots, m_2)$. Moreover, FIG. 18 shows states of obtaining lengths $\lambda i_1 i_2 j_1 j_2$ $(j_1=1, 2, \ldots, m_1)$ $(j_2=1, 2, \ldots, m_2)$ between the center of the normal curve and the points $(i_1, i_2)$ to calculate positions apart from the center of the normal curve by the above-described lengths.

Similarly, FIG. 19 shows weighting curves created based on the change rates in kurtosis of the respective normal curves shown in FIG. 18 with regard to the respective cases where the center of the weighting curve is moved to the positions of the points $(j_1, j_2)$ $(j_1=1, 2, \ldots, m_1)$ $(j_2=1, 2, \ldots, m_2)$. Moreover, FIG. 19 shows states of obtaining lengths $\lambda i_1 i_2 j_1 j_2$ $(j_1=1, 2, \ldots, m_1)$ $(j_2=1, 2, \ldots, m_2)$ between the center of the weighting curve and the points $(i_1, i_2)$ to calculate positions apart from the center of the weighting curve by the above-described lengths.

From FIGS. 18 and 19, the following is understood. Specifically, the movement of the center of the normal curve and the movement of the center of the weighting curve correspond to each other. Moreover, the method for calculating the element number $i_o$ of the reference pattern vector proximate to the position apart from the center of the reference pattern vector by the length $\lambda i_1 i_2 j_1 j_2$ and the method for calculating the element number $i_o$ of the weighting vector proximate to the position apart from the center of the weighting vector by the length $\lambda i_1 i_2 j_1 j_2$ are the same. Accordingly, it is understood that, when the $j_1 j_2$ element and the $i_1 i_2$ element of the pattern matrix are given, $i_o$ in the equation 12 is calculated based on the length between these two points on the (x-y)-normalized plane.

Specifically, $hg j_1 j_2$ shown in the left side of the equation 12 can be calculated as a product-sum value in such a manner that the length between the specified element and each element of the standard pattern matrix is obtained, the element number $i_o$ of the weighting vector proximate to the position apart from the center of the weighting vector by the above-described length is calculated, the value of the product of the element value $g j_1 j_2 i_o$ of the above-described element number of the weighting vector and the element value $h i_1 i_2$ of each element of the standard pattern matrix is obtained, and the above-described value of the product is added to each element of the standard pattern matrix. Moreover, $ng j_1 j_2$ shown in the left side of the equation 12 can be calculated as a product-sum value in such a manner that the length between the specified element and each element of the input pattern matrix is obtained, the element number $i_o$ of the weighting vector proximate to the position apart from the center of the weighting vector by the above-described length is calculated, the value of the product of the element value $g j_1 j_2 i_o$ of the above-described element number of the weighting vector and the element value $n i_1 i_2$ of each element of the input pattern matrix is obtained, and the above-described value of the product is added to each element of the input pattern matrix.

Next, a weighted standard pattern matrix Hg having $hg j_1 j_2$ $(j_1=1, 2, \ldots, m_1)$ $(j_2=1, 2, \ldots, m_2)$ in the equation 12 as an element and a weighted input pattern matrix Ng having $ng j_1 j_2 (j_1=1, 2, \ldots, m_1)$ $(j_2=1, 2, \ldots, m_2)$ in the equation 12 as an element are created. These weighted standard pattern matrix Hg and weighted input pattern matrix Ng are expressed as in the following equation 14.

[Equation 14] (14)

$$Hg = \begin{bmatrix} hg11 & hg12 & \cdots & hg1i_2 & \cdots & hg1m_2 \\ hg21 & hg22 & \cdots & hg2i_2 & \cdots & hg2m_2 \\ \vdots & \vdots & & \vdots & & \vdots \\ hgi_1 1 & hgi_1 2 & \cdots & hgi_1 i_2 & \cdots & hgi_1 m_2 \\ \vdots & \vdots & & \vdots & & \vdots \\ hgm_1 1 & hgm_1 2 & \cdots & hgm_1 i_2 & \cdots & hgm_1 m_2 \end{bmatrix}$$

$$Ng = \begin{bmatrix} ng11 & ng12 & \cdots & ng1i_2 & \cdots & ng1m_2 \\ ng21 & ng22 & \cdots & ng2i_2 & \cdots & ng2m_2 \\ \vdots & \vdots & & \vdots & & \vdots \\ ngi_1 1 & ngi_1 2 & \cdots & ngi_1 i_2 & \cdots & ngi_1 m_2 \\ \vdots & \vdots & & \vdots & & \vdots \\ ngm_1 1 & ngm_1 2 & \cdots & ngm_1 i_2 & \cdots & ngm_1 m_2 \end{bmatrix}$$

Moreover, the equation 12 is assigned to the equation 11 to obtain the following equation 15. From the equation 15, it is understood that the shape variation $Dj_1j_2$ is obtained by subtracting the element value $hgj_1j_2$ of the weighted standard pattern matrix Hg from the element value $ngj_1j_2$ of the weighted input pattern matrix Ng.

[Equation 15]

$$Dj_1j_2 = ngj_1j_2 - hgj_1j_2 \quad \quad (15)$$

$$(j_1 = 1, 2, 3, \ldots, m_1)$$
$$(j_2 = 1, 2, 3, \ldots, m_1)$$

In the related art (Japanese Patent Application No. 2000-277749), the square root of the square sum of the $m_1 \times m_2$ pieces of shape variations $Dj_1j_2$ calculated by the equation 15 is defined as the value of the geometric distance. Accordingly, a geometric distance value $d_E$ can be calculated by the following equation 16.

[Equation 16] (16)

$$d_E = \sqrt{\sum_{j_1=1}^{m_1} \sum_{j_2=1}^{m_2} (Dj_1j_2)^2}$$

$$= \sqrt{\sum_{j_1=1}^{m_1} \sum_{j_2=1}^{m_2} (ngj_1j_2 - hgj_1j_2)^2}$$

Moreover, in the related art (Japanese Patent Application No. 2000-277749), the square sum of the $m_1 \times m_2$ pieces of shape variations $Dj_1j_2$ calculated by the equation 15 is defined as the value of the geometric distance as it is. Accordingly, the geometric distance value $d_E$ can be calculated by the following equation 17.

[Equation 17] (17)

$$d_E = \sum_{j_1=1}^{m_1} \sum_{j_2=1}^{m_2} (Dj_1j_2)^2$$

$$= \sum_{j_1=1}^{m_1} \sum_{j_2=1}^{m_2} (ngj_1j_2 - hgj_1j_2)^2$$

Meanwhile, in the equation 12, the element value $hi_1i_2$ of the standard pattern matrix and the element value $ni_1i_2$ of the input pattern matrix are substituted into the element value $hoi_1i_2$ of the original standard pattern matrix and the element value $noi_1i_2$ of the original input pattern matrix, respectively. Then, as shown in the following equation 18, the product-sum value of the change rate $gj_1j_2i_o$ in kurtosis of the reference pattern vector and the element value $hoi_1i_2$ of the original standard pattern matrix is defined as $hogj_1j_2$, and the product-sum value of the same change rate $gj_1j_2i_o$ and the element value $noi_1i_2$ of the original input pattern matrix is defined as $nogj_1j_2$.

[Equation 18] (18)

$$hogj_1j_2 = \sum_{i_1=1}^{m_1} \sum_{i_2=1}^{m_2} gj_1j_2i_0 \cdot hoi_1i_2$$

$$nogj_1j_2 = \sum_{i_1=1}^{m_1} \sum_{i_2=1}^{m_2} gj_1j_2i_0 \cdot noi_1i_2$$

$$(j_1 = 1, 2, 3, \ldots, m_1)$$
$$(j_2 = 1, 2, 3, \ldots, m_2)$$

Next, an original and weighted standard pattern matrix Hog having $hogj_1j_2$ ($j_1=1, 2, \ldots, m_1$) ($j_2=1, 2, \ldots, m_2$) in the equation 18 as an element and an original and weighted input pattern matrix Nog having $nogj_1j_2$ ($j_1=1, 2, \ldots, m_1$) ($j_2=1, 2, \ldots, m_2$) in the equation 18 as an element are created. These original and weighted standard pattern matrix Hog and original and weighted input pattern matrix Nog are expressed as in the following equation 19.

[Equation 19] (19)

$$Hog = \begin{bmatrix} hog11 & hog12 & \ldots & hog1i_2 & \ldots & hog1m_2 \\ hog21 & hog22 & \ldots & hog2i_2 & \ldots & hog2m_2 \\ \vdots & \vdots & & \vdots & & \vdots \\ hogi_11 & hogi_12 & \cdots & hogi_1i_2 & \cdots & hogi_1m_2 \\ \vdots & \vdots & & \vdots & & \vdots \\ hogm_11 & hogm_12 & \cdots & hogm_1i_2 & \cdots & hogm_1m_2 \end{bmatrix}$$

$$Nog = \begin{bmatrix} nog11 & nog12 & \cdots & nog1i_2 & \cdots & nog1m_2 \\ nog21 & nog22 & \cdots & nog2i_2 & \cdots & nog2m_2 \\ \vdots & \vdots & & \vdots & & \vdots \\ nogi_11 & nogi_12 & \cdots & nogi_1i_2 & \cdots & nogi_1m_2 \\ \vdots & \vdots & & \vdots & & \vdots \\ nogm_11 & nogm_12 & \cdots & nogm_1i_2 & \cdots & nogm_1m_2 \end{bmatrix}$$

Here, in the case where the original standard pattern matrix Ho and the original input pattern matrix No, which are shown in the equation 1, are normalized by the sum of the densities of the entire pixels by use of the equation 2, and thus the standard pattern matrix H and the input pattern matrix N, which are shown in the equation 4, are created, then the following equation 20 is established.

[Equation 20] (20)

$$hi_1i_2 = \frac{hoi_1i_2}{\sum_{j_1=1}^{m_1} \sum_{j_2=1}^{m_2} hoj_1j_2}$$

$$ni_1i_2 = \frac{noi_1i_2}{\sum_{j_1=1}^{m_1} \sum_{j_2=1}^{m_2} noj_1j_2}$$

$$(i_1 = 1, 2, 3, \ldots, m_1)$$
$$(i_2 = 1, 2, 3, \ldots, m_2)$$

Moreover, in the case where the original standard pattern matrix Ho and the original input pattern matrix No, which are shown in the equation 1, are normalized by the maximum value of the densities of the entire pixels by use of the equation 3, and thus the standard pattern matrix H and the input pattern matrix N, which are shown in the equation 4, are created, then the following equation 21 is established.

[Equation 21] (21)

$$hi_1 i_2 = \frac{ho_{i_1 i_2}}{\max\{ho_{j_1 j_2}\}}$$

$$ni_1 i_2 = \frac{no_{i_1 i_2}}{\max\{no_{j_1 j_2}\}}$$

$$(i_1 = 1, 2, 3, \ldots, m_1)$$
$$(i_2 = 1, 2, 3, \ldots, m_2)$$

Values of denominators in the right sides in the equation 20 are the sums of the densities of the entire pixels of the standard image and the input image, respectively, which are constants. Moreover, values of denominators in the right sides in the equation 21 are the maximum values of the densities of the entire pixels of the standard image and the input image, respectively, which are also constants. Accordingly, Ch and Cn are defined as constants, and the equation 20 and the equation 21 are integrated and represented as in the following equation 22.

[Equation 22] (22)

$$hi_1 i_2 = ho_{i_1 i_2}/Ch$$
$$ni_1 i_2 = no_{i_1 i_2}/Cn$$
$$(i_1 = 1, 2, 3, \ldots, m_1)$$
$$(i_2 = 1, 2, 3, \ldots, m_2)$$

The equation 22 is substituted into the equation 12, then the equation 18 is used, and thus the following equation 23 is obtained.

[Equation 23] (23)

$$hgj_1 j_2 = \sum_{i_1=1}^{m_1} \sum_{i_2=1}^{m_2} gj_1 j_2 i_0 \cdot (ho_{i_1 i_2}/Ch)$$
$$= hog_{j_1 j_2}/Ch$$

$$ngj_1 j_2 = \sum_{i_1=1}^{m_1} \sum_{i_2=1}^{m_2} gj_1 j_2 i_0 \cdot (no_{i_1 i_2}/Cn)$$
$$= nog_{j_1 j_2}/Cn$$

$$(j_1 = 1, 2, 3, \ldots, m_1)$$
$$(j_2 = 1, 2, 3, \ldots, m_2)$$

From the equation 23, with regard to $j_1$ ($j_1=1, 2, \ldots, m_1$) and $j_2$ ($j_2=1, 2, \ldots, m_2$), it is understood that the element value $hgj_1 j_2$ of the weighted standard pattern matrix is obtained by dividing the element value $hogj_1 j_2$ of the original and weighted standard pattern matrix by the constant Ch, and that the element value $ngj_1 j_2$ of the weighted input pattern matrix is obtained by dividing the element value $nogj_1 j_2$ of the original and weighted input pattern matrix by the constant Cn.

Figure 20:
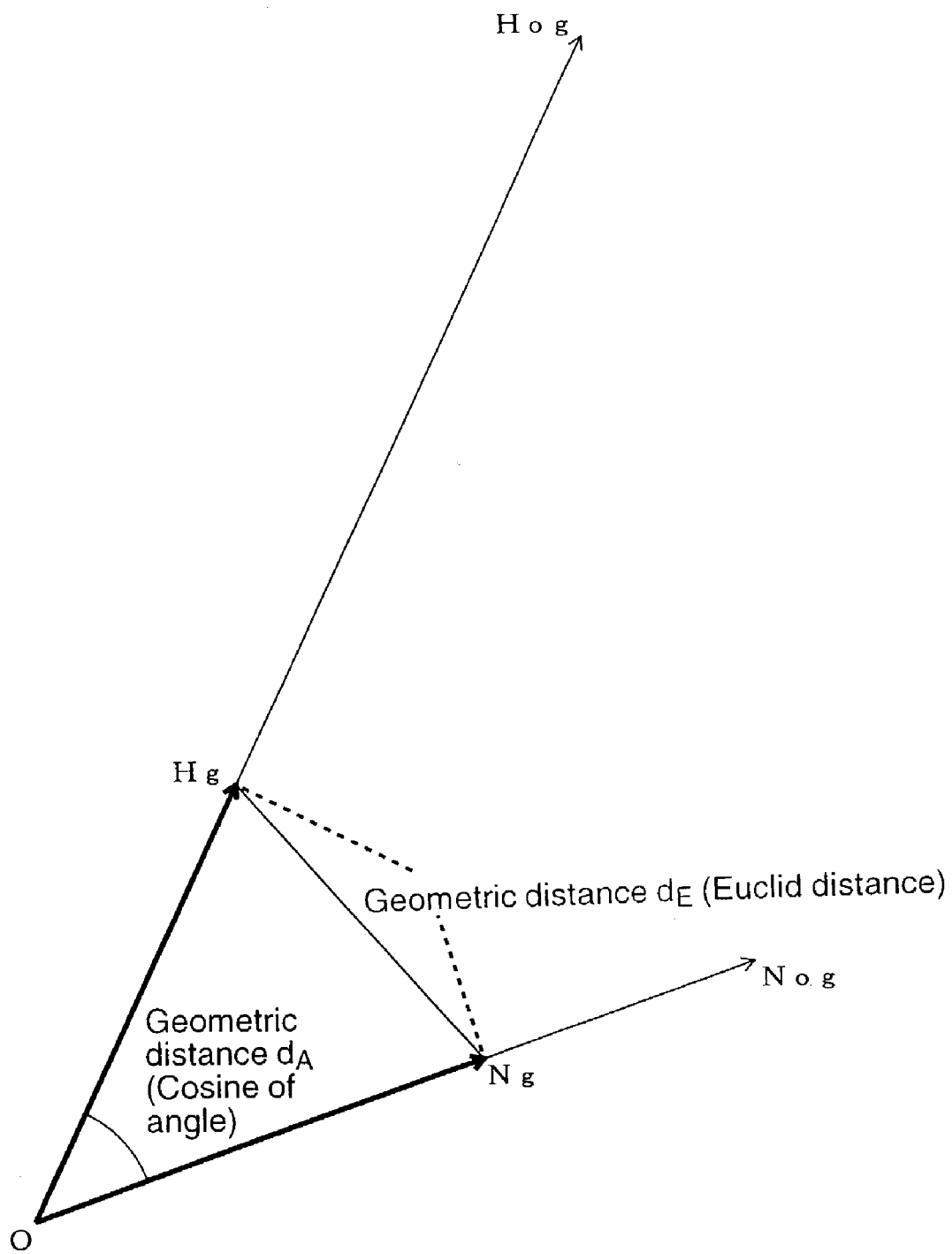
FIG. 20 is a diagram showing a relationship among a point of a weighted standard pattern matrix, a point of a weighted input pattern matrix, a point of an original and weighted standard pattern matrix and a point of an original and weighted input pattern matrix.

FIG. 20 is a schematic diagram showing the relationships of the equation 23. FIG. 20 shows arrows directed from an origin O to a point of the weighted standard pattern matrix Hg, a point of the weighted input pattern matrix Ng, a point of the original and weighted standard pattern matrix Hog, and a point of the original and weighted input pattern matrix Nog, respectively, in an $m_1 \times m_2$ dimension pattern space. In FIG. 20, a state is shown, where the origin O, the point of the weighted standard pattern matrix Hg and the point of the original and weighted standard pattern matrix Hog are arrayed on one straight line, and the origin O, the point of the weighted input pattern matrix Ng and the point of the original and weighted input pattern matrix Nog are arrayed on the other straight line, based on the relationships of the equation 23.

Moreover, from the equation 16, it is understood that the geometric distance $d_E$ can be calculated by carrying out the conventional calculation for the Euclid distance by use of the element value $hgj_1 j_2$ of the weighted standard pattern matrix and the element value $ngj_1 j_2$ of the weighted input pattern matrix. In this connection, FIG. 20 shows that the geometric distance $d_E$ becomes a Euclid distance between the point of the weighted standard pattern matrix Hg and the point of the weighted input pattern matrix Ng.

Meanwhile, in the image recognition for the binary images and images other than the binary images, both of which are mixedly present, generally, it is not previously known in many cases whether each input image is a binary image or an image other than the binary image. In such a case, judgment cannot be made as to which of the method for normalizing the density pattern of the image by the maximum value of the densities of the entire pixels or the method for normalizing the density pattern thereof by the sum of the densities of the entire pixels is to be used for processing the input image. Accordingly, the value of the geometric distance $d_E$ shown in the equation 16 will not be usable.

In this connection, with regard to the original and weighted standard pattern matrix and the original and weighted input pattern matrix, which are created without normalizing the density pattern of the image, it is convenient if an angle between these two original and weighted pattern matrices, that is, an angle between the straight line OHog and the straight line ONog in FIG. 20, can be used as a similarity scale. Accordingly, a value of a geometric distance $d_A$ can be calculated as a cosine of the angle between the original and weighted standard pattern matrix Hog and the original and weighted input pattern matrix Nog by the following equation 24. In the equation 24, the geometric distance value $d_A$ is set in a range: $-1 \leq d_A \leq +1$. Moreover, when the shape of the original standard pattern matrix Ho and the shape of the original input pattern matrix No are similar to each other, accordingly, when the shape of the original and weighted standard pattern matrix Hog and the shape of the original and weighted input pattern matrix Nog are similar to each other, then the value of the angle between these two original and weighted pattern matrices is reduced, and therefore, the geometric distance value $d_A$ becomes a value approximate to +1.

[Equation 24]
$$d_A = \frac{\sum_{j_1=1}^{m_1} \sum_{j_2=1}^{m_2} nogj_1 j_2 \cdot hogj_1 j_2}{\sqrt{\sum_{j_1=1}^{m_1} \sum_{j_2=1}^{m_2} (nogj_1 j_2)^2} \sqrt{\sum_{j_1=1}^{m_1} \sum_{j_2=1}^{m_2} (hogj_1 j_2)^2}} \quad (24)$$

The above description for the first subject of the present invention will be summarized as below. As shown in the equation 16 and FIG. 20, the geometric distance $d_E$ between the standard pattern matrix H and the input pattern matrix N can be calculated as the Euclid distance between the weighted standard pattern matrix Hg and the weighted input pattern matrix Ng. Meanwhile, as shown in the equation 24 and FIG. 20, the geometric distance $d_A$ between the original standard pattern matrix Ho and the original input pattern matrix No can be calculated as the cosine of the angle between the original and weighted standard pattern matrix Hog and the original and weighted input pattern matrix Nog. Note that, as being understood from FIG. 20, the value of the angle between the original and weighted standard pattern matrix Hog and the original and weighted input pattern matrix Nog is equal to the value of the angle between the weighted standard pattern matrix Hg and the weighted input pattern matrix Ng, and therefore, the geometric distance $d_A$ may be calculated as the cosine of the angle between the weighted standard pattern matrix Hg and the weighted input pattern matrix Ng.

As above, description has been made for the methods for calculating the geometric distance value $d_E$ and the geometric distance value $d_A$. Next, consideration will be made for the actual calculation for the geometric distance value $d_E$ and the geometric distance value $d_A$ between the standard image and the input image.

The related art (Japanese Patent Application No. 2000-277749) shows an example of a standard voice and three input voices. FIGS. 21 and 22 show a standard image and three input images, which have the same shapes as these. Specifically, FIGS. 21 and 22 schematically show a state to be described below with regard to a standard image 1 having a flat density shape and input images 2, 3 and 4 having the same sums of the densities of the entire pixels as this standard image 1 and different density shape features therefrom. In the drawings, an original standard pattern matrix 1Ao of seven rows and nine columns having the density of the standard image 1 as an element is previously registered. Then, original input pattern matrices 2Ao, 3Ao and 4Ao of seven rows and nine columns having the densities of the input images 2, 3 and 4 respectively as elements are created. Subsequently, as similarity scales between the standard image 1 and the input images 2, 3 and 4, geometric distance values $d_E2$, $d_E3$ and $d_E4$ and geometric distance values $d_A2$, $d_A3$ and $d_A4$ are calculated.

Note that, in the calculation of the geometric distance value $d_E$, on the assumption that instruction is previously made that the density pattern of the image be normalized by the sum of the densities of the entire pixels, the normalized density is obtained by use of the equation 2, the standard pattern matrix having the normalized density of the standard image 1 as an element is previously registered, and the input pattern matrices having the normalized densities of the input images 2, 3 and 4 respectively as elements are created.

Here, assumption is made that the input images 2, 3 and 4 have relationships of γ, δ, ε, ζ, η and θ shown in FIG. 22 with respect to a variable α. Namely, assumption is made that the changes of the density shapes of the input images 2, 3 and 4 with respect to the density shape of the standard image 1 are prescribed by the variable α under the relationships shown in FIG. 22.

Figure 23:
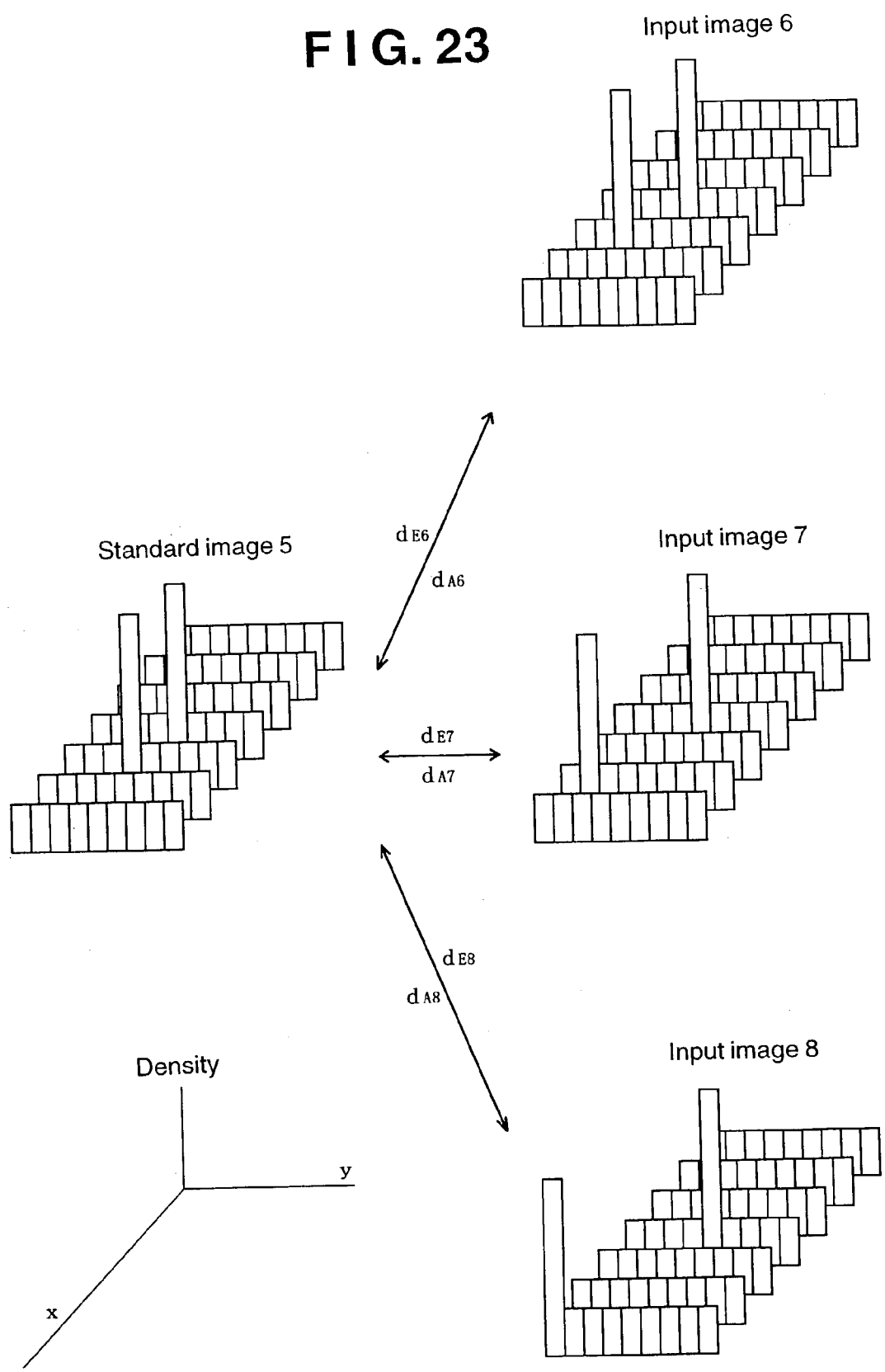
FIG. 23 is a diagram showing other examples of the densities of a standard image and input images.

Moreover, the related art (Japanese Patent Application No. 2000-277749) shows a standard voice and three input voices. FIGS. 23 and 24 show a standard image and three input images, which have the same shapes as these. Specifically, FIGS. 23 and 24 schematically show a state to be described below with regard to a standard image 5 having two peaks in the density shape and input images 6, 7 and 8 having the same sums of the densities of the entire pixels as this standard image 5 and different peak positions therefrom. In the drawings, an original standard pattern matrix 5Ao of seven rows and nine columns having the density of the standard image 5 as an element is previously registered. Then, original input pattern matrices 6Ao, 7Ao and 8Ao of seven rows and nine columns having the densities of the input images 6, 7 and 8 respectively as elements are created. Subsequently, as similarity scales between the standard image 5 and the input images 6, 7 and 8, geometric distance values $d_E6$, $d_E7$ and $d_E8$ and geometric distance values $d_A6$, $d_A7$ and $d_A8$ are calculated.

Note that, in the calculation of the geometric distance value $d_E$, on the assumption that the instruction is previously made so that the density pattern of the image is normalized by the sum of the densities of the entire pixels, the normalized density is obtained by use of the equation 2, the standard pattern matrix having the normalized density of the standard image 5 as an element is previously registered, and the input pattern matrices having the normalized densities of the input images 6, 7 and 8 respectively as elements are created.

Here, assumption is made that the standard image 5 and the input images 6, 7 and 8 have relationships of ω and φ shown in FIG. 24 with respect to a variable β. Namely, assumption is made that the changes of the density shapes of the input images 6, 7 and 8 with respect to the density shape of the standard image 5 are prescribed by the variable β under the relationships shown in FIG. 24.

Figure 25:
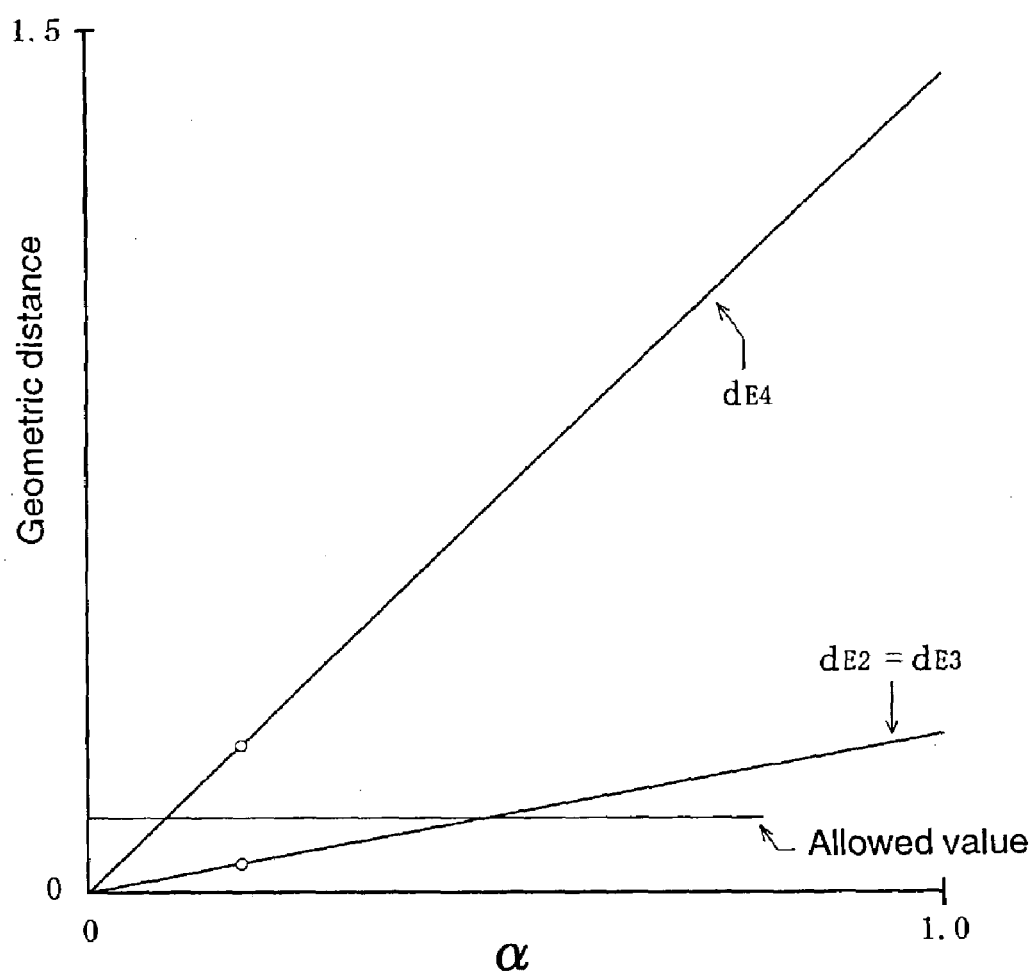
FIG. 25 is a graph showing a state where values of geometric distances between a standard pattern matrix and input pattern matrices are changed with respect to a in FIG. 22.

FIG. 25 shows a state where the geometric distance values $d_E2$, $d_E3$ and $d_E4$ are changed when the value of the variable α in FIG. 22 is increased from 0 to 1. From FIG. 25, it is understood, in the example of FIGS. 21 and 22, that the geometric distance values always have a relationship: $d_E2=d_E3<d_E4$, and that the geometric distance values $d_E2$, $d_E3$ and $d_E4$ are increased as the value of the variable α is increased. Specifically, it is understood that the result of FIG. 25 is approximately equal to the result in the related art (Japanese Patent Application No. 2000-277749). Accordingly, from the above result, it can be confirmed that approximation by the equations 7 and 9 has been suitable.

Figure 26:
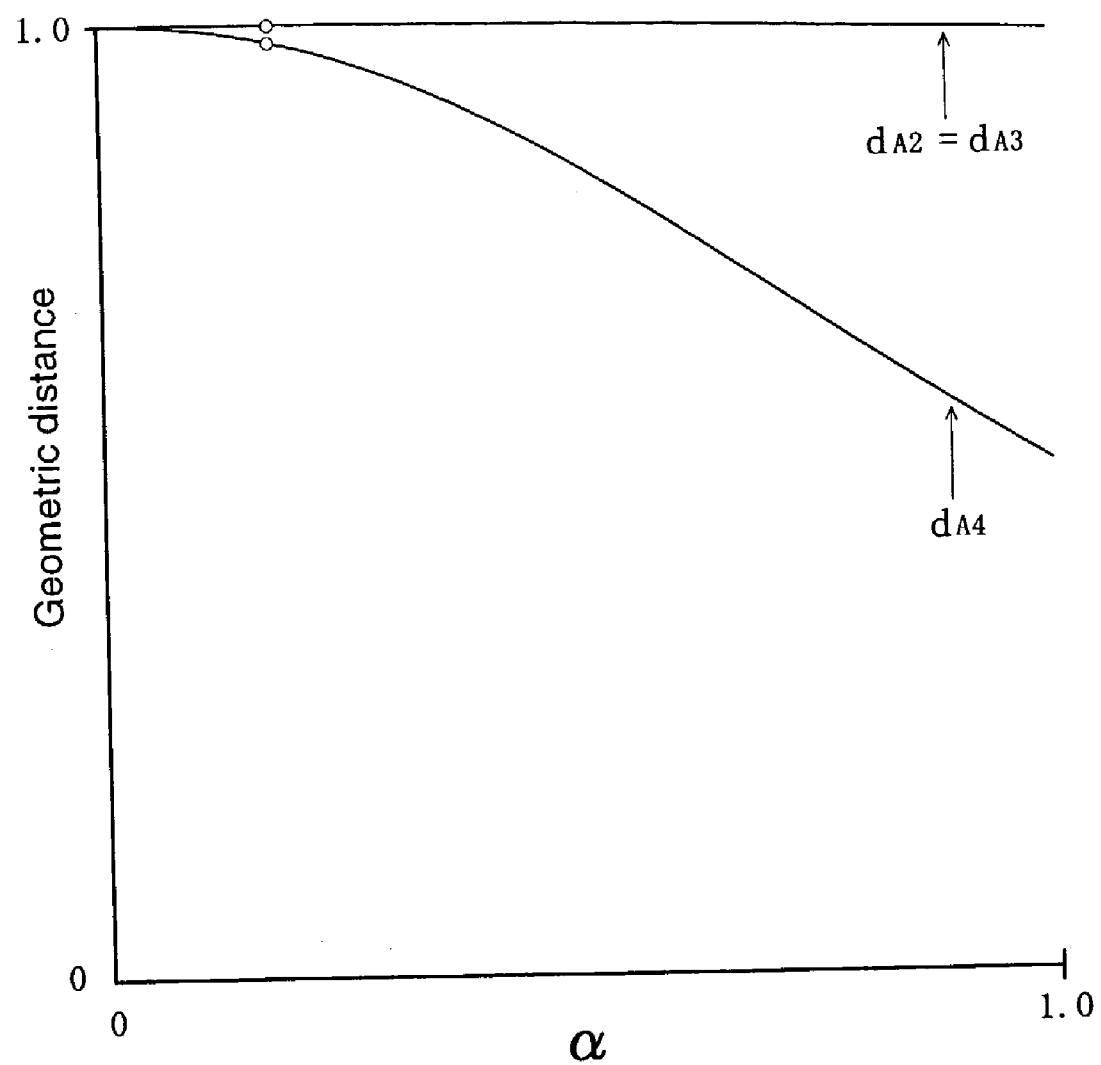
FIG. 26 is a graph showing a state where values of geometric distances between an original standard pattern matrix and original input pattern matrices are changed with respect to α in FIG. 22.

Meanwhile, FIG. 26 shows a state where the geometric distance values $d_A2$, $d_A3$ and $d_A4$ are changed when the value of the variable a in FIG. 22 is increased from 0 to 1. From FIG. 26, it is understood, in the example of FIGS. 21 and 22, that the geometric distance values always have a relationship: $d_A2=d_A3>d_A4$, and that the geometric distance values $d_A2$, $d_A3$ and $d_A4$ are decreased as the value of the variable α is increased. The decrease of the geometric distance values $d_A2$, $d_A3$ and $d_A4$ implies increase of the value of the angle. Namely, it is understood that the value of the angle between the original standard pattern matrix 1Ao and the original input pattern matrix 4Ao is always larger than the value of the angle between the original standard pattern matrix 1Ao and the original input pattern matrix 2Ao or 3Ao. The largeness of the value of the angle implies largeness of the distance. Accordingly, while the original input pattern matrices 2Ao, 3Ao and 4Ao cannot be distinguished with respect to the original standard pattern matrix 1Ao by means of the conventional cosine of the angle as shown in the related art (Japanese Patent Application No. 2000-277749), it is understood that the original input pattern matrices 2Ao and 3Ao can be distinguished with respect to the original input pattern matrix 4Ao by means of the geometric distance value $d_A$ as shown in FIG. 26.

Figure 27:
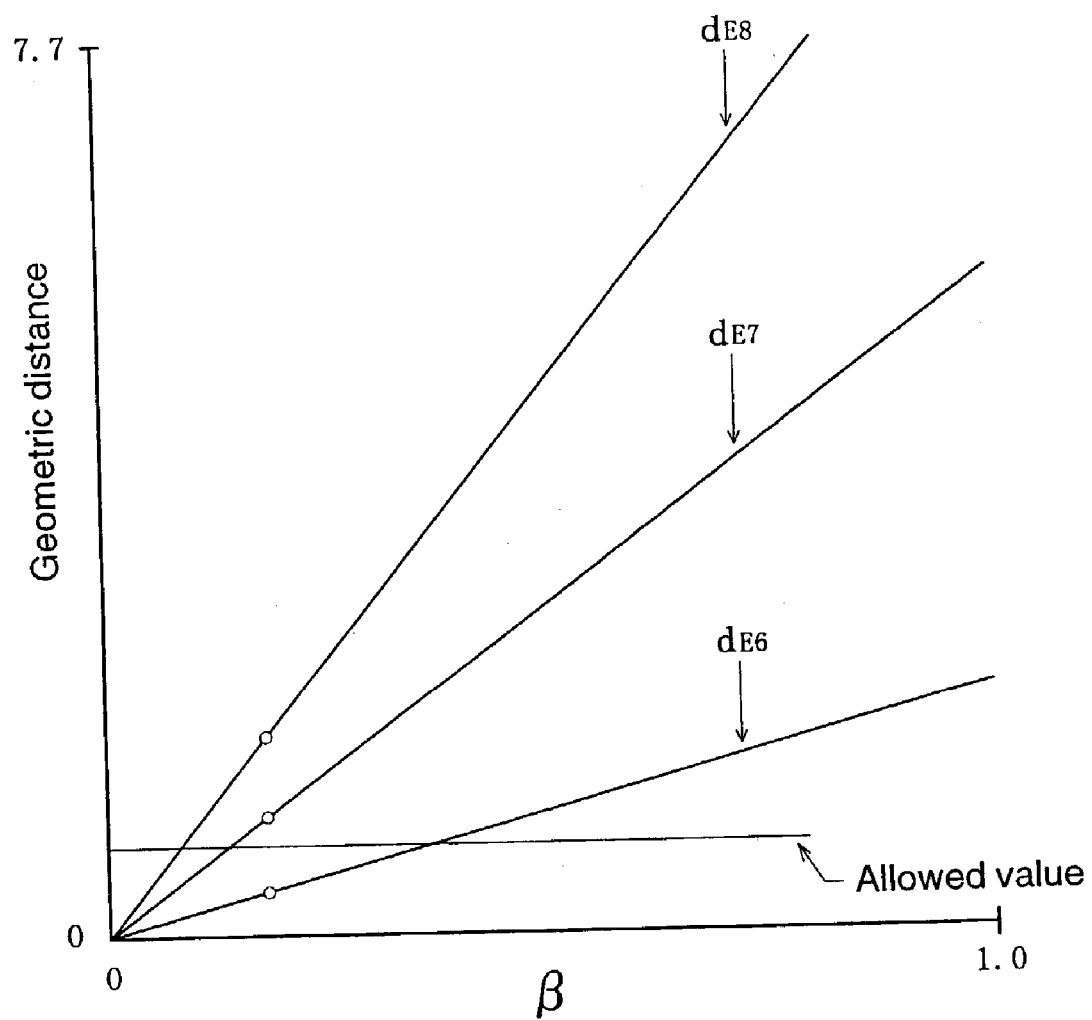
FIG. 27 is a graph showing a state where the values of the geometric distances between the standard pattern matrix and the input pattern matrices are changed with respect to β in FIG. 24.

Moreover, FIG. 27 shows a state where the geometric distance values $d_E6$, $d_E7$ and $d_E8$ are changed when the value of the variable β in FIG. 24 is increased from 0 to 1. From FIG. 27, it is understood, in the example of FIGS. 23 and 24, that the geometric distance values always have a relationship: $d_E6<d_E7<d_E8$, and that the geometric distance values $d_E6$, $d_E7$ and $d_E8$ are increased as the value of the variable β is increased. Namely, it is understood that the result of FIG. 27 is approximately equal to the result in the related art (Japanese Patent Application No. 2000-277749). Accordingly, from the above result, it can be confirmed that the approximation by the equations 7 and 9 has been suitable.

Figure 28:
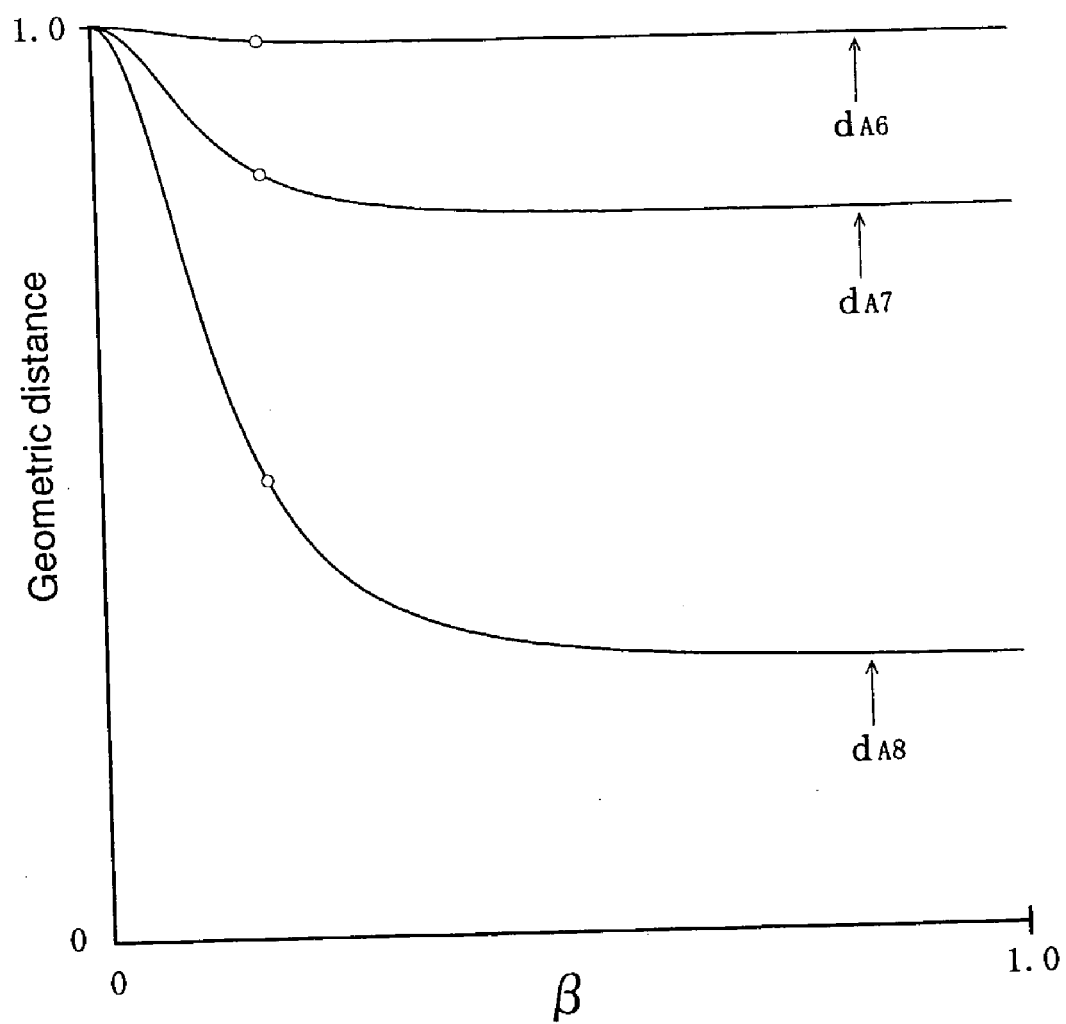
FIG. 28 is a graph showing a state where the values of the geometric distances between the original standard pattern matrix and the original input pattern matrices are changed with respect to β in FIG. 24.

Meanwhile, FIG. 28 shows a state where the geometric distance values $d_A6$, $d_A7$ and $d_A8$ are changed when the value of the variable β in FIG. 24 is increased from 0 to 1. From FIG. 28, it is understood, in the example of FIGS. 23 and 24, that the geometric distance values always have a relationship: $d_A6>d_A7>d_A8$, and that the geometric distance values $d_A6$, $d_A7$ and $d_A8$ are decreased as the value of the variable β is increased. The decrease of the geometric distance values $d_A6$, $d_A7$ and $d_A8$ implies increase of the value of the angle. Namely, it is understood that the values of the angles between the original standard pattern matrix 5Ao and the original input pattern matrices 6Ao, 7Ao and 8Ao are larger in order of the original input pattern matrices 6Ao, 7Ao and 8Ao. The largeness of the value of the angle implies largeness of the distance. Accordingly, while the original input pattern matrices 6Ao, 7Ao and 8Ao cannot be distinguished with respect to the original standard pattern matrix 5Ao by means of the conventional cosine of the angle as shown in the related art (Japanese Patent Application No. 2000-277749), it is understood that the above-described distinguishment can be made by means of the geometric distance value $d_A$ as shown in FIG. 28.

FIGS. 21 to 24 show the example where the sum of the densities of the entire pixels of the standard image and the sums of the densities of the entire pixels of the input images are all equal. In FIGS. 25 to 28, the geometric distance values $d_E$ and $d_A$ between the standard image and the input images are calculated. Next, with regard to an example where the sum of the densities of the entire pixels of the standard image is different from the respective sums of the densities of the entire pixels of the input images, the geometric distance values $d_E$ and $d_A$ between the standard image and the input images will be calculated, which will be compared with the conventional Euclid distance value and cosine value of the angle.

EXPERIMENTAL EXAMPLE

Figure 30:
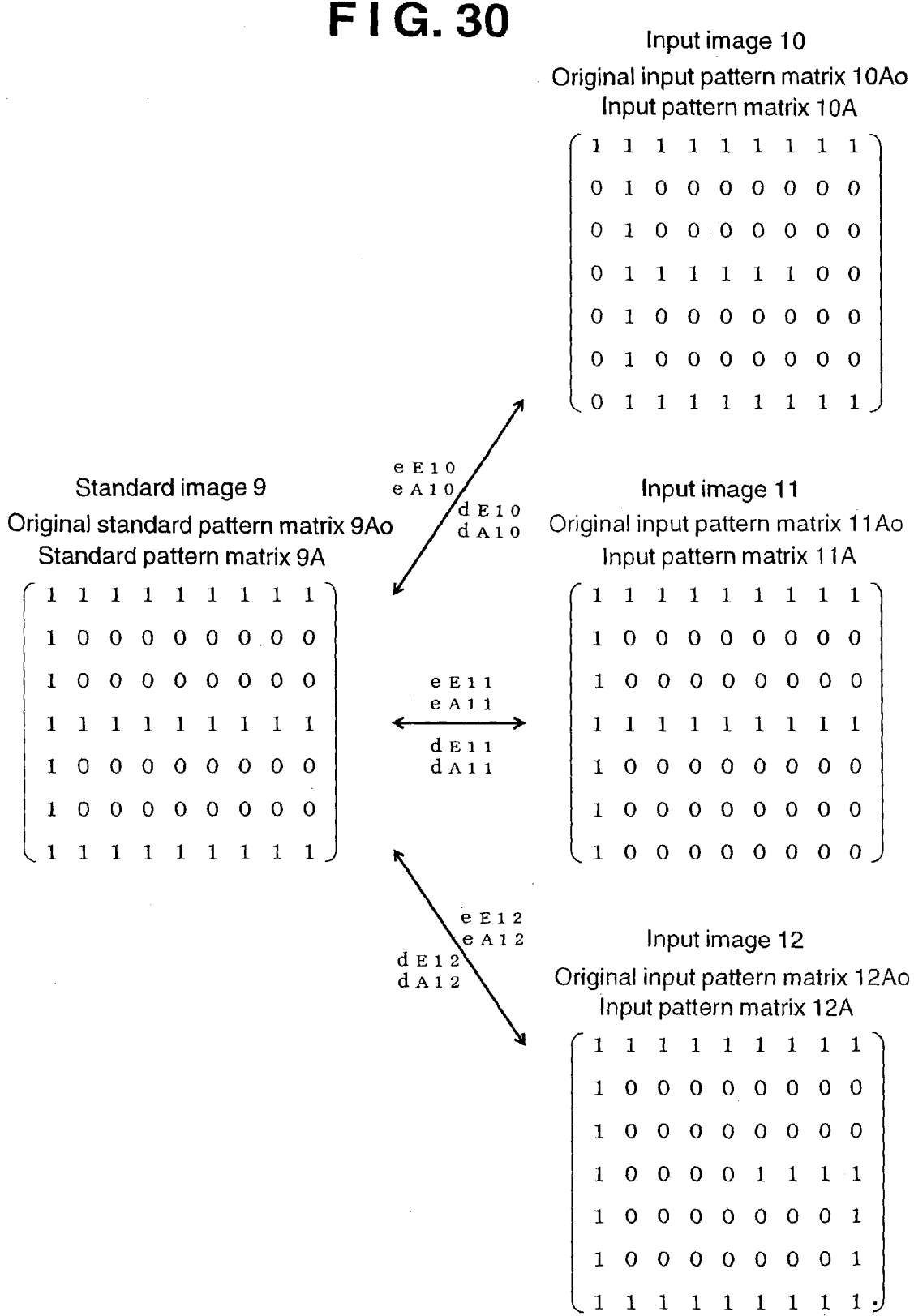
FIG. 30 is a diagram showing examples of original pattern matrices and pattern matrices of the standard image and the input images, corresponding to those of FIG. 29.

Description will be made for an experimental example with reference to FIGS. 29, 30, 31A, 31B, 32A and 32B. FIGS. 29 and 30 schematically show a state to be described below with regard to a standard image 9 having a density shape of the alphabet "E" and input images 10, 11 and 12 having density shapes of the alphabets "E", "F" and "G", respectively. In the drawings, an original standard pattern matrix 9Ao of seven rows and nine columns having the density of the standard image 9 as an element and a standard pattern matrix 9A of seven rows and nine columns having the normalized density of the standard image 9 as an element are previously registered. Moreover, original input pattern matrices 10Ao, 11Ao and 12Ao of seven rows and nine columns having the densities of the input images 10, 11 and 12 as elements respectively and input pattern matrices 10A, 11A and 12A of seven rows and nine columns having the normalized densities of the input images 10, 11 and 12 as elements respectively are created. Subsequently, as similarity scales between the standard image 9 and the input images 10, 11 and 12, (conventional) Euclid distances $e_E10$, $e_E11$ and $e_E11$, (conventional) cosines of angles $e_A10$, $e_A11$ and $e_A12$, geometric distances $d_E10$, $d_E11$ and $d_E12$, and geometric distances $d_A10$, $d_A11$ and $d_A12$ are calculated.

Note that the standard image 9 and the respective input images 10, 11 and 12 are binary images, in which the density of the character portion of the image is 1, and the density of the background portion thereof is 0. Moreover, in the calculation of the geometric distance $d_E$, on the assumption that the instruction is previously made that the density pattern of the image be normalized by the maximum value of the densities of the entire pixels, the normalized density is obtained by use of the equation 3. In this case, the normalized density of the character portion of the image becomes 1, and the normalized density of the background portion thereof becomes 0. Accordingly, as shown in FIG. 30, the standard pattern matrix 9A and the input pattern matrices 10A, 11A and 12A will be equal to the original standard pattern matrix 9Ao and the original input pattern matrices 10Ao, 11Ao and 12Ao, respectively. Note that, in FIG. 30, the aggregate of the densities of the entire pixels of the original standard pattern matrix 9Ao is 31, and the sums of the densities of the entire pixels of the original input pattern matrices 10Ao, 11Ao and 12Ao are 27, 23 and 29, respectively, all of which are different from one another.

Figure 31A:
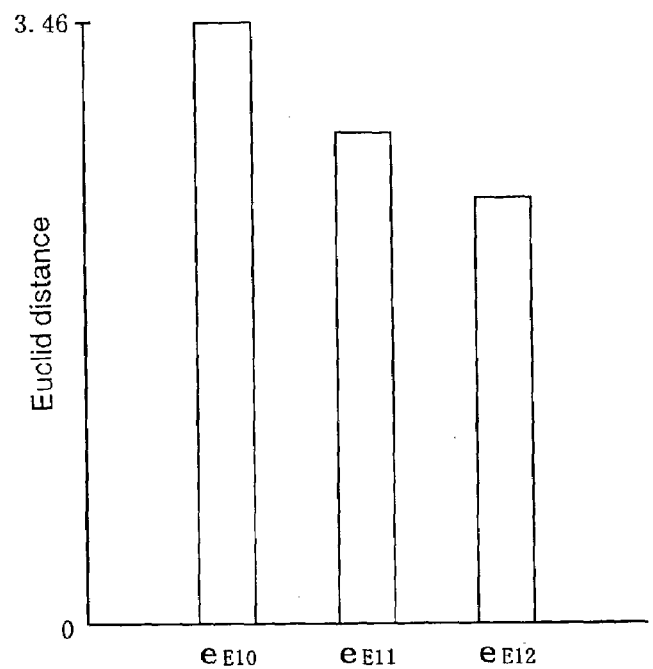
FIG. 31A is a bar graph showing values of Euclid distances between the standard image and an input image same as the standard image and between the standard image and input images different from the standard image, the bar graph being obtained as a result of an experiment.
Figure 31B:
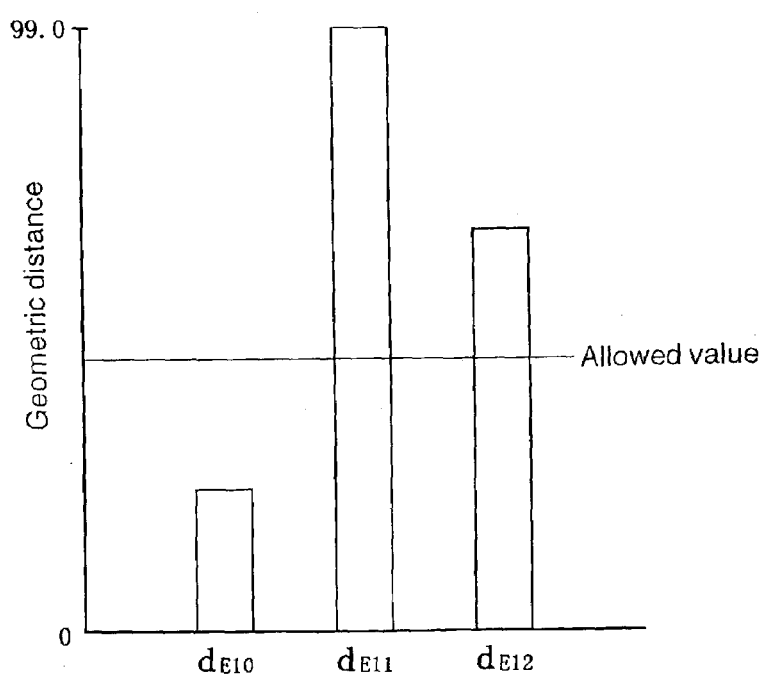
FIG. 31B is a bar graph showing values of geometric distances between the standard image and the input image same as the standard image and between the standard image and the input images different from the standard image, the bar graph being obtained as a result of the experiment.

FIGS. 31A and 31B are bar graphs showing the Euclid distance values $e_E10$, $e_E11$ and $e_E12$ and the geometric distance values $d_E10$, $d_E11$ and $d_E12$, respectively, both of which are obtained from the experiment.

As described above, FIGS. 31A and 31B show the respective distance values between the standard image and the input images, which are obtained by calculating the Euclid distance values $e_E$ and the geometric distance values $d_E$ from the same measurement data. According to FIGS. 31A and 31B, the following can be mentioned.

(1) In FIG. 31A, among the Euclid distance values $e_E10$, $e_E11$ and $e_E12$, the Euclid distance value $e_E12$ is the smallest. Specifically, it is understood that, among the Euclid distance values between the standard pattern matrix 9A and the input pattern matrices 10A, 11A and 12A, the Euclid distance value $e_E12$ between the standard pattern matrix 9A and the input pattern matrix 12A is the smallest. Moreover, in FIG. 31B, among the geometric distance values $d_E10$, $d_E11$ and $d_E12$, the geometric distance value $d_E10$ is the smallest. Specifically, it is understood that, among the geometric distance values between the standard pattern matrix 9A and the input pattern matrices 10A, 11A and 12A, the geometric distance value $d_E10$ between the standard pattern matrix 9A and the input pattern matrix 10A is the smallest.

(2) In FIGS. 29 and 30, the input image 10 is a character in the same category as the standard image 9, in which a "positional shift" occurs in a longitudinal line thereof, and the input image 11 and the input image 12 are characters in categories different from the standard image 9. Here, when the Euclid distance values are used, at whichever position (value) an allowed value may be set in FIG. 31A, judgment will be made by mistake that the input image 12 is the standard image, or alternatively, that none of the three input images is the standard image. On the contrary, when the geometric distance values $d_E$ are used, if the allowed value is set at the position shown in FIG. 31B, then judgment can be made that the input image 10 is the standard image and that the input images 11 and 12 are not the standard images.

Meanwhile, FIGS. 32A and 32B are bar graphs showing the angular cosine values $e_A10$, $e_A11$ and $e_A12$ and the geometric distance values $d_A10$, $d_A11$ and $d_A12$, respectively, both of which are obtained from the experiment.

As described above, FIGS. 32A and 32B show the respective distance values between the standard image and the input images, which are obtained by calculating the angular cosine values ea and the geometric distance values $d_A$ from the same measurement data. According to FIGS. 32A and 32B, the following can be mentioned.

(1) In FIG. 32A, among the angular cosine values $e_A10$, $e_A11$ and $e_A12$, the angular cosine value $e_A12$ is the largest. Namely, it is understood that, among the angular cosine values between the original standard pattern matrix 9Ao and the original input pattern matrices 10Ao, 11Ao and 12Ao, the angular cosine value $e_A12$ between the original standard pattern matrix 9Ao and the original input pattern matrix 12Ao is the largest. The largeness of the angular cosine value implies shortness of the distance. Moreover, in FIG. 32B, among the geometric distance values $d_A10$, $d_A11$ and $d_A12$, the geometric distance value $d_A10$ is the largest. Specifically, it is understood that, among the geometric distance values between the original standard pattern matrix 9Ao and the original input pattern matrices 10Ao, 11Ao and 12Ao, the geometric distance value $d_A10$ between the original standard pattern matrix 9Ao and the original input pattern matrix 10Ao is the largest. The largeness of the geometric distance value implies shortness of the distance.

(2) In FIGS. 29 and 30, the input image 10 is a character in the same category as the standard image 9, in which a "positional shift" occurs in a longitudinal line thereof, and the input image 11 and the input image 12 are characters in categories different from the standard image 9. Here, when the angular cosine values are used, at whichever position (value) an allowed value may be set in FIG. 32A, judgment will be made by mistake that the input image 12 is the standard image, or alternatively, that none of the three input images is the standard image. On the contrary, when the geometric distance values $d_A$ are used, if the allowed value is set at the position shown in FIG. 32B, then judgment can be made that the input image 10 is the standard image and that the input images 11 and 12 are not the standard images.

From the results of the above experiments, the following can be understood. In the case where the method for normalizing a density pattern of an image is previously instructed, the use of the geometric distance $d_E$ enables more accurate detection of the similarity between the images than the use of the Euclid distance. Meanwhile, in the case where the method for normalizing a density pattern of an image is not previously instructed, the use of the geometric distance $d_A$ enables more accurate detection of the similarity between the images than the use of the cosine of the angle.

Next, description will be made for examples where, by use of the method for detecting a similarity between images described above, a computer continuously detects a similarity between images to recognize an image with reference to FIGS. 33 to 42. Note that FIGS. 33 to 37 show an example of recognizing an image by use of the geometric distance value $d_E$, and that FIGS. 38 to 42 show an example of recognizing an image by use of the geometric distance value $d_A$.

Figure 33:
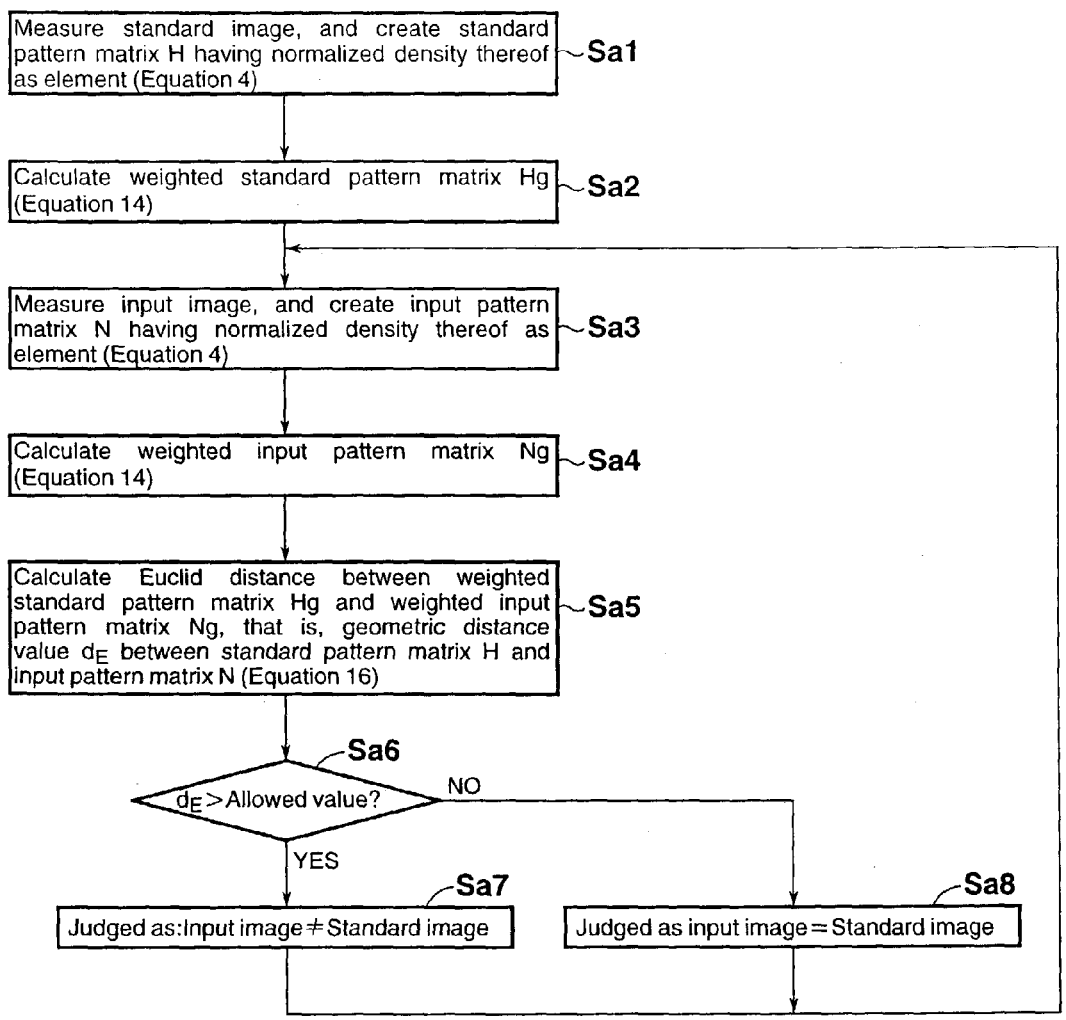
FIG. 33 is a block diagram showing a flowchart for recognizing an image.

FIG. 33 is a flowchart for recognizing an image by a computer by use of the geometric distance value $d_E$. In FIG. 33, the standard pattern matrix H is previously created from the standard image in step Sa1, and the weighted standard pattern matrix Hg is previously calculated from the standard pattern matrix H in step Sa2. Here, the calculation procedure for the weighted standard pattern matrix Hg in step Sa2 is constituted of steps Sa2-1 to Sa2-8 shown in FIG. 34. In the next step Sa3, the input pattern matrix N is created from the input image, and in step Sa4, the weighted input pattern matrix Ng is calculated from the input pattern matrix N. Here, the calculation procedure for the weighted input pattern matrix Ng in step Sa4 is constituted of steps Sa4-1 to Sa4-8 shown in FIG. 35. Then, in step Sa5, the Euclid distance between the weighted standard pattern matrix Hg and the weighted input pattern matrix Ng, that is, the geometric distance value $d_E$ between the standard pattern matrix H and the input pattern matrix N is calculated, which is then compared with an allowed value to make judgment in step Sa6. After the judgment, the processing from step Sa3 is iterated again.

According to the processing procedure as described above, the images can be continuously recognized. When the geometric distance value $d_E$ is larger than the allowed value, the input image is judged not to be the standard image in step Sa7, and when the geometric distance value $d_E$ is equal to/less than the allowed value, the input image is judged to be the standard image in step Sa8.

Incidentally, in the image recognition, generally, recognition is made in many cases as to which of plural images the input image is, for example, like images of the alphabets "A", "B", "C", "D" and "E". In such a case, the respective images of "A", "B", "C", "D" and "E" are regarded as individual standard images, and from these standard images, five standard pattern matrices are previously created.

Next, one input pattern matrix is created from the input image, and geometric distance values $d_E$ between this input pattern matrix and the five standard pattern matrices are calculated. Then, the minimum value among these geometric distance values $d_E$ is compared with an arbitrarily set allowed value. When the minimum geometric distance value $d_E$ is equal to/less than the allowed value, the input image is judged to be a standard image giving the minimum geometric distance value $d_E$, and otherwise, the input image is judged not to be any of the five standard images.

Figure 34:
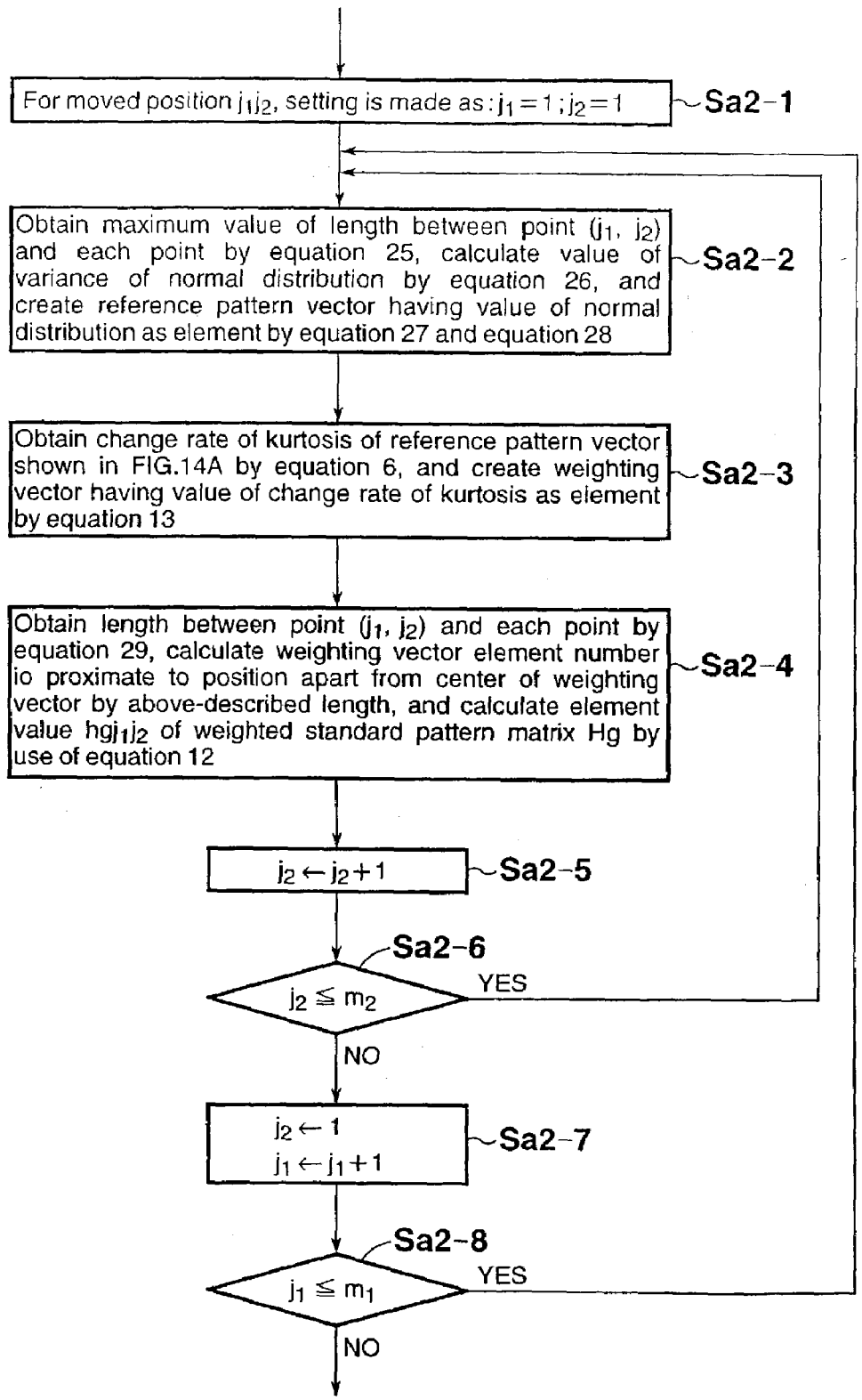
FIG. 34 is a block diagram showing a flowchart for calculating an element value of the weighted standard pattern matrix.

FIG. 34 is a flowchart showing a processing procedure for calculating the $m_1 \times m_2$ pieces of element values $hgj_1j_2$ of the weighted standard pattern matrix Hg. Here, the processing procedure after creating the standard pattern matrix H by the equation 4 is shown, and steps Sa2-1 to Sa2-8 in FIG. 34 are details of step Sa2 in FIG. 33.

In FIG. 34, in the first step Sa2-1, initial setting is previously made as: $j_1=1$; and $j_2=1$. Then, in the following steps Sa2-2 to Sa2-6, $j_2$ is increased one by one to $j_2=m_2$, and in steps Sa2-2 to Sa2-8, $j_1$ is increased one by one to $j_1=m_1$. In such a manner, the processing enters a loop for calculating the element values $hgj_1j_2$ of the weighted standard pattern matrix Hg.

In step Sa2-2 in this element value calculation loop, for each circulation in the loop, the reference pattern vector $Kj_1j_2$ is created by use of the following equations 25, 26, 27 and 28 in this order. Namely, the maximum value of the length between the point $(j_1, j_2)$ and each point is obtained by the equation 25, the variance value of the normal distribution is calculated by the equation 26, and the reference pattern vector having the value of the normal distribution as an element is created by the equations 27 and 28. In step Sa2-3, the weighting vector $Gj_1j_2$ is created by use of the equations 6 and 13 in this order. Specifically, by the equation 6, the change rate in kurtosis of the reference pattern vector shown in FIG. 14A is obtained, and by the equation 13, the weighting vector having the value of the change rate in kurtosis as an element is created. Next, in step Sa2-4, the element value $hgj_1j_2$ of the weighted standard pattern matrix Hg is calculated by use of the coming equation 29 and the precedent equation 12 in this order. Specifically, by the equation 29, the length between the point $(j_1, j_2)$ and each point is obtained to calculate the element number $i_o$ of the weighting vector proximate to the position apart from the center of the weighting vector by the above-described length, and by the equation 12, the element value $hgj_1j_2$ of the weighted standard pattern matrix Hg is calculated.

[Equation 25] (25)

$$\lambda m_1 1 j_1 j_2 = \sqrt{\left\{\frac{(m_1 - j_1)}{(m_1 - 1)}\right\}^2 + \left\{\frac{(1 - j_2)}{(m_2 - 1)}\right\}^2}$$

$(j_1 = 1, 2, 3, \ldots, m_1)$
$(j_2 = 1, 2, 3, \ldots, m_2)$

[Equation 26] (26)

$$\sigma j_1 j_2 = \frac{\lambda m_1 1 j_1 j_2}{1.4}$$

$(j_1 = 1, 2, 3, \ldots, m_1)$
$(j_2 = 1, 2, 3, \ldots, m_2)$

[Equation 27] (27)

$$Kj_1 j_2^{(+)} = (kj_1 j_2^{(+)} 1, kj_1 j_2^{(+)} 2, \ldots, kj_1 j_2^{(+)} i_0, \ldots, kj_1 j_2^{(+)} m_0)$$
$$Kj_1 j_2^{(-)} = (kj_1 j_2^{(-)} 1, kj_1 j_2^{(-)} 2, \ldots, kj_1 j_2^{(-)} i_0, \ldots, kj_1 j_2^{(-)} m_0)$$

$(j_1 = 1, 2, 3, \ldots, m_1)$
$(j_2 = 1, 2, 3, \ldots, m_2)$

[Equation 28] (28)

$$L j_1 j_2 i_0 = \left| i_0 - \frac{m_0 + 1}{2} \right| \times \Delta y j_1 j_2$$

$(i_0 = 1, 2, 3, \ldots, m_0)$
$(j_1 = 1, 2, 3, \ldots, m_1)$
$(j_2 = 1, 2, 3, \ldots, m_2)$

[Equation 29] (29)

for $i_1 = 1, 2, 3, \ldots, m_1;$
$i_2 = 1, 2, 3, \ldots, m_2;$ $$\lambda i_1 i_2 j_1 j_2 = \sqrt{\left\{\frac{(i_1 - j_1)}{(m_1 - 1)}\right\}^2 + \left\{\frac{(i_2 - j_2)}{(m_2 - 1)}\right\}^2}$$

$(j_1 = 1, 2, 3, \ldots, m_1)$
$(j_2 = 1, 2, 3, \ldots, m_2)$

According to the processing procedure as described above, for the respective cases corresponding to the $j_1j_2$ elements $(j_1=1, 2, \ldots, m_1)$ $(j_2=1, 2, \ldots, m_2)$, the $m_1 \times m_2$ pieces of element values $hgj_1j_2$ of the weighted standard pattern matrix Hg can be calculated.

Figure 35:
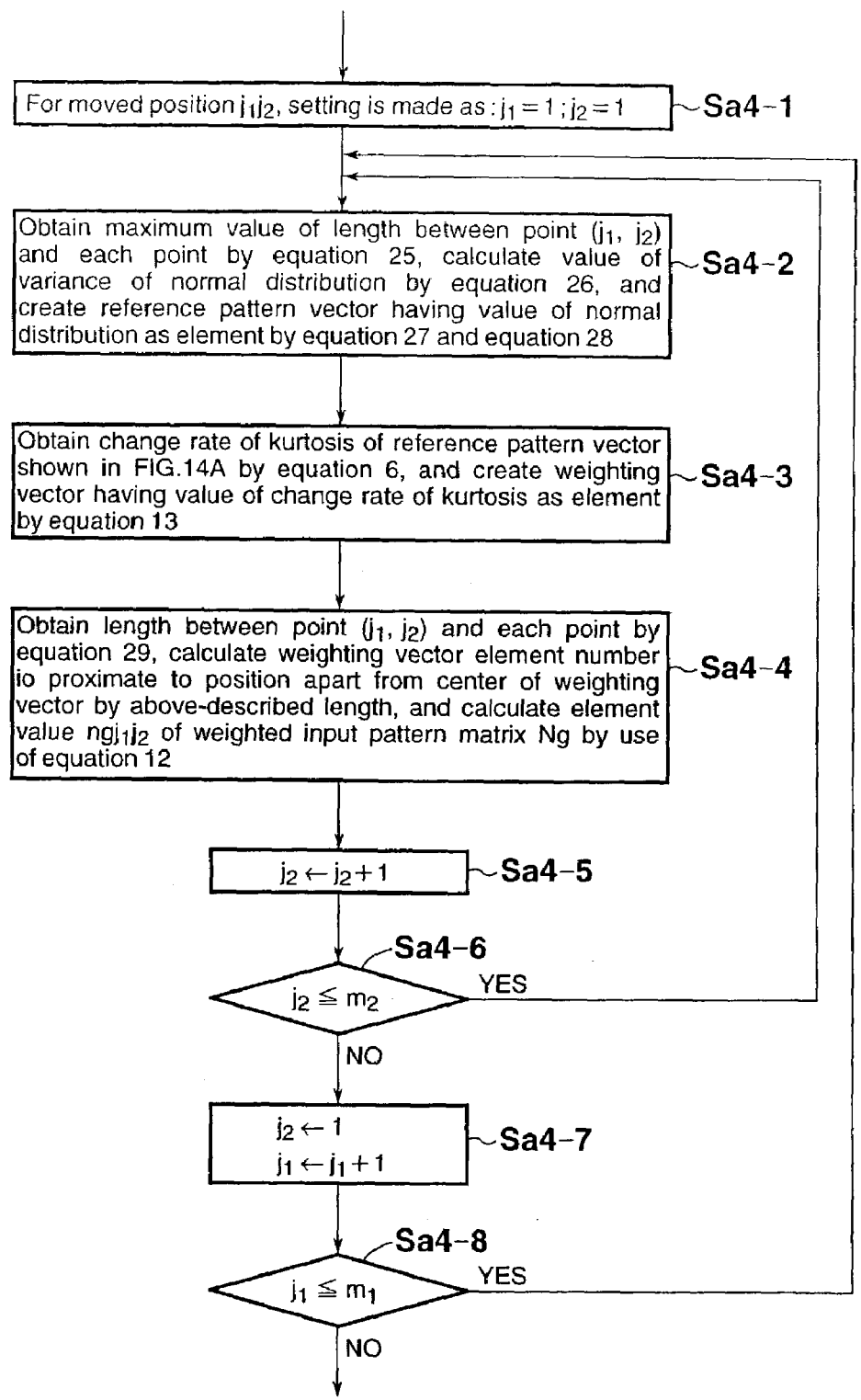
FIG. 35 is a block diagram showing a flowchart for calculating an element value of the weighted input pattern matrix.

Similarly, FIG. 35 is a flowchart showing a processing procedure for calculating the $m_1 \times m_2$ pieces of element values $ngj_1j_2$ of the weighted input pattern matrix Ng. Here, the processing procedure after creating the input pattern matrix N by the equation 4 is shown. Steps Sa4-1 to Sa4-8 are also details of step Sa4 in FIG. 33.

In FIG. 35, the element values $hgj_1j_2$ of the weighted standard pattern matrix Hg in FIG. 34 are substituted into the element values $ngj_1j_2$ of the weighted input pattern matrix Ng, and the same processing procedure as FIG. 34 is executed.

Figure 36:
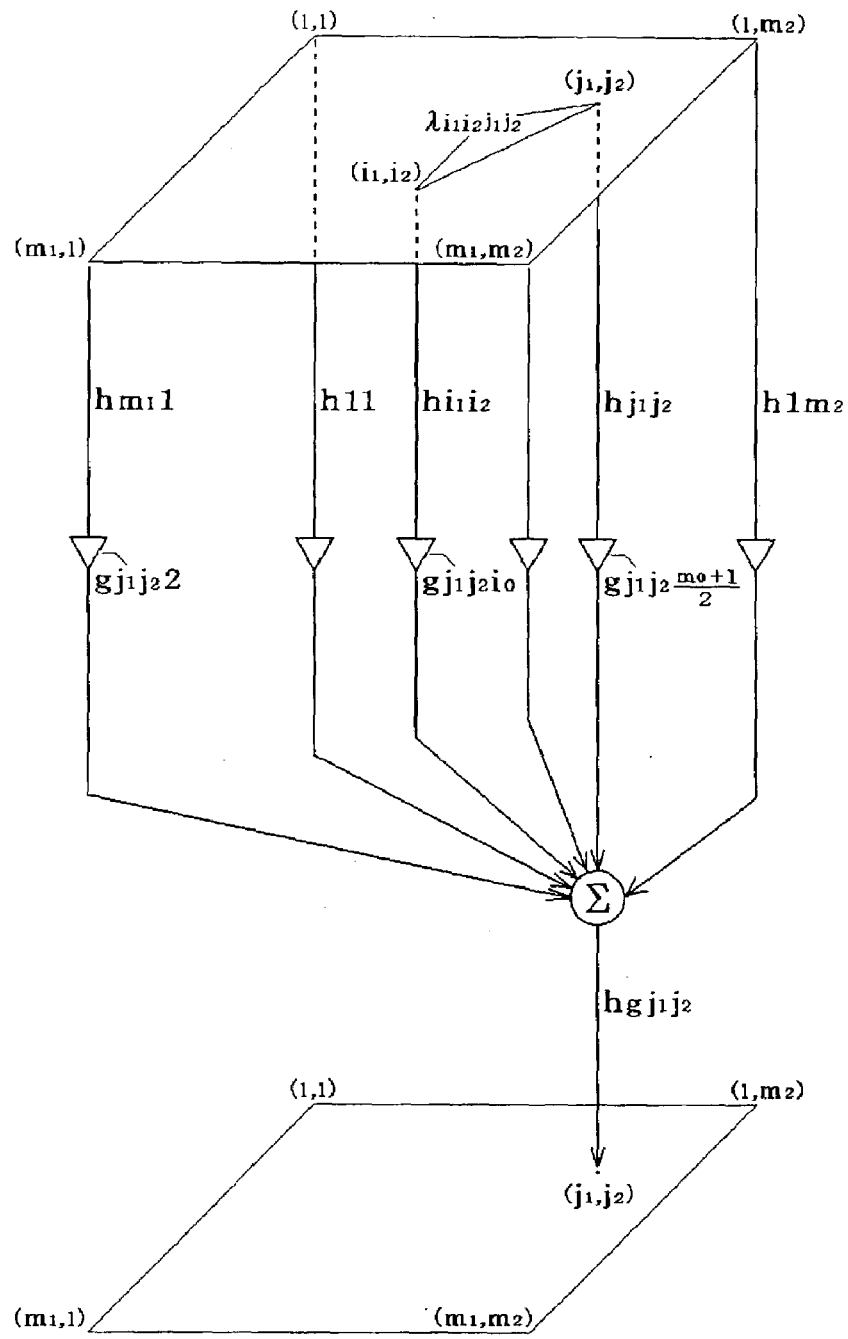
FIG. 36 is a schematic diagram showing a processing procedure for calculating the element value of the weighted standard pattern matrix.

Moreover, FIG. 36 shows the processing procedure for calculating the element value $hgj_1j_2$ of the weighted standard pattern matrix Hg from the element values $hi_1i_2$ ($i_1=1, 2, \ldots, m_1$) ($i_2=1, 2, \ldots, m_2$) of the standard pattern matrix H and the element values $gj_1j_2i_o$ ($i_o=1, 2, \ldots, m_o$) of the weighting vector $Gj_1j_2$. FIG. 36 is also a schematic diagram of step Sa2-4 in FIG. 34.

In FIG. 36, the following state is shown. The length $\lambda i_1 i_2 j_1 j_2$ between the $j_1j_2$ element and the $i_1i_2$ element of the standard pattern matrix H is obtained, and the element number $i_o$ of the weighting vector proximate to the position apart from the center of the weighting vector by the above-described length is calculated. Then, the value of the product of the element value $gj_1j_2i_o$ of the above-described element number of the weighting vector and the element value $hi_1i_2$ of the $i_1i_2$ element of the standard pattern matrix is obtained, and the product-sum value obtained by adding the value of the product for the entire elements of the standard pattern matrix is calculated. Then, the product-sum value is defined as the element value $hgj_1j_2$ of the weighted standard pattern matrix Hg. Note that reference codes ∇ (inverse triangle) in FIG. 36 denote multipliers, and codes Σ (summation codes) therein denote adders. From FIGS. 36 and 17, it is understood that the element value $hi_1i_2$ of the standard pattern matrix is multiplied by the weighting factor $gj_1j_2i_o$ based on the length $\lambda i_1 i_2 j_1 j_2$.

Figure 37:
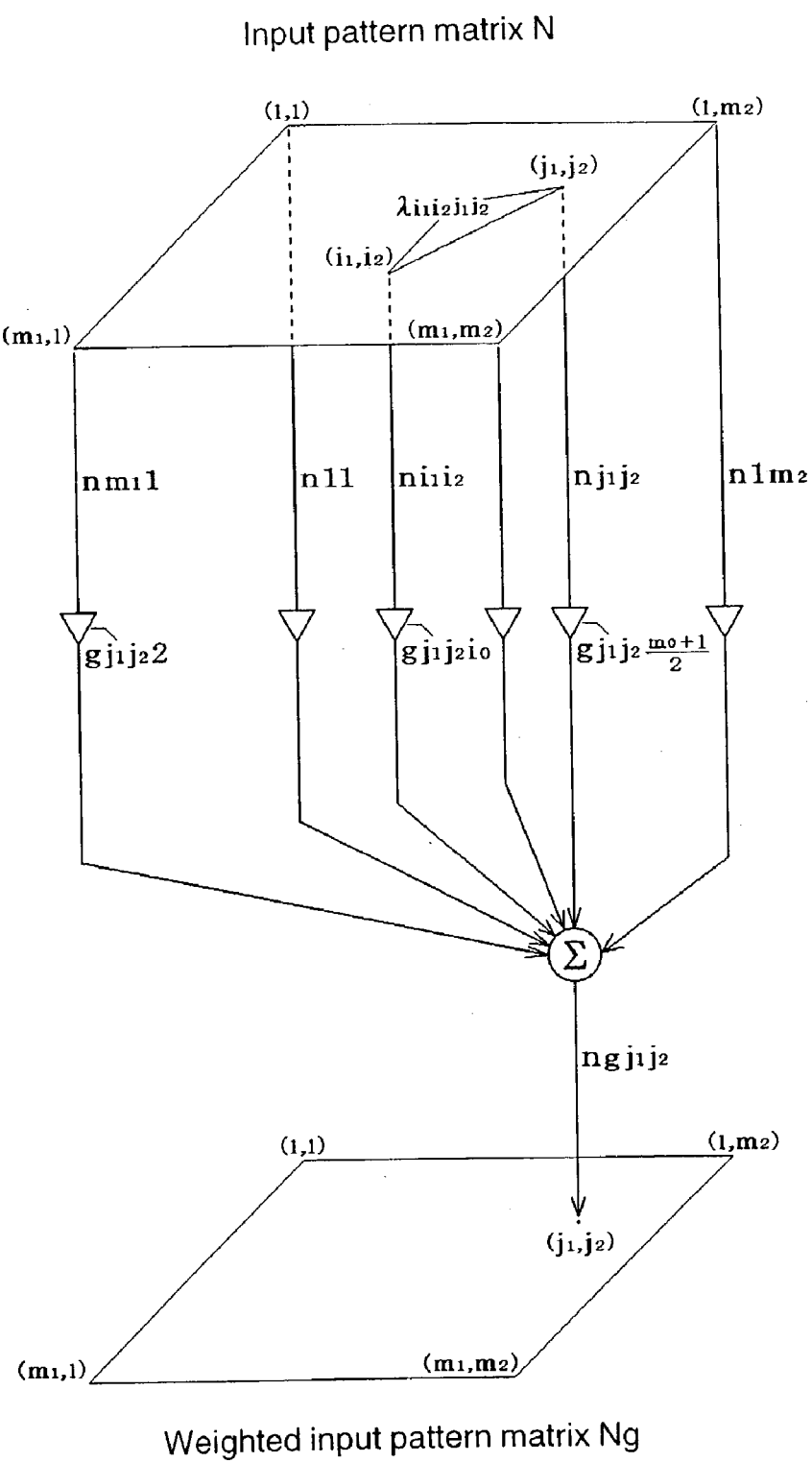
FIG. 37 is a schematic diagram showing a processing procedure for calculating the element value of the weighted input pattern matrix.

Similarly, FIG. 37 shows a processing procedure for calculating the element value $ngj_1j_2$ of the weighted input pattern matrix Ng from the element values $ni_1i_2$ ($i_1=1, 2, \ldots, m_1$) ($i_2=1, 2, \ldots, m_2$) of the input pattern matrix N and the element values $gj_1j_2i_o$ ($i_o=1, 2, \ldots, m_o$) of the weighting vector $Gj_1j_2$. FIG. 37 is also a schematic diagram of step Sa4-4 in FIG. 35. Reference codes ∇ in FIG. 37 denote multipliers, and codes Σ therein denote adders.

In FIG. 37, the element values $hi_1i_2$ ($i_1=1, 2, \ldots, m_1$) ($i_2=1, 2, \ldots, m_2$) of the standard pattern matrix H and the element value $hgj_1j_2$ of the weighted standard pattern matrix Hg in FIG. 36 are substituted into the element values $ni_1i_2$ ($i_1=1, 2, \ldots, m_1$) ($i_2=1, 2, \ldots, m_2$) of the input pattern matrix N and the element value $ngj_1j_2$ of the weighted input pattern matrix Ng, respectively, and the same processing procedure as FIG. 36 is executed.

Hence, in accordance with the processing procedures shown in FIGS. 34 to 37, for the respective cases corresponding to the $j_1j_2$ elements ($j_1=1, 2, \ldots, m_1$) ($j_2=1, 2, \ldots, m_2$), the $m_1 \times m_2$ pieces of element values $hgj_1j_2$ of the weighted standard pattern matrix Hg and the $m_1 \times m_2$ pieces of element values $ngj_1j_2$ of the weighted input pattern matrix Ng can be calculated.

Figure 38:
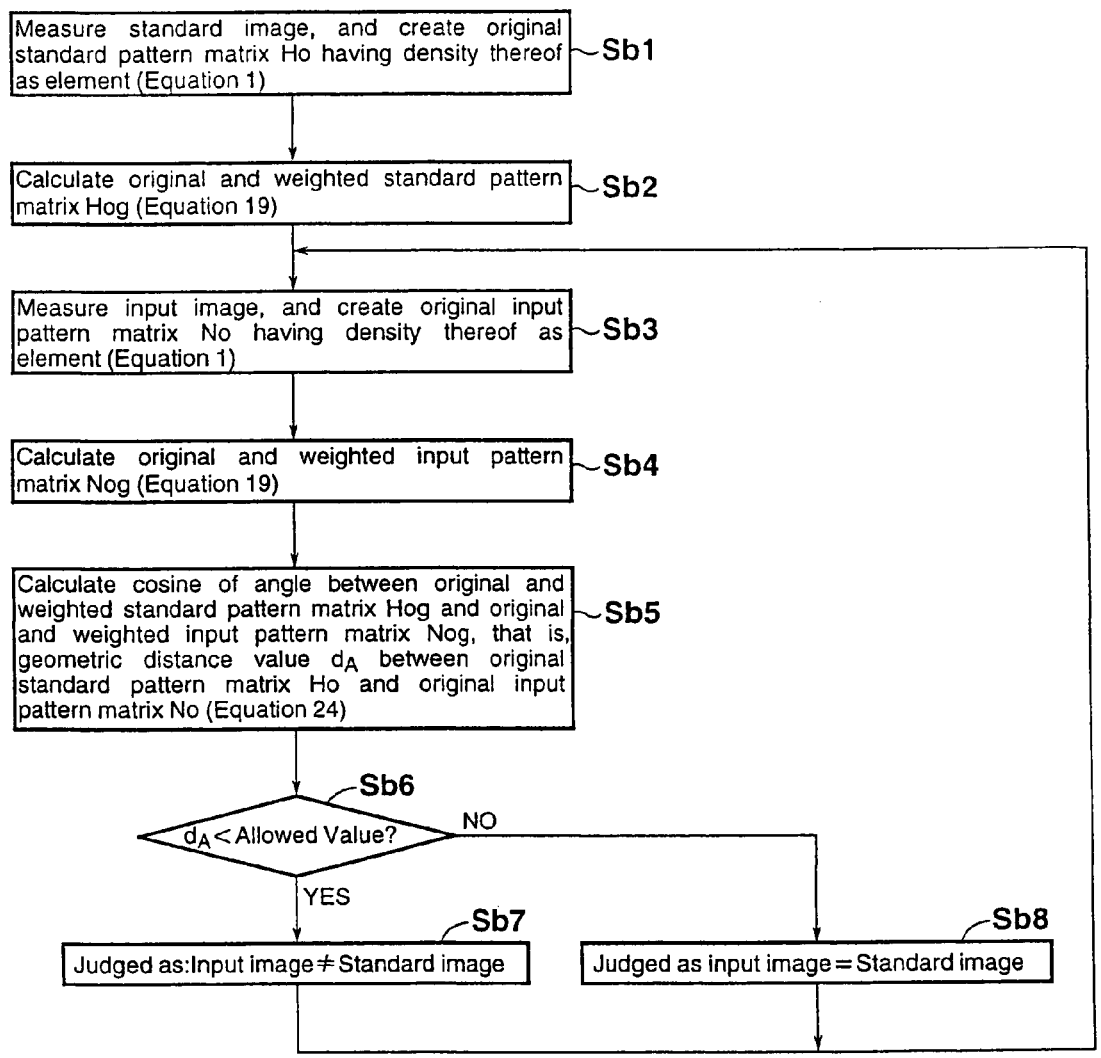
FIG. 38 is a block diagram showing another flowchart for recognizing an image.

Meanwhile, FIG. 33 is a flowchart for recognizing an image by a computer by use of the geometric distance value $d_A$. In FIG. 38, the original standard pattern matrix Ho is previously created from the standard image in step Sb1, and the original and weighted standard pattern matrix Hog is previously calculated from the original standard pattern matrix Ho in step Sb2. Here, the calculation procedure for the original and weighted standard pattern matrix Hog in step Sb2 is constituted of steps Sb2-1 to Sb2-8 shown in FIG. 39. In the next step Sb3, the original input pattern matrix No is created from the input image, and in step Sb4, the original and weighted input pattern matrix Nog is calculated from the original input pattern matrix No. Here, the calculation procedure for the original and weighted input pattern matrix Nog in step Sb4 is constituted of steps Sb4-1 to Sb4-8 shown in FIG. 40. Then, in step Sb5, the cosine of the angle between the original and weighted standard pattern matrix Hog and the original and weighted input pattern matrix Nog, that is, the geometric distance value $d_A$ between the original standard pattern matrix Ho and the original input pattern matrix No is calculated, which is then compared with an allowed value to make judgment in step Sb6. After the judgment, the processing from step Sb3 is iterated again.

According to the processing procedure as described above, the images can be continuously recognized. When the geometric distance value $d_A$ is smaller than the allowed value, the input image is judged not to be the standard image in step Sb7, and when the geometric distance value $d_A$ is equal to/larger than the allowed value, the input image is judged to be the standard image in step Sb8.

Incidentally, in the image recognition, generally, recognition is made in many cases as to which of plural images the input image is, for example, like images of the alphabets "A", "B", "C", "D" and "E". In such a case, the respective images of "A," "B," "C," "D" and "E" are regarded as individual standard images, and from these standard images, five original standard pattern matrices are previously created.

Next, one original input pattern matrix is created from the input image, and geometric distance values $d_A$ between this original input pattern matrix and the five original standard pattern matrices are calculated. Then, the maximum value among these geometric distance values $d_A$ is compared with an arbitrarily set allowed value. When the maximum geometric distance value $d_A$ is equal to/larger than the allowed value, the input image is judged to be a standard image giving the maximum geometric distance value $d_A$, and otherwise, the input image is judged not to be any of the five standard images.

Figure 39:
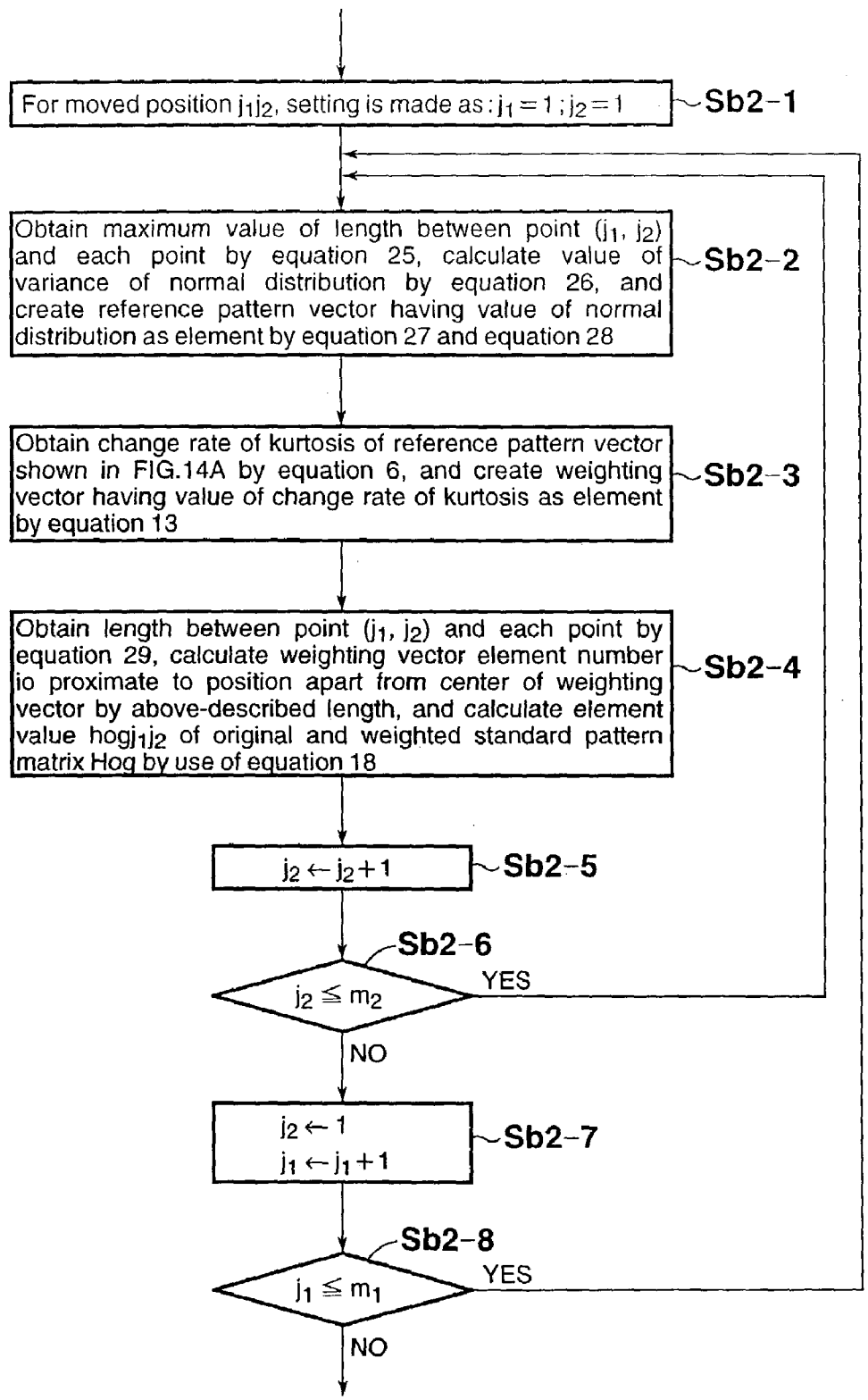
FIG. 39 is a block diagram showing a flowchart for calculating an element value of the original and weighted standard pattern matrix.

FIG. 39 is a flowchart showing a processing procedure for calculating the $m_1 \times m_2$ pieces of element values $hogj_1j_2$ of the original and weighted standard pattern matrix Hog. Here, the processing procedure after creating the original standard pattern matrix Ho by the equation 1 is shown, and steps Sb2-1 to Sb2-8 in FIG. 39 are details of step Sb2 in FIG. 38.

In FIG. 39, in the first step Sb2-1, initial setting is previously made as: $j_1=1$; and $j_2=1$. Then, in the following steps Sb2-2 to Sb2-6, $j_2$ is increased one by one to $j_2=m_2$, and in steps Sb2-2 to Sb2-8, $j_1$ is increased one by one to $j_1=m_1$. In such a manner, the processing enters a loop for calculating the element values $hogj_1j_2$ of the original and weighted standard pattern matrix Hog.

In step Sb2-2 in this element value calculation loop, for each circulation in the loop, the reference pattern vector $Kj_1j_2$ is created by use of the equations 25, 26, 27 and 28 in this order. Namely, the maximum value of the length between the point $(j_1, j_2)$ and each point is obtained by the equation 25, the variance value of the normal distribution is calculated by the equation 26, and the reference pattern vector having the value of the normal distribution as an element is created by the equations 27 and 28. In step Sb2-3, the weighting vector $Gj_1j_2$ is created by use of the equations 6 and 13 in this order. Specifically, by the equation 6, the change rate in kurtosis of the reference pattern vector shown in FIG. 14A is obtained, and by the equation 13, the weighting vector having the value of the change rate in kurtosis as an element is created. Next, in step Sb2-4, the element values $hogj_1j_2$ of the original and weighted standard pattern matrix Hog are calculated by use of the equations 29 and 18 in this order. Specifically, by the equation 29, the length between the point $(j_1, j_2)$ and each point is obtained to calculate the element number $i_o$ of the weighting vector proximate to the position apart from the center of the weighting vector by the above-described length, and by the equation 18, the element values $hogj_1j_2$ of the original and weighted standard pattern matrix Hog are calculated.

According to the processing procedure as described above, for the respective cases corresponding to the $j_1j_2$ elements $(j_1=1, 2, \ldots, m_1)$ $(j_2=1, 2, \ldots, m_2)$, the $m_1 \times m_2$ pieces of element values $hogj_1j_2$ of the original and weighted standard pattern matrix Hog can be calculated.

Figure 40:
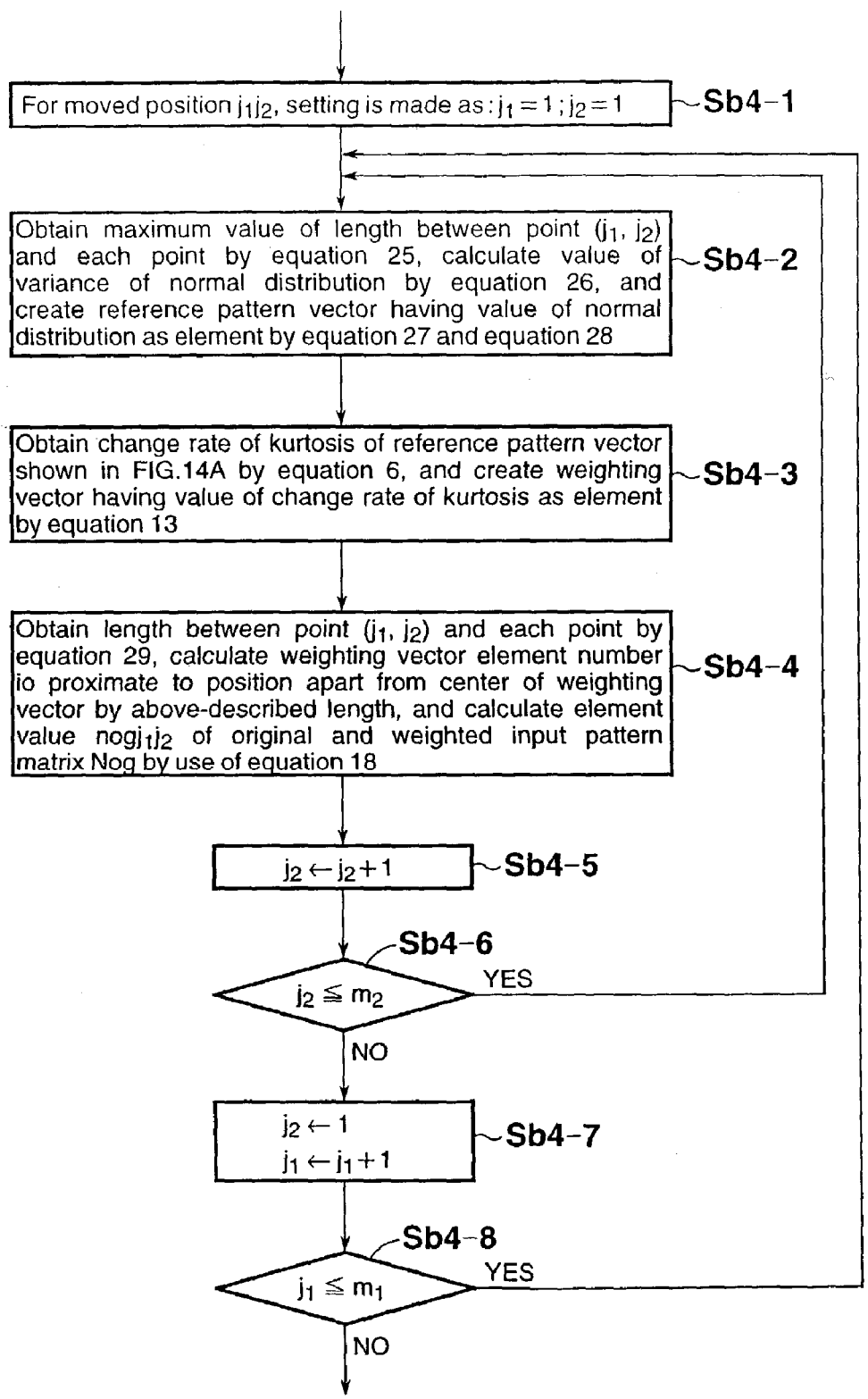
FIG. 40 is a block diagram showing a flowchart for calculating an element value of the original and weighted input pattern matrix.

Similarly, FIG. 40 is a flowchart showing a processing procedure for calculating the $m_1 \times m_2$ pieces of element values $nogj_1j_2$ of the original and weighted input pattern matrix Nog. Here, the processing procedure after creating the original input pattern matrix No by the equation 1 is shown. Steps Sb4-1 to Sb4-8 are also details of step Sb4 in FIG. 38.

In FIG. 40, the element values $hogj_1j_2$ of the original and weighted standard pattern matrix Hog in FIG. 39 are substituted into the element values $nogj_1j_2$ of the original and weighted input pattern matrix Nog, and the same processing procedure as FIG. 39 is executed.

Figure 41:
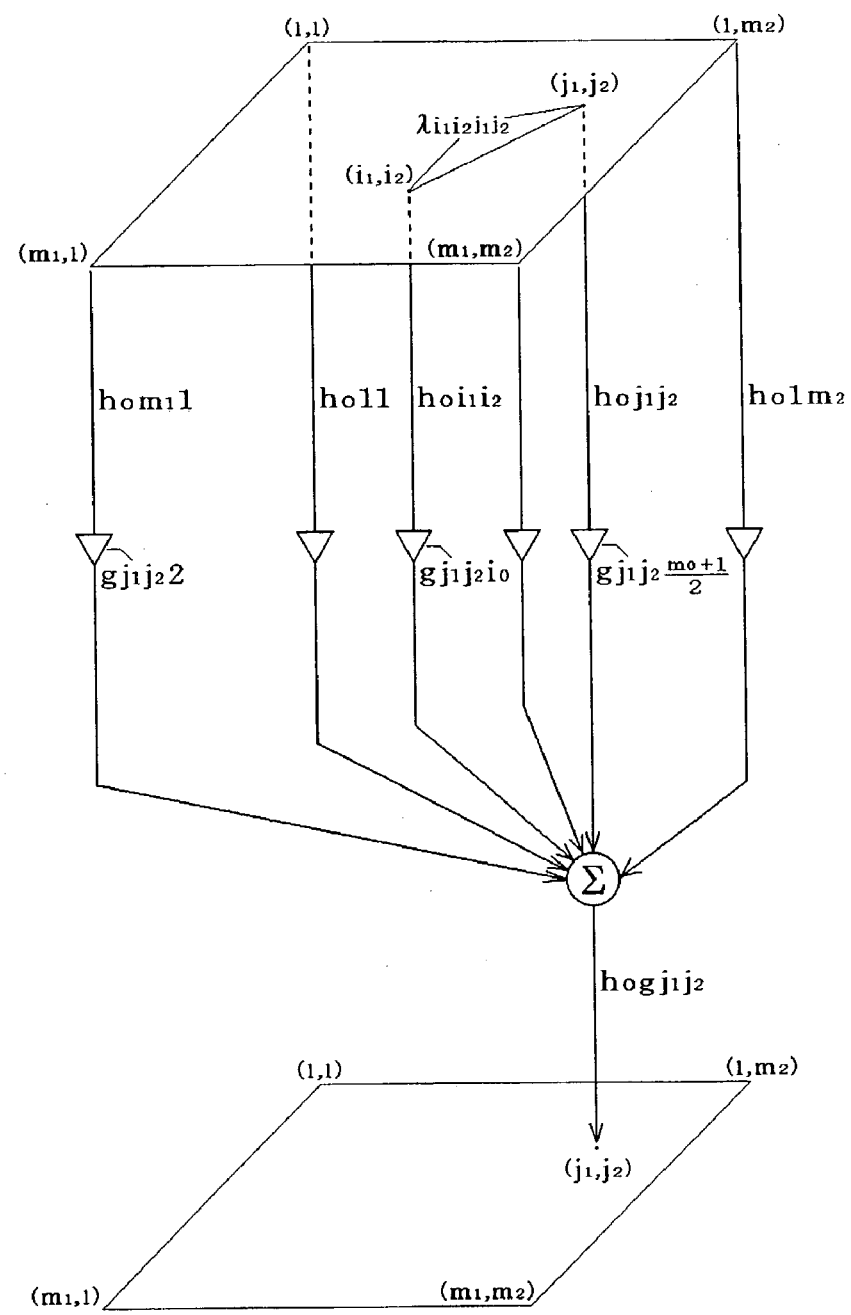
FIG. 41 is a schematic diagram showing a processing procedure for calculating an element value of the original and weighted standard pattern matrix.

Moreover, FIG. 41 shows the processing procedure for calculating the element value $hogj_1j_2$ of the original and weighted standard pattern matrix Hog from the element values $hoi_1i_2$ $(i_1=1, 2, \ldots, m_1)$ $(i_2=1, 2, \ldots, m_2)$ of the original standard pattern matrix Ho and the element values $gj_1j_2i_o$ $(i_o=1, 2, \ldots, m_o)$ of the weighting vector $Gj_1j_2$. FIG. 41 is also a schematic diagram of step Sb2-4 in FIG. 39.

In FIG. 41, the following state is shown. The length $\lambda i_1i_2j_1j_2$ between the $j_1j_2$ element and the $i_1i_2$ element of the original standard pattern matrix Ho is obtained, and the element number $i_o$ of the weighting vector proximate to the position apart from the center of the weighting vector by the above-described length is calculated. Then, the value of the product of the element value $gj_1j_2i_o$ of the above-described element number of the weighting vector and the element value $hoi_1i_2$ of the $i_1i_2$ element of the original standard pattern matrix is obtained, and the product-sum value obtained by adding the value of the product to the entire elements of the original standard pattern matrix is calculated. Then, the product-sum value is defined as the element value $hogj_1j_2$ of the original and weighted standard pattern matrix Hog. Note that reference codes $\nabla$ in FIG. 41 denote multipliers, and codes $\Sigma$ therein denote adders. From FIGS. 41 and 17, it is understood that the element value $hoi_1i_2$ of the original standard pattern matrix is multiplied by the weighting factor $gj_1j_2i_o$ based on the length $\lambda i_1i_2j_1j_2$.

Figure 42:
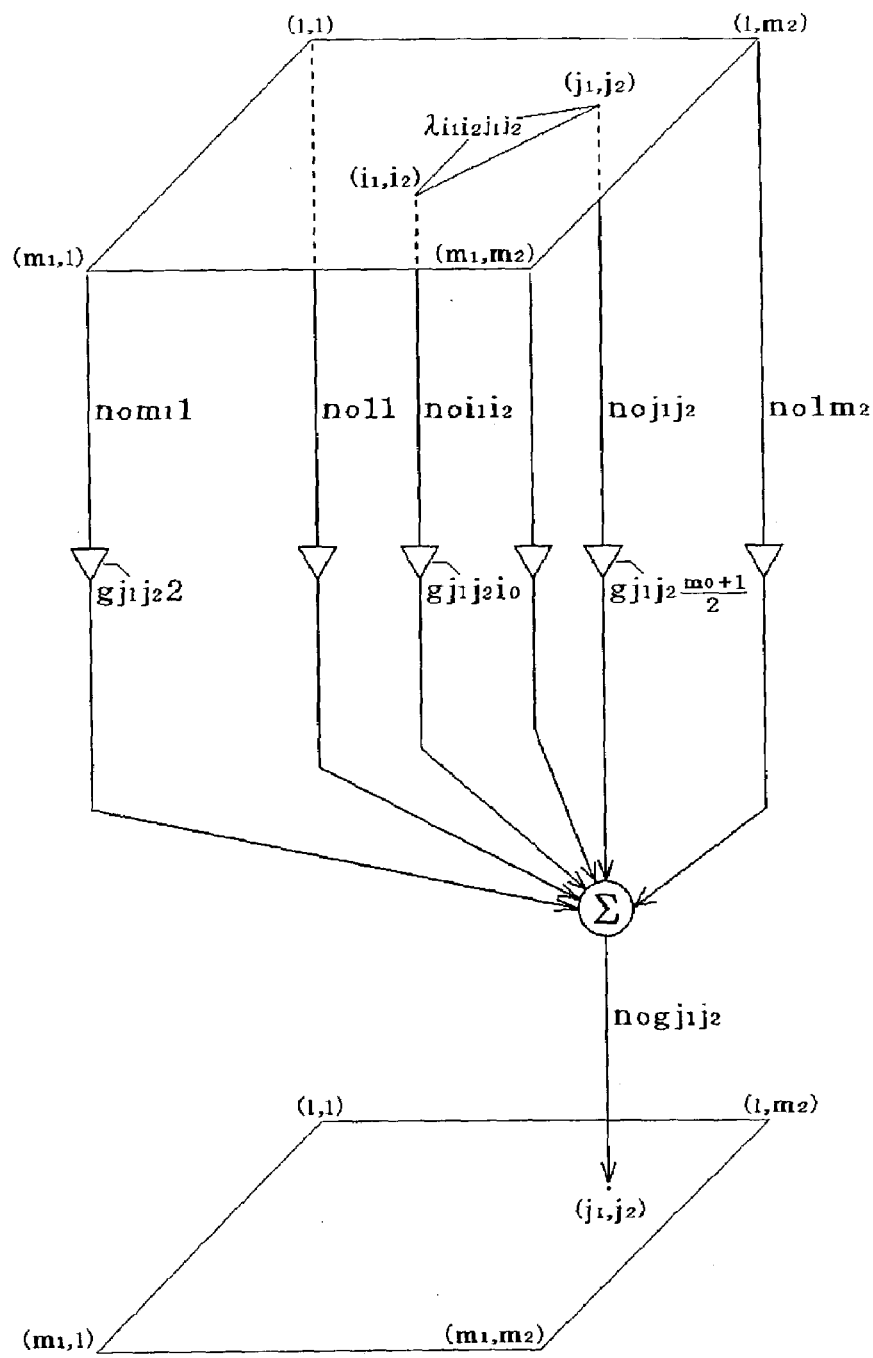
FIG. 42 is a schematic diagram showing a processing procedure for calculating an element value of the original and weighted input pattern matrix.

Similarly, FIG. 42 shows a processing procedure for calculating the element value $nogj_1j_2$ of the original and weighted input pattern matrix Nog from the element values $noi_1i_2$ $(i_1=1, 2, \ldots, m_1)$ $(i_2=1, 2, \ldots, m_2)$ of the original input pattern matrix No and the element values $gj_1j_2i_o$ $(i_o=1, 2, \ldots, m_o)$ of the weighting vector $Gj_1j_2$. FIG. 42 is also a schematic diagram of step Sb4-4 in FIG. 40. Reference codes $\nabla$ in FIG. 42 denote multipliers, and codes $\Sigma$ therein denote adders.

In FIG. 42, the element values ho $i_1i_2$ $(i_1=1, 2, \ldots, m_1)$ $(i_2=1, 2, \ldots, m_2)$ of the original standard pattern matrix Ho and the element value $hogj_1j_2$ of the original and weighted standard pattern matrix Hog in FIG. 41 are substituted into the element values no $i_1i_2$ $(i_1=1, 2, \ldots, m_1)$ $(i_2=1, 2, \ldots,$ $m_2$) of the original input pattern matrix No and the element value $nog_{j_1j_2}$ of the original and weighted input pattern matrix Nog, respectively, and the same processing procedure as FIG. 41 is executed.

Hence, in accordance with the processing procedures shown in FIGS. 39 to 42, for the respective cases corresponding to the $j_1j_2$ elements ($j_1$=1, 2, . . . , $m_1$) ($j_2$=1, 2, . . . , $m_2$), the $m_1 \times m_2$ pieces of element values $hog_{j_1j_2}$ of the original and weighted standard pattern matrix Hog and the $m_1 \times m_2$ pieces of element values $nog_{j_1j_2}$ of the original and weighted input pattern matrix Nog can be calculated.

Figure 43:
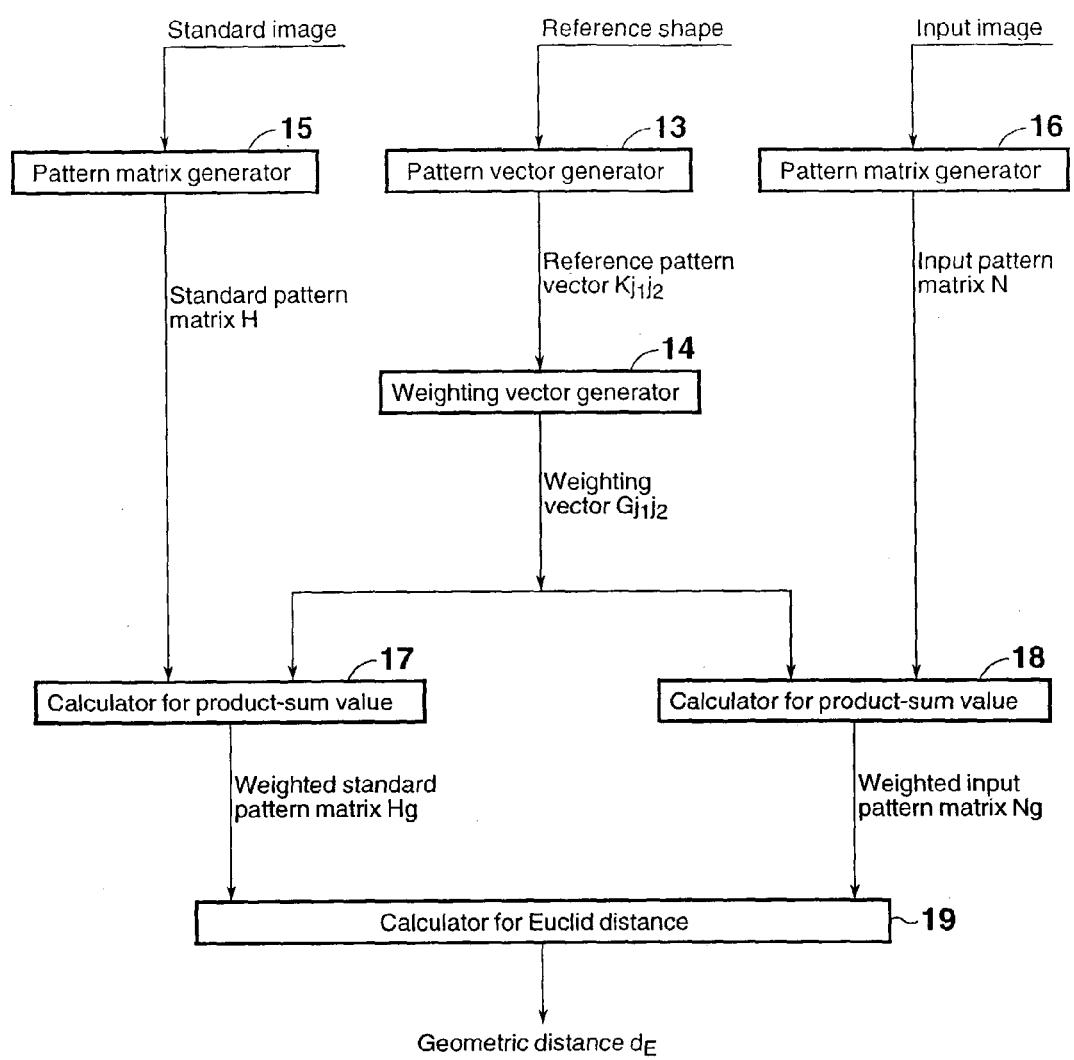
FIG. 43 is a block diagram showing a structure of an apparatus for detecting a similarity between images.
Figure 44:
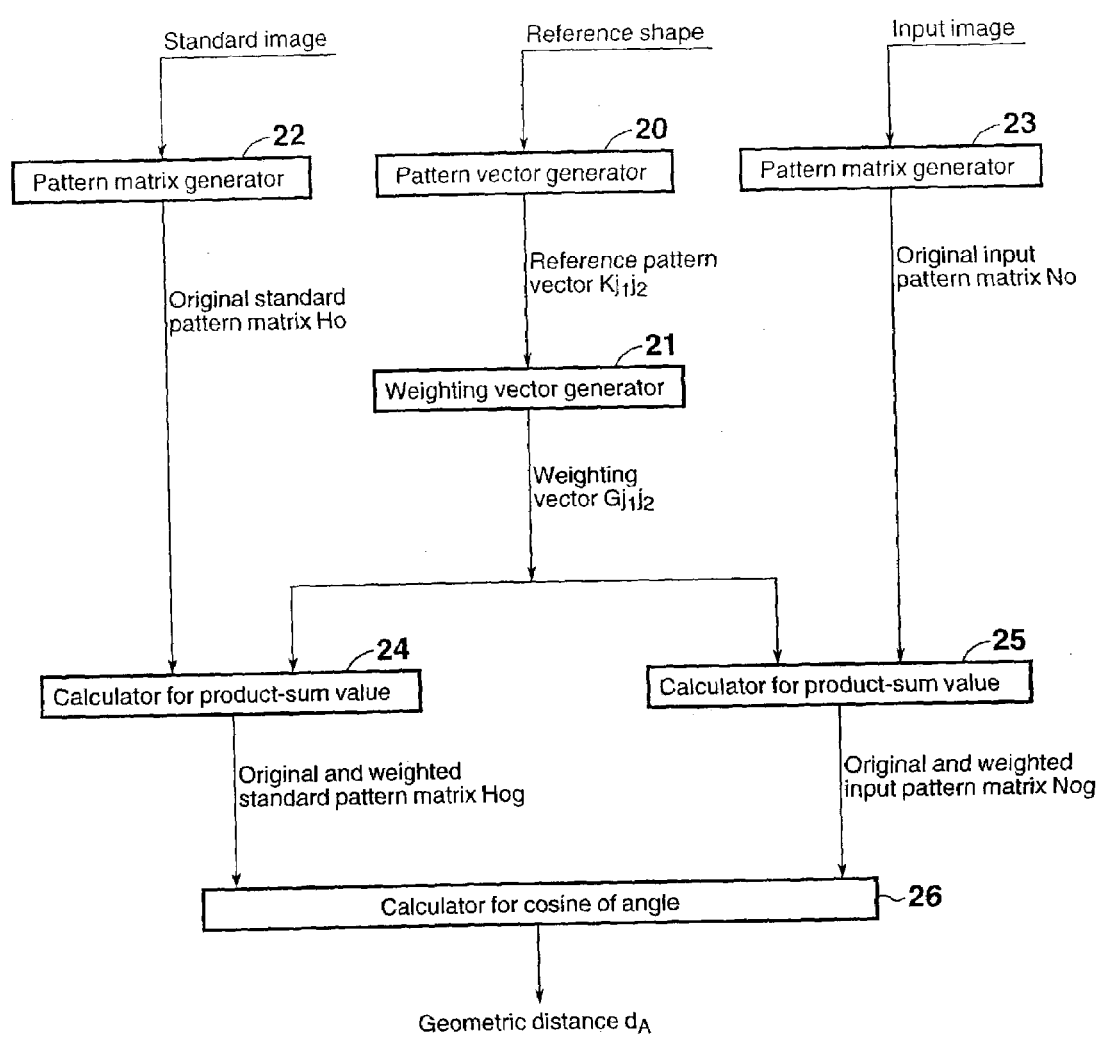
FIG. 44 is a block diagram showing another structure of the apparatus for detecting a similarity between images.

FIGS. 43 and 44 are block diagrams showing apparatuses for detecting a similarity between images, which realize the calculation procedures for the geometric distance value $d_E$ and the geometric distance value $d_A$, respectively.

In FIG. 43, a reference numeral 13 denotes a pattern vector generator, a numeral 14 denotes a weighting vector generator, numerals 15 and 16 denote pattern matrix generators, and numerals 17, 18 and 19 denote calculators.

The pattern vector generator 13 generates the reference pattern vector $Kj_1j_2$ having the value of the normal distribution as an element. The weighting vector generator 14 generates the weighting vector $Gj_1j_2$ having the value of the change rate in kurtosis of the reference pattern vector $Kj_1j_2$ as an element. The pattern matrix generator 15 generates the standard pattern matrix H having the feature quantity of the standard image as an element. The pattern matrix generator 16 generates the input pattern matrix N having the feature quantity of the input image as an element. The calculator 17 obtains the length between the specified element and each element of the standard pattern matrix, calculates the element number of the weighting vector proximate to the position apart from the center of the weighting vector by the above-described length, obtains the value of the product of the element value of the above-described element number of the weighting vector $Gj_1j_2$ and the element value of each element of the standard pattern matrix H, and calculates the product-sum value obtained by adding the value of the product to each element of the standard pattern matrix. Here, in calculating the product-sum value, the calculator 17 obtains the product-sum value while moving the specified element of the standard pattern matrix to the position of each element, and thus generates the weighted standard pattern matrix Hg having the above-described product-sum value as an element value of the specified element. The calculator 18 obtains the length between the specified element and each element of the input pattern matrix, and calculates the element number of the weighting vector proximate to the position apart from the center of the weighting vector by the above-described length. Then, the calculator 18 obtains the value of the product of the element value of the above-described element number of the weighting vector $Gj_1j_2$ and the element value of each element of the input pattern matrix N, and calculates the product-sum value obtained by adding the value of the product to each element of the input pattern matrix. Here, in calculating the product-sum value, the calculator 18 obtains the product-sum value while moving the specified element of the input pattern matrix to the position of each element, and thus generates the weighted input pattern matrix Ng having the above-described product-sum value as an element value of the specified element. The calculator 19 calculates the Euclid distance between the weighted standard pattern matrix Hg generated by the calculator 17 and the weighted input pattern matrix Ng generated by the calculator 18, and thus obtains the geometric distance value $d_E$ between the standard pattern matrix H and the input pattern matrix N.

Meanwhile, in FIG. 44, a reference numeral 20 denotes a pattern vector generator, a numeral 21 denotes a weighting vector generator, numerals 22 and 23 denote pattern matrix generators, and numerals 24, 25 and 26 denote calculators.

The pattern vector generator 20 generates the reference pattern vector $Kj_1j_2$ having the value of the normal distribution as an element. The weighting vector generator 21 generates the weighting vector $Gj_1j_2$ having the value of the change rate in kurtosis of the reference pattern vector $Kj_1j_2$ as an element. The pattern matrix generator 22 generates the original standard pattern matrix Ho having the feature quantity of the standard image as an element. The pattern matrix generator 23 generates the original input pattern matrix No having the feature quantity of the input image as an element. The calculator 24 obtains the length between the specified element and each element of the original standard pattern matrix, calculates the element number of the weighting vector proximate to the position apart from the center of the weighting vector by the above-described length, obtains the value of the product of the element value of the above-described element number of the weighting vector $Gj_1j_2$ and the element value of each element of the original standard pattern matrix Ho, and calculates the product-sum value obtained by adding the value of the product to each element of the original standard pattern matrix. Here, in calculating the product-sum value, the calculator 24 obtains the product-sum value while moving the specified element of the original standard pattern matrix to the position of each element, and thus generates the original and weighted standard pattern matrix Hog having the above-described product-sum value as an element value of the specified element. The calculator 25 obtains the length between the specified element and each element of the original input pattern matrix, calculates the element number of the weighting vector proximate to the position apart from the center of the weighting vector by the above-described length, obtains the value of the product of the element value of the above-described element number of the weighting vector $Gj_1j_2$ and the element value of each element of the original input pattern matrix No, and calculates the product-sum value obtained by adding the value of the product to each element of the original input pattern matrix. Here, in calculating the product-sum value, the calculator 25 obtains the product-sum value while moving the specified element of the original input pattern matrix to the position of each element, and thus generates the original and weighted input pattern matrix Nog having the above-described product-sum value as an element value of the specified element. The calculator 26 calculates the cosine value of the angle between the original and weighted standard pattern matrix Hog generated by the calculator 24 and the original and weighted input pattern matrix Nog generated by the calculator 25, and thus obtains the geometric distance value $d_A$ between the original standard pattern matrix Ho and the original input pattern matrix No.

As above, description has been made for the solving means for the first subject of the present invention. Next, description will be made for the solving means for the second subject of the present invention.

In the handwritten character recognition, a deformed character occurs for each writing even if the same character is written. Therefore, a method is usually adopted, in which a large number of human beings write the same character repeatedly, and a plurality of standard images are registered for each character.

For example, FIG. 45 shows two examples of binary images of the alphabet "E" and two examples of binary images of the alphabet "F", which are defined as standard images 27 and 28 of "E" and standard images 29 and 30 of "F". The alphabet "E" and the alphabet "F" are different in category. Note that the density of the character portion in each of these standard images is set at 1, and that the density of the background portion therein is set at 0. Moreover, FIG. 45 schematically shows the respective geometric distances $d_E$ between the standard images as $d_E27$–$28$, $d_E29$–$30$, $d_E27$–$29$, $d_E27$–$30$, $d_E28$–$29$ and $d_E28$–$30$. Note that $d_E27$–$28$ indicated by a solid-line arrow is a geometric distance between the standard images 27 and 28 of "E" in the same category, and that $d_E29$–$30$ indicated by a solid-line arrow is a geometric distance between the standard images 29 and 30 of "F" in the same category. $d_E27$–$29$ and $d_E27$–$30$ indicated by broken-line arrows are geometric distances between the standard image 27 of "E" and the standard images 29 and 30 of "F", which are different in category. $d_E28$–$29$ and $d_E28$–$30$ indicated by broken-line arrows are geometric distances between the standard image 28 of "E" and the standard images 29 and 30 of "F", which are different in category.

Meanwhile, FIG. 45 schematically shows the respective geometric distances $d_A$ between the standard images as $d_A27$–$28$, $d_A29$–$30$, $d_A27$–$29$, $d_A27$–$30$, $d_A28$–$29$ and $d_A28$–$30$. Note that $d_A27$–$28$ indicated by a solid-line arrow is a geometric distance between the standard images 27 and 28 of "E" in the same category, and that $d_A29$–$30$ indicated by a solid-line arrow is a geometric distance between the standard images 29 and 30 of "F" in the same category. $d_A27$–$29$ and $d_A27$–$30$ indicated by broken-line arrows are geometric distances between the standard image 27 of "E" and the standard images 29 and 30 of "F", which are different in category. $d_A28$–$29$ and $d_A28$–$30$ indicated by broken-line arrows are geometric distances between the standard image 28 of "E" and the standard images 29 and 30 of "F", which are different in category.

Here, if the distance between the standard images in the same category is shortened, and simultaneously, the distance between the standard images in the different categories is elongated, then, as a result, separation of the standard image in the same category and the standard image in the different category is improved, and thus recognition performance when an input image is given is improved.

However, in the equation 26, the square of the ratio value obtained by dividing the maximum value $\lambda m_1 1 j_1 j_2$ of the length between the specified element and each element of the pattern matrix by the constant of 1.4 is defined as the value of variance of the normal distribution. Namely, according to the method of the related art (Japanese Patent Application No. 2000-277749), since the reference pattern vector is created by use of the normal distribution having the fixed value of variance, the separation of the standard image in the same category and the standard image in the different category is fixed, and thus the recognition performance when an input image is given cannot be improved.

In order to solve the above-described problem, in the present invention, the reference pattern vector is created by use of the normal distribution having a variable variance value instead of the fixed method of the related art. Therefore, investigation will be made for a state where the weighting curve is changed when the above-described constant of 1.4 is substituted into a variable to change the variance value of the normal curve.

Figure 46A:
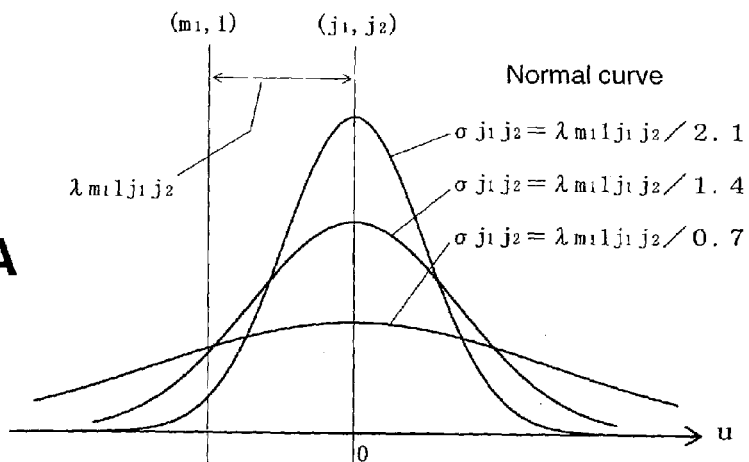
FIG. 46A is a diagram showing change examples of normal curves when values of variance are changed.
Figure 46B:
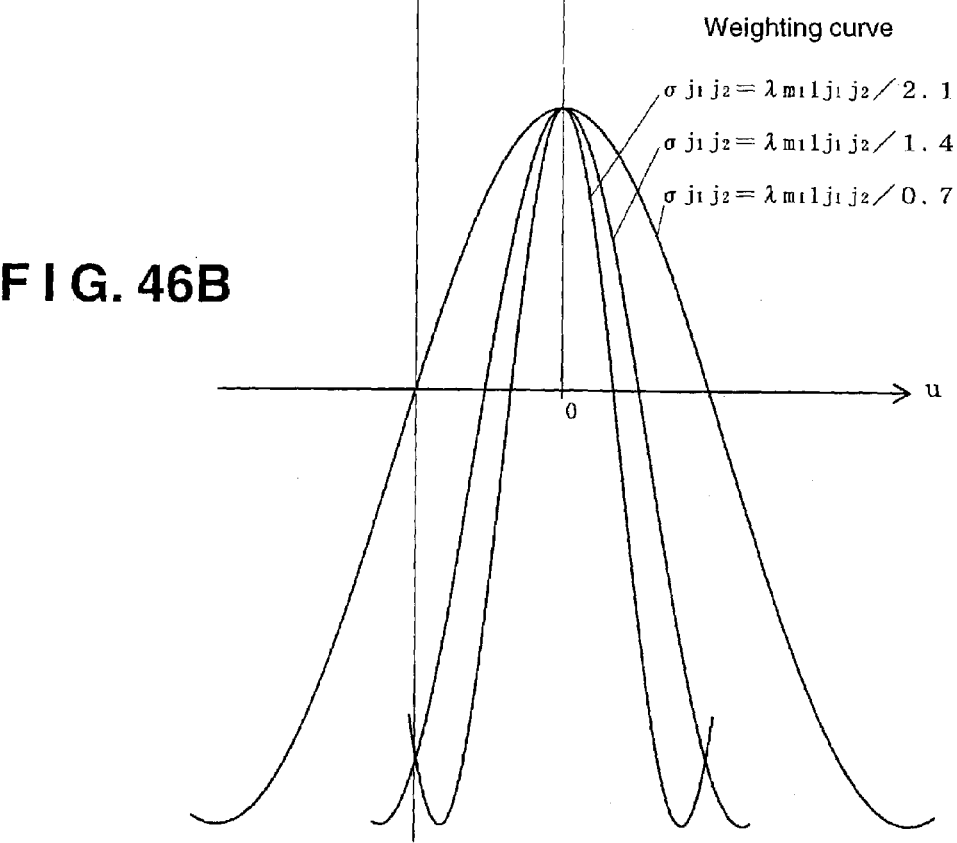
FIG. 46B is a diagram showing change examples of weighting curves created based on change rates of kurtoses of the normal curves.

FIG. 46A shows the respective normal curves when the constant is 1.4 and substituted with 2.1 and 0.7 in the equation 26. Moreover, FIG. 46B shows the respective weighting curves created based on the change rates in kurtosis of these normal curves. From FIGS. 46A and 46B, it is understood that the normal curve becomes gentler and the weighting curve is extended to the direction parallel to the u-axis as the value of the variance $\sigma j_1 j_2^2$ becomes larger. Note that the above-described constants 2.1, 1.4 and 0.7 are numerical values based on the description below.

Specifically, when the mean value: $\mu=0$ and the variance is set as $\sigma^2$, the kurtosis value of the normal curve is equal to "3". Then, when the value of the curve f(y) is increased more than the value of the normal curve in the range of: $-0.7\sigma<y<+0.7\sigma$, the kurtosis value will be larger than "3". When the value of the curve f(y) is increased more than the value of the normal curve in the range of: $-2.1\sigma<y<-0.7\sigma$ or in the range of: $+0.7\sigma<y<+2.1\sigma$, the kurtosis value will be smaller than "3". Moreover, when the value of the curve f(y) is increased more than the value of the normal curve in the vicinity of: $y=-0.7\sigma$ or in the vicinity of: $y=+0.7\sigma$, the variation of the kurtosis value will be small, and the kurtosis value will be nearly "3". On the other hand, when the value of the curve f(y) is increased more than the value of the normal curve in the range of: $y \leqq -2.1\sigma$ or in the range of: $y \geqq +2.1\sigma$, the kurtosis value will be unstable to be larger and smaller than "3". All of the above is always established irrespective of the value of the variance $\sigma^2$.

Next, as shown in FIGS. 46A and 46B, when the variance value of the normal curve is changed to extend and contract the weighting curve in the direction parallel to the u-axis, investigation will be made for a state where the geometric distance value $d_E$ and the geometric distance value $d_A$ between the standard images are changed with regard to the standard images 27, 28, 29 and 30 shown in FIG. 45. Note that, in the above description, the method for calculating the geometric distance value $d_E$ and the geometric distance value $d_A$ between the standard image and the input image has been shown. However, the input image can be substituted into the standard image, and by the method similar to the above description, the geometric distance value $d_E$ and the geometric distance value $d_A$ between two standard images can be calculated.

Here, consideration will be made for the case of using the geometric distance $d_E$. In order to examine the state where the geometric distance values between the standard images are changed, as shown in the following equation 30, a ratio value $R_E$ (Cg) of mean values is calculated, which is obtained by dividing a mean geometric distance value between the standard images in the same category by the mean geometric distance value between the standard images in the different categories. Note that, as assumption, the constants of 2.1, 1.4 and 0.7 in FIG. 46 are substituted with the variable Cg, the value of the variable Cg is changed in the range of: $0.7 \leqq Cg \leqq 2.1$, and the ratio value $R_E$ (Cg) of the mean values in this case is calculated. Moreover, in the calculation of the geometric distance $d_E$, as assumption, the normalized density is obtained by use of the equation 3 on the assumption that the normalization of the density pattern of the image by the maximum value of the densities of the entire pixels is previously instructed.

[Equation 30] (30)

when $\sigma j_1 j_2 = \lambda m_1 1 j_1 j_2 / Cg, R_E(Cg) =$ $$\frac{\frac{d_E 27 - 28 + d_E 29 - 30}{2}}{\frac{d_E 27 - 29 + d_E 27 - 30 + d_E 28 - 29 + d_E 28 - 30}{4}}$$

In the equation 30, as the value of the variable Cg is increased, the value of the variance $\sigma j_1 j_2^2$ is decreased. Accordingly, the weighting curve is contracted in the direction parallel to the u-axis, and the geometric distance values $d_E 27$–$28$, $d_E 29$–$30$, $d_E 27$–$29$, $d_E 27$–$30$, $d_E 28$–$29$ and $d_E 28$–$30$ between the respective standard images are also changed in value in the range of: $d_E \geq 0$. Here, the numerator of $R_E(Cg)$ in the equation 30 is the mean geometric distance value between the standard images in the same category, and the denominator thereof is the mean geometric distance value between the standard images in the different categories. Therefore, when the ratio value $R_E(Cg)$ of the mean values becomes minimum, the distance between the standard images in the same category is shortened, and simultaneously, the distance between the standard images in the different categories is elongated. Accordingly, the weighting curve created based on the value of the variable Cg minimizing the ratio value $R_E(Cg)$ of the mean values becomes optimal.

Figure 47:
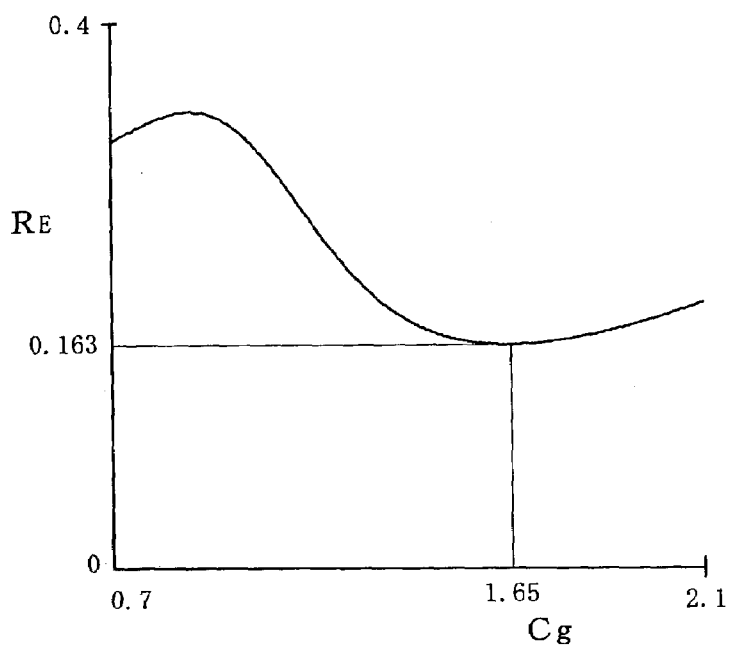
FIG. 47 is a graph showing a change in a ratio value of mean values of geometric distances calculated by use of the weighting curves created based on the change rates of the kurtoses of the normal curves.

FIG. 47 shows a state where the ratio value $R_E(Cg)$ of the mean values is changed when the value of the variable Cg is increased from 0.7 to 2.1 with regard to the standard images 27, 28, 29 and 30 shown in FIG. 45. From FIG. 47, it is understood that the ratio value $R_E$ (Cg) of the mean values takes the minimum value of 0.163 when Cg=1.65.

Accordingly, with regard to the standard images 27, 28, 29 and 30 shown in FIG. 45, from the result of FIG. 47, the weighting curve creased based on the value of: Cg=1.65 becomes optimal, and in this case, the value $R_E(Cg)$ becomes equal to 0.163. Note that, in the case of using the conventional Euclid distance for the standard images 27, 28, 29 and 30 shown in FIG. 45, the ratio value of mean values, which is obtained by dividing the mean Euclid distance value between the standard images in the same category by the mean Euclid distance value between the standard images in the different categories, becomes 0.472. From the above results, it can be understood that the use of the geometric distance $d_E$ improves the separation of the standard image in the same category and the standard image in the different category more than the use of the Euclid distance, and thus enhances the recognition performance when an input image is given.

Meanwhile, consideration will be made for the case of using the geometric distance $d_A$. In order to examine the state where the geometric distance values between the standard images are changed, as shown in the following equation 31, a difference value $R_A(Cg)$ of mean values is calculated, which is obtained by subtracting a mean geometric distance value between the standard images in the different categories from the mean geometric distance value between the standard images in the same category. Note that, as assumption, the constants of 2.1, 1.4 and 0.7 in FIGS. 46A and 46B are substituted into the variable Cg, the value of the variable Cg is changed in the range of: $0.7 \leq Cg \leq 2.1$, and the difference value $R_A(Cg)$ of the mean values in this case is calculated.

[Equation 31] (31)

$$\text{when } \sigma j_1 j_2 = \lambda m_1 1 j_1 j_2 / Cg, R_A(Cg) = \frac{d_A 27 - 28 + d_A 29 - 30}{2} - \frac{d_A 27 - 29 + d_A 27 - 30 + d_A 28 - 29 + d_A 28 - 30}{4}$$

In the equation 31, as the value of the variable Cg is increased, the value of the variance $\sigma j_1 j_2^2$ is decreased. Accordingly, the weighting curve is contracted in the direction parallel to the u-axis, and the geometric distance values $d_A 27$–$28$, $d_A 29$–$30$, $d_A 27$–$29$, $d_A 27$–$30$, $d_A 28$–$29$ and $d_A 28$–$30$ between the respective standard images are also changed in value in the range of $-1 \leq d_A \leq +1$. Here, the first term of $R_A(Cg)$ in the equation 31 is the mean geometric distance value between the standard images in the same category, and the second term thereof is the mean geometric distance value between the standard images in the different categories. Therefore, when the value $R_A(Cg)$ of a difference between the mean values becomes maximum, the distance between the standard images in the same category is shortened, and simultaneously, the distance between the standard images in the different categories is elongated. Accordingly, a weighting curve created based on the value of the variable Cg maximizing the difference value $R_A(Cg)$ of the mean values becomes optimal.

Figure 48:
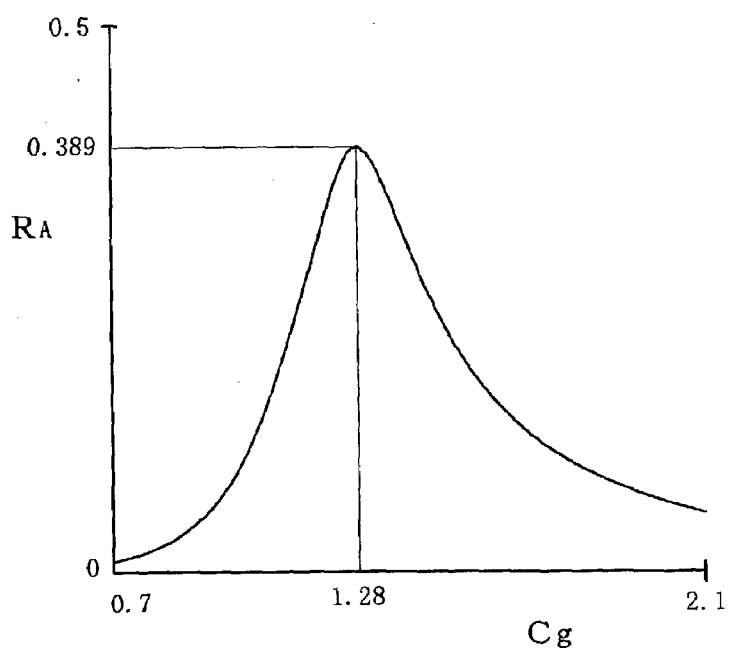
FIG. 48 is a graph showing a change in a difference value of the mean values of the geometric distances calculated by use of the weighting curves created based on the change rates of the kurtoses of the normal curves.

FIG. 48 shows a state where the difference value $R_A(Cg)$ of the mean values is changed when the value of the variable Cg is increased from 0.7 to 2.1 with regard to the standard images 27, 28, 29 and 30 shown in FIG. 45. From FIG. 48, it is understood that the difference value $R_A(Cg)$ of the mean values takes the maximum value of 0.389 when Cg=1.28.

Accordingly, with regard to the standard images 27, 28, 29 and 30 shown in FIG. 45, from the result of FIG. 48, the weighting curve created based on the value of: Cg=1.28 becomes optimal, and in this case, the value $R_A(Cg)$ becomes equal to 0.389. Note that, in the case of using the conventional cosine of angle for the standard images 27, 28, 29 and 30 shown in FIG. 45, the difference value of the mean values, which is obtained by subtracting a mean value of cosine of angle between the standard images in the different categories from a mean value of cosine of angle between the standard images in the same category, becomes 0.129. From the above result, it can be understood that, in the case of using the geometric distance $d_A$, the separation of the standard image in the same category and the standard image in the different categories is improved more than in the case of using the cosine of the angle, and thus the recognition performance when the input image is given is improved.

In the above, as shown in FIG. 46B, for the case of expanding and contracting the weighting curve in the direction parallel to the u-axis, the state has been examined, where the geometric distance values between the standard images are changed. Next, consideration will be made that the weighting curve is changed also in a direction perpendicular to the u-axis. However, in this embodiment, consideration will be made limitedly for the following case. Specifically, when the weighting curve is expanded and contracted in the direction parallel to the u-axis, and simultaneously changed in the direction perpendicular to the u-axis, similarly to the curve shown in FIG. 46B, the functional value of the changed weighting curve when u=0 becomes positive. Further, the changed weighting curve intersects the u-axis on two points and becomes symmetric with respect to u=0.

In the related art (Japanese Patent Application No. 2000-277749), by the following expression 32, the entire element numbers of the positive reference pattern vector and the negative reference pattern vector are weighted by the constant of 1. Then, with regard to the $i_1 i_2$ element ($i_1$=1, 2, . . . , $m_1$) ($i_2$=1, 2, . . . , $m_2$) of the pattern matrix, the absolute value $|ni_1 i_2 - hi_1 i_2|$ of the variation between the element value $hi_1 i_2$ of the standard pattern matrix and the element value $ni_1 i_2$ of the input pattern matrix is substituted into the increasing quantity of the positive reference pattern vector or the negative reference pattern vector as it is irrespective of the element number of the reference pattern vector. Specifically, in the method of the related art, since the reference pattern vector is increased by use of the increasing means having a fixed value of weight, the separation of the standard image in the same category and the standard image in the different category is fixed, and thus the recognition performance when the input image is given cannot be improved.

[Equation 32]

for $i_1 = 1, 2, 3, \ldots, m_1$;
$i_2 = 1, 2, 3 \ldots m_2$:
when $ni_1 i_2 > hi_1 i_2$, $kj_1 j_2{}^{(+)} i_0$ is increased by $|ni_1 i_2 - hi_1 i_2|$,
when $ni_1 i_2 < hi_1 i_2$, $kj_1 j_2{}^{(-)} i_0$ is increased by $|ni_1 i_2 - hi_1 i_2|$,
. . . . . . . . . . . (32)
$(j_1 = 1, 2, 3, \ldots, m_1)$
$(j_2 = 1, 2, 3, \ldots, m_2)$ In order to solve the above-described problem, in the present invention, the reference pattern vector is increased by use of increasing means having a variable value of weight instead of the fixed method of the related art. Therefore, as shown in the following equation 33, the element number $i_o$ ($i_o = 1, 2, \ldots, m_o$) of the positive reference pattern vector and the negative reference pattern vector is weighted with a variable $wj_1 j_2 i_o$, and a value of a product of the variable $wj_1 j_2 i_o$ and the absolute value $|ni_1 i_2 - hi_1 i_2|$ of the variation is substituted into the increasing quantity of the positive reference pattern vector or the negative reference pattern vector. Here, it is assumed that the variable $wj_1 j_2 i_o$ has a different value for each element number $i_o$. However, with regard to the element number $i_o$ ($i_o = 1, 2, \ldots, m_o$), assumption is made as: $wj_1 j_2 i_o = wj_1 j_2 (m_o - i_o + 1)$; and $wj_1 j_2 i_o > 0$.

[Equation 33]

for $i_1 = 1, 2, 3, \ldots, m_1$;
$i_2 = 1, 2, 3, \ldots, m_2$:
when $ni_1 i_2 > hi_1 i_2$,
$kj_1 j_2{}^{(+)} i_0$ is increased by $wj_1 j_2 i_o \cdot |ni_1 i_2 - hi_1 i_2|$,
when $ni_1 i_2 < hi_1 i_2$,
$kj_1 j_2{}^{(-)} i_0$ is increased by $wj_1 j_2 i_o \cdot |ni_1 i_2 - hi_1 i_2|$.
. . . . . . . . . . . (33)
$(j_1 = 1, 2, 3, \ldots, m_1)$
$(j_2 = 1, 2, 3, \ldots, m_1)$ Here, weighting the element number $i_o (i_o = 1, 2, \ldots, m_o)$ of the positive reference pattern vector and the negative reference pattern vector with the variable $wj_1 j_2 i_o$ as shown in the equation 33 is equivalent to weighting the change rate $gj_1 j_2 i_o$ of the kurtosis in the element number $i_o$ of the reference pattern vector with the variable $wj_1 j_2 i_o$ as understood from FIG. 14A. Therefore, such weighting is also equivalent to weighting the element value $gj_1 j_2 i_o$ of the element number $i_o$ of the weighting vector with the variable $wj_1 j_2 i_o$. Accordingly, the same effect can be obtained from the increasing means shown in the equation 33 and the change of the weighting curve in the direction perpendicular to the u-axis. Here, the latter one that is simpler in calculation processing as compared with the former one will be examined.

Figure 49:
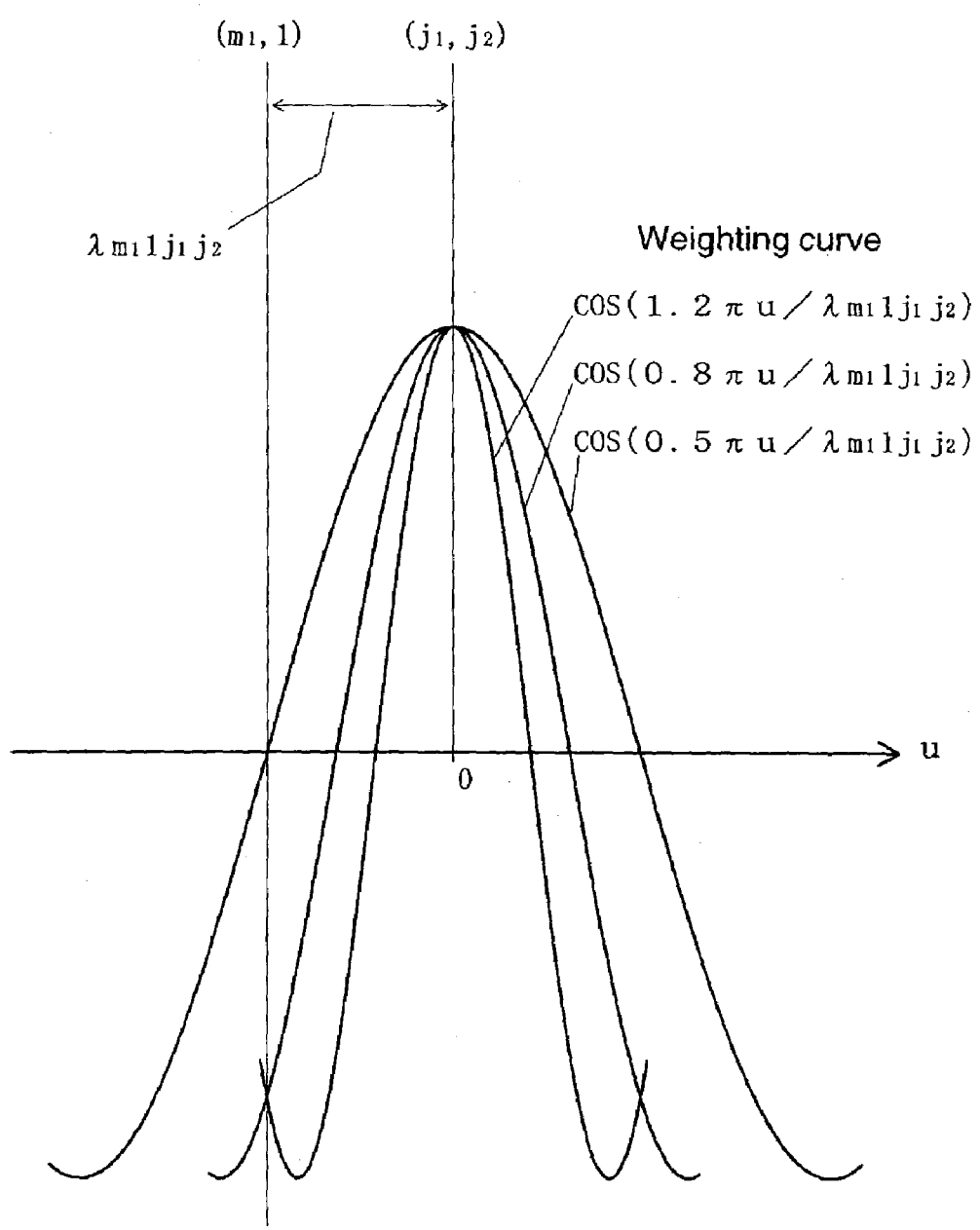
FIG. 49 is a diagram showing change examples of weighting curves created based on cosine functions.

FIG. 49 shows weighting curves created based on cosine functions having angular coefficient values obtained by dividing constants of $1.27\pi$, $0.87\pi$ and $0.5\pi$ by the length $\lambda m_1 1 j_1 j_2$, respectively. Here, $\pi$ is a circular ratio, and $\lambda m_1 1 j_1 j_2$ is the maximum value of the lengths between the specified element and the respective elements of the pattern matrix. From FIG. 49, it is understood that, as the angular coefficient value is reduced, the weighting curve is extended to the direction parallel to the u-axis. Moreover, as shown in FIG. 46B, in the weighting curve creased based on the change rate of the kurtosis of the normal curve, the length from the u-axis to the maximum value of the weighting curve is shorter than the length from the u-axis to the minimum value of the weighting curve. However, it is understood that, as shown in FIG. 49, in the weighting curve created based on the cosine function, both of the lengths are equal to each other. Accordingly, the following can be said. Specifically, the weighting curve created based on the change rate of the kurtosis of the normal curve is changed to the direction perpendicular to the u-axis by multiplying a positive weighting value thereby, and consequently, the weighting curve created based on the cosine function is obtained.

In this connection, next, instead of the weighting curve created based on the change rate of the kurtosis of the normal curve, the weighting curve created based on the cosine function is used to calculate the geometric distance value $d_E$ and the geometric distance value $d_A$. Concretely, as shown in FIG. 49, with regard to the standard images 27, 28, 29 and 30 shown in FIG. 45, the state is examined, where the geometric distance value $d_E$ and the geometric distance value $d_A$ between the respective standard images are changed when the weighting curve created based on the cosine function is expanded and contracted in the direction parallel to the u-axis.

Here, the case of using the geometric distance $d_E$ will be considered. In order to examine the state where the geometric distance values between the standard images are changed, similarly to the equation 30, the ratio value $R_E(Cg)$ of the mean values is calculated, which is obtained by dividing the mean geometric distance value between the standard images in the same category by the mean geometric distance value between the standard images in the different categories. However, assumption is made as below. The constants of $1.2\pi$, $0.8\pi$ and $0.5\pi$ in FIG. 49 are substituted into the variable Cg, the value of the variable Cg is changed in the range of: $0.5\pi \leq Cg \leq 1.2\pi$, and the ratio value $R_E(Cg)$ of the mean values in this case is calculated. Moreover, in the calculation of the geometric distance $d_E$, it is assumed that the normalized density is obtained by use of the equation 3 on the assumption that the normalization of the density pattern of the image by the maximum value of the densities of the entire pixels is instructed beforehand.

Figure 50:
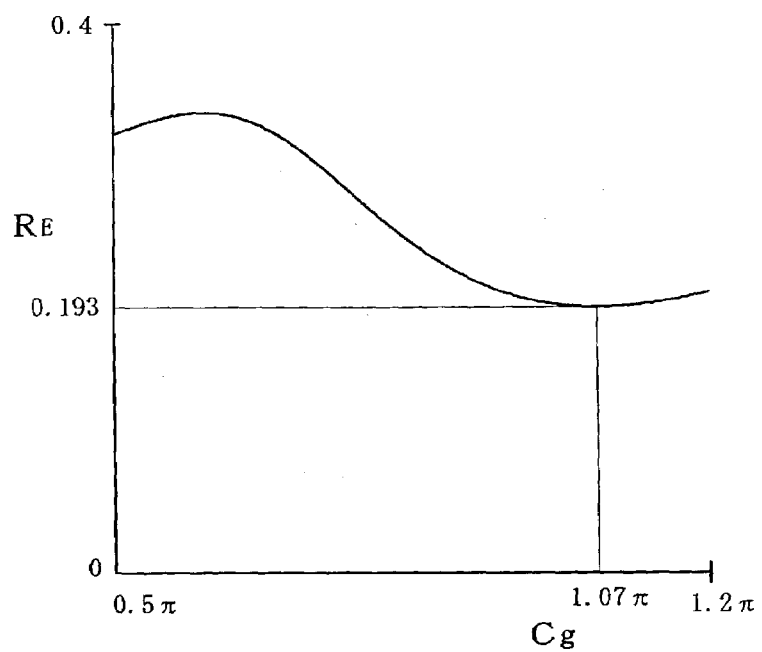
FIG. 50 is a graph showing a change in a ratio value of mean values of geometric distances calculated by use of the weighting curves created based on the cosine functions.

FIG. 50 shows a state where the ratio value $R_E(Cg)$ of the mean values is changed when the value of the variable Cg is increased from $0.5\pi$ to $1.2\pi$ with regard to the standard images 27, 28, 29 and 30 shown in FIG. 45. From FIG. 50, it is understood that the ratio value $R_E(Cg)$ of the mean values takes the minimum value of 0.193 when $Cg = 1.07\pi$.

As described above, with regard to the standard images 27, 28, 29 and 30 shown in FIG. 45, in FIG. 47 and FIG. 50, the minimum values of the ratio values $R_E(Cg)$ of the mean values become 0.163 and 0.193, respectively. Accordingly, since the minimum value of the minimum values of the ratio values $R_E(Cg)$ of the mean values is the former one, the weighting curve created based on the value of: $Cg = 1.65$, which is shown in FIG. 47 becomes optimal. Specifically, in the weighting curves shown in FIG. 46B, a weighting curve created based on a relationship of: $\sigma j_1 j_2 = \lambda m_1 1 j_2 / 1.65$ becomes optimal.

Meanwhile, consideration will be made for the case of using the geometric distance $d_A$. In order to examine the state where the geometric distance values between the standard images are changed, similarly to the equation 31, the difference value $R_A(Cg)$ of the mean values is calculated, which is obtained by subtracting the mean geometric distance value between the standard images in the different categories from the mean geometric distance value between the standard images in the same category. Note that, as assumption, the constants of 1.2π, 0.8π and 0.5π in FIG. 49 are substituted into the variable Cg, the value of the variable Cg is changed in the range of: 0.5π≦Cg≦1.2π, and the difference value $R_A(Cg)$ of the mean values in this case is calculated.

Figure 51:
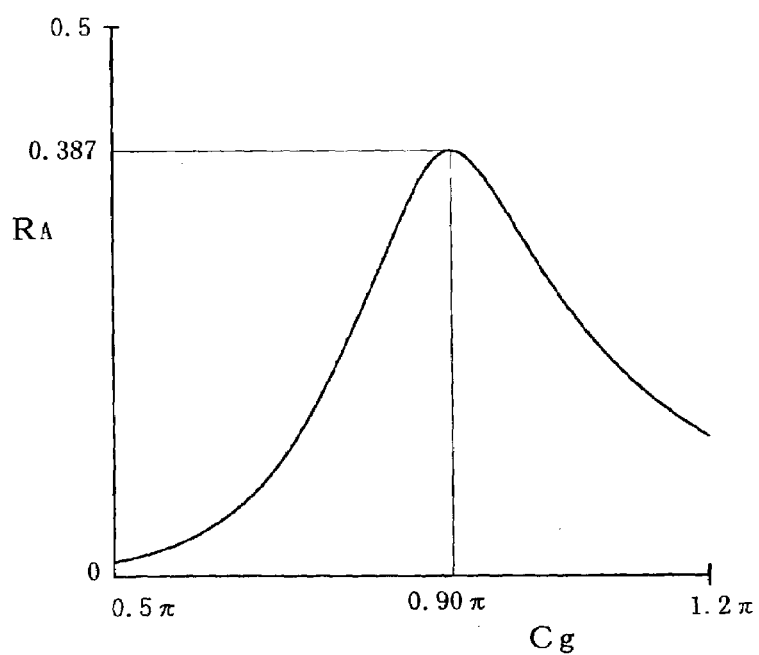
FIG. 51 is a graph showing a change in a difference value of the mean values of the geometric distances calculated by use of the weighting curves created based on the cosine functions.

FIG. 51 shows a state where the difference value $R_A(Cg)$ of the mean values is changed when the value of the variable Cg is increased from 0.5π to 1.2π with regard to the standard images 27, 28, 29 and 30 shown in FIG. 45. From FIG. 51, it is understood that the difference value $R_A(Cg)$ of the mean values takes the maximum value of 0.387 when Cg=0.90π.

As described above, with regard to the standard images 27, 28, 29 and 30 shown in FIG. 45, in FIG. 48 and FIG. 51, the maximum values of the difference values $R_A(Cg)$ of the mean values become 0.389 and 0.387, respectively. Accordingly, since the maximum value of the maximum values of the difference values $R_A(Cg)$ of the mean values is the former one, the weighting curve created based on the value of: Cg=1.28, which is shown in FIG. 48 becomes optimal. Specifically, in the weighting curves shown in FIG. 46B, a weighting curve created based on a relationship of: $\sigma j_1 j_2 = \lambda m_1 1 j_1 j_2 / 1.28$ becomes optimal.

In the above description, the example has been shown, where the weighting curve created based on the change rate of the kurtosis of the normal curve is changed in the direction perpendicular to the u-axis, and then expanded and contracted in the direction parallel to the u-axis. However, the above-described example is equivalent to increasing the reference pattern vector by use of increasing means having a variable value of weight after creating the reference pattern vector by use of the normal distribution having a variable value of variance.

Incidentally, in the above description, the method for expanding and contracting the weighting curve in the direction parallel to the u-axis in order to change the range of the weighting curve covering the entire (x-y)-normalized plane has been shown in FIG. 46B, and the method for expanding and contracting the weighting curve in the direction parallel to the u-axis as the center of the weighting curve moves on the (x-y)-normalized plane has been shown in FIG. 19. These are matters of relative expansion and contraction of the weighting curve and the u-axis. Accordingly, in the actual calculation, instead of the expansion and contraction of the weighting curve with respect to the u-axis, expansion and contraction of the u-axis with respect to the weighting curve may be performed contrarily, both of which are equivalent to each other.

Accordingly, with regard to the latter case, by referring to the following four examples, description will be made for the method for obtaining the length between the specified element and each element of a pattern matrix to calculate the element number $i_o$ of the weighting vector proximate to the position apart from the center of the weighting vector by the above-described length.

Note that, in the equation 26, the range of the normal curve: $-1.4\sigma \leq u \leq +1.4\sigma$ covers the entire (x-y)-normalized plane. On the other hand, in the following first and second examples, 1.4σ is substituted into the variable Cg, and the range of the weighting curve: $-Cg \leq u \leq +Cg$ covers the entire (x-y)-normalized plane, so that the u-axis is expanded and contracted with respect to one weighting curve as the value of the variable Cg is changed. Moreover, in the following third and fourth examples, the u-axis is expanded and contracted with respect to one weighting curve as the center of the weighting curve is moved on the (x-y)-normalized plane. In this case, with regard to these four examples, the method for calculating the element number $i_o$ is shown.

As the first example, FIGS. 52A, 52B and 52C show a state where the u-axis is expanded as the value of the variable Cg is increased in order of the drawings (graphs). Note that FIGS. 52A, 52B and 52C show weighting curves created based on the change rates of the kurtosis of the normal curve having the value of the variance of: $\sigma j_1 j_2 = 1.0$, in which the respective weighting curves are the same, and the respective points $(m_1, 1)$, $(j_1, j_2)$ and $(i_1, i_2)$ are the same coordinates on the (x-y)-normalized plane.

The graphs of FIGS. 52A, 52B and 52C correspond to the weighting curve of: $\sigma j_1 j_2 = \lambda m_1 1 j_1 j_2 / 0.7$, the weighting curve of: $\sigma j_1 j_2 = \lambda m_1 1 j_1 j_2 / 1.4$ and the weighting curve of: $\sigma j_1 j_2 = \lambda m_1 1 j_1 j_2 / 2.1$, which are shown in FIG. 46B, respectively. Specifically, the respective weighting curves shown in FIG. 46B are the ones obtained by expanding and contracting the weighting curve with respect to the fixed length $\lambda m_1 1 j_1 j_2$ on the u-axis. On the contrary, the respective graphs of FIGS. 52A, 52B and 52C are the ones obtained by expanding and contracting the length $\lambda m_1 1 j_1 j_2$ on the u-axis with respect to one weighting curve. Both of the above weighting curves and graphs are equivalent to each other.

In FIGS. 52A, 52B and 52C, $-Cg=-0.7$, $-Cg=-1.4$ and $-Cg=-2.1$ are displayed, respectively. These show that the lengths $\lambda m_1 1 j_1 j_2$ in the graphs correspond to ranges of: $-0.7 \leq u \leq 0$, $-1.4 \leq u \leq 0$ and $-2.1 \leq u \leq 0$, respectively. Moreover, in the graphs, positions $u_o$ on the u-axis, which correspond to the points $(i_1, i_2)$, are displayed. Here, with regard to the expansion and contraction of the u-axis shown in FIGS. 52A, 52B and 52C, each length $\lambda i_1 i_2 j_1 j_2$ between the point $(j_1, j_2)$ and the point $(i_1, i_2)$ is expanded and contracted in the same ratio as the length $\lambda m_1 1 j_1 j_2$ between the point $(j_1, j_2)$ and the point $(m_1, 1)$ is expanded and contracted. Therefore, a value of a ratio obtained by dividing the length $\lambda i_1 i_2 j_1 j_2$ by the length $\lambda m_1 1 j_1 j_2$ always becomes a constant value irrespective of the expansion and contraction of the u-axis. Accordingly, by the following equation 34, the position $u_o$ can be calculated.

[Equation 34] (34)

for $i_1 = 1, 2, 3, \ldots, m_1$;

$i_2 = 1, 2, 3, \ldots, m_2$;

$$u_0 = -Cg \times \frac{\lambda i_1 i_2 j_1 j_2}{\lambda m_1 1 j_1 j_2}$$

$(j_1 = 1, 2, 3, \ldots, m_1)$ $(j_2 = 1, 2, 3, \ldots, m_2)$

Figure 53A:
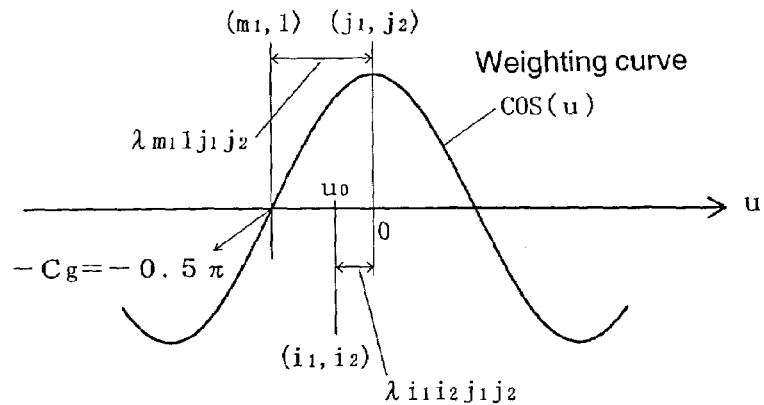
FIGS. 53A to 53C are diagrams showing examples of expanding and contracting the u-axis with respect to the weighting curve created based on the cosine function.
Figure 53B:
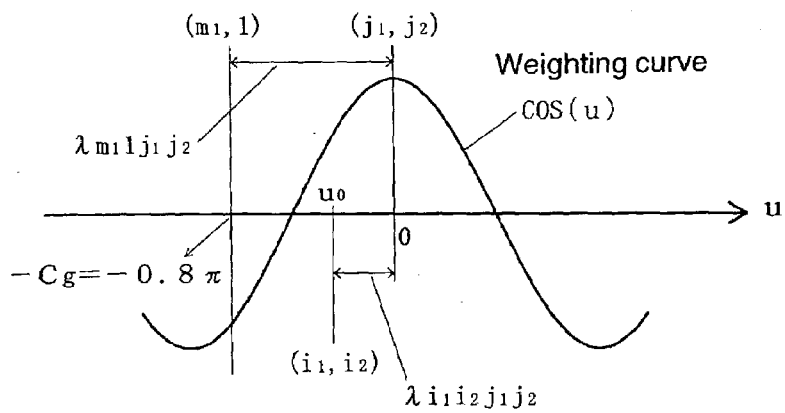
Figure 53C:
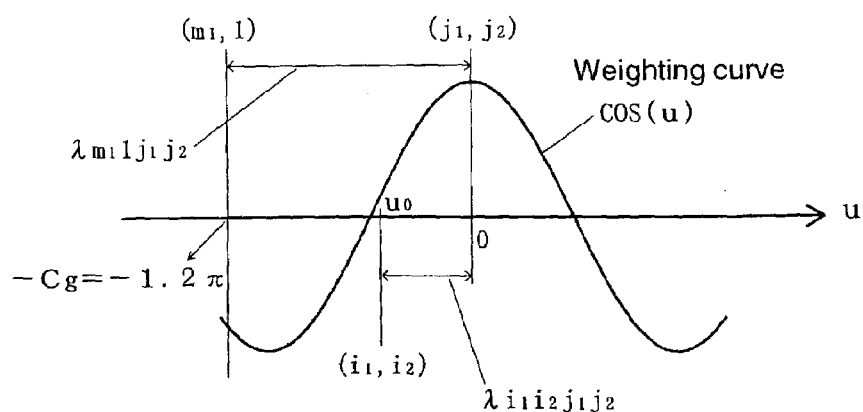

As the second example, FIGS. 53A, 53B and 53C show a state where the u-axis is expanded as the value of the variable Cg is increased in order of the drawings (graphs). Note that FIGS. 53A, 53B and 53C show weighting curves created based on the cosine functions having the angular coefficient value of 1.0, in which the respective weighting curves are the same, and the respective points $(m_1, 1)$, $(j_1, j_2)$ and $(i_1, i_2)$ are the same coordinates on the (x-y)-normalized plane.

The graphs of FIGS. 53A, 53B and 53C correspond to the weighting curve of cos $(0.5\pi u/\lambda m_1 1 j_1 j_2)$, the weighting curve of cos $(0.8\pi u/\lambda m_1 1 j_1 j_2)$ and the weighting curve of cos $(1.2\pi u/\lambda m_1 1 j_1 j_2)$, respectively, which are shown in FIG.

49. Specifically, the respective weighting curves shown in FIG. 49 are the ones obtained by expanding and contracting the weighting curve with respect to the fixed length $\lambda m_1 1 j_1 j_2$ on the u-axis. On the contrary, the respective graphs of FIGS. 53A, 53B and 53C are the ones obtained by expanding and contracting the length $\lambda m_1 1 j_1 j_2$ on the u-axis with respect to one weighting curve. Both of the above weighting curves and graphs are equivalent to each other.

In FIGS. 53A, 53B and 53C, $-Cg=-0.5\pi$, $-Cg=-0.8\pi$ and $-Cg=-1.2\pi$ are displayed, respectively. These show that the lengths $\lambda m_1 1 j_1 j_2$ in the graphs correspond to ranges of: $-0.5\pi \leq u \leq 0$, $-0.8\pi \leq u \leq 0$ and $-1.2\pi \leq u \leq 0$, respectively. Moreover, in the graphs, positions $u_o$ on the u-axis, which correspond to the points $(i_1, i_2)$, are displayed. Here, with regard to the expansion and contraction of the u-axis shown in FIGS. 53A, 53B and 53C, each length $\lambda i_1 i_2 j_1 j_2$ between the point $(j_1, j_2)$ and the point $(i_1, i_2)$ is expanded and contracted in the same ratio as the length $\lambda m_1 1 j_1 j_2$ between the point $(j_1, j_2)$ and the point $(m_1, 1)$ is expanded and contracted. Therefore, a value of a ratio obtained by dividing the length $\lambda i_1 i_2 j_1 j_2$ by the length $\lambda m_1 1 j_1 j_2$ always becomes a constant value irrespective of the expansion and contraction of the u-axis. Accordingly, by the equation 34, the position $u_o$ can be calculated.

Figure 54A:
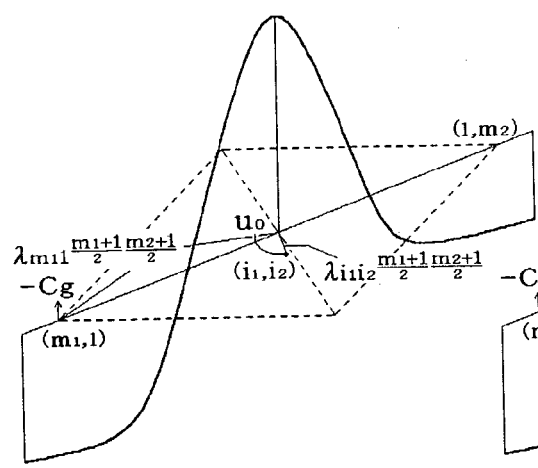
FIGS. 54A and 54B are diagrams showing an example of expanding and contracting the u-axis with respect to one weighting curve as the center of the weighting curve is moved on an (x-y) normalized plane.
Figure 54B:
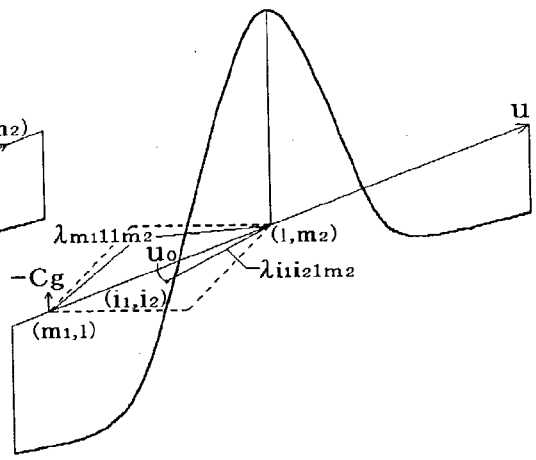

As the third example, FIGS. 54A and 54B show a state where the u-axis is expanded and contracted as the center of the weighting curve is moved on the (x-y)-normalized plane, in which the length between the two points on the u-axis in FIG. 54B is contracted to be a half of that in FIG. 54A. Note that FIGS. 54A and 54B show weighting curves of an arbitrary shape, in which the respective weighting curves are the same, and the values of the respective variables Cg are the same irrespective of the movement of the center of the weighting curve.

FIG. 54A shows the length $i_1 i_2 j_1 j_2$ and the length $\lambda m_1 1 j_1 j_2$ when the center of the weighting curve is moved to the point of $(j_1, j_2)=((m_1+1)/2, (m_2+1)/2)$, and FIG. 54B shows the length $\lambda i_1 i_2 j_1 j_2$ and the length $\lambda m_1 1 j_1 j_2$ when the center of the weighting curve is moved to the point of $(j_1, j_2)=(1, m_2)$. Moreover, in the graphs, positions $u_o$ on the u-axis, which correspond to the points $(i_1, i_2)$, are displayed. Accordingly, by the equation 34, the position $u_o$ can be calculated.

Figure 55A:
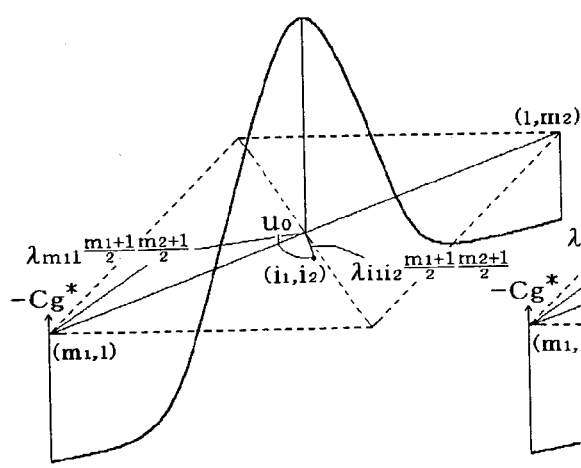
FIGS. 55A and 55B are diagrams showing another example of expanding and contracting the u-axis with respect to one weighting curve as the center of the weighting curve is moved on the (x-y) normalized plane.
Figure 55B:
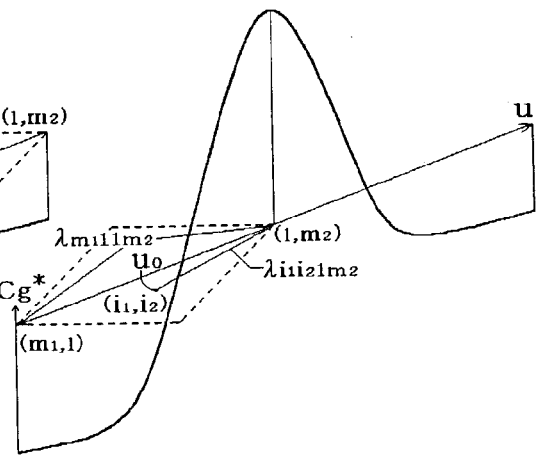

As the fourth example, FIGS. 55A and 55B are graphs, in which the variables Cg in FIGS. 54A and 54B are substituted with variables Cg* to expand the ranges of the weighting curve covering the entire (x-y)-normalized plane more than those of FIGS. 54A and 54B. Note that, herein, there is a relationship of: $0<Cg<Cg^*$, and the values of the respective variables Cg* of FIGS. 55A and 55B are the same irrespective of the movement of the center of the weighting curve. Accordingly, by substituting Cg with Cg* in the equation 34, the position $u_o$ can be calculated.

From the above four examples, the following is understood with regard to the case of expanding and contracting the u-axis with respect to one weighting curve. Namely, the value of the variable Cg is previously set so that the range of: $-Cg \leq u \leq +Cg$ of the weighting curve can cover the entire (x-y)-normalized plane. Subsequently, the length $\lambda i_1 i_2 j_1 j_2$ between the specified element and each element of the pattern matrix and the maximum value $\lambda m_1 1 j_1 j_2$ of the length between the specified element and each element are obtained, and these lengths are substituted into the equation 34 to obtain the position $u_o$. Thus, $i_o$ as the element number of the weighting vector proximate to the above-described position $u_o$ can be calculated. Moreover, according to the processing method as described above, even if the $m_1 \times m_2$ pieces of weighting vectors are not previously created with regard to the respective cases corresponding to the $j_1 j_2$ elements $(j_1=1, 2, \ldots, m_1)$ $(j_2=1, 2, \ldots, m_2)$, only by creating one weighting vector, calculation can be made for the $m_1 \times m_2$ pieces of element values $hgj_1 j_2$ of the weighted standard pattern matrix and the $m_1 \times m_2$ pieces of element values $ngj_1 j_2$ of the weighted input pattern matrix (or the $m_1 \times m_2$ pieces of element values $hogj_1 j_2$ of the original and weighted standard pattern matrix and the $m_1 \times m_2$ pieces of element values $nogj_1 j_2$ of the original and weighted input pattern matrix).

In the above description, two examples are shown as concrete weighting curves: the weighted curve created based on the change rate of the kurtosis of the normal curve having a value of variance: $\sigma j_1 j_2=1.0$; and the weighting curve created based on the cosine function having an angular coefficient value of 1.0, and among theses, an optimal weighting curve has been obtained. However, the optimal weighting curve is related to the density shapes of the entire registered standard images, and therefore, in the case where the registered standard images are different from each other, then the optimal weighting curves will differ from each other. Accordingly, in general, the case does not always occur, where there is always an optimal weighting curve among the weighting curves shown in the two examples. Therefore, it is necessary to find an optimal weighting curve among weighting curves of arbitrary shapes.

Accordingly, next, description will be made for a method for obtaining an optimal weighting curve and an optimal value of the variable Cg according to the optimal weighting curve among the weighting curves of arbitrary shape with reference to FIGS. 56 to 59. Note that FIGS. 56 to 59 show processing procedures after registering the standard image, and in FIGS. 56 to 59, the method for expanding and contracting the u-axis with respect to the one weighting curve will be used.

Figure 56:
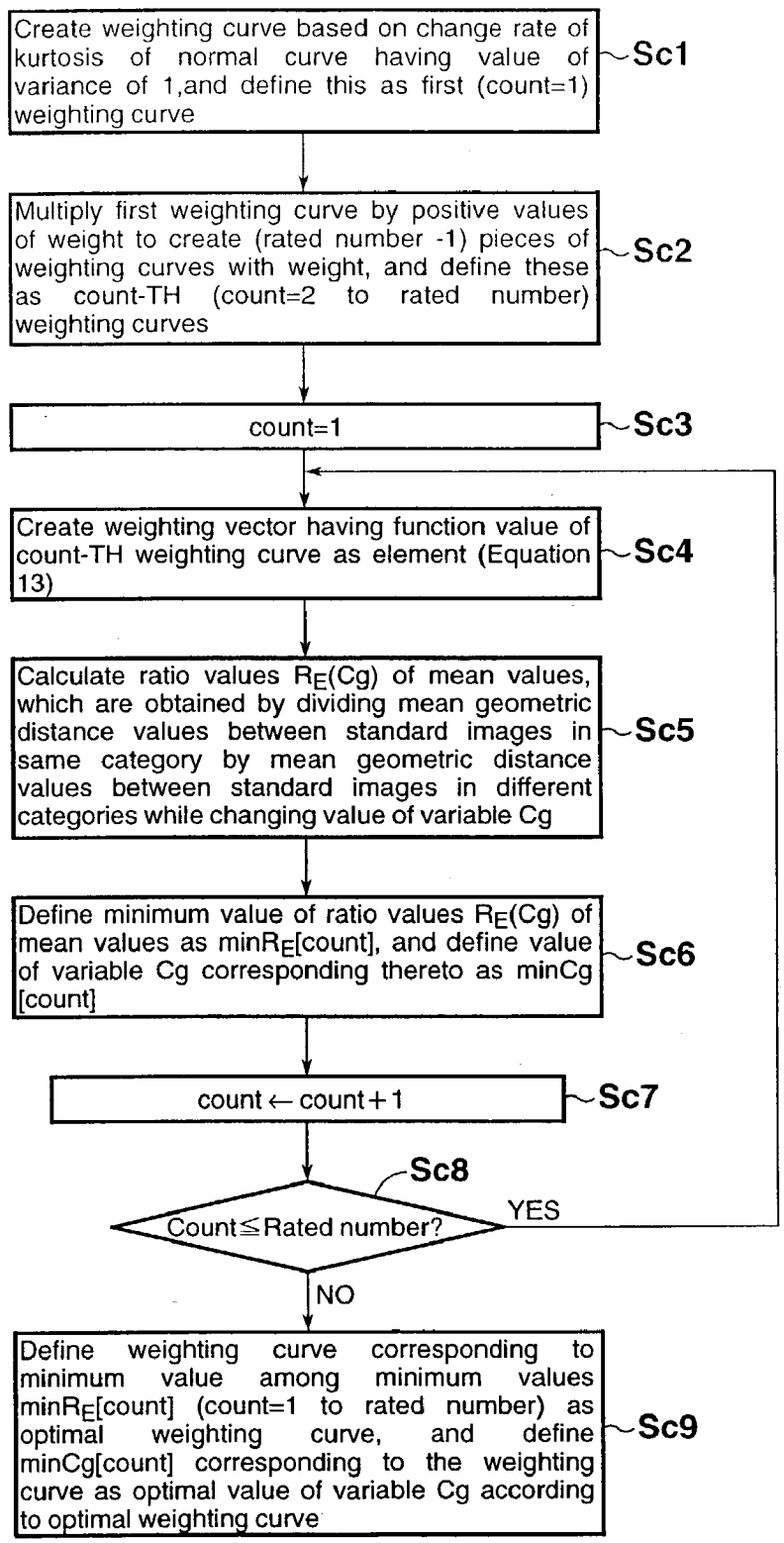
FIG. 56 is a block diagram showing a flowchart for calculating an optimal weighting curve.

FIG. 56 is a flowchart showing a processing procedure for calculating the optimal weighting curve and the optimal value of the variable Cg according to the optimal weighting curve with regard to the case of using the geometric distance $d_E$ as a similarity scale between the respective standard images. In FIG. 56, in the first Step Sc1, a weighting curve is created based on the change rate of the kurtosis of the normal curve having a value of variance of 1, and defined as a first (count=1) weighting curve. In Step Sc2, the first weighting curve is multiplied by positive values of weight to create (rated number −1) pieces of weighting curves with weight, which are then defined as count-th (count=2 to the rated number) weighting curves. As described above, one weighting curve shown in FIGS. 52A to 52C can create the plurality of weighting curves shown in FIG. 46B by expanding and contracting the u-axis. Moreover, another weighting curve shown in FIGS. 53A to 53C can create the plurality of weighting curves shown in FIG. 49 by expanding and contracting the u-axis. Therefore, in Step Sc1 and Step Sc2, it is sufficient if one representative weighting curve may be created. In Step Sc3, initial setting is made as: count=1. In the next Step Sc4 to Step Sc8, the processing enters a loop for calculating the optimal weighting curve and the optimal value of the variable Cg according to the optimal weighting curve by increasing the count one by one to: count=rated number. Note that, for the rated number, a sufficiently large value should be used in a range allowed by a processing time of a computer.

Figure 57:
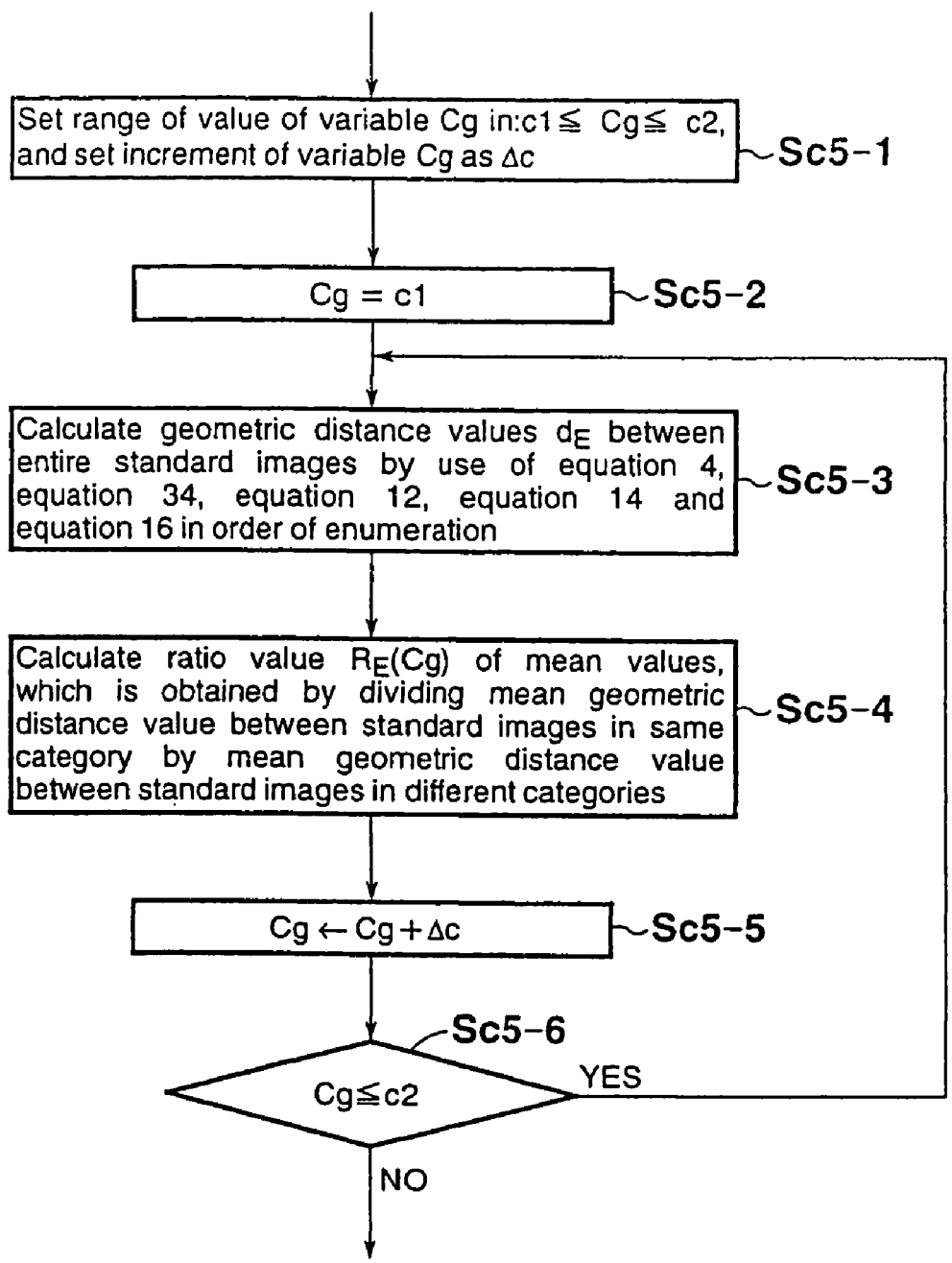
FIG. 57 is a block diagram showing a flowchart for calculating the ratio value of the mean values.

In Step Sc4 in this optimal value calculation loop, for each circulation of the loop, the weighting vector having the function value of the count-th weighting curve as an element is created. Next, in Step Sc5, calculation is made for the ratio values $R_E(Cg)$ of the mean values, which are obtained by dividing the mean geometric distance values between the standard images in the same category by the mean geometric distance values between the standard images in the different categories while changing the value of the variable Cg. Here, the calculation procedure for the ratio values $R_E(Cg)$ of the mean values in Step Sc5 is constituted of Step Sc5-1 to Step Sc5-6, which are shown in FIG. 57. Note that FIG. 47 and FIG. 50 are graphs showing the ratio values $R_E(Cg)$ of the mean values calculated in Step Sc5. Then, in step Sc6, the minimum value of the ratio value $R_E(Cg)$ of the mean values is defined as min$R_E$[count], and the value of the variable Cg corresponding thereto is defined as minCg [count]. In FIG. 47, min$R_E$[count]=0.163, and minCg [count]=1.65. In FIG. 50, min$R_E$[count]=0.193, and minCg [count]=1.07π.

After the processing gets out of the loop, in Step Sc9, a weighting curve corresponding to the minimum value among the minimum values min$R_E$[count] (count=1 to rated number) is optimized as an optimal weighting curve, and the minCg[count] corresponding to the optimized weighting curve is defined as an optimal value of the variable Cg according to the optimal weighting curve. Note that, in the case of using the weighting curves shown in FIGS. 52 and 53 on the assumption of: rated number=2, from FIG. 47 and FIG. 50, the minimum value of the minimum values min$R_E$ [count] becomes 0.163, and the minCg[count] corresponding thereto becomes 1.65. Specifically, the weighting curve shown in FIG. 52 is defined as the optimal one, and 1.65 is defined as the optimal value of the variable Cg.

FIG. 57 is a flowchart showing a processing procedure for calculating the ratio value $R_E(Cg)$ of the mean values while changing the value of the variable Cg. Here, the processing procedure after creating the weighting vector by the equation 13 is shown, and Steps Sc5-1 to Sc5-6 are also details of Step Sc5 in FIG. 56.

In FIG. 57, in the first Step Sc5-1, the range of the value of the variable Cg is set in: $c1 \leq Cg \leq c2$, and an increment of the variable Cg is set as Δc, and in Step Sc5-2, initial setting is made as: Cg=c1. In the next Step Sc5-3 to Step Sc5-6, the processing enters a loop for calculating the ratio value $R_E(Cg)$ of the mean values by increasing Cg by every Δc to: Cg=c2. Note that, for the increment Δc of the variable Cg, a sufficiently small value should be used in the range allowed by the processing time of the computer.

In Step Sc5-3 in this calculation loop for the ratio value of the mean values, for each circulation of the loop, the geometric distance values $d_E$ between the entire standard images are calculated by use of the equation 4, the equation 34, the equation 12, the equation 14 and the equation 16 in accordance with an order of enumeration. Specifically, in the equation 4, the ones obtained by substituting the standard pattern matrix and the input pattern matrix with two standard pattern matrices are created, and by the equation 34, the position $u_o$ on the u-axis and the element number $i_o$ of the weighting vector, which correspond to the point $(i_1, i_2)$, are calculated. By use of results thereof, in the equation 12 and the equation 14, the ones obtained by substituting the weighted standard pattern matrix and the weighted input pattern matrix into two weighted standard pattern matrices are created, and by the equation 16, the geometric distance value $d_E$ between the two standard images are calculated. Then, the equation 4, the equation 34, the equation 12, the equation 14 and the equation 16 are repeatedly used, and thus the geometric distance values $d_E$ between the entire standard images are calculated. Next, in Step Sc5-4, the ratio value $R_E(Cg)$ of the mean values is calculated, which is obtained by dividing the mean geometric distance value between the standard images in the same category by the mean geometric distance value between the standard images in the different categories. Specifically, similarly to the equation 30, the mean geometric distance value obtained by dividing the sum value of the geometric distances between the standard images in the same category by the number of geometric distance values is set as a numerator, and the mean geometric distance value obtained by dividing the sum value of the geometric distances between the standard images in the different categories by the number of geometric distance values is set as a denominator, and thus the ratio value $R_E(Cg)$ of the mean values is calculated, which is obtained by dividing the numerator by the denominator.

In accordance with the processing procedure as described above, in the range of: $c1 \leq Cg \leq c2$, the ratio value $R_E(Cg)$ of the mean values can be calculated with regard to the value of the variable Cg for each Δc. Accordingly, in the case of using the geometric distance $d_E$ as the similarity scale between the standard images, in accordance with the processing procedure shown in FIG. 56 and FIG. 57, the optimal weighting curve and the optimal value of the variable Cg according to the optimal weighting curve can be calculated.

Figure 58:
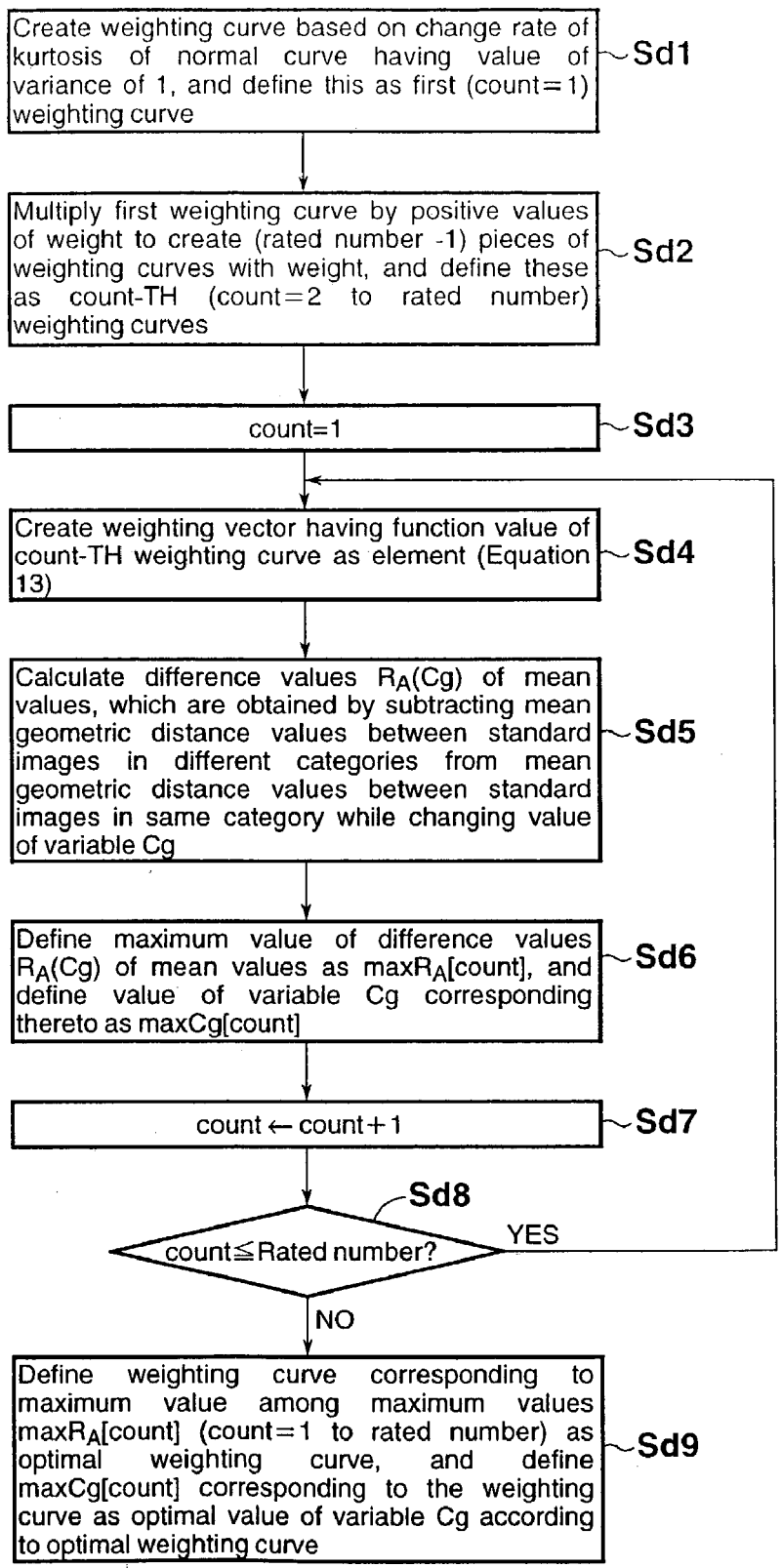
FIG. 58 is a block diagram showing another flowchart for calculating the optimal weighting curve.

Meanwhile, FIG. 58 is a flowchart showing a processing procedure for calculating the optimal weighting curve and the optimal value of the variable Cg according to the optimal weighting curve with regard to the case of using the geometric distance $d_A$ as a similarity scale between the respective standard images. In FIG. 58, in the first Step Sd1, a weighting curve is created based on the change rate of the kurtosis of the normal curve having a value of variance of 1, and defined as a first (count=1) weighting curve. In Step Sd2, the first weighting curve is multiplied by positive values of weight to create (rated number −1) pieces of weighting curves with weight, which are then defined as count-th (count=2 to the rated number) weighting curves. As described above, one weighting curve shown in FIG. 52 can create the plurality of weighting curves shown in FIG. 46B by expanding and contracting the u-axis. Moreover, another weighting curve shown in FIG. 53 can create the plurality of weighting curves shown in FIG. 49 by expanding and contracting the u-axis. Therefore, in Step Sd1 and Step Sd2, it is sufficient if one representative weighting curve may be created. In Step Sd3, initial setting is made as: count=1. In the next Step Sd4 to Step Sd8, the processing enters a loop for calculating the optimal weighting curve and the optimal value of the variable Cg according to the optimal weighting curve by increasing the count one by one to: count=rated number. Note that, for the rated number, a sufficiently large value should be used in a range allowed by a processing time of a computer.

Figure 59:
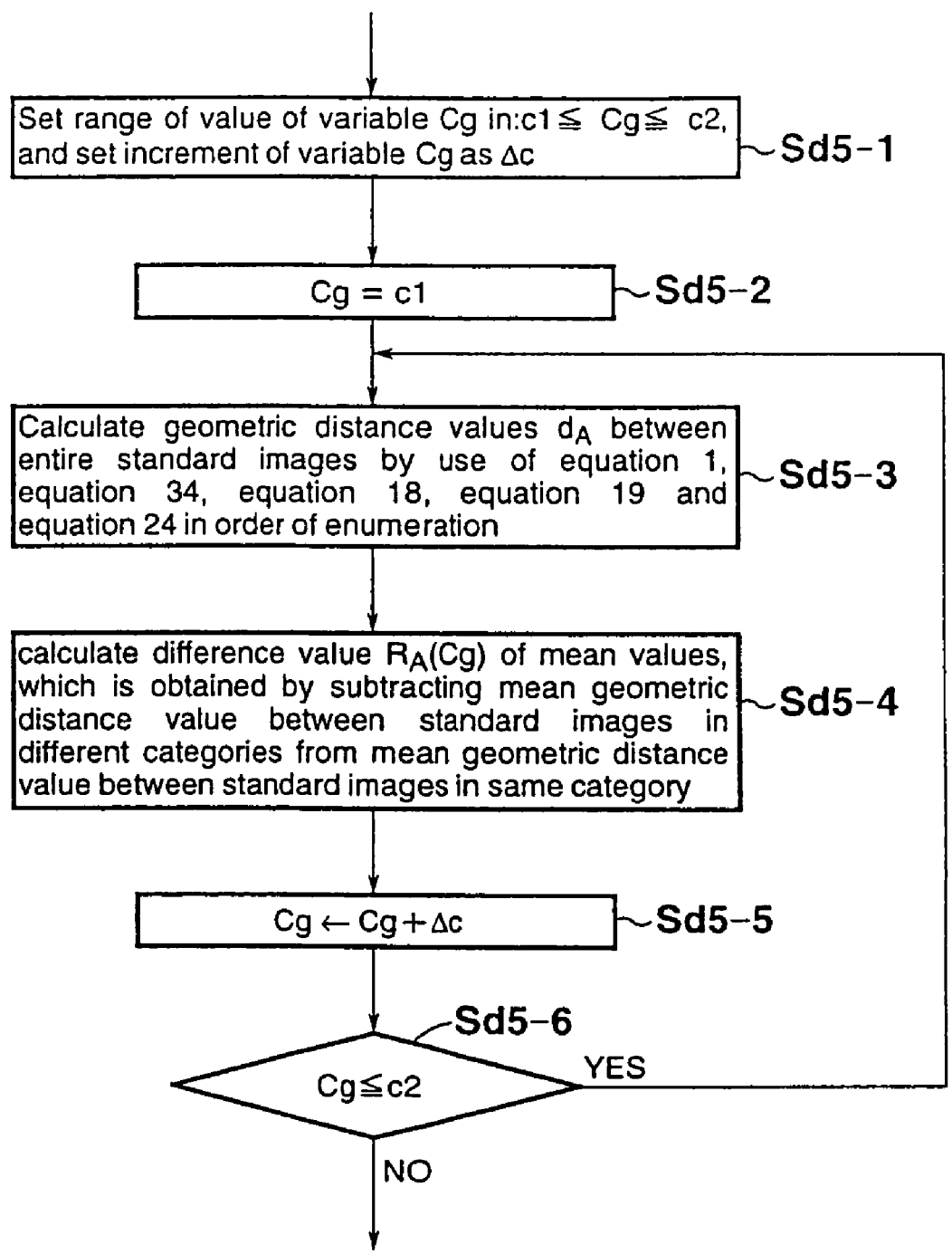
FIG. 59 is a block diagram showing a flowchart for calculating the difference value of the mean values.

In Step Sd4 in this optimal value calculation loop, for each circulation of the loop, the weighting vector having the function value of the count-th weighting curve as an element is created. Next, in Step Sd5, calculation is made for the difference values $R_A(Cg)$ of the mean values, which are obtained by subtracting the mean geometric distance values between the standard images in the different categories from the mean geometric distance values between the standard images in the same category while changing the value of the variable Cg. Here, the calculation procedure for the difference values $R_A(Cg)$ of the mean values in Step Sd5 is constituted of Step Sd5-1 to Step Sd5-6, which are shown in FIG. 59. Note that FIG. 48 and FIG. 51 are graphs showing the difference values $R_A(Cg)$ of the mean values calculated in Step Sd5. Then, in step Sd6, the maximum value of the difference value $R_A(Cg)$ of the mean values is defined as maxR$_A$[count], and the value of the variable Cg corresponding thereto is defined as maxCg[count]. In FIG. 48, maxR$_A$[count]=0.389, and maxCg[count]=1.28. In FIG. 51, maxR$_A$[count]=0.387, and maxCg[count]=0.90π.

After the processing gets out of the loop, in Step Sd9, a weighting curve corresponding to the maximum value among the maximum values maxR$_A$[count] (count=1 to rated number) is optimized as an optimal weighting curve, and the maxCg[count] corresponding to the optimized weighting curve is defined as an optimal value of the variable Cg according to the optimal weighting curve. Note that, in the case of using the weighting curves shown in FIGS. 52 and 53 on the assumption of: rated number =2, from FIG. 48 and FIG. 51, the maximum value of the maximum values maxR$_A$[count] becomes 0.389, and the maxCg[count] corresponding thereto becomes 1.28. Specifically, the weighting curve shown in FIG. 52 is defined as the optimal one, and 1.28 is defined as the optimal value of the variable Cg.

FIG. 59 is a flowchart showing a processing procedure for calculating the difference value $R_A(Cg)$ of the mean values while changing the value of the variable Cg. Here, the processing procedure after creating the weighting vector by the equation 13 is shown, and Steps Sd5-1 to Sd5-6 are also details of Step Sd5 in FIG. 58.

In FIG. 59, in the first Step Sd5-1, the range of the value of the variable Cg is set in: c1≦Cg≦c2, and an increment of the variable Cg is set as Δc, and in Step Sd5-2, initial setting is made as: Cg=c1. In the next Step Sd5-3 to Step Sd5-6, the processing enters a loop for calculating the difference value $R_A(Cg)$ of the mean values by increasing Cg by every Δc to: Cg=c2. Note that, for the increment Δc of the variable Cg, a sufficiently small value should be used in the range allowed by the processing time of the computer.

In Step Sd5-3 in this calculation loop for the difference value of the mean values, for each circulation of the loop, the geometric distance values $d_A$ between the entire standard images are calculated by use of the equation 1, the equation 34, the equation 18, the equation 19 and the equation 24 in accordance with an order of enumeration. Specifically, in the equation 1, the ones obtained by substituting the original standard pattern matrix and the original input pattern matrix with two original standard pattern matrices are created, and by the equation 34, the position $u_o$ on the u-axis and the element number $i_o$ of the weighting vector, which correspond to the point ($i_1$, $i_2$), are calculated. By use of results thereof, in the equation 18 and the equation 19, the ones obtained by substituting the original and weighted standard pattern matrix and the original and weighted input pattern matrix with two original and weighted standard pattern matrices are created, and by the equation 24, the geometric distance value $d_A$ between the two standard images are calculated. Then, the equation 1, the equation 34, the equation 18, the equation 19 and the equation 24 are repeatedly used, and thus the geometric distance values $d_A$ between the entire standard images are calculated. Next, in Step Sd5-4, the difference value $R_A(Cg)$ of the mean values is calculated, which is obtained by subtracting the mean geometric distance value between the standard images in the different categories from the mean geometric distance value between the standard images in the same category. Specifically, similarly to the equation 31, the mean geometric distance value obtained by dividing the sum value of the geometric distances between the standard images in the same category by the number of geometric distance values is set as a first term, and the mean geometric distance value obtained by dividing the sum value of the geometric distances between the standard images in the different categories by the number of geometric distance values is set as a second term, and thus the difference value $R_A(Cg)$ of the mean values is calculated, which is obtained by subtracting the second term from the first term.

In accordance with the processing procedure as described above, in the range of: c1≦Cg≦c2, the difference value $R_A(Cg)$ of the mean values can be calculated with regard to the value of the variable Cg for each Δc. Accordingly, in the case of using the geometric distance $d_A$ as the similarity scale between the standard images, in accordance with the processing procedure shown in FIG. 58 and FIG. 59, the optimal weighting curve and the optimal value of the variable Cg according to the optimal weighting curve can be calculated.

Generally expressing the above-described matter, the obtainment of the optimal weighting curve and the optimal value of the variable Cg results in solving a question of optimization for obtaining values of ($m_o$+1) pieces of variables minimizing or maximizing an objective function when the ratio value $R_E(Cg)$ of the mean values or the difference value $R_A(Cg)$ of the mean values is defined as the objective function, and the element values $gj_1j_2i_o$ ($i_o$=1, 2, . . . , $m_o$) of the weighting vector and the value of the variable Cg are defined as the ($m_o$+1) pieces of variables. With regard to the question of optimization, in the field of the numerical calculation method, numerical solutions such as the method of steepest descent and the Newton's method are proposed. These numerical solutions change the values of the variables in a direction where the objective function is rapidly decreased or increased, thus calculate the optimal value of the variable by small number of calculation times. Also in the present invention, by use of these numerical solutions, it is made possible to calculate the optimal weighting curve and the optimal value of the variable Cg efficiently. Accordingly, instead of previously creating the weighting curve with weight in Step Sc2 in FIG. 56 or in Step Sd2 in FIG. 58, alteration may be made so as to create the weighting curve with weight for each circulation of the loop in Step Sc4 in FIG. 56 or in Step Sd4 in FIG. 58, where the above-described numerical solutions may be utilized. Specifically, the count-th weighting curve with weight and the count-th value of the variable Cg may be changed in the direction where the ratio value $R_E(Cg)$ of the mean values or the difference value $R_A(Cg)$ of the mean values is rapidly decreased or increased to obtain the (count+1)-th weighting curve with weight and the (count+1)-th value of the variable Cg.

Moreover, for generally considering the above-described matter, next, description will be made for a relationship between the conventional Euclid distance and the geometric distance $d_E$ according to the present invention. In this embodiment, consideration is limitedly made for the case where, when the weighting curve is changed in the direction perpendicular to the u-axis, the functional value of the changed weighting curve becomes positive when u=0, and the changed weighting curve intersects the u-axis on two points and becomes symmetric with respect to u=0 similarly to the curve shown in FIG. 46B. Here, consideration will be made for the case where the weighting curve particularly becomes the Dirac's delta function as a result of loosening the above-described limitation and changing the weighting curve into the direction perpendicular to the u-axis in the geometric distance $d_E$. Specifically, in the weighting vector, in the case where $gj_1j_2i_o$=1 when $i_o$=($m_o$+1)/2 and $gj_1j_2i_o$=0 when $i_o$≠($m_o$+1)/2, the equation 12 is established as:

$hgj_1j_2=hj_1j_2$ and $ngj_1j_2=nj_1j_2$ ($j_1=1, 2, \ldots, m_1$) ($j_2=1, 2, \ldots, m_2$). In this case, the weighted standard pattern matrix and the weighted input pattern matrix become equal to the standard pattern matrix and the input pattern matrix, respectively. Therefore, in the above particular case, the geometric distance $d_E$ shown in the equation 16 becomes equal to the conventional Euclid distance. Specifically, the geometric distance $d_E$ is placed as the one in which the conventional Euclid distance is expanded and generalized.

Meanwhile, description will be made for a relationship between the conventional cosine of the angle and the geometric distance $d_A$ according to the present invention. In this embodiment, consideration is limitedly made for the case where, when the weighting curve is changed in the direction perpendicular to the u-axis, the functional value of the changed weighting curve becomes positive when u=0, and the changed weighting curve intersects the u-axis on two points and becomes symmetric with respect to u=0 similarly to the curve shown in FIG. 46B. Here, consideration will be made for the case where the weighting curve particularly becomes the Dirac's delta function as a result of loosening the above-described limitation and changing the weighting curve into the direction perpendicular to the u-axis in the geometric distance $d_A$. Specifically, in the weighting vector, in the case where $gj_1j_2i_o=1$ when $i_o=(m_o+1)/2$ and $gj_1j_2i_o=0$ when $i_o \neq (m_o+1)/2$, the equation 18 is established as: $hogj_1j_2=hoj_1j_2$ and $nogj_1j_2=noj_1j_2$ ($j_1=1, 2, \ldots, m_1$) ($j_2=1, 2, \ldots, m_2$). In this case, the original and weighted standard pattern matrix and the original and weighted input pattern matrix become equal to the original standard pattern matrix and the original input pattern matrix, respectively. Therefore, in the above particular case, the geometric distance $d_A$ shown in the equation 24 becomes equal to the conventional cosine of the angle. Specifically, the geometric distance $d_A$ is placed as the one in which the conventional cosine of the angle is expanded and generalized.

Moreover, consideration will be made for the above-described matter in comparison with the prior art. In the calculation processing of the geometric distance $d_E$, the weighted standard pattern matrix is created by the product-sum operation of the element value of the weighting vector and the element value of the standard patter matrix. Independently thereof, the weighted input pattern matrix is created by the product-sum operation of the element value of the same weighting vector and the element value of the input pattern matrix. Then, by use of the weighted standard pattern matrix and the weighted input pattern matrix, the conventional calculation for the Euclid distance is carried out. Here, in another expression of this calculation processing, the standard pattern matrix undergoes digital filter processing by means of the weighting vector to create the weighed standard pattern matrix. Independently thereof, the input pattern matrix undergoes digital filter processing by means of the same weighting vector to create the weighted input pattern matrix. Then, by use of the weighed standard pattern matrix and the weighted input pattern matrix, the conventional calculation for the Euclid distance is carried out. Accordingly, the calculation processing of the geometric distance $d_E$ can be formally expressed as a combination of the digital filter processing and the Euclid distance. However, while the conventional digital filter and Euclid distance are conceived as single and individual each, in the calculation processing of the geometric distance $d_E$, as shown in FIG. 56, the weighting vector is created so that the ratio value $R_E(Cg)$ of the mean values can be minimum. Namely, the calculation processing of the geometric distance $d_E$ can be said to be substantially a processing method different from the prior art in which the digital filter processing and the Euclid distance are closely related to each other even if the calculation processing is formally the combination of both of them.

Meanwhile, in the calculation processing of the geometric distance $d_A$, the original and weighted standard pattern matrix is created by the product-sum operation of the element value of the weighting vector and the element value of the original standard patter matrix. Independently thereof, the original and weighted input pattern matrix is created by the product-sum operation of the element value of the same weighting vector and the element value of the original input pattern matrix. Then, by use of the original and weighted standard pattern matrix and the original and weighted input pattern matrix, the conventional calculation for the cosine of the angle is carried out. Here, in another expression of this calculation processing, the original standard pattern matrix undergoes digital filter processing by means of the weighting vector to create the original and weighed standard pattern matrix. Independently thereof, the original input pattern matrix undergoes digital filter processing by means of the same weighting vector to create the original and weighted input pattern matrix. Then, by use of the original and weighed standard pattern matrix and the original and weighted input pattern matrix, the conventional calculation for the cosine of the angle is carried out. Accordingly, the calculation processing of the geometric distance $d_A$ can be formally expressed as a combination of the digital filter processing and the cosine of the angle. However, while the conventional digital filter and cosine of the angle are conceived as single and individual each, in the calculation processing of the geometric distance $d_A$, as shown in FIG. 58, the weighting vector is created so that the difference value $R_A(Cg)$ of the mean values can be maximum. Specifically, the calculation processing of the geometric distance $d_A$ can be said to be substantially a processing method different from the prior art in which the digital filter processing and the cosine of the angle are closely related to each other even if the calculation processing is formally the combination of both of them.

The above description for the second subject of the present invention will be summarized as below. In the case of using the geometric distance $d_E$ as the similarity scale between the respective standard images, while changing the weighting curve in the direction perpendicular to the u-axis and the direction parallel to the u-axis, the ratio value of the mean values is obtained by dividing the mean geometric distance value between the standard images in the same category by the mean geometric distance value between the standard images in the different categories, and thus the weighting curve minimizing the ratio value of the mean values is calculated. Then, the function value of the above-described weighting curve is defined as a weighting factor, and the weighting vector having the value of the above-described weighting factor as an element is created to calculate the geometric distance value. Thus, the distance between the standard images in the same category can be shortened, and simultaneously the distance between the standard images in the different categories can be elongated. As a result thereof, the separation of the standard image in the same category and the standard image in the different category is improved, and thus the recognition performance when an input image is given is improved.

Meanwhile, in the case of using the geometric distance $d_A$ as the similarity scale between the respective standard images, while changing the weighting curve in the direction perpendicular to the u-axis and the direction parallel to the u-axis, the difference value of the mean values is obtained by subtracting the mean geometric distance value between the standard images in the different categories from the mean geometric distance value between the standard images in the same category, and thus the weighting curve maximizing the difference value of the mean values is calculated. Then, the function value of the above-described weighting curve is defined as a weighting factor, and the weighting vector having the value of the above-described weighting factor as an element is created to calculate the geometric distance value. Thus, the distance between the standard images in the same category can be shortened, and simultaneously the distance between the standard images in the different categories can be elongated. As a result thereof, the separation of the standard image in the same category and the standard image in the different category is improved, and thus the recognition performance when an input image is given is improved.

In summary, when the original standard pattern matrix having the feature quantity of the standard image as an element and the original input pattern matrix having the feature quantity of the input image as an element are created, in the case where the method for normalizing the density pattern of the image is previously instructed, the density pattern of the image is normalized by the instructed method to create the standard pattern matrix and the input pattern matrix. Moreover, the weighting vector having the value of the change rate of the kurtosis of the reference pattern vector as an element is created. Then, the weighted standard pattern matrix is created by the product-sum operation of the element value of the weighting vector and the element value of the standard pattern matrix. And independently of this creation, the weighted input pattern matrix is created by the product-sum operation of the element value of the same weighting vector and the element value of the input pattern matrix. Next, the conventional calculation for the Euclid distance is carried out by use of these weighted standard pattern matrix and weighted input pattern matrix, and thus the geometric distance value between the standard pattern matrix and the input pattern matrix is calculated.

Furthermore, instead of the above-described weighting vector, the ratio value of the mean values, which is obtained by dividing the mean geometric distance value between the standard images in the same category by the mean geometric distance value between the standard images in the different categories, is obtained, and the weighting vector having the value of the weighting factor minimizing the above ratio value of the mean values as an element is created. By use of this weighting vector, the geometric distance value between the standard pattern matrix and the input pattern matrix can be calculated.

The geometric distance value thus obtained is compared with an arbitrarily set allowed value. When the geometric distance value is larger than the allowed value, the input image is judged not to be the standard image. When the geometric distance value is equal to/smaller than the allowed value, the input image is judged to be the standard image.

Meanwhile, when the original standard pattern matrix having the feature quantity of the standard image as an element and the original input pattern matrix having the feature quantity of the input image as an element are created, in the case where the method for normalizing the density pattern of the image is not previously instructed, the density pattern of the image is not normalized, and the original standard pattern matrix and the original input pattern matrix are used as they are. Moreover, the weighting vector having the value of the change rate of the kurtosis of the reference pattern vector as an element is created. Then, the original and weighted standard pattern matrix is created by the product-sum operation of the element value of the weighting vector and the element value of the original standard pattern matrix. And independently of this creation, the original and weighted input pattern matrix is created by the product-sum operation of the element value of the same weighting vector and the element value of the original input pattern matrix. Next, the conventional calculation for the cosine of the angle is carried out by use of these original and weighted standard pattern matrix and original and weighted input pattern matrix, and thus the geometric distance value between the original standard pattern matrix and the original input pattern matrix is calculated.

Furthermore, instead of the above-described weighting vector, the difference value of the mean values is obtained by subtracting the mean geometric distance value between the standard images in the different categories from the mean geometric distance value between the standard images in the same category, and the weighting vector having the value of the weighting factor maximizing the above difference value of the mean values as an element is created. By use of this weighting vector, the geometric distance value between the original standard pattern matrix and the original input pattern matrix can be calculated.

The geometric distance value thus obtained is compared with an arbitrarily set allowed value. When the geometric distance value is smaller than the allowed value, the input image is judged not to be the standard image. When the geometric distance value is equal to/larger than the allowed value, the input image is judged to be the standard image.

Embodiment (II): Method for Recognizing Voice (Two-Dimension)

Description will be made for the method for recognizing a voice by use of a detected value of a similarity between two pattern matrices (or original pattern matrices). In this embodiment, for voice recognition, each of power spectrum pattern (voiceprint) of the voices is normalized by the entire energy of the power spectrum or the maximum value of the power spectrum, and thus a standard pattern matrix and an input pattern matrix are created. Moreover, a weighting vector having a value of a change rate in kurtosis of a reference pattern vector as an element is created. Then, an element value of the weighting vector and an element value of the standard pattern matrix are subjected to a product-sum operation, and thus a weighted standard pattern matrix is created. Independently thereof, the element value of the same weighting vector and an element value of the input pattern matrix are subjected to the product-sum operation, and thus a weighted input pattern matrix is created. Subsequently, a conventional calculation for the Euclid distance is carried out by use of these weighted standard pattern matrix and weighted input pattern matrix, and thus the similarity of the voices is detected.

Meanwhile, an original standard pattern matrix and an original input pattern matrix are created without normalizing the power spectrum pattern of the voice. Then, the element value of the weighting vector and an element value of the original standard pattern matrix are subjected to the product-sum operation, and thus an original and weighted standard pattern matrix is created. Independently thereof, the element value of the same weighting vector and an element value of the original input pattern matrix are subjected to the product-sum operation, and thus an original and weighted input pattern matrix is created. Subsequently, a conventional calculation for the cosine of the angle is carried out by use of these original and weighted standard pattern matrix and original and weighted input pattern matrix, and thus the similarity of the voices is detected.

Furthermore, the element value of the weighting vector is adjusted so that a distance between standard pattern matrices (or between original standard pattern matrices) in the same category can be shortened, and that a distance between standard pattern matrices (or between original standard pattern matrices) in different categories can be elongated simultaneously. Then, the similarity of the voices is detected by use of the weighting vector having been adjusted, and by use of a detected value thereof, the voice is recognized.

The related art (Japanese Patent Application No. 2000-277749) shows a method for calculating a power spectrum $Pi_1 i_2$ ($i_1=1, 2, \ldots, m_1$) ($i_2=1, 2, \ldots, m_2$) at $i_2$-th time in an $i_1$-th frequency band by the following equation 35 in order to extract a feature of a time change of a frequency distribution of the voice.

[Equation 35] (35)

$$Pi_1 i_2 = \sum_{t=ti_2}^{ti_2+T} \{xi_1(t)\}^2$$

$(i_1 = 1, 2, 3, \ldots, m_1)$ $(i_2 = 1, 2, 3, \ldots, m_2)$

In this connection, next, an original standard pattern matrix Ho having a power spectrum $Pi_1 i_2$ ($i_1=1, 2, \ldots, m_1$) ($i_2=1, 2, \ldots, m_2$) of a standard voice as an element and an original input pattern matrix No having a power spectrum $Pi_1 i_2$ ($i_1=1, 2, \ldots, m_1$) ($i_2=1, 2, \ldots, m_2$) of an input voice as an element are created. These original standard pattern matrix Ho and original input pattern matrix No are previously expressed as in the equation 1. Note that the equation 1 expresses the shapes of the power spectra of the standard voice and the input voice by the $m_1 \times m_2$ pieces of element values of the original pattern matrix.

Incidentally, in the voice recognition, since voices having a power spectrum pattern (voiceprint) varied for each uttering appear even in the same voice, a method is usually adopted, in which a large number of human beings utter the same voices repeatedly, and a plurality of standard voices are registered for each voice. In this embodiment, the same voices registered as described above are defined as standard voices in the same category, and voices different from these are defined as standard voices in a different category.

Then, the similarity detection procedure for the images, which is described above, is applied to the original standard pattern matrix Ho and the original input pattern matrix No for the voice, which are created in the above, and thus the voice recognition is carried out.

Concretely, when the original standard pattern matrix having the feature quantity of the standard voice as an element and the original input pattern matrix having the feature quantity of the input voice as an element are created, in the case where the method for normalizing the power spectrum pattern of the voice is previously instructed, the power spectrum pattern of the voice is normalized by the instructed method to create the standard pattern matrix and the input pattern matrix. Moreover, the weighting vector having the value of the change rate of the kurtosis of the reference pattern vector as an element is created. Then, the weighted standard pattern matrix is created by the product-sum operation of the element value of the weighting vector and the element value of the standard pattern matrix. And independently thereof, the weighted input pattern matrix is created by the product-sum operation of the element value of the same weighting vector and the element value of the input pattern matrix. Next, the conventional calculation for the Euclid distance is carried out by use of these weighted standard pattern matrix and weighted input pattern matrix, and thus the geometric distance value between the standard pattern matrix and the input pattern matrix is calculated.

Furthermore, instead of the above-described weighting vector, the ratio value of the mean values is obtained by dividing the mean geometric distance value between the standard voices in the same category by the mean geometric distance value between the standard voices in the different categories, and the weighting vector having the value of the weighting factor minimizing the above ratio value of the mean values as an element is created. By use of this weighting vector, the geometric distance value between the standard pattern matrix and the input pattern matrix can be calculated.

The geometric distance value thus obtained is compared with an arbitrarily set allowed value. When the geometric distance value is larger than the allowed value, the input voice is judged not to be the standard voice. When the geometric distance value is equal to/smaller than the allowed value, the input voice is judged to be the standard voice.

Meanwhile, when the original standard pattern matrix having the feature quantity of the standard voice as an element and the original input pattern matrix having the feature quantity of the input voice as an element are created, in the case where the method for normalizing the power spectrum pattern of the voice is not previously instructed, the power spectrum pattern of the voice is not normalized, and the original standard pattern matrix and the original input pattern matrix are used as they are. Moreover, the weighting vector having the value of the change rate of the kurtosis of the reference pattern vector as an element is created. Then, the original and weighted standard pattern matrix is created by the product-sum operation of the element value of the weighting vector and the element value of the original standard pattern matrix. And independently of this creation, the original and weighted input pattern matrix is created by the product-sum operation of the element value of the same weighting vector and the element value of the original input pattern matrix. Next, the conventional calculation for the cosine of the angle is carried out by use of these original and weighted standard pattern matrix and original and weighted input pattern matrix, and thus the geometric distance value between the original standard pattern matrix and the original input pattern matrix is calculated.

Furthermore, instead of the above-described weighting vector, the difference value of the mean values is obtained by subtracting the mean geometric distance value between the standard voices in the different categories from the mean geometric distance value between the standard voices in the same category, and the weighting vector having the value of the weighting factor maximizing the above difference value of the mean values as an element is created. By use of this weighting vector, the geometric distance value between the original standard pattern matrix and the original input pattern matrix can be calculated.

The geometric distance value thus obtained is compared with an arbitrarily set allowed value. When the geometric distance value is smaller than the allowed value, the input voice is judged not to be the standard voice. When the geometric distance value is equal to/larger than the allowed value, the input voice is judged to be the standard voice.

Embodiment (III): Method for Judging Abnormality in Machine (Two-Dimension)

Next, description will be made for the method for judging an abnormality in a machine by use of a detected value of a similarity between two pattern matrices (or original pattern matrices). In this embodiment, in order to judge an abnormality in a machine, each of power spectrum patterns of oscillation waves is normalized by the entire energy of the power spectrum or the maximum value of the power spectrum, and thus a standard pattern matrix and an input pattern matrix are created. Moreover, a weighting vector having a value of a change rate in kurtosis of a reference pattern vector as an element is created. Then, an element value of the weighting vector and an element value of the standard pattern matrix are subjected to a product-sum operation, and thus a weighted standard pattern matrix is created. Independently thereof, the element value of the same weighting vector and an element value of the input pattern matrix are subjected to the product-sum operation, and thus a weighted input pattern matrix is created. Subsequently, a conventional calculation for the Euclid distance is carried out by use of these weighted standard pattern matrix and weighted input pattern matrix, and thus the similarity of the oscillation waves is detected.

Meanwhile, an original standard pattern matrix and an original input pattern matrix are created without normalizing the power spectrum pattern of the oscillation wave. Then, the element value of the weighting vector and an element value of the original standard pattern matrix are subjected to the product-sum operation, and thus an original and weighted standard pattern matrix is created. Independently thereof, the element value of the same weighting vector and an element value of the original input pattern matrix are subjected to the product-sum operation, and thus an original and weighted input pattern matrix is created. Subsequently, a conventional calculation for the cosine of the angle is carried out by use of these original and weighted standard pattern matrix and original and weighted input pattern matrix, and thus the similarity of the oscillation waves is detected.

Furthermore, the element value of the weighting vector is adjusted so that a distance between standard pattern matrices (or between original standard pattern matrices) in the same category can be shortened, and that a distance between standard pattern matrices (or between original standard pattern matrices) in different categories can be elongated simultaneously. Then, the similarity of the oscillation waves is detected by use of the weighting vector having been adjusted, and by use of a detected value thereof, the abnormality in a machine is judged.

The related art (Japanese Patent Application No. 2000-277749) shows a method for calculating a power spectrum $Pi_1i_2$ ($i_1=1, 2, \ldots, m_1$) ($i_2=1, 2, \ldots, m_2$) at $i_2$-th time in an $i_1$-th frequency band by the equation 35 in order to extract a feature of a time change of a frequency distribution of the oscillation wave.

In this connection, next, an original standard pattern matrix Ho having a power spectrum $Pi_1i_2$ ($i_1=1, 2, \ldots, m_1$) ($i_2=1, 2, \ldots, m_2$) of a standard oscillation wave as an element and an original input pattern matrix No having a power spectrum $Pi_1i_2$ ($i_1=1, 2, \ldots, m_1$) ($i_2=1, 2, \ldots, m_2$) of an input oscillation wave as an element are created. These original standard pattern matrix Ho and original input pattern matrix No are previously expressed as in the equation 1. Note that the equation 1 is read to express the shapes of the power spectra of the standard oscillation wave and the input oscillation wave by the $m_1 \times m_2$ pieces of element values of the original pattern matrix.

Incidentally, in the abnormality judgment in a machine, the oscillation waves different for each operation mode are measured even in the same machine, and the oscillation waves having a power spectrum pattern varied for each measurement appear even in the same operation mode. Therefore, a method is usually adopted, in which the oscillation waves in the same operation mode are measured repeatedly, and a plurality of standard oscillation waves are registered for each operation mode. In this embodiment, the oscillation waves in the same operation mode, which are registered as described above, are defined as standard oscillation waves in the same category, and oscillation waves in an operation mode different from the above are defined as standard oscillation waves in a different category.

Then, the similarity detection procedure for the images, which is described above, is applied to the original standard pattern matrix Ho and the original input pattern matrix No for the oscillation wave, which are created in the above, and thus the abnormality judgment in a machine is carried out.

Concretely, when the original standard pattern matrix having the feature quantity of the standard oscillation wave as an element and the original input pattern matrix having the feature quantity of the input oscillation wave as an element are created, in the case where the method for normalizing the power spectrum pattern of the oscillation wave is previously instructed, the power spectrum patterns of the oscillation wave are normalized by the instructed method to create the standard pattern matrix and the input pattern matrix. Moreover, the weighting vector having the value of the change rate of the kurtosis of the reference pattern vector as an element is created. Then, the weighted standard pattern matrix is created by the product-sum operation of the element value of the weighting vector and the element value of the standard pattern matrix. And independently of this creation, the weighted input pattern matrix is created by the product-sum operation of the element value of the same weighting vector and the element value of the input pattern matrix. Next, the conventional calculation for the Euclid distance is carried out by use of these weighted standard pattern matrix and weighted input pattern matrix, and thus the geometric distance value between the standard pattern matrix and the input pattern matrix is calculated.

Furthermore, instead of the above-described weighting vector, the ratio value of the mean values, which is obtained by dividing the mean geometric distance value between the standard oscillation waves in the same category by the mean geometric distance value between the standard oscillation waves in the different categories, is obtained, and the weighting vector having the value of the weighting factor minimizing the above ratio value of the mean values as an element is created. By use of this weighting vector, the geometric distance value between the standard pattern matrix and the input pattern matrix can be calculated.

The geometric distance value thus obtained is compared with an arbitrarily set allowed value. When the geometric distance value is larger than the allowed value, the machine is judged to be abnormal. When the geometric distance value is equal to/smaller than the allowed value, the machine is judged to be normal.

Meanwhile, when the original standard pattern matrix having the feature quantity of the standard oscillation wave as an element and the original input pattern matrix having the feature quantity of the input oscillation wave as an element are created, in the case where the method for normalizing the power spectrum pattern of the oscillation wave is not previously instructed, the power spectrum pattern of the oscillation wave is not normalized, and the original standard pattern matrix and the original input pattern matrix are used as they are. Moreover, the weighting vector having the value of the change rate of the kurtosis of the reference pattern vector as an element is created. Then, the original and weighted standard pattern matrix is created by the product-sum operation of the element value of the weighting vector and the element value of the original standard pattern matrix. And independently thereof, the original and weighted input pattern matrix is created by the product-sum operation of the element value of the same weighting vector and the element value of the original input pattern matrix. Next, the conventional calculation for the cosine of the angle is carried out by use of these original and weighted standard pattern matrix and original and weighted input pattern matrix, and thus the geometric distance value between the original standard pattern matrix and the original input pattern matrix is calculated.

Furthermore, instead of the above-described weighting vector, the difference value of the mean values, which is obtained by subtracting the mean geometric distance value between the standard oscillation waves in the different categories from the mean geometric distance value between the standard oscillation waves in the same category, is obtained, and the weighting vector having the value of the weighting factor maximizing the above difference value of the mean values as an element is created. By use of this weighting vector, the geometric distance value between the original standard pattern matrix and the original input pattern matrix can be calculated.

The geometric distance value thus obtained is compared with an arbitrarily set allowed value. When the geometric distance value is smaller than the allowed value, the machine is judged to be abnormal. When the geometric distance value is equal to/larger than the allowed value, the machine is judged to be normal.

Embodiment (IV): Method for Recognizing Moving Image (Three-Dimension)

Description will be made for the method for recognizing a moving image by use of a detected value of a similarity between two pattern matrix layers (or original pattern matrix layers). In this embodiment, in order to recognize a moving image, a density pattern of the moving image is normalized by the sum of densities of the entire pixels or the maximum value of the densities of the entire pixels, and thus a standard pattern matrix layer and an input pattern matrix layer are created. Moreover, a weighting vector having a value of a change rate in kurtosis of a reference pattern vector as an element is created. Then, an element value of the weighting vector and an element value of the standard pattern matrix layer are subjected to a product-sum operation, and thus a weighted standard pattern matrix layer is created. Independently thereof, the element value of the same weighting vector and an element value of the input pattern matrix layer are subjected to the product-sum operation, and thus a weighted input pattern matrix layer is created. Subsequently, a conventional calculation for the Euclid distance is carried out by use of these weighted standard pattern matrix layer and weighted input pattern matrix layer, and thus the similarity of the moving images is detected.

Meanwhile, an original standard pattern matrix layer and an original input pattern matrix layer are created without normalizing the density pattern of the moving image. Then, the element value of the above-described weighting vector and an element value of the original standard pattern matrix layer are subjected to the product-sum operation, and thus an original and weighted standard pattern matrix layer is created. Independently thereof, the element value of the weighting vector and an element value of the original input pattern matrix layer are subjected to the product-sum operation, and thus an original and weighted input pattern matrix layer is created. Subsequently, a conventional calculation for a cosine of an angle is carried out by use of these original and weighted standard pattern matrix layer and original and weighted input pattern matrix layer, and thus the similarity of moving the images is detected.

Furthermore, the element value of the above-described weighting vector is adjusted so that a distance between standard pattern matrix layers (or between original standard pattern matrix layers) in the same category can be shortened, and that a distance between standard pattern matrix layers (or between original standard pattern matrix layers) in different categories can be elongated simultaneously. Then, the similarity of the moving images is detected by use of the weighting vector having been adjusted, and by use of a detected value thereof, the moving image is recognized.

Here, the above-described method for detecting a similarity between a standard pattern matrix and an input pattern matrix (or between an original standard pattern matrix and an original input pattern matrix) with regard to an image, a voice, and an oscillation wave and the like is extended to the method for detecting a similarity between a standard pattern matrix layer and an input pattern matrix layer (or between an original standard pattern matrix layer and an original input pattern matrix layer).

FIG. 60 is an example of a moving image where a motion of a pen writing an alphabet "E" is photographed as time passes. As shown in FIG. 60, the moving image is constituted of $m_3$ pieces of images photographed as time passes. Each image is constituted of $m_1 \times m_2$ pieces of pixels obtained by partitioning the image into $m_1$ pieces in an x-direction and $m_2$ pieces in a y-direction. Here, a density of a moving image in a pixel that is $i_1$-th in the x-direction, $i_2$-th in the y-direction and at $i_3$-th time is defined as $Pi_1i_2i_3$.

Next, an original standard pattern matrix layer Ho having a density $Pi_1i_2i_3$ ($i_1=1, 2, \ldots, m_1$) ($i_2=1, 2, \ldots, m_2$) ($i_3=1, 2, \ldots, m_3$) of a standard moving image as an element and an original input pattern matrix layer No having a density $Pi_1i_2i_3$ ($i_1=1, 2, \ldots, m_1$) ($i_2=1, 2, \ldots, m_2$) ($i_3=1, 2, \ldots, m_3$) of an input moving image as an element are created. These original standard pattern matrix layer Ho and original input pattern matrix layer No are expressed as in the following equations 36 and 37 instead of the equation 1. Note that the equations 36 and 37 express the shapes of the densities of the standard moving image and the input moving image by the $m_1 \times m_2 \times m_3$ pieces of element values of the original pattern matrix layer, respectively.

[Equation 36] (36)

$$Ho = \begin{bmatrix} ho11m_3 & \cdots & ho1i_2m_3 & \cdots & ho1m_2m_3 \\ ho21m_3 & \cdots & ho2i_2m_3 & \cdots & ho2m_2m_3 \\ \vdots & \cdots & \vdots & \cdots & \vdots \\ \vdots & \cdots & \vdots & \cdots & \vdots \\ hoi_11m_3 & \cdots & hoi_1i_2m_3 & \cdots & hoi_1m_2m_3 \\ \vdots & \cdots & \vdots & \cdots & \vdots \\ hom_11m_3 & \cdots & hom_1i_2m_3 & \cdots & hom_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} ho11i_3 & \cdots & holi_2i_3 & \cdots & holm_2i_3 \\ ho21i_3 & \cdots & ho2i_2i_3 & \cdots & ho2m_2i_3 \\ \vdots & \cdots & \vdots & \cdots & \vdots \\ \vdots & \cdots & \vdots & \cdots & \vdots \\ hoi_11i_3 & \cdots & hoi_1i_2i_3 & \cdots & hoi_1m_2i_3 \\ \vdots & \cdots & \vdots & \cdots & \vdots \\ hom_11i_3 & \cdots & hom_1i_2i_3 & \cdots & hom_1m_2i_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} ho111 & \cdots & holi_21 & \cdots & holm_21 \\ ho211 & \cdots & ho2i_21 & \cdots & ho2m_21 \\ \vdots & \cdots & \vdots & \cdots & \vdots \\ \vdots & \cdots & \vdots & \cdots & \vdots \\ hoi_111 & \cdots & hoi_1i_21 & \cdots & hoi_1m_21 \\ \vdots & \cdots & \vdots & \cdots & \vdots \\ hom_111 & \cdots & hom_1i_21 & \cdots & hom_1m_21 \end{bmatrix}$$

[Equation 37] (37)

$$No = \begin{bmatrix} no11m_3 & \cdots & noli_2m_3 & \cdots & nolm_2m_3 \\ no21m_3 & \cdots & no2i_2m_3 & \cdots & no2m_2m_3 \\ \vdots & \cdots & \vdots & \cdots & \vdots \\ \vdots & \cdots & \vdots & \cdots & \vdots \\ noi_11m_3 & \cdots & noi_1i_2m_3 & \cdots & noi_1m_2m_3 \\ \vdots & \cdots & \vdots & \cdots & \vdots \\ nom_11m_3 & \cdots & nom_1i_2m_3 & \cdots & nom_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} no11i_3 & \cdots & noli_2i_3 & \cdots & nolm_2i_3 \\ no21i_3 & \cdots & no2i_2i_3 & \cdots & no2m_2i_3 \\ \vdots & \cdots & \vdots & \cdots & \vdots \\ \vdots & \cdots & \vdots & \cdots & \vdots \\ noi_11i_3 & \cdots & noi_1i_2i_3 & \cdots & noi_1m_2i_3 \\ \vdots & \cdots & \vdots & \cdots & \vdots \\ nom_11i_3 & \cdots & nom_1i_2i_3 & \cdots & nom_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} no111 & \cdots & noli_21 & \cdots & nolm_21 \\ no211 & \cdots & no2i_21 & \cdots & no2m_21 \\ \vdots & \cdots & \vdots & \cdots & \vdots \\ \vdots & \cdots & \vdots & \cdots & \vdots \\ noi_111 & \cdots & noi_1i_21 & \cdots & noi_1m_21 \\ \vdots & \cdots & \vdots & \cdots & \vdots \\ nom_111 & \cdots & nom_1i_21 & \cdots & nom_1m_21 \end{bmatrix}$$

Figure 61:
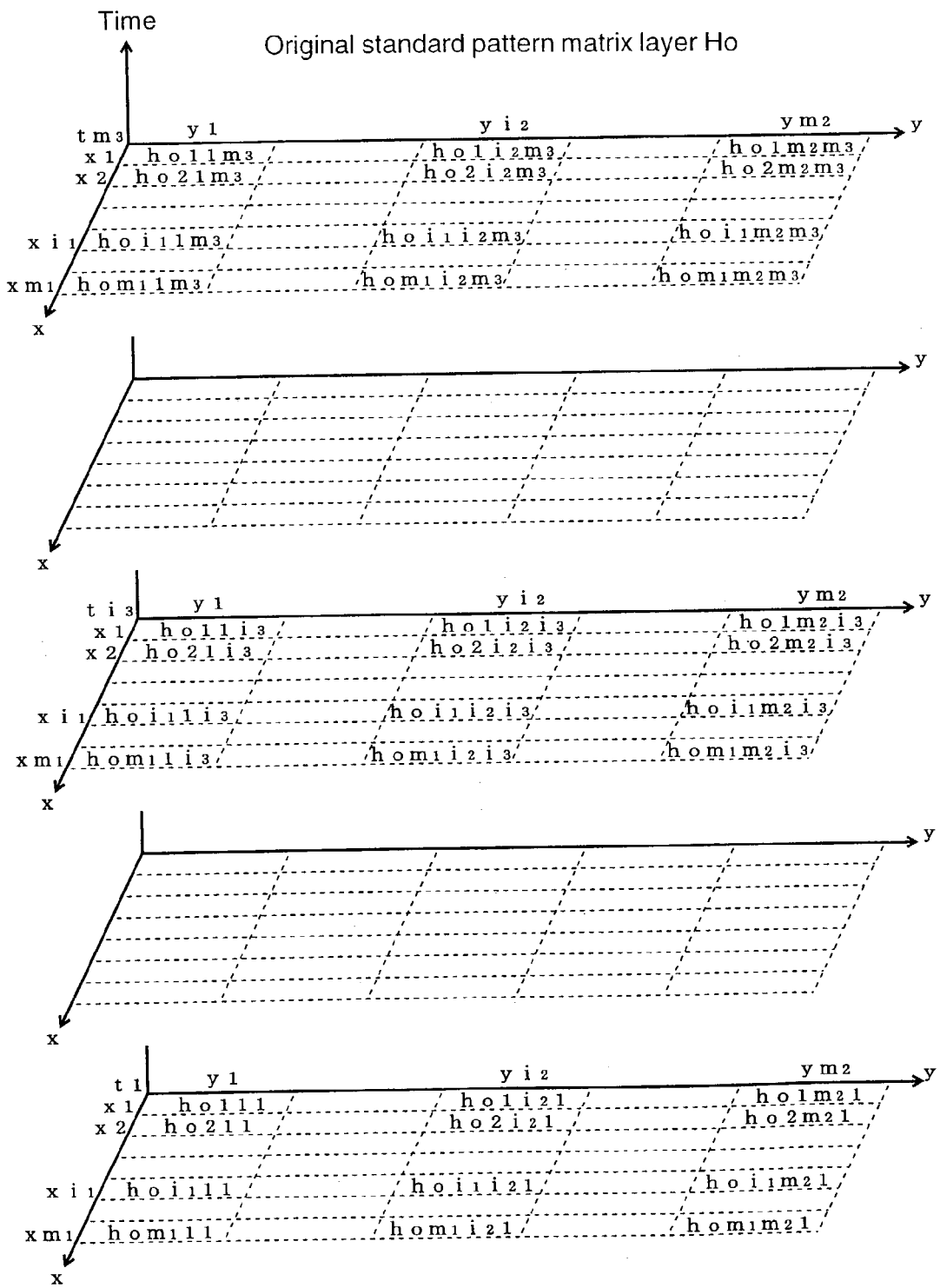
FIG. 61 is a diagram showing a method for expressing an original standard pattern matrix layer in an (x-y-time) space.
Figure 62:
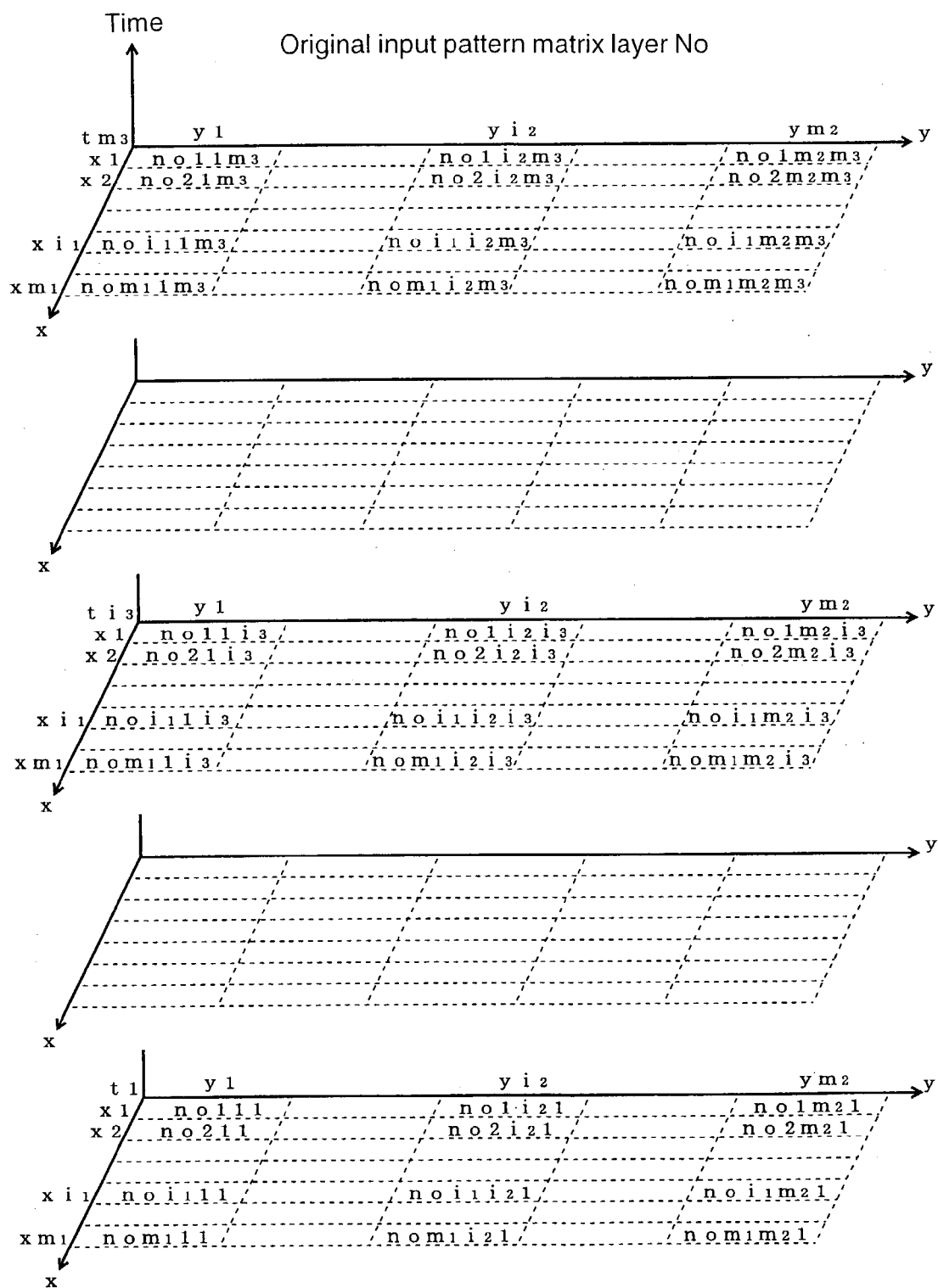
FIG. 62 is a diagram showing a method for expressing an original input pattern matrix layer in the (x-y-time) space.

Moreover, FIG. 61 shows the original standard pattern matrix layer Ho on an (x-y-time) space, and similarly, FIG. 62 shows the original input pattern matrix layer No on an (x-y-time) space.

In the related art (Japanese Patent Application No. 2000-277749), as processing, the density $Pi_1i_2i_3$ ($i_1=1, 2, \ldots, m_1$) ($i_2=1, 2, \ldots, m_2$) ($i_3=1, 2, \ldots, m_3$) of the moving image is normalized by the sum of the densities of the entire pixels. Specifically, the normalized density $pi_1i_2i_3$ of the moving image in the pixel that is the $i_1$-th in the x-direction, the $i_2$-th in the Y-direction and at the $i_3$-th time is calculated by the following equation 38 instead of the equation 2.

[Equation 38] (38)

$$pi_1i_2i_3 = \frac{P_{i_1i_2i_3}}{\sum_{j_1=1}^{m_1}\sum_{j_2=1}^{m_2}\sum_{j_3=1}^{m_3} P_{j_1j_2j_3}}$$

($i_1 = 1,2,3,\ldots,m_1$)
($i_2 = 1,2,3,\ldots,m_2$)
($i_3 = 1,2,3,\ldots,m_3$)

Moreover, in the case of a binary moving image, the density $Pi_1i_2i_3$ ($i_1=1, 2, \ldots, m_1$) ($i_2=1, 2, \ldots, m_2$) ($i_3=1, 2, \ldots, m_3$) of the moving image is normalized by the maximum value of the densities of the entire pixels. Specifically, the normalized density $pi_1i_2i_3$ of the moving image in the pixel that is the $i_1$-th in the x-direction, the $i_2$-th in the y-direction and at the $i_3$-th time can be calculated by the following equation 39 instead of the equation 3. Note that a symbol $\max\{Pj_1j_2j_3\}$ in the equation 39 implies a maximum value of the density $Pj_{1/2/3}$ ($j_1=1, 2, \ldots, m_1$) ($j_2=1, 2, \ldots, m_2$) ($j_3=1, 2, \ldots, m_3$) of the moving image.

[Equation 39] (39)

$$pi_1i_2i_3 = \frac{P_{i_1i_2i_3}}{\max\{P_{j_1j_2j_3}\}}$$

($i_1 = 1,2,3,\ldots,m_1$)
($i_2 = 1,2,3,\ldots,m_2$)
($i_3 = 1,2,3,\ldots,m_3$)

Here, the shape of the normalized density by the equation 38 and the shape of the normalized density by the equation 39 are similar to each other. Therefore, whichever of the equation 38 and the equation 39 may be used, a similar discussion to be described later is established.

Next, a standard pattern matrix layer H having a normalized density $pi_1i_2i_3$ ($i_1=1, 2, \ldots, m_1$) ($i_2=1, 2, \ldots, m_2$) ($i_3=1, 2, \ldots, m_3$) of the standard moving image as an element and an input pattern matrix layer N having a normalized density $pi_1i_2i_3$ ($i_1=1, 2, \ldots, m_1$) ($i_2=1, 2, \ldots, m_2$) ($i_3=1, 2, \ldots, m_3$) of the input moving image as an element are created. These standard pattern matrix layer H and input pattern matrix layer N are expressed as in the following equations 40 and 41 instead of the equation 4. Note that the equations 40 and 41 express the shapes of the normalized densities of the standard moving image and the input moving image by the $m_1 \times m_2 \times m_3$ pieces of element values of the pattern matrix layers, respectively.

[Equation 40] (40)

$$H = \begin{bmatrix} h11m_3 & \cdots & h1i_2m_3 & \cdots & h1m_2m_3 \\ j21m_3 & \cdots & h2i_2m_3 & \cdots & h2m_2m_3 \\ \vdots & \cdots & \vdots & \cdots & \vdots \\ \vdots & \cdots & \vdots & \cdots & \vdots \\ hi_11m_3 & \cdots & hi_1i_2m_3 & \cdots & hi_1m_2m_3 \\ \vdots & \cdots & \vdots & \cdots & \vdots \\ hm_11m_3 & \cdots & hm_1i_2m_3 & \cdots & hm_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} h1 1i_3 & \cdots & h1i_2i_3 & \cdots & h1m_2i_3 \\ h21i_3 & \cdots & h2i_2i_3 & \cdots & h2m_2i_3 \\ \vdots & \cdots & \vdots & \cdots & \vdots \\ \vdots & \cdots & \vdots & \cdots & \vdots \\ hi_11i_3 & \cdots & hi_1i_2i_3 & \cdots & hi_1m_2i_3 \\ \vdots & \cdots & \vdots & \cdots & \vdots \\ hm_11i_3 & \cdots & hm_1i_2i_3 & \cdots & hm_1m_2i_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} h111 & \cdots & h1i_21 & \cdots & h1m_21 \\ h211 & \cdots & h2i_21 & \cdots & h2m_21 \\ \vdots & \cdots & \vdots & \cdots & \vdots \\ \vdots & \cdots & \vdots & \cdots & \vdots \\ hi_111 & \cdots & hi_1i_21 & \cdots & hi_1m_21 \\ \vdots & \cdots & \vdots & \cdots & \vdots \\ hm_111 & \cdots & hm_1i_21 & \cdots & hm_1m_21 \end{bmatrix}$$

[Equation 41] (41)

$$N = \begin{bmatrix} n11m_3 & \cdots & n1i_2m_3 & \cdots & n1m_2m_3 \\ n21m_3 & \cdots & n2i_2m_3 & \cdots & n2m_2m_3 \\ \vdots & \cdots & \vdots & \cdots & \vdots \\ \vdots & \cdots & \vdots & \cdots & \vdots \\ ni_11m_3 & \cdots & ni_1i_2m_3 & \cdots & ni_1m_2m_3 \\ \vdots & \cdots & \vdots & \cdots & \vdots \\ nm_11m_3 & \cdots & nm_1i_2m_3 & \cdots & nm_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} n1 1i_3 & \cdots & n1i_2i_3 & \cdots & n1m_2i_3 \\ n21i_3 & \cdots & n2i_2i_3 & \cdots & n2m_2i_3 \\ \vdots & \cdots & \vdots & \cdots & \vdots \\ \vdots & \cdots & \vdots & \cdots & \vdots \\ ni_11i_3 & \cdots & ni_1i_2i_3 & \cdots & ni_1m_2i_3 \\ \vdots & \cdots & \vdots & \cdots & \vdots \\ nm_11i_3 & \cdots & nm_1i_2i_3 & \cdots & nm_1m_2i_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} n111 & \cdots & n1i_21 & \cdots & n1m_21 \\ n211 & \cdots & n2i_21 & \cdots & n2m_21 \\ \vdots & \cdots & \vdots & \cdots & \vdots \\ \vdots & \cdots & \vdots & \cdots & \vdots \\ ni_111 & \cdots & ni_1i_21 & \cdots & ni_1m_21 \\ \vdots & \cdots & \vdots & \cdots & \vdots \\ nm_111 & \cdots & nm_1i_21 & \cdots & nm_1m_21 \end{bmatrix}$$

Figure 63:
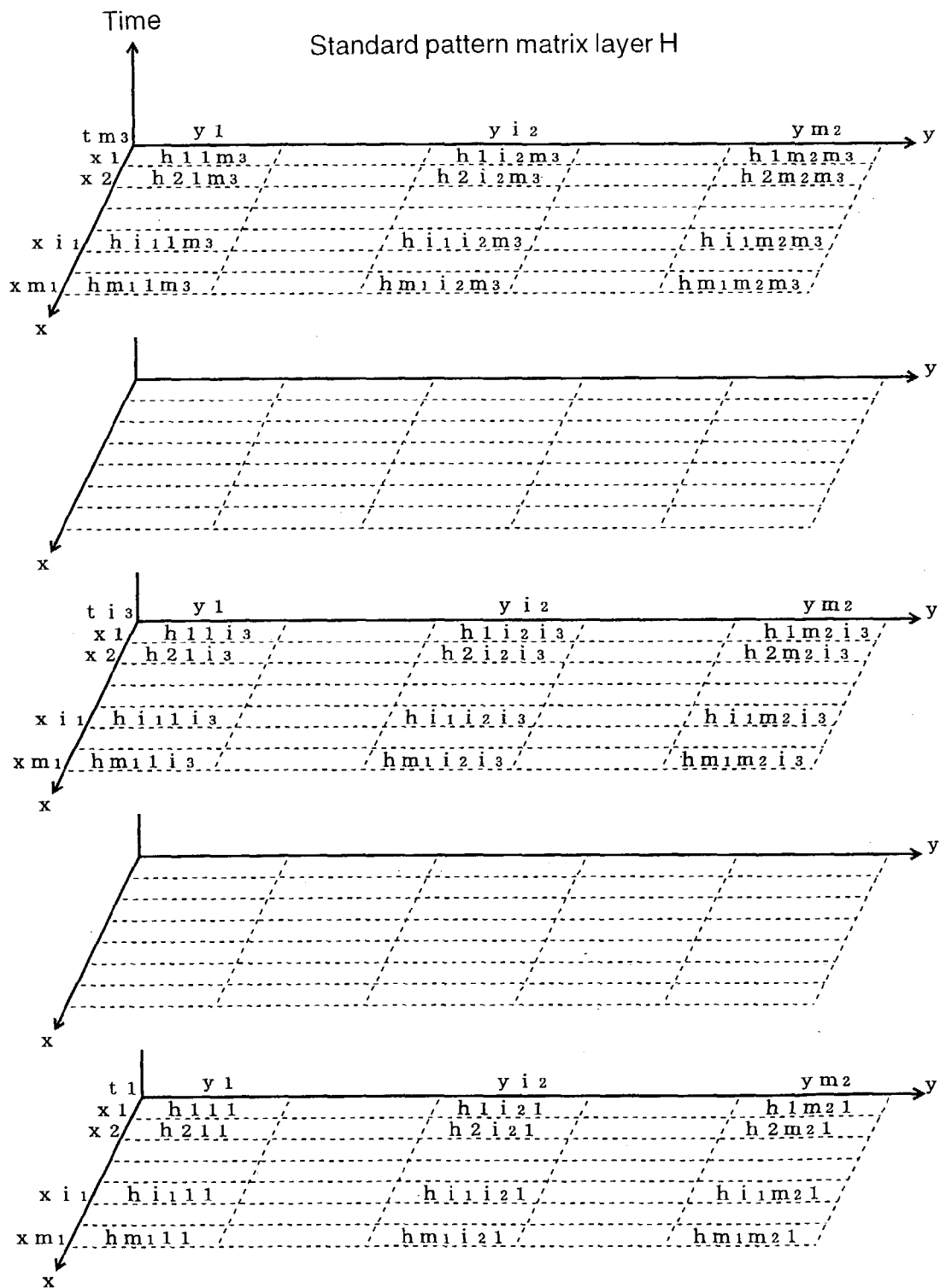
FIG. 63 is a diagram showing a method for expressing a standard pattern matrix layer in the (x-y-time) space.
Figure 64:
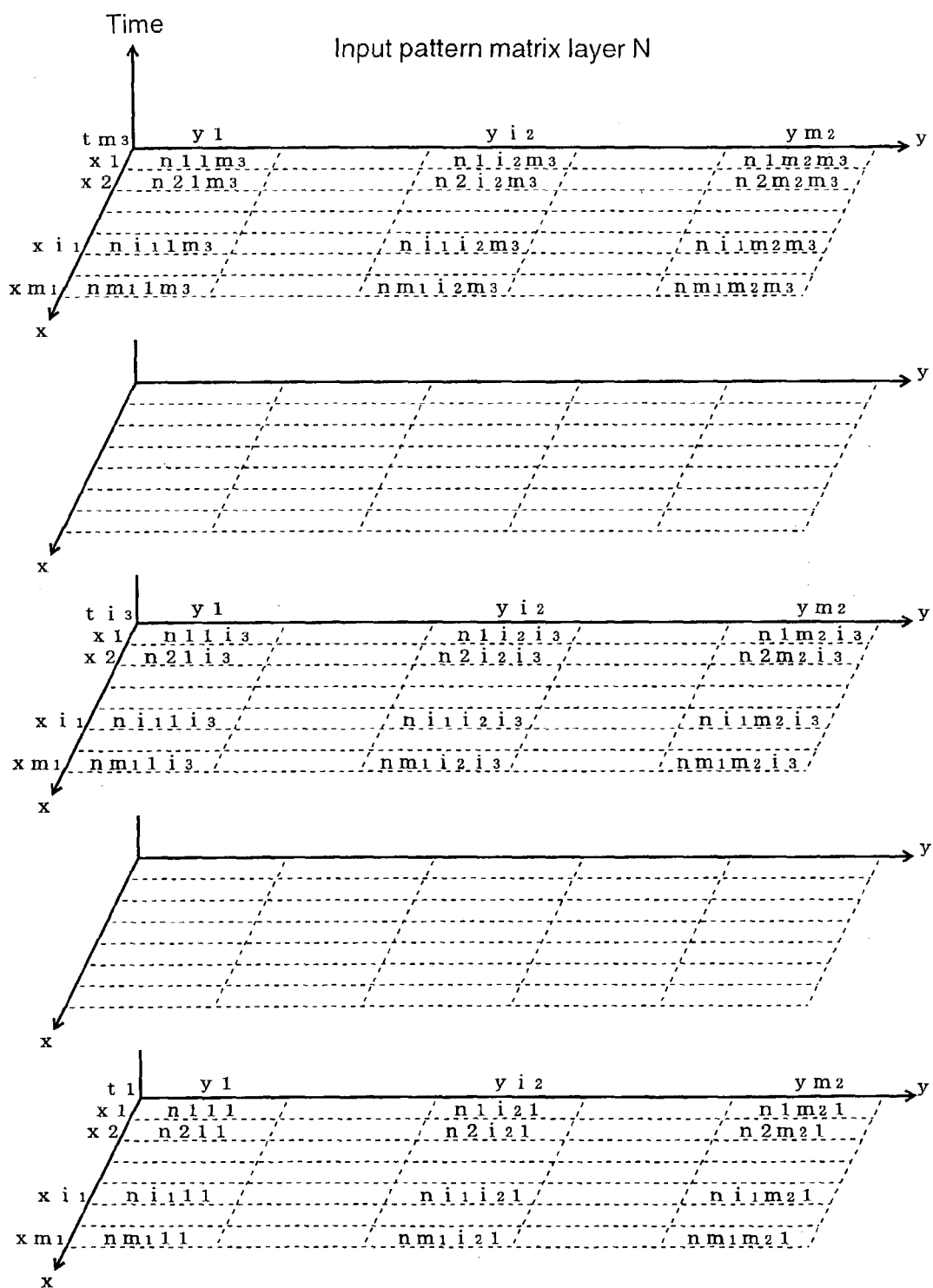
FIG. 64 is a diagram showing a method for expressing an input pattern matrix layer in the (x-y-time) space.

Moreover, FIG. 63 shows the standard pattern matrix layer H on an (x-y-time) space, and similarly, FIG. 64 shows the input pattern matrix layer N on an (x-y-time) space.

Figure 65A:
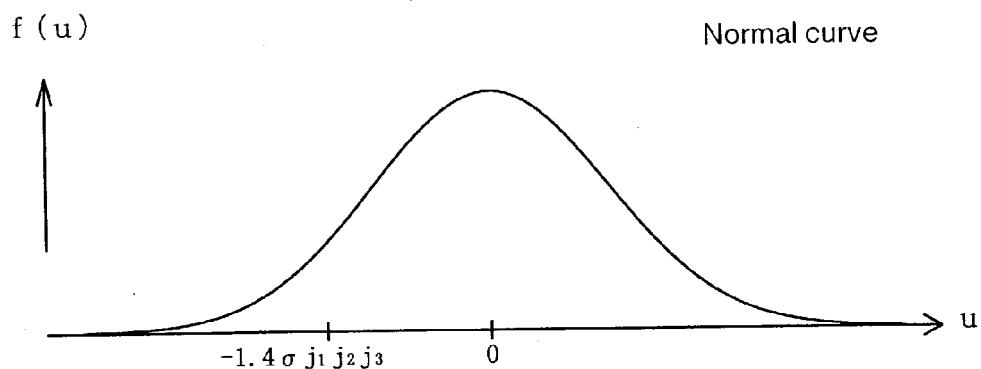
FIG. 65A is a diagram showing another example of the normal curve.
Figure 65B:
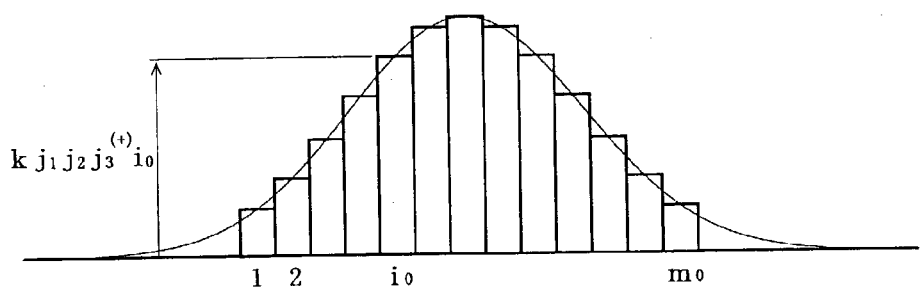
FIG. 65B is a diagram showing another example of the positive reference pattern vector having the value of the normal curve as the element.
Figure 65C:
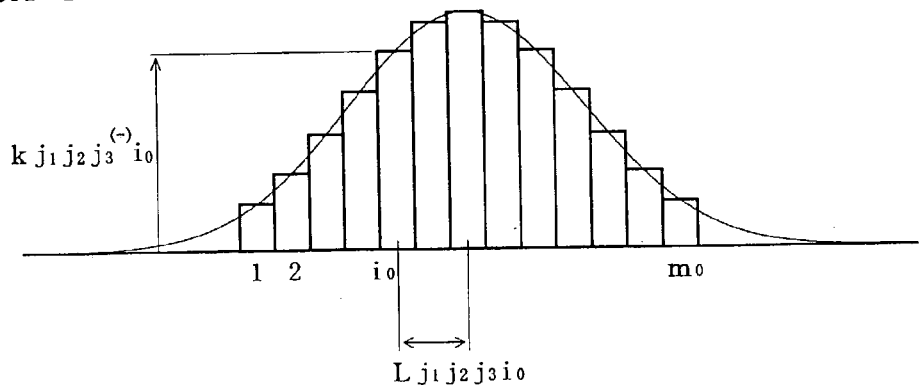
FIG. 65C is a diagram showing another example of the negative reference pattern vector having the value of the normal curve as the element.

In the related art (Japanese Patent Application No. 2000-277749), as shown in FIG. 65A, a graph of a normal distribution (normal curve) having a mean value: $\mu=0$ and a value of a variance $\sigma j_1 j_2 j_3^2$ is created. Moreover, as shown in FIGS. 65B and 65C, a positive reference pattern vector $Kj_1j_2j_3^{(+)}$ and a negative reference pattern vector $Kj_1j_2j_3^{(-)}$, each having a value of the same normal distribution as an element, are created.

Next, in the related art (Japanese Patent Application No. 2000-277749), the shape change between the standard pattern matrix layer H and the input pattern matrix layer N is substituted into shape changes of the positive reference pattern vector $Kj_1j_2j_3^{(+)}$ and the negative reference pattern vector $Kj_1j_2j_3^{(-)}$. Specifically, with regard to the $i_1i_2i_3$ element ($i_1=1, 2, \ldots, m_1$) ($i_2=1, 2, \ldots, m_2$) ($i_3=1, 2, \ldots, m_3$) of the pattern matrix layer, an absolute value of the variation between the element value $hi_1i_2i_3$ of the standard pattern matrix layer H and the element value $ni_1i_2i_3$ of the input pattern matrix layer N is $|ni_1i_2i_3-hi_1i_2i_3|$. In this case, as shown in the equation 42, when $ni_1i_2i_3$ is larger than $hi_1i_2i_3$, an element value $kj_1j_2j_3^{(+)}i_o$ of the positive reference pattern vector $Kj_1j_2j_3^{(+)}$ is increased by the absolute value $|ni_1i_2i_3-hi_1i_2i_3|$ of this variation. When $ni_1i_2i_3$ is smaller than $hi_1i_2i_3$, an element value $kj_1j_2j_3^{(-)}i_o$ of the negative reference pattern vector $Kj_1j_2j_3^{(-)}$ is increased by the absolute value $|ni_1i_2i_3-hi_1i_2i_3|$ of this variation.

[Equation 42]
for $i_1=1,2,3, \ldots, m_1$;
  $i_2=1,2,3, \ldots, m_2$;
  $i_3=1,2,3, \ldots, m_3$;
  when $ni_1i_2i_3>hi_1i_2i_3$,
    $kj_1j_2j_3^{(+)}i_o$ is increased by $|ni_1i_2i_3-hi_1i_2i_3|$,
  when $ni_1i_2i_3<hi_1i_2i_3$,
    $kj_1j_2j_3^{(-)}i_o$ is increased by $|ni_1i_2i_3-hi_1i_2i_3|$.
  .......... (42)
    ($j_1=1,2,3, \ldots, m_1$)
    ($j_2=1,2,3, \ldots, m_2$)
    ($j_3=1,2,3, \ldots, m_3$)

Subsequently, in the related art (Japanese Patent Application No. 2000-277749), with regard to the pair of reference pattern vectors (positive reference pattern vector $Kj_1j_2j_3^{(+)}$ and negative reference pattern vector $Kj_1j_2j_3^{(-)}$) changed in shape by the equation 42, in the following equation 43, a size of each shape change thereof is numerically evaluated as a variation in kurtosis. Namely, a kurtosis $Aj_1j_2j_3^{(+)}$ of the positive reference pattern vector $Kj_1j_2j_3^{(+)}$ and a kurtosis $Aj_1j_2j_3^{(-)}$ of the negative reference pattern vector $Kj_1j_2j_3^{(-)}$ are calculated by the following equation 43.

[Equation 43] (43)

$$A_{j_1j_2j_3^{(+)}} = \frac{\left\{\sum_{I_0=1}^{m_0} k_{j_1j_2j_3^{(+)}i_0}\right\} \cdot \left\{\sum_{I_0=1}^{m_0} (L_{j_1j_2j_3i_0})^4 \cdot k_{j_1j_2j_3^{(+)}i_0}\right\}}{\left\{\sum_{I_0=1}^{m_0} (L_{j_1j_2j_3i_0})^2 \cdot k_{j_1j_2j_3^{(+)}i_0}\right\}^2}$$

$$A_{j_1j_2j_3^{(-)}} = \frac{\left\{\sum_{I_0=1}^{m_0} k_{j_1j_2j_3^{(-)}i_0}\right\} \cdot \left\{\sum_{I_0=1}^{m_0} (L_{j_1j_2j_3i_0})^4 \cdot k_{j_1j_2j_3^{(-)}i_0}\right\}}{\left\{\sum_{I_0=1}^{m_0} (L_{j_1j_2j_3i_0})^2 \cdot k_{j_1j_2j_3^{(-)}i_0}\right\}^2}$$

($j_1 = 1,2,3,\ldots,m_1$)
($j_2 = 1,2,3,\ldots,m_2$)
($j_3 = 1,2,3,\ldots,m_3$)

Here, description will be made for the change rate of the kurtosis of the reference pattern vector. Similarly to the positive reference pattern vector $Kj_1j_2^{(+)}$ and the negative reference pattern vector $Kj_1j_2^{(-)}$, which are shown in FIGS. 4B and 4C, the positive reference pattern vector $Kj_1j_2j_3^{(+)}$ and the negative reference pattern vector $Kj_1j_2j_3^{(-)}$, which are shown in FIGS. 65B and 65C, are vectors (one-dimension) and express the shape of the normal distribution by the $m_o$ pieces of element values of the vectors. Accordingly, the description for the change rates of the kurtoses of the positive reference pattern vector $Kj_1j_2^{(+)}$ and the negative reference pattern vector $Kj_1j_2^{(-)}$ with reference to FIGS. 5A to 7B is also established for the positive reference pattern vector $Kj_1j_2j_3^{(+)}$ and the negative reference pattern vector $Kj_1j_2j_3^{(-)}$.

Accordingly, the change rate of kurtosis in each element of the positive reference pattern vector $Kj_1j_2j_3^{(+)}$ is previously calculated. When only the $i_1i_2i_3$ element of the input pattern matrix layer is increased with respect to the standard pattern matrix layer, and thus the $i_o$-th element ($i_o=1, 2, \ldots, m_o$) of the positive reference pattern vector is increased by the same value, then the change rate of the kurtosis in the $i_o$-th element of the positive reference pattern vector is defined as $gj_1j_2j_3i_o$, and an absolute value of the variation between the element value of the standard pattern matrix layer and the element value of the input pattern matrix layer is defined as $|ni_1i_2i_3-hi_1i_2i_3|$. Thus, instead of the upper conditional equation of the equation 7, by an upper conditional equation of the following equation 44, a value of a product of $gj_1j_2j_3i_o$ and $|ni_1i_2i_3-hi_1i_2i_3|$ can be obtained to calculate a kurtosis value $Aj_1j_2j_3^{(+)}$.

Similarly, when only the $i_1i_2i_3$ element of the input pattern matrix layer is decreased with respect to the standard pattern matrix layer, and thus the $i_o$-th element ($i_o=1, 2, \ldots, m_o$) of the negative reference pattern vector is increased by the same value, then a value of a product of $gj_1j_2j_3i_o$ and $|ni_1i_2i_3-hi_1i_2i_3|$ can be obtained to calculate a kurtosis value $Aj_1j_2j_3^{(-)}$ by a lower conditional equation of the following equation 44 instead of the lower conditional equation of the equation 7 Note that the equation 44 is established only in the case where only one element of the positive reference pattern vector or the negative reference pattern vector is increased.

[Equation 44]
when $ni_1i_2i_3>hi_1i_2i_3$,
  $Aj_1j_2j_3^{(+)}=3+gj_1j_2j_3i_o \cdot |ni_1i_2i_3-hi_1i_2i_3|$
when $ni_1i_2i_3<hi_1i_2i_3$,
  $Aj_1j_2j_3^{(-)}=3+gj_1j_2j_3i_o \cdot |ni_1i_2i_3-hi_1i_2i_3|$
  .......... (44)
    ($j_1=1,2,3, \ldots, m_1$)
    ($j_2=1,2,3, \ldots, m_2$)
    ($j_3=1,2,3, \ldots, m_3$)

In the equation 44, $|ni_1i_2i_3-hi_1i_2i_3|$ is substituted with $(ni_1i_2i_3-hi_1i_2i_3)$ while considering signs thereof, and thus the following equation 45 is obtained instead of the equation 8.

[Equation 45]
when $ni_1i_2i_3>hi_1i_2i_3$,
  $Aj_1j_2j_3^{(+)}=3+gj_1j_2j_3i_o \cdot (ni_1i_2i_3-hi_1i_2i_3)$
when $ni_1i_2i_3<hi_1i_2i_3$,
  $Aj_1j_2j_3^{(-)}=3+gj_1j_2j_3i_o \cdot (ni_1i_2i_3-hi_1i_2i_3)$
  .......... (45)
    ($j_1=1,2,3, \ldots, m_1$)
    ($j_2=1,2,3, \ldots, m_2$)
    ($j_3=1,2,3, \ldots, m_3$)

Next, description will be made for a property of the change in kurtosis of the reference pattern vector. The positive reference pattern vector $Kj_1j_2j_3^{(+)}$ and the negative reference pattern vector $Kj_1j_2j_3^{(-)}$, which are shown in FIGS. 65B and 65C, are vectors (one dimension), similarly to the positive reference pattern vector $Kj_1j_2^{(+)}$ and the negative reference pattern vector $Kj_1j_2^{(-)}$, which are shown in FIGS. 4B and 4C. Moreover, each of these vectors expresses the shape of the normal distribution by the $m_o$ pieces of element values of the vector. Accordingly, the description for the property in the change of the kurtoses of the positive reference pattern vector $Kj_1j_2^{(+)}$ and the negative reference pattern vector $Kj_1j_2^{(-)}$ with reference to FIGS. 8A to 13B is established also for the positive reference pattern vector $Kj_1j_2j_3^{(+)}$ and the negative reference pattern vector $Kj_1j_2j_3^{(-)}$.

Accordingly, with regard to the increased two elements of the positive reference pattern vector, by use of the same method as that in FIGS. 5B, 6B and 7B, each variation of the kurtosis is obtained, and the sum value is obtained by adding the variation of kurtoses, and thus the kurtosis value $Aj_1j_2j_3^{(+)}$ can be calculated. Similarly, the kurtosis value $Aj_1^ij_2j_3^{(-)}$ can be calculated.

The above is established also in the case where three or more elements of the input pattern matrix layer are simultaneously increased with respect to the standard pattern matrix layer, and thus three or more elements of the positive reference pattern vector $Kj_1j_2j_3^{(+)}$ are simultaneously increased. Similarly, the above is established also in the case where three or more elements of the input pattern matrix layer are simultaneously decreased with respect to the standard pattern matrix layer, and thus three or more elements of the negative reference pattern vector $Kj_1j_2j_3^{(-)}$ are simultaneously increased.

Accordingly, in the case where plural elements of the input pattern matrix layer are simultaneously increased with respect to the standard pattern matrix layer, and thus plural elements of the positive reference pattern vector are simultaneously increased, the kurtosis value $Aj_1j_2j_3^{(+)}$ can be calculated by an upper conditional equation of the following equation 46 instead of the upper conditional equation of the equation 9. Specifically, the change rate of kurtosis in the $i_o$-th element of the positive reference pattern vector is defined as $gj_1j_2j_3i_o$, and the variation between the element value of the standard pattern matrix layer and the element value of the input pattern matrix layer is defined as $(ni_1i_2i_3-hi_1i_2i_3)$. Then, a value of the product of $gj_1j_2j_3i_o$ and $(ni_1i_2i_3-hi_1i_2i_3)$ is obtained, and a value of the sum is obtained by adding the value of the product to the entire elements of the input pattern matrix layer, which are increased with respect to the standard pattern matrix layer, and thus the kurtosis value $Aj_1j_2j_3^{(+)}$ is calculated.

Similarly, in the case where plural elements of the input pattern matrix layer are simultaneously decreased with respect to the standard pattern matrix layer, and thus plural elements of the negative reference pattern vector are simultaneously increased, then, by a lower conditional equation of the following equation 46 instead of the lower conditional equation of the equation 9, a value of the product of $gj_1j_2j_3i_o$ and $(ni_1i_2i_3-hi_1i_2i_3)$ is obtained. Then, a value of the sum is obtained by adding the value of the product to the entire elements of the input pattern matrix layer, which are decreased with respect to the standard pattern matrix layer, and thus the kurtosis value $Aj_1j_2j_3^{(-)}$ is calculated.

[Equation 46]

for all $i_1, i_2, i_3$ where $ni_1i_2i_3$, $$A_{j_1j_2j_3}^{(+)} = 3 + \sum_{i_1=1}^{m_1}\sum_{i_2=1}^{m_2}\sum_{i_3=1}^{m_3} gj_1j_2j_3i_o \cdot (ni_1i_2i_3 - hi_1i_2i_3)$$

for all $i_1, i_2, i_3$ where $ni_1i_2i_3 < hi_1i_2i_3$, $$Aj_1j_2j_3^{(-)} = 3 - \sum_{i_1=1}^{m_1}\sum_{i_2=1}^{m_2}\sum_{i_3=1}^{m_3} gj_1j_2j_3i_o \cdot (ni_1i_2i_3 - hi_1i_2i_3)$$

$(j_1 = 1, 2, 3, \ldots, m_1)$
$(j_2 = 1, 2, 3, \ldots, m_2)$
$(j_3 = 1, 2, 3, \ldots, m_3)$ Incidentally, in the related art (Japanese Patent Application No. 2000-277749), by use of the kurtosis $Aj_1j_2j_3^{(+)}$ of the positive reference pattern vector $Kj_1j_2j_3^{(+)}$ and the kurtosis $Aj_1j_2j_3^{(-)}$ of the negative reference pattern vector $Kj_1j_2j_3^{(-)}$, both of which are calculated by the equation 43, a shape variation $Dj_1j_2j_3$ is calculated by the following equation 47 instead of the equation 10. Specifically, the kurtosis values of the two reference pattern vectors $Kj_1j_2j_3^{(+)}$ and $Kj_1j_2j_3^{(-)}$ set initially to normal distribution shapes are both equal to 3. Therefore, the kurtosis variations of the positive and negative reference pattern vectors changed in shape by the equation 42 become $\{Aj_1j_2j_3^{(+)}-3\}$ and $\{Aj_1j_2j_3^{(-)}-3\}$, respectively. Accordingly, the variation in the positive direction becomes $\{Aj_1j_2j_3^{(+)}-3\}$, the variation in the negative direction becomes $\{Aj_1j_2j_3^{(-)}-3\}$, and the entire variation becomes a difference value therebetween. On the premise described above, the shape variation $Dj_1j_2j_3$ is calculated.

[Equation 47]

$$Dj_1j_2j_3 = \{Aj_1j_2j_3^{(+)} - 3\} - \{Aj_1j_2j_3^{(-)} - 3\} \quad (47)$$
$$= Aj_1j_2j_3^{(+)} - Aj_1j_2j_3^{(-)}$$

$(j_1 = 1, 2, 3, \ldots, m_1)$
$(j_2 = 1, 2, 3, \ldots, m_2)$
$(j_3 = 1, 2, 3, \ldots, m_3)$ Accordingly, the equation 46 is assigned to the equation 47 to obtain the following equation 48 instead of the equation 11. Specifically, in the case where the plural elements of the input pattern matrix layer are increased and decreased simultaneously with respect to the standard pattern matrix layer, and thus the plural elements of the positive and negative reference pattern vectors are increased simultaneously, then the shape variation $Dj_1j_2j_3$ can be calculated by the equation 48.

[Equation 48]

$$Dj_1j_2j_3 = \sum_{i_1=1}^{m_1}\sum_{i_2=1}^{m_2}\sum_{i_3=1}^{m_3} gj_1j_2j_3i_o \cdot (ni_1i_2i_3 - hi_1i_2i_3) \quad (48)$$
$$= \sum_{i_1=1}^{m_1}\sum_{i_2=1}^{m_2}\sum_{i_3=1}^{m_3} (gj_1j_2i_o \cdot ni_1i_2i_3 - gj_1j_2i_o \cdot hi_1i_2i_3)$$
$$= \sum_{i_1=1}^{m_1}\sum_{i_2=1}^{m_2}\sum_{i_3=1}^{m_3} gj_1j_2j_3i_o \cdot ni_1i_2i_3 - \sum_{i_1=1}^{m_1}\sum_{i_2=1}^{m_2}\sum_{i_3=1}^{m_3} gj_1j_2j_3i_o \cdot hi_1i_2i_3$$

$(j_1 = 1, 2, 3, \ldots, m_1)$
$(j_2 = 1, 2, 3, \ldots, m_2)$
$(j_3 = 1, 2, 3, \ldots, m_3)$ From the equation 48, it is understood that the shape variation $Dj_1j_2j_3$ can be decomposed into a product-sum operation for the change rate $gj_1j_2j_3i_o$ of the kurtosis of the reference pattern vector and the element value $hi_1i_2i_3$ of the standard pattern matrix layer and a product-sum operation for the same change rate $gj_1j_2j_3i_o$ and the element value $ni_1i_2i_3$ of the input pattern matrix layer. In this connection, as shown in the following equation 49 instead of the equation 12, the respective product-sum values are defined as $hgj_1j_2j_3$ and $ngj_1j_2j_3$.

[Equation 49]

$$hg_{j_1j_2j_3} = \sum_{i_1=1}^{m_1}\sum_{i_2=1}^{m_2}\sum_{i_3=1}^{m_3} g_{j_1j_2j_3i_o} \cdot h_{i_1i_2i_3}$$

$$ng_{j_1j_2j_3} = \sum_{i_1=1}^{m_1}\sum_{i_2=1}^{m_2}\sum_{i_3=1}^{m_3} g_{j_1j_2j_3i_o} \cdot n_{i_1i_2i_3}$$

$(j_1 = 1, 2, 3, \ldots, m_1)$
$(j_2 = 1, 2, 3, \ldots, m_2)$
$(j_3 = 1, 2, 3, \ldots, m_3)$ (49)

Next, description will be made for a method for calculating the change rate $g_{j_1j_2j_3i_o}$ ($i_o=1, 2, \ldots, m_o$) of the kurtosis and calculating the element number $i_o$ in the equation 49. Note that the positive reference pattern vector $Kj_1^{\prime}j_2j_3^{(+)}$ and the negative reference pattern vector $Kj_1j_2j_3^{(-)}$ are vectors equivalent to each other. Therefore, the change rate of the kurtosis of the positive reference pattern vector $Kj_1^{\prime}j_2j_3^{(+)}$ and the change rate of the kurtosis of the negative reference pattern vector $Kj_1j_2j_3^{(-)}$ are equal to each other. Moreover, as shown in the equation 49, it is not necessary to distinguish these reference pattern vectors. Accordingly, in the description below, the positive and negative reference pattern vectors will be simply referred to as a reference pattern vector, excluding the signs $^{(+)}$ and $^{(-)}$.

Figure 66A:
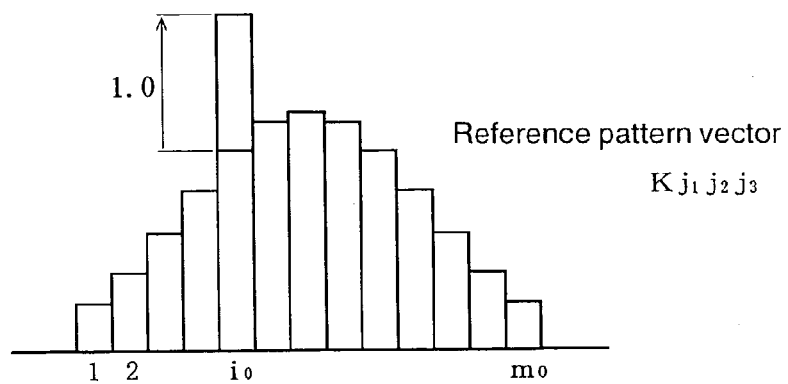
FIGS. 66A and 66B are diagrams showing another example of creating the weighting vector based on the change rate of the kurtosis of the reference pattern vector.
Figure 66B:
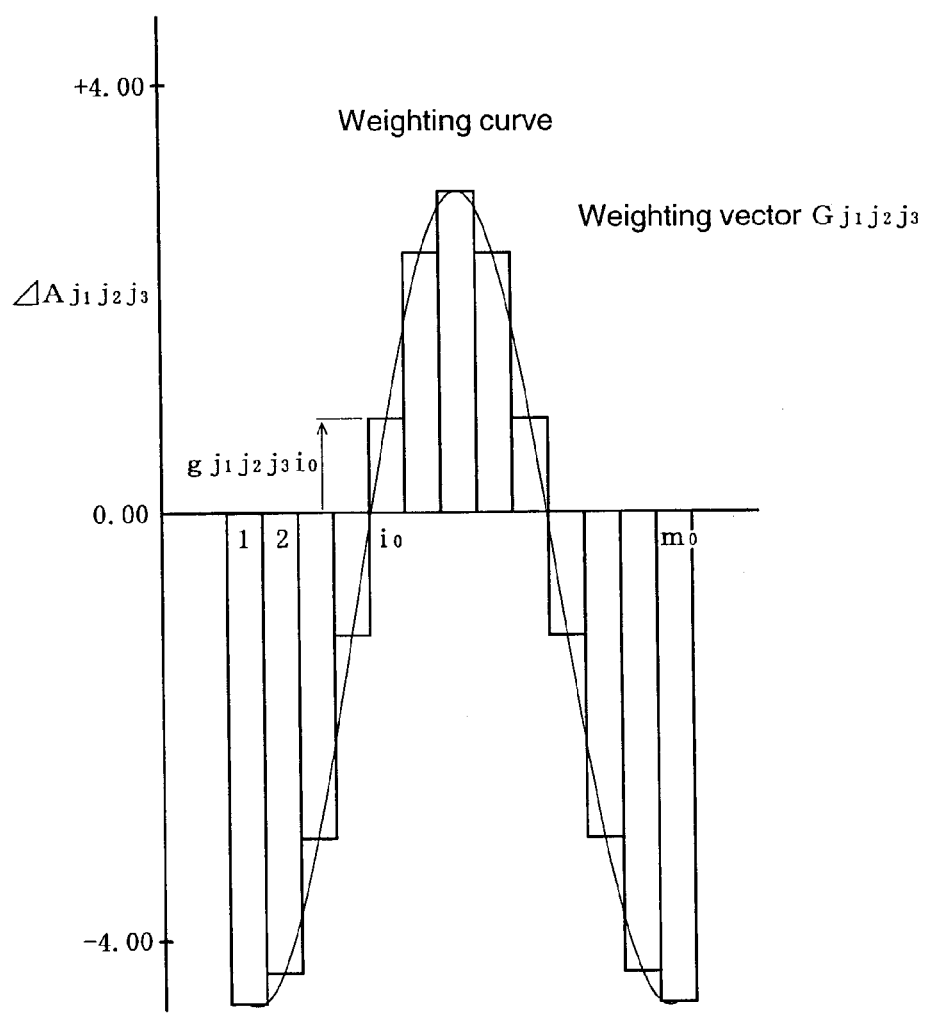

FIG. 66A is a schematic diagram showing an example where only the $i_o$-th element of the reference pattern vector $Kj_1j_2j_3$ is increased by 1.0. Moreover, FIG. 66B is a graph (weighting curve) showing a state where the variation $\Delta Aj_1j_2j_3$ of the kurtosis $Aj_1j_2j_3$ of the reference pattern vector changed in shape as shown in FIG. 66A is directly obtained by the equation 43 and plotted on the position $i_o$ in FIG. 66B, and then a calculated value $\Delta Aj_1j_2j_3$ of the kurtosis variation is changed when the $i_o$ is changed from 1 to $m_o$. Here in this weighting curve, the kurtosis variation when only the $i_o$-th element of the reference pattern vector is increased by 1.0 is plotted. Therefore, a function value of the weighting curve becomes equal to the change rate $g_{j_1j_2j_3i_o}$ of the kurtosis in the $i_o$-th element ($i_o=1, 2, \ldots, m_o$) of the reference pattern vector. Moreover, FIG. 66B also shows a bar graph of which height is equal to the function value of the weighting curve. A weighting vector $Gj_1j_2j_3$ having a height value of the bar graph as an element is created as shown in FIG. 66B., and is expressed as in the following equation 50 instead of the equation 13. The equation 50 expresses the change rate of the kurtosis of the reference pattern vector by the $m_o$ pieces of element values of the vector. While the equations 36, 37, 40 and 41 are matrix layers (three-dimension), the equation 50 is a vector (one-dimension).

[Equation 50]

$Gj_1j_2=(g_{j_1j_2j_3}1, g_{j_1j_2j_3}2, \ldots, g_{j_1j_2j_3}i_o, \ldots, g_{j_1j_2j_3}m_o)$
. . . . . . . . . . (50)
$(j_1=1,2,3, \ldots, m_1)$
$(j_2=1,2,3, \ldots, m_2)$
$(j_3=1,2,3, \ldots, m_3)$ Next, the relationship between the normal curve and the weighting curve is shown, and the relationship between the reference pattern vector $Kj_1j_2j_3$ and the weighting vector $Gj_1j_2j_3$ is shown. The positive reference pattern vector $Kj_1j_2j_3^{(+)}$ and the negative reference pattern vector $Kj_1j_2j_3^{(-)}$, which are shown in FIGS. 65B and 65C, are vectors (one dimension), similarly to the positive reference pattern vector $Kj_1j_2^{(+)}$ and the negative reference pattern vector $Kj_1j_2^{(-)}$, which are shown in FIGS. 4B and 4C. Moreover, each of these vectors expresses the shape of the normal distribution by the $m_o$ pieces of element values of the vector. Still more, the weighting vector $Gj_1j_2j_3$ shown in FIG. 66B is a vector (one-dimension), similarly to the weighting vector $Gj_1j_2$ shown in FIG. 14B, and expresses the change rate of the kurtosis of the reference pattern vector by the $m_o$ pieces of element values of the vector. Accordingly, the relationship between the normal curve and the weighting curve and the relationship between the reference pattern vector $Kj_1j_2j_3$ and the weighting vector $Gj_1j_2j_3$, which are with reference to FIGS. 66A and 66B, are equal to the relationship between the normal curve and the weighting curve and the relationship between the reference pattern vector $Kj_1j_2$ and the weighting vector $Gj_1j_2$, which are with reference to FIGS. 15A to 19, respectively.

Specifically, the normal curve and the weighting curve correspond to each other, the reference pattern vector $Kj_1j_2j_3$ and the weighting vector $Gj_1j_2j_3$ correspond to each other, and indices $j_1j_2j_3$, $i_o$ and $m_o$ of the reference pattern vector $Kj_1j_2j_3$ and indices $j_1j_2j_3$, $i_o$ and $m_o$ of the weighting vector $Gj_1j_2j_3$ have the same values, respectively.

Moreover, the movement of the center of the normal curve and the movement of the center of the weighting curve correspond to each other. Still more, the method for calculating the element number $i_o$ of the reference pattern vector proximate to the position apart from the center of the reference pattern vector by the length $\lambda i_1i_2i_3j_1j_2j_3$ and the method for calculating the element number $i_o$ of the weighting vector proximate to the position apart from the center of the weighting vector by the length $\lambda i_1i_2i_3j_1j_2j_3$ are the same. Accordingly, when the $j_1j_2j_3$ element and the $i_1i_2i_3$ element of the pattern matrix layer are given, $i_o$ in the equation 49 is calculated based on the length between these two points on the (x-y-time)-normalized space.

Specifically, $hg_{j_1j_2j_3}$ shown in the left side of the equation 49 can be calculated as a product-sum value in such a manner that the length between the specified element and each element of the standard pattern matrix layer is obtained, the element number $i_o$ of the weighting vector proximate to the position apart from the center of the weighting vector by the above-described length is calculated, the value of the product of the element value $g_{j_1j_2j_3i_o}$ of the above-described element number of the weighting vector and the element value $h_{i_1i_2i_3}$ of each element of the standard pattern matrix layer is obtained, and the above-described value of the product is added to each element of the standard pattern matrix layer. Moreover, $ng_{j_1j_2j_3}$ shown in the left side of the equation 49 can be calculated as a product-sum value in such a manner that the length between the specified element and each element of the input pattern matrix layer is obtained, the element number $i_o$ of the weighting vector proximate to the position apart from the center of the weighting vector by the above-described length is calculated, the value of the product of the element value $g_{j_1j_2j_3i_o}$ of the above-described element number of the weighting vector and the element value $n_{i_1i_2i_3}$ of each element of the input pattern matrix layer is obtained, and the above-described value of the product is added to each element of the input pattern matrix layer.

Next, a weighted standard pattern matrix layer Hg having $hg_{j_1j_2j_3}$ ($j_1=1, 2, \ldots, m_1$) ($j_2=1, 2, \ldots, m_2$) ($j_3=1, 2, \ldots, m_3$) in the equation 49 as an element and a weighted input pattern matrix layer Ng having $ng j_1 j_2 j_3$ ($j_1=1, 2, \ldots, m_1$) ($j_2=1, 2, \ldots, m_2$) ($j_3=1, 2, \ldots, m_3$) in the equation 49 as an element are created. These weighted standard pattern matrix layer Hg and weighted input pattern matrix layer Ng are expressed as in the following equations 51 and 52 instead of the equation 14.

[Equation 51] (51)

$$Hg = \begin{bmatrix} hg11m_3 & \cdots & hg1i_2m_3 & \cdots & hg1m_2m_3 \\ hg21m_3 & \cdots & hg2i_2m_3 & \cdots & hg2m_2m_3 \\ \vdots & \cdots & \vdots & \cdots & \vdots \\ \vdots & \cdots & \vdots & \cdots & \vdots \\ hgi_11m_3 & \cdots & hgi_1i_2m_3 & \cdots & hgi_1m_2m_3 \\ \vdots & \cdots & \vdots & \cdots & \vdots \\ hgm_11m_3 & \cdots & hgm_1i_2m_3 & \cdots & hgm_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} hg11i_3 & \cdots & hg1i_2i_3 & \cdots & hg1m_2i_3 \\ hg21i_3 & \cdots & hg2i_2i_3 & \cdots & hg2m_2i_3 \\ \vdots & \cdots & \vdots & \cdots & \vdots \\ \vdots & \cdots & \vdots & \cdots & \vdots \\ hgi_11i_3 & \cdots & hgi_1i_2i_3 & \cdots & hgi_1m_2i_3 \\ \vdots & \cdots & \vdots & \cdots & \vdots \\ hgm_11i_3 & \cdots & hgm_1i_2i_3 & \cdots & hgm_1m_2i_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} hg111 & \cdots & hg1i_21 & \cdots & hg1m_21 \\ hg211 & \cdots & hg2i_21 & \cdots & hg2m_21 \\ \vdots & \cdots & \vdots & \cdots & \vdots \\ \vdots & \cdots & \vdots & \cdots & \vdots \\ hgi_111 & \cdots & hgi_1i_21 & \cdots & hgi_1m_21 \\ \vdots & \cdots & \vdots & \cdots & \vdots \\ hgm_111 & \cdots & hgm_1i_21 & \cdots & hgm_1m_21 \end{bmatrix}$$

[Equation 52] (52)

$$Ng = \begin{bmatrix} ng11m_3 & \cdots & ng1i_2m_3 & \cdots & ng1m_2m_3 \\ ng21m_3 & \cdots & ng2i_2m_3 & \cdots & ng2m_2m_3 \\ \vdots & \cdots & \vdots & \cdots & \vdots \\ \vdots & \cdots & \vdots & \cdots & \vdots \\ ngi_11m_3 & \cdots & ngi_1i_2m_3 & \cdots & ngi_1m_2m_3 \\ \vdots & \cdots & \vdots & \cdots & \vdots \\ ngm_11m_3 & \cdots & ngm_1i_2m_3 & \cdots & ngm_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} ng11i_3 & \cdots & ng1i_2i_3 & \cdots & ng1m_2i_3 \\ ng21i_3 & \cdots & ng2i_2i_3 & \cdots & ng2m_2i_3 \\ \vdots & \cdots & \vdots & \cdots & \vdots \\ \vdots & \cdots & \vdots & \cdots & \vdots \\ ngi_11i_3 & \cdots & ngi_1i_2i_3 & \cdots & ngi_1m_2i_3 \\ \vdots & \cdots & \vdots & \cdots & \vdots \\ ngm_11i_3 & \cdots & ngm_1i_2i_3 & \cdots & ngm_1m_2i_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} ng111 & \cdots & ng1i_21 & \cdots & ng1m_21 \\ ng211 & \cdots & ng2i_21 & \cdots & ng2m_21 \\ \vdots & \cdots & \vdots & \cdots & \vdots \\ \vdots & \cdots & \vdots & \cdots & \vdots \\ ngi_111 & \cdots & ngi_1i_21 & \cdots & ngi_1m_21 \\ \vdots & \cdots & \vdots & \cdots & \vdots \\ ngm_111 & \cdots & ngm_1i_21 & \cdots & ngm_1m_21 \end{bmatrix}$$

Moreover, the equation 49 is assigned to the equation 48 to obtain the following equation 53 instead of the equation 15. From the equation 53, it is understood that the shape variation $Dj_1 j_2 j_3$ is obtained by subtracting the element value $hgj_1j_2j_3$ of the weighted standard pattern matrix layer Hg from the element value $ngj_1j_2j_3$ of the weighted input pattern matrix layer Ng.

[Equation 53]

$$Dj_1j_2j_3 = ngj_1j_2j_3 - hgj_1j_2j_3 \qquad (53)$$

$(j_1=1,2,3,\ldots,m_1)$
$(j_2=1,2,3,\ldots,m_2)$
$(j_3=1,2,3,\ldots,m_3)$

In the related art (Japanese Patent Application No. 2000-277749), the square root of the square sum of the $m_1 \times m_2 \times m_3$ pieces of shape variations $Dj_1j_2j_3$ calculated by the equation 53 is defined as the value of the geometric distance. Accordingly, a geometric distance value $d_E$ can be calculated by the following equation 54 instead of the equation 16.

[Equation 54]

$$d_E = \sqrt{\sum_{j_1=1}^{m_1} \sum_{j_2=1}^{m_2} \sum_{j_3=1}^{m_3} (Dj_1 j_2 j_3)^2}$$

$$= \sqrt{\sum_{j_1=1}^{m_1} \sum_{j_2=1}^{m_2} \sum_{j_3=1}^{m_3} (ngj_1 j_2 j_3 - hgj_1 j_2 j_3)^2} \qquad (54)$$

Moreover, in the related art (Japanese Patent Application No. 2000-277749), the square sum of the $m_1 \times m_2 \times m_3$ pieces of shape variations $Dj_1j_2j_3$ calculated by the equation 53 is defined as the value of the geometric distance as it is. Accordingly, the geometric distance value $d_E$ can also be calculated by the following equation 55 instead of the equation 17.

[Equation 55]

$$d_E = \sum_{j_1=1}^{m_1} \sum_{j_2=1}^{m_2} \sum_{j_3=1}^{m_3} (Dj_1 j_2 j_3)^2$$

$$= \sum_{j_1=1}^{m_1} \sum_{j_2=1}^{m_2} \sum_{j_3=1}^{m_3} (ngj_1 j_2 j_3 - hgj_1 j_2 j_3)^2 \qquad (55)$$

Meanwhile, in the equation 49, the element value $hi_1i_2i_3$ of the standard pattern matrix layer and the element value $ni_1i_2i_3$ of the input pattern matrix layer are substituted into the element value $hoi_1i_2i_3$ of the original standard pattern matrix layer and the element value $noi_1i_2i_3$ of the original input pattern matrix layer, respectively. Then, as shown in the following equation 56 instead of the equation 18, the product-sum value of the change rate $gj_1j_2j_3i_o$ in kurtosis of the reference pattern vector and the element value $hoi_1i_2i_3$ of the original standard pattern matrix layer is defined as $hogj_1j_2j_3$, and the product-sum value of the same change rate $gj_1j_2j_3i_o$ and the element value $noi_1i_2i_3$ of the original input pattern matrix layer is defined as $nogj_1j_2j_3$.

[Equation 56]

$$hogj_1 j_2 j_3 = \sum_{i_1=1}^{m_1} \sum_{i_2=1}^{m_2} \sum_{i_3=1}^{m_3} gj_1 j_2 j_3 i_0 \cdot hoi_1 i_2 i_3 \qquad (56)$$

$$nogj_1 j_2 j_3 = \sum_{i_1=1}^{m_1} \sum_{i_2=1}^{m_2} \sum_{i_3=1}^{m_3} gj_1 j_2 j_3 i_0 \cdot noi_1 i_2 i_3$$

$(j_1 = 1, 2, 3, \ldots, m_1)$
$(j_2 = 1, 2, 3, \ldots, m_2)$
$(j_3 = 1, 2, 3, \ldots, m_3)$ Next, an original and weighted standard pattern matrix layer Hog having $hogj_1j_2j_3$ ($j_1=1, 2, \ldots, m_1$) ($j_2=1, 2, \ldots, m_2$) ($j_3=1, 2, \ldots, m_3$) in the equation 56 as an element and an original and weighted input pattern matrix layer Nog having $nogj_1j_2j_3$ ($j_1=1, 2, \ldots, m_1$) ($j_2=1, 2, \ldots, m_2$) ($j_3=1, 2, \ldots, m_3$) in the equation 56 as an element are created. These original and weighted standard pattern matrix layer Hog and original and weighted input pattern matrix layer Nog are expressed as in the following equations 57 and 58 instead of the equation 19.

[Equation 57]

$$Hog = \begin{bmatrix} hog11m_3 & \ldots & hog1i_2m_3 & \ldots & hog1m_2m_3 \\ hog21m_3 & \ldots & hog2i_2m_3 & \ldots & hog2m_2m_3 \\ \vdots & \ldots & \vdots & \ldots & \vdots \\ hogi_11m_3 & \ldots & hogi_1i_2m_3 & \ldots & hogi_1m_2m_3 \\ \vdots & \ldots & \vdots & \ldots & \vdots \\ hogm_11m_3 & \ldots & hogm_1i_2m_3 & \ldots & hogm_1m_2m_3 \end{bmatrix}$$

$$\begin{bmatrix} \ldots & \ldots & \ldots & \ldots & \ldots \\ \ldots & \ldots & \ldots & \ldots & \ldots \\ \vdots & \ldots & \vdots & \ldots & \vdots \\ \vdots & \ldots & \vdots & \ldots & \vdots \\ \ldots & \ldots & \ldots & \ldots & \ldots \\ \vdots & \ldots & \vdots & \ldots & \vdots \\ \ldots & \ldots & \ldots & \ldots & \ldots \end{bmatrix}$$

$$\begin{bmatrix} hog11i_3 & \ldots & hog1i_2i_3 & \ldots & hog1m_2i_3 \\ hog21i_3 & \ldots & hog2i_2i_3 & \ldots & hog2m_2i_3 \\ \vdots & \ldots & \vdots & \ldots & \vdots \\ hogi_11i_3 & \ldots & hogi_1i_2i_3 & \ldots & hogi_1m_2i_3 \\ \vdots & \ldots & \vdots & \ldots & \vdots \\ hogm_11i_3 & \ldots & hogm_1i_2i_3 & \ldots & hogm_1m_2i_3 \end{bmatrix}$$

$$\begin{bmatrix} \ldots & \ldots & \ldots & \ldots & \ldots \\ \ldots & \ldots & \ldots & \ldots & \ldots \\ \vdots & \ldots & \vdots & \ldots & \vdots \\ \vdots & \ldots & \vdots & \ldots & \vdots \\ \ldots & \ldots & \ldots & \ldots & \ldots \\ \vdots & \ldots & \vdots & \ldots & \vdots \\ \ldots & \ldots & \ldots & \ldots & \ldots \end{bmatrix}$$

$$\begin{bmatrix} hog111 & \cdots & hog1i_21 & \cdots & hog1m_21 \\ hog211 & \cdots & hog2i_21 & \cdots & hog2m_21 \\ \vdots & \cdots & \vdots & \cdots & \vdots \\ \vdots & \cdots & \vdots & \cdots & \vdots \\ hogi_111 & \cdots & hogi_1i_21 & \cdots & hogi_1m_21 \\ \vdots & \cdots & \vdots & \cdots & \vdots \\ hogm_111 & \cdots & hogm_1i_21 & \cdots & hogm_1m_21 \end{bmatrix}$$

[Equation 58] (58)

$$Nog = \begin{bmatrix} nog11m_3 & \cdots & nog1i_2m_3 & \cdots & nog1m_2m_3 \\ nog21m_3 & \cdots & nog2i_2m_3 & \cdots & nog2m_2m_3 \\ \vdots & \cdots & \vdots & \cdots & \vdots \\ \vdots & \cdots & \vdots & \cdots & \vdots \\ nogi_11m_3 & \cdots & nogi_1i_2m_3 & \cdots & nogi_1m_2m_3 \\ \vdots & \cdots & \vdots & \cdots & \vdots \\ nogm_11m_3 & \cdots & nogm_1i_2m_3 & \cdots & nogm_1m_2m_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} nog11i_3 & \cdots & nog1i_2i_3 & \cdots & nog1m_2i_3 \\ nog21i_3 & \cdots & nog2i_2i_3 & \cdots & nog2m_2i_3 \\ \vdots & \cdots & \vdots & \cdots & \vdots \\ \vdots & \cdots & \vdots & \cdots & \vdots \\ nogi_11i_3 & \cdots & nogi_1i_2i_3 & \cdots & nogi_1m_2i_3 \\ \vdots & \cdots & \vdots & \cdots & \vdots \\ nogm_11i_3 & \cdots & nogm_1i_2i_3 & \cdots & nogm_1m_2i_3 \end{bmatrix}$$

$$\begin{bmatrix} \cdots & \cdots & \cdots & \cdots & \cdots \\ \cdots & \cdots & \cdots & \cdots & \cdots \\ \vdots & \cdots & \vdots & \cdots & \vdots \\ \vdots & \cdots & \vdots & \cdots & \vdots \\ \cdots & \cdots & \cdots & \cdots & \cdots \\ \vdots & \cdots & \vdots & \cdots & \vdots \\ \cdots & \cdots & \cdots & \cdots & \cdots \end{bmatrix}$$

$$\begin{bmatrix} nog111 & \cdots & nog1i_21 & \cdots & nog1m_21 \\ nog211 & \cdots & nog2i_21 & \cdots & nog2m_21 \\ \vdots & \cdots & \vdots & \cdots & \vdots \\ \vdots & \cdots & \vdots & \cdots & \vdots \\ nogi_111 & \cdots & nogi_1i_21 & \cdots & nogi_1m_21 \\ \vdots & \cdots & \vdots & \cdots & \vdots \\ nogm_111 & \cdots & nogm_1i_21 & \cdots & nogm_1m_21 \end{bmatrix}$$

Here, in the case where the original standard pattern matrix layer Ho and the original input pattern matrix layer No, which are shown in the equations 36 and 37, are normalized by the sum of the densities of the entire pixels by use of the equation 38, and thus the standard pattern matrix layer H and the input pattern matrix layer N, which are shown in the equations 40 and 41, are created, then the following equation 59 is established instead of the equation 20.

[Equation 59]

$$hi_1i_2i_3 = \frac{hoi_1i_2i_3}{\sum_{j_1=1}^{m_1}\sum_{j_2=1}^{m_2}\sum_{j_3=1}^{m_3} hoj_1j_2j_3} \quad (59)$$

$$ni_1i_2i_3 = \frac{noi_1i_2i_3}{\sum_{j_1=1}^{m_1}\sum_{j_2=1}^{m_2}\sum_{j_3=1}^{m_3} noj_1j_2j_3}$$

$(i_1 = 1, 2, 3, \ldots, m_1)$
$(i_2 = 1, 2, 3, \ldots, m_2)$
$(i_3 = 1, 2, 3, \ldots, m_3)$ Moreover, in the case where the original standard pattern matrix layer Ho and the original input pattern matrix layer No, which are shown in the equations 36 and 37, are normalized by the maximum value of the densities of the entire pixels by use of the equation 39, and thus the standard pattern matrix layer H and the input pattern matrix layer N, which are shown in the equations 40 and 41, are created, then the following equation 60 is established instead of the equation 21.

[Equation 60]

$$hi_1i_2i_3 = \frac{hoi_1i_2i_3}{\max\{hoj_1j_2j_3\}} \quad (60)$$

$$ni_1i_2i_3 = \frac{noi_1i_2i_3}{\max\{noj_1j_2j_3\}}$$

$(i_1 = 1, 2, 3, \ldots, m_1)$
$(i_2 = 1, 2, 3, \ldots, m_2)$
$(i_3 = 1, 2, 3, \ldots, m_3)$ Values of denominators in the right sides in the equation 59 are the sums of the densities of the entire pixels of the standard moving image and the input moving image, respectively, which are constants. Moreover, values of denominators in the right sides in the equation 60 are the maximum values of the densities of the entire pixels of the standard moving image and the input moving image, respectively, which are also constants. Accordingly, Ch and Cn are defined as constants, and the equation 59 and the equation 60 are integrated and represented as in the following equation 61 instead of the equation 22.

[Equation 61]
$hi_1i_2i_3 = hoi_1i_2i_3/Ch$
$ni_1i_2i_3 = noi_1i_2i_3/Cn$
$\ldots\ldots\ldots\ldots$ (61)
$(i_1=1,2,3,\ldots,m_1)$
$(i_2=1,2,3,\ldots,m_2)$
$(i_3=1,2,3,\ldots,m_3)$ The equation 61 is substituted into the equation 49, then the equation 56 is used, and thus the following equation 62 is obtained instead of the equation 23.

[Equation 62]

$$hgj_1j_2j_3 = \sum_{i_1=1}^{m_1}\sum_{i_2=1}^{m_2}\sum_{i_3=1}^{m_3} gj_1j_2j_3i_0 \cdot (hoi_1i_2i_3/Ch) \quad (62)$$

$$= hogj_1j_2j_3/Ch$$

$$ngj_1j_2j_3 = \sum_{i_1=1}^{m_1}\sum_{i_2=1}^{m_2}\sum_{i_3=1}^{m_3} gj_1j_2j_3i_0 \cdot (noi_1i_2i_3/Cn)$$

$$= nogj_1j_2j_3/Cn$$

$$(j_1 = 1, 2, 3, \cdots, m_1)$$
$$(j_2 = 1, 2, 3, \cdots, m_2)$$
$$(j_3 = 1, 2, 3, \cdots, m_3)$$

From the equation 62, with regard to ($j_1$=1, 2, ..., $m_1$) ($j_2$=1, 2, ..., $m_2$) ($j_3$=1, 2, ..., $m_3$), it is understood that the element value $hgj_1j_2j_3$ of the weighted standard pattern matrix layer is obtained by dividing the element value $hogj_1j_2j_3$ of the original and weighted standard pattern matrix layer by the constant Ch, and that the element value $ngj_1j_2j_3$ of the weighted input pattern matrix layer is obtained by dividing the element value $nogj_1j_2j_3$ of the original and weighted input pattern matrix layer by the constant Cn.

FIG. 20 is a schematic diagram showing the relationships of the equation 62. Here, FIG. 20 is read to show arrows directed from the origin O to the point of the weighted standard pattern matrix layer Hg, the point of the weighted input pattern matrix layer Ng, the point of the original and weighted standard pattern matrix layer Hog, and the point of the original and weighted input pattern matrix layer Nog, respectively, on an $m_1 \times m_2 \times m_3$ dimensional pattern space. In FIG. 20, a state is shown, where the origin O, the point of the weighted standard pattern matrix layer Hg and the point of the original and weighted standard pattern matrix layer Hog are arrayed on one straight line, and the origin O, the point of the weighted input pattern matrix layer Ng and the point of the original and weighted input pattern matrix layer Nog are arrayed on the other straight line, based on the relationships of the equation 62.

Moreover, from the equation 54, it is understood that the geometric distance $d_E$ can be calculated by carrying out the conventional calculation for the Euclid distance by use of the element value $hgj_1j_2j_3$ of the weighted standard pattern matrix layer and the element value $ngj_1j_2j_3$ of the weighted input pattern matrix layer. In this connection, FIG. 20 shows that the geometric distance $d_E$ becomes a Euclid distance between the point of the weighted standard pattern matrix layer Hg and the point of the weighted input pattern matrix layer Ng.

Meanwhile, in the moving image recognition for the binary moving images and moving images other than the binary moving images, both of which are mixedly present, generally, it is not previously known in many cases whether each input moving image is a binary moving image or a moving image other than the binary moving image. In such a case, judgment cannot be made as to which of the method for normalizing the density pattern of the moving image by the maximum value of the densities of the entire pixels or the method for normalizing the density pattern thereof by the sum of the densities of the entire pixels is to be used for processing the input moving image. Accordingly, the value of the geometric distance $d_E$ shown in the equation 54 will not be usable.

In this connection, with regard to the original and weighted standard pattern matrix layer and the original and weighted input pattern matrix layer, which are created without normalizing the density pattern of the moving image, it is convenient if an angle between these two original and weighted pattern matrix layers, that is, an angle between the straight line OHog and the straight line Onog in FIG. 20, can be used as a similarity scale. Accordingly, the value of the geometric distance $d_A$ can be calculated as a cosine of the angle between the original and weighted standard pattern matrix layer Hog and the original and weighted input pattern matrix layer Nog by the following equation 63 instead of the equation 24. In the equation 63, the geometric distance value $d_A$ is set in a range: $-1 \leq d_A \leq +1$. Moreover, when the shape of the original standard pattern matrix layer Ho and the shape of the original input pattern matrix layer No are similar to each other, accordingly, when the shape of the original and weighted standard pattern matrix layer Hog and the shape of the original and weighted input pattern matrix layer Nog are similar to each other, then the value of the angle between these two original and weighted pattern matrix layers is reduced, and therefore, the geometric distance value $d_A$ becomes a value approximate to +1.

[Equation 63]

$$d_A = \frac{\sum_{j_1=1}^{m_1}\sum_{j_2=1}^{m_2}\sum_{j_3=1}^{m_3} nogj_1j_2j_3 \cdot hogj_1j_2j_3}{\sqrt{\sum_{j_1=1}^{m_1}\sum_{j_2=1}^{m_2}\sum_{j_3=1}^{m_3} (nogj_1j_2j_3)^2} \sqrt{\sum_{j_1=1}^{m_1}\sum_{j_2=1}^{m_2}\sum_{j_3=1}^{m_3} (hogj_1j_2j_3)^2}} \quad (63)$$

The above description for the first subject of the present invention will be summarized as below. As shown in the equation 54 and FIG. 20, the geometric distance $d_E$ between the standard pattern matrix layer H and the input pattern matrix layer N can be calculated as the Euclid distance between the weighted standard pattern matrix layer Hg and the weighted input pattern matrix layer Ng. Meanwhile, as shown in the equation 63 and FIG. 20, the geometric distance $d_A$ between the original standard pattern matrix layer Ho and the original input pattern matrix layer No can be calculated as the cosine of the angle between the original and weighted standard pattern matrix layer Hog and the original and weighted input pattern matrix layer Nog. Note that, as being understood from FIG. 20, the value of the angle between the original and weighted standard pattern matrix layer Hog and the original and weighted input pattern matrix layer Nog is equal to the value of the angle between the weighted standard pattern matrix layer Hg and the weighted input pattern matrix layer Ng, and therefore, the geometric distance $d_A$ may be calculated as the cosine of the angle between the weighted standard pattern matrix layer Hg and the weighted input pattern matrix layer Ng.

As above, description has been made for the solving means for the first subject of the present invention. Next, description will be made for the solving means for the second subject of the present invention.

The on-line handwritten character recognition is a technology of recognizing a written character from the motion of a pen writing the character. In this on-line handwritten character recognition, deformed characters occur for each writing even if the same character is written. Therefore, the method is usually adopted, in which a large number of human beings write the same character repeatedly, and a plurality of standard moving images are registered for each character. In this embodiment, the same characters registered as described above are defined as standard moving images in the same category, and characters different from these are defined as standard moving images in a different category.

Here, if the distance between the standard moving images in the same category is shortened, and simultaneously, the distance between the standard moving images in the different categories is elongated, then, as a result, separation of the standard moving image in the same category and the standard moving image in the different category is improved, and thus recognition performance when an input moving image is given is improved.

However, in the related art (Japanese Patent Application No. 2000-277749), the square of the ratio value obtained by dividing, by the following equation 64, the maximum value $\lambda m_1 11 j_1 j_2 j_3$ of the length between the specified element and each element of the pattern matrix layer by the constant of 1.4 is defined as the value of variance of the normal distribution. Moreover, in the related art (Japanese Patent Application No. 2000-277749), by the precedent equation 42, the entire element numbers of the positive reference pattern vector and the negative reference pattern vector are weighted by the constant of 1. Then, with regard to the $i_1 i_2 i_3$ element ($i_1=1, 2, \ldots, m_1$) ($i_2=1, 2, \ldots, m_2$) ($i_3=1, 2, \ldots, m_3$) of the pattern matrix layer, the absolute value $|n i_1 i_2 i_3 - h i_1 i_2 i_3|$ of the variation between the element value $h i_1 i_2 i_3$ of the standard pattern matrix layer and the element value $n i_1 i_2 i_3$ of the input pattern matrix layer is substituted into the increasing quantity of the positive reference pattern vector or the negative reference pattern vector as it is irrespective of the element number of the reference pattern vector.

[Equation 64]

$$\sigma j_1 j_2 j_3 = \frac{\lambda m_1 11 j_1 j_2 j_3}{1.4} \quad (64)$$

$$(j_1 = 1, 2, 3, \cdots, m_1)$$
$$(j_2 = 1, 2, 3, \cdots, m_2)$$
$$(j_3 = 1, 2, 3, \cdots, m_3)$$

Specifically, in the method of the related art, the reference pattern vector is created by use of the normal distribution having a fixed value of variance, and the reference pattern vector is increased by use of the increasing means having a fixed value of weight. Therefore, the separation of the standard moving image in the same category and the standard moving image in the different category is fixed, and thus the recognition performance when the input moving image is given cannot be improved.

In order to solve the above-described problem, in the present invention, instead of the fixed method of the related art, the reference pattern vector is created by use of the normal distribution having a variable value of variance. and the reference pattern vector is increased by use of the increasing means having a variable value of weight.

In this case, the creation of the reference pattern vector by use of the normal distribution having the variable value of variance and the simultaneous increase of the reference pattern vector by use of the increasing means having the variable value of weight are equivalent to the expansion and contraction of the weighting curve created based on the change rate of the kurtosis of the normal curve in the direction parallel to the u-axis and the simultaneous change of the weighting curve in the direction perpendicular to the u-axis. Therefore, the former one and the latter one can obtain the same effect. Here, the latter one that is simpler in calculation processing as compared with the former one will be used. Moreover, the latter one results in a matter of finding a weighting curve where the separation of the standard moving image in the same category and the standard moving image in the different category is improved most, that is, an optimal weighting curve.

Here, with regard to the case of the latter one, the expansion and contraction of the weighting curve in the direction parallel to the u-axis for changing the range of the weighting curve covering the entire (x-y-time)-normalized space and the expansion and contraction of the weighting curve in the direction parallel to the u-axis as the center of the weighting curve is moved in the (x-y-time)-normalized space are matters of relative expansion and contraction of the weighting curve and the u-axis. Accordingly, in the actual calculation, instead of the expansion and contraction of the weighting curve with respect to the u-axis, the expansion and contraction of the u-axis with respect to the weighting curve may be performed contrarily, both of which are equivalent to each other.

Accordingly, next, with regard to the case of expanding and contracting the u-axis with respect to the weighting curve, description will be made for the method for obtaining the length between the specified element and each element of the pattern matrix layer to calculate the element number $i_o$ of the weighting vector proximate to the position apart from the center of the weighting vector by the above-described length.

First, FIGS. 52A to 53C previously shown will be considered, extended to the three-dimensional (x-y-time)-normalized space. In the precedent equation 64, the range of the normal curve: $-1.4\sigma \leq u \leq +1.4\sigma$ is made to cover the entire (x-y-time)-normalized space. On the contrary, here, $1.4\sigma$ is substituted into the variable Cg, and the range of the weighting curve: $-Cg \leq u \leq +Cg$ is made to cover the entire (x-y-time)-normalized space. Then, as the value of the variable Cg is changed, the u-axis is expanded and contracted with respect to one weighting curve.

In this case, with regard to the expansion and contraction of the u-axis, the length $\lambda i_1 i_2 i_3 j_1 j_2 j_3$ between the point ($j_1, j_2, j_3$) and the point ($i_1, i_2, i_3$) is expanded and contracted in the same ratio as the length $\lambda m_1 11 j_1 j_2 j_3$ between the point ($j_1, j_2, j_3$) and the point ($m_1, 1, 1$) is expanded and contracted. Therefore, the value of a ratio obtained by dividing the length $\lambda i_1 i_2 i_3 j_1 j_2 j_3$ by the length $\lambda m_1 11 j_1 j_2 j_3$ always becomes a constant value irrespective of the expansion and contraction of the u-axis. Accordingly, when a position on the u-axis, which corresponds to the point ($i_1, i_2, i_3$), is defined as $u_o$, the position $u_o$ can be calculated by the following equation 65 instead of the equation 34.

[Equation 65]

for $i_1 = 1, 2, 3, \cdots, m_1;$
$i_2 = 1, 2, 3, \cdots, m_2;$
$i_3 = 1, 2, 3, \cdots, m_3:$ -continued $$u_0 = -Cg \times \frac{\lambda i_1 i_2 i_3 j_1 j_2 j_3}{\lambda m_1 11 j_1 j_2 j_3} \quad (65)$$

$(j_1 = 1, 2, 3, \cdots, m_1)$
$(j_2 = 1, 2, 3, \cdots, m_2)$
$(j_3 = 1, 2, 3, \cdots, m_3)$ Second, FIGS. 54A to 55B previously shown will be considered, extended to the three-dimensional (x-y-time)-normalized space. Here, the u-axis is expanded and contracted with respect to one weighting curve as the center of the weighting curve moves in the (x-y-time)-normalized space. In this case, the value of the variable Cg (or variable Cg*) is the same irrespective of the movement of the center of the weighting curve. Accordingly, the position $u_o$ can be calculated by the equation 65.

From the above description, the following is understood with regard to the case of expanding and contracting the u-axis with respect to one weighting curve. Namely, the value of the variable Cg is previously set so that the range of: $-Cg \leq u \leq +Cg$ of the weighting curve can cover the entire (x-y-time)-normalized space. Subsequently, the length $\lambda i_1 i_2 i_3 j_1 j_2 j_3$ between the specified element and each element of the pattern matrix layer and the maximum value $\lambda m_1 11 j_1 j_2 j_3$ of the length between the specified element and each element are obtained, and these lengths are assigned into the equation 65 to obtain the position $u_o$. Thus, $i_o$ as the weighting vector element number proximate to the above-described position $u_o$ can be calculated. Moreover, according to the processing method as described above, even if the $m_1 \times m_2 \times m_3$ pieces of weighting vectors are not previously created with regard to the respective cases corresponding to the $j_1 j_2 j_3$ elements ($j_1 = 1, 2, \ldots, m_1$) ($j_2 = 1, 2, \ldots, m_2$) ($j_3 = 1, 2, \ldots, m_3$), only by creating one weighting vector, calculation can be made for the $m_1 \times m_2 \times m_3$ pieces of element values $hg j_1 j_2 j_3$ of the weighted standard pattern matrix layer and the $m_1 \times m_2 \times m_3$ pieces of element values $ng j_1 j_2 j_3$ of the weighted input pattern matrix layer (or the $m_1 \times m_2 \times m_3$ pieces of element values $hog j_1 j_2 j_3$ of the original and weighted standard pattern matrix layer and the $m_1 \times m_2 \times m_3$ pieces of element values $nog j_1 j_2 j_3$ of the original and weighted input pattern matrix layer).

Incidentally, the optimal weighting curve is related to the density shapes of the entire registered standard moving images, and therefore, in the case where the registered standard moving images are different from each other, then the optimal weighting curves will differ from each other. Accordingly, it is necessary to find an optimal weighting curve among weighting curves of arbitrary shapes.

Accordingly, next, description will be made for a method for obtaining an optimal weighting curve and an optimal value of the variable Cg according to the optimal weighting curve among the weighting curves of arbitrary shapes with reference to FIGS. 56 to 59. Note that, in FIGS. 56 and 57, the standard image is read as the standard moving image, and in Step Sc4 in FIG. 56, the equation 13 is read as the equation 50. Moreover, in Step Sc5-3 in FIG. 57, the equation 4, the equation 34, the equation 12, the equation 14 and the equation 16 are read as the equations 40 and 41, the equation 65, the equation 49, the equations 51 and 52 and the equation 54, respectively. In this case, FIGS. 56 and 57 become flowcharts showing processing procedures for calculating an optimal weighting curve and an optimal value of the variable Cg according to the optimal weighting curve with regard to the case of using the geometric distance $d_E$ as a similarity scale between the standard moving images.

Specifically, as shown in FIGS. 56 and 57, a weighting curve is previously created based on the change rate of the kurtosis of the normal curve having a value of variance of 1, and the weighting curve is multiplied by positive values of weight to create a plurality of weighting curves with weight. Then, a weighting vector having a function value of one of the weighting curves as an element is created. Next, calculation is made for a ratio values $R_E(Cg)$ of mean values, which are obtained by dividing the mean geometric distance values between the standard moving images in the same category by the mean geometric distance values between the standard moving images in the different categories, while changing the value of the variable Cg. Thus, the minimum value of the ratio values $R_E(Cg)$ of the mean values is obtained. This minimum value is obtained repeatedly for the entire weighting curves described above, and a weighting curve corresponding to the minimum value among the minimum values of the ratio values $R_E(Cg)$ of the mean values is defined as an optimal weighting curve, and a value of the variable Cg corresponding to weighting curve is defined as an optimal value of the variable Cg according to the optimal weighting curve.

Moreover, the function value of the optimal weighting curve obtained as described above is defined as a weighting factor, and the weighting vector having the value of the above-described weighting factor as an element is created. Thus, the distance between the standard moving images in the same category can be shortened, and simultaneously the distance between the standard moving images in the different categories can be elongated. As a result thereof, the separation of the standard moving image in the same category and the standard moving image in the different category is improved, and thus the recognition performance when an input moving image is given is improved.

Meanwhile, in FIGS. 58 and 59, the standard image is read as the standard moving image, and in Step Sd4 in FIG. 58, the equation 13 is read as the equation 50. Moreover, in Step Sd5-3 in FIG. 59, the equation 1, the equation 34, the equation 18, the equation 19 and the equation 24 are read as the equations 36 and 37, the equation 65, the equation 56, the equations 57 and 58 and the equation 63, respectively. In this case, FIGS. 58 and 59 become flowcharts showing processing procedures for calculating an optimal weighting curve and an optimal value of the variable Cg according to the optimal weighting curve with regard to the case of using the geometric distance $d_A$ as a similarity scale between the standard moving images.

Specifically, as shown in FIGS. 58 and 59, a weighting curve is previously created based on the change rate of the kurtosis of the normal curve having a value of variance of 1, and the weighting curve is multiplied by positive values of weight to create a plurality of weighting curves with weight. Then, a weighting vector having a function value of one of the weighting curves as an element is created. Next, calculation is made for difference values $R_A(Cg)$ of mean values, which are obtained by subtracting the mean geometric distance values between the standard moving images in the different categories from the mean geometric distance values between the standard moving images in the same category, while changing the value of the variable Cg. Thus, the maximum value of the difference values $R_A(Cg)$ of the mean values is obtained. This maximum value is obtained repeatedly for the entire weighting curves described above, and a weighting curve corresponding to the maximum value among the maximum values of the difference values $R_A(Cg)$ of the mean values is optimized, and a value of the variable Cg corresponding to the weighting curve is defined as an optimal value of the variable Cg according to the optimal weighting curve.

Moreover, the function value of the optimal weighting curve obtained as described above is defined as a weighting factor, and the weighting vector having the value of the above-described weighting factor as an element is created. Thus, the distance between the standard moving images in the same category can be shortened, and simultaneously the distance between the standard moving images in the different categories can be elongated. As a result thereof, the separation of the standard moving image in the same category and the standard moving image in the different category is improved, and thus the recognition performance when an input moving image is given is improved.

Generally expressing the above-described matter, the obtainment of the optimal weighting curve and the optimal value of the variable Cg results in solving a question of optimization for obtaining values of $(m_o+1)$ pieces of variables minimizing or maximizing an objective function when the ratio value $R_E(Cg)$ of the mean values or the difference value $R_A(Cg)$ of the mean values is defined as the objective function, and the element values $gj_1j_2j_3i_o$ ($i_o=1, 2, \ldots, m_o$) of the weighting vector and the value of the variable Cg are defined as the $(m_o+1)$ pieces of variables. With regard to the question of optimization, in the field of the numerical calculation method, numerical solutions such as the method of steepest descent and the Newton's method are proposed. These numerical solutions change the values of the variables in a direction where the objective function is rapidly decreased or increased, thus calculate the optimal value of the variable by small number of calculation times. Also in the present invention, by use of these numerical solutions, it is made possible to calculate the optimal weighting curve and the optimal value of the variable Cg efficiently. Accordingly, instead of previously creating the weighting curve with weight in Step Sc2 in FIG. 56 or in Step Sd2 in FIG. 58, alteration may be made so as to create the weighting curve with weight for each circulation of the loop in Step Sc4 in FIG. 56 or in Step Sd4 in FIG. 58, where the above-described numerical solutions may be utilized. Specifically, the count-th weighting curve with weight and the count-th value of the variable Cg may be changed in the direction where the ratio value $R_E(Cg)$ of the mean values or the difference value $R_A(Cg)$ of the mean values is rapidly decreased or increased to obtain the (count+1)-th weighting curve with weight and the (count+1)-th value of the variable Cg.

Moreover, for generally considering the above-described matter, next, description will be made for a relationship between the conventional Euclid distance and the geometric distance $d_E$ according to the present invention. In this embodiment, consideration is limitedly made for the case where, when the weighting curve is changed in the direction perpendicular to the u-axis, the functional value of the changed weighting curve when u=0 becomes positive, and the changed weighting curve intersects the u-axis on two points and becomes symmetric with respect to u=0 similarly to the curve shown in FIG. 46B. Here, consideration will be made for the case where the weighting curve particularly becomes the Dirac's delta function as a result of loosening the above-described limitation and changing the weighting curve in the direction perpendicular to the u-axis in the geometric distance $d_E$. Specifically, in the weighting vector, in the case where $gj_1j_2j_3i_o=1$ when $i_o=(m_o+1)/2$ and $gj_1j_2j_3i_o=0$ when $i_o \ne (m_o+1)/2$, the equation 49 is established as: $hgj_1j_2j_3=hj_1j_2j_3$ and $ngj_1j_2j_3=nj_1j_2j_3$ ($j_1=1, 2, \ldots, m_1$) ($j_2=1, 2, \ldots, m_2$) ($j_3=1, 2, \ldots, m_3$). In this case, the weighted standard pattern matrix layer and the weighted input pattern matrix layer become the standard pattern matrix layer and the input pattern matrix layer, respectively. Therefore, in the above particular case, the geometric distance $d_E$ shown in the equation 54 becomes equal to the conventional Euclid distance. Specifically, the geometric distance $d_E$ is placed as the one in which the conventional Euclid distance is expanded and generalized.

Meanwhile, description will be made for a relationship between the conventional cosine of the angle and the geometric distance $d_A$ according to the present invention. In this embodiment, consideration is limitedly made for the case where, when the weighting curve is changed in the direction perpendicular to the u-axis, the functional value of the changed weighting curve when u=0 becomes positive, and the changed weighting curve intersects the u-axis on two points and becomes symmetric with respect to u=0 similarly to the curve shown in FIG. 46B. Here, consideration will be made for the case where the weighting curve particularly becomes the Dirac's delta function as a result of loosening the above-described limitation and changing the weighting curve into the direction perpendicular to the u-axis in the geometric distance $d_A$. Namely, in the weighting vector, in the case where $gj_1j_2j_3i_o=1$ when $i_o=(m_o+1)/2$ and $gj_1j_2j_3i_o=0$ when $i_o \ne (m_o+1)/2$, the equation 56 is established as: $hogj_1j_2j_3=hoj_1j_2j_3$ and $nogj_1j_2j_3=noj_1j_2j_3$ ($j_1=1, 2, \ldots, m_1$) ($j_2=1, 2, \ldots, m_2$) ($j_3=1, 2, \ldots, m_3$). In this case, the original and weighted standard pattern matrix layer and the original and weighted input pattern matrix layer become equal to the original standard pattern matrix layer and the original input pattern matrix layer, respectively. Therefore, in the above particular case, the geometric distance $d_A$ shown in the equation 63 becomes equal to the conventional cosine of the angle. Specifically, the geometric distance $d_A$ is placed as the one in which the conventional cosine of the angle is expanded and generalized.

Moreover, consideration will be made for the above-described matter in comparison with the prior art. In the calculation processing of the geometric distance $d_E$, the weighted standard pattern matrix layer is created by the product-sum operation of the element value of the weighting vector and the element value of the standard pattern matrix layer. Independently thereof, the weighted input pattern matrix layer is created by the product-sum operation of the element value of the same weighting vector and the element value of the input pattern matrix layer. Then, by use of the weighted standard pattern matrix layer and the weighted input pattern matrix layer, the conventional calculation for the Euclid distance is carried out. Here, in another expression of this calculation processing, the standard pattern matrix layer undergoes digital filter processing by means of the weighting vector to create the weighted standard pattern matrix layer. Independently of this creation, the input pattern matrix layer undergoes digital filter processing by means of the same weighting vector to create the weighted input pattern matrix layer. Then, by use of the weighted standard pattern matrix layer and the weighted input pattern matrix layer, the conventional calculation for the Euclid distance is carried out. Accordingly, the calculation processing of the geometric distance $d_E$ can be formally expressed as a combination of the digital filter processing and the Euclid distance. However, while the conventional digital filter and Euclid distance are conceived as single and separate individually, in the calculation processing of the geometric distance $d_E$, as shown in FIG. 56, the weighting vector is created so that the ratio value $R_E(Cg)$ of the mean values can be minimum. Specifically, the calculation processing of the geometric distance $d_E$ can be said to be substantially a processing method different from the prior art in which the digital filter processing and the Euclid distance are closely related to each other even if the calculation processing is formally the combination of both of them.

Meanwhile, in the calculation processing of the geometric distance $d_A$, the original and weighted standard pattern matrix layer is created by the product-sum operation of the element value of the weighting vector and the element value of the original standard pattern matrix layer. Independently thereof, the original and weighted input pattern matrix layer is created by the product-sum operation of the element value of the same weighting vector and the element value of the original input pattern matrix layer. Then, by use of the original and weighted standard pattern matrix layer and the original and weighted input pattern matrix layer, the conventional calculation for the cosine of the angle is carried out. Here, in another expression of this calculation processing, the original standard pattern matrix layer undergoes digital filter processing by means of the weighting vector to create the original and weighted standard pattern matrix layer. Independently thereof, the original input pattern matrix layer undergoes digital filter processing by means of the same weighting vector to create the original and weighted input pattern matrix layer. Then, by use of the original and weighted standard pattern matrix layer and the original and weighted input pattern matrix layer, the conventional calculation for the cosine of the angle is carried out. Accordingly, the calculation processing of the geometric distance $d_A$ can be formally expressed as a combination of the digital filter processing and the cosine of the angle. However, while the conventional digital filter and cosine of the angle are conceived as single and individual each, in the calculation processing of the geometric distance $d_A$, as shown in FIG. 58, the weighting vector is created so that the difference value $R_A(Cg)$ of the mean values can be maximum. Specifically, the calculation processing of the geometric distance $d_A$ can be said to be substantially a processing method different from the prior art in which the digital filter processing and the cosine of the angle are closely related to each other even if the calculation processing is formally the combination thereof.

The above description for the second subject of the present invention will be summarized as below. In the case of using the geometric distance $d_E$ as the similarity scale between the respective standard moving images, while changing the weighting curve in the direction perpendicular to the u-axis and the direction parallel to the u-axis, the ratio value of the mean values is obtained by dividing the mean geometric distance value between the standard moving images in the same category by the mean geometric distance value between the standard moving images in the different categories, and thus the weighting curve minimizing the ratio value of the mean values is calculated. Then, the function value of the above-described weighting curve is defined as a weighting factor, and the weighting vector having the value of the above-described weighting factor as an element is created to calculate the geometric distance value. Thus, the distance between the standard moving images in the same category can be shortened, and simultaneously the distance between the standard moving images in the different categories can be elongated. As a result thereof, the separation of the standard moving image in the same category and the standard moving image in the different category is improved, and thus the recognition performance when an input moving image is given is improved.

Meanwhile, in the case of using the geometric distance $d_A$ as the similarity scale between the respective standard moving images, while changing the weighting curve in the direction perpendicular to the u-axis and the direction parallel to the u-axis, the difference value of the mean values, which is obtained by subtracting the mean geometric distance value between the standard moving images in the different categories from the mean geometric distance value between the standard moving images in the same category, is obtained, and thus the weighting curve maximizing the difference value of the mean values is calculated. Then, the function value of the above-described weighting curve is defined as a weighting factor, and the weighting vector having the value of the above-described weighting factor as an element is created to calculate the geometric distance value. Thus, the distance between the standard moving images in the same category can be shortened, and simultaneously the distance between the standard moving images in the different categories can be elongated. As a result thereof, the separation of the standard moving image in the same category and the standard moving image in the different category is improved, and thus the recognition performance when an input moving image is given is improved.

The moving image recognition is carried out by use of the geometric distance value $d_E$ between the standard pattern matrix layer and the input pattern matrix layer or the geometric distance value $d_A$ between the original standard pattern matrix layer and the original input pattern matrix layer, each of which is calculated as described above.

Concretely, when the original standard pattern matrix layer having the feature quantity of the standard moving image as an element and the original input pattern matrix layer having the feature quantity of the input moving image as an element are created, in the case where the method for normalizing the density pattern of the moving image is previously instructed, the density pattern of the moving image is normalized by the instructed method to create the standard pattern matrix layer and the input pattern matrix layer. Moreover, the weighting vector having the value of the change rate of the kurtosis of the reference pattern vector as an element is created. Then, the weighted standard pattern matrix layer is created by the product-sum operation of the element value of the weighting vector and the element value of the standard pattern matrix layer. And independently of this creation, the weighted input pattern matrix layer is created by the product-sum operation of the element value of the same weighting vector and the element value of the input pattern matrix layer. Next, the conventional calculation for the Euclid distance is carried out by use of these weighted standard pattern matrix layer and weighted input pattern matrix layer, and thus the geometric distance value between the standard pattern matrix layer and the input pattern matrix layer is calculated.

Furthermore, instead of the above-described weighting vector, the ratio value of the mean values, which is obtained by dividing the mean geometric distance value between the standard moving images in the same category by the mean geometric distance value between the standard moving images in the different categories, is obtained, and the weighting vector having the value of the weighting factor minimizing the above ratio value of the mean values as an element is created. By use of this weighting vector, the geometric distance value between the standard pattern matrix layer and the input pattern matrix layer can be calculated.

The geometric distance value thus obtained is compared with an arbitrarily set allowed value. When the geometric distance value is larger than the allowed value, the input moving image is judged not to be the standard moving image. When the geometric distance value is equal to/smaller than the allowed value, the input moving image is judged to be the standard moving image.

Meanwhile, when the original standard pattern matrix layer having the feature quantity of the standard moving image as an element and the original input pattern matrix layer having the feature quantity of the input moving image as an element are created, in the case where the method for normalizing the density pattern of the moving image is not previously instructed, the density pattern of the moving image is not normalized, and the original standard pattern matrix layer and the original input pattern matrix layer are used as they are. Moreover, the weighting vector having the value of the change rate of the kurtosis of the reference pattern vector as an element is created. Then, the original and weighted standard pattern matrix layer is created by the product-sum operation of the element value of the weighting vector and the element value of the original standard pattern matrix layer. And independently of this creation, the original and weighted input pattern matrix layer is created by the product-sum operation of the element value of the same weighting vector and the element value of the original input pattern matrix layer. Next, the conventional calculation for the cosine of the angle is carried out by use of these original and weighted standard pattern matrix layer and original and weighted input pattern matrix layer, and thus the geometric distance value between the original standard pattern matrix layer and the original input pattern matrix layer is calculated.

Furthermore, instead of the above-described weighting vector, the difference value of the mean values, which is obtained by subtracting the mean geometric distance value between the standard moving images in the different categories from the mean geometric distance value between the standard moving images in the same category, is obtained, and the weighting vector having the value of the weighting factor maximizing the above difference value of the mean values as an element is created. By use of this weighting vector, the geometric distance value between the original standard pattern matrix layer and the original input pattern matrix layer can be calculated.

The geometric distance value thus obtained is compared with an arbitrarily set allowed value. When the geometric distance value is smaller than the allowed value, the input moving image is judged not to be the standard moving image. When the geometric distance value is equal to/larger than the allowed value, the input moving image is judged to be the standard moving image.

Embodiment (V): Method for Recognizing Solid (Three-Dimension)

Next, description will be made for the method for recognizing a solid by use of a detected value of a similarity between two pattern matrix layers (or original pattern matrix layers). In this embodiment, in order to recognize a solid, a density (mass per volume) pattern of the solid is normalized by the entire mass or the maximum value of the density, and thus a standard pattern matrix layer and an input pattern matrix layer are created. Moreover, a weighting vector having a value of a change rate in kurtosis of a reference pattern vector as an element is created. Then, an element value of the weighting vector and an element value of the standard pattern matrix layer are subjected to a product-sum operation, and thus a weighted standard pattern matrix layer is created. Independently thereof, the element value of the same weighting vector and an element value of the input pattern matrix layer are subjected to the product-sum operation, and thus a weighted input pattern matrix layer is created. Subsequently, a conventional calculation for the Euclid distance is carried out by use of these weighted standard pattern matrix layer and weighted input pattern matrix layer, and thus the similarity of the solids is detected.

Meanwhile, an original standard pattern matrix layer and an original input pattern matrix layer are created without normalizing the density pattern of the solid. Then, the element value of the weighting vector and an element value of the original standard pattern matrix layer are subjected to the product-sum operation, and thus an original and weighted standard pattern matrix layer is created. Independently thereof, the element value of the same weighting vector and an element value of the original input pattern matrix layer are subjected to the product-sum operation, and thus an original and weighted input pattern matrix layer is created. Subsequently, a conventional calculation for the cosine of the angle is carried out by use of these original and weighted standard pattern matrix layer and original and weighted input pattern matrix layer, and thus the similarity of the solids is detected.

Furthermore, the element value of the weighting vector is adjusted so that a distance between standard pattern matrix layers (or between original standard pattern matrix layers) in the same category can be shortened, and that a distance between standard pattern matrix layers (or between original standard pattern matrix layers) in different categories can be elongated simultaneously. Then, the similarity of the solids is detected by use of the weighting vector having been adjusted, and by use of a detected value thereof, the solid is recognized.

Figure 67:
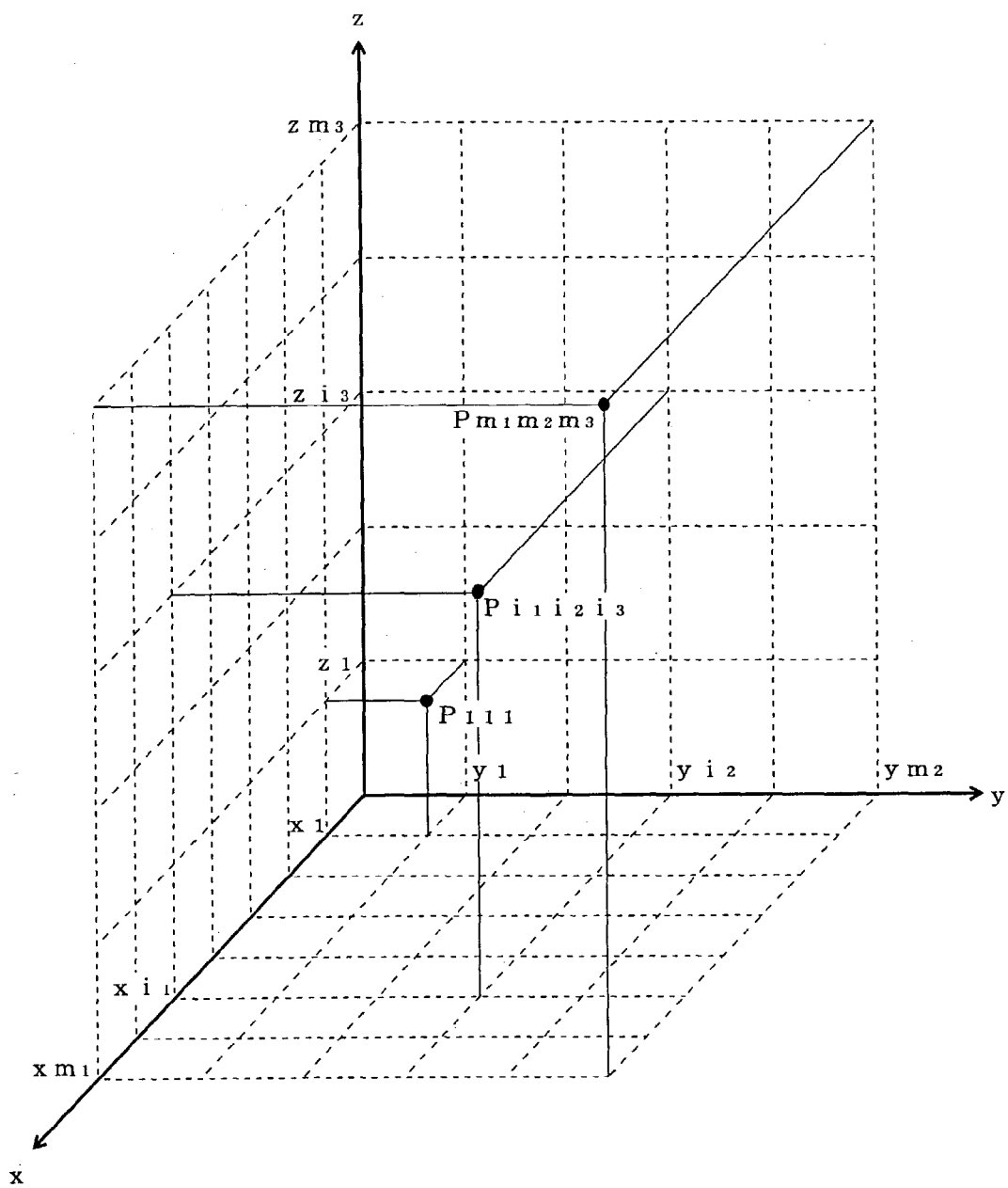
FIG. 67 is a diagram showing a density distribution of a solid.

FIG. 67 shows a density (mass per volume) distribution of a solid. As shown in FIG. 67, the solid is constituted of $m_1 \times m_2 \times m_3$ pieces of sections obtained by partitioning the solid into $m_1$ pieces in an x-direction, $m_2$ pieces in a y-direction and $m_3$ pieces in a z-direction. Here, a density of the solid in a section of the $i_1$-th in the x-direction, of the $i_2$-th in the y-direction and of the $i_3$-th of the z-direction is defined as $Pi_1i_2i_3$.

Next, an original standard pattern matrix layer Ho having a density $Pi_1i_2i_3$ ($i_1=1, 2, \ldots, m_1$) ($i_2=1, 2, \ldots, m_2$) ($i_3=1, 2, \ldots, m_3$) of a standard solid as an element and an original input pattern matrix layer No having a density $Pi_1i_2i_3$ ($i_1=1, 2, \ldots, m_1$) ($i_2=1, 2, \ldots, m_2$) ($i_3=1, 2, \ldots, m_3$) of an input solid as an element are created. These original standard pattern matrix layer Ho and original input pattern matrix layer No are previously expressed as in the equations 36 and 37. Note that the equations 36 and 37 are read to express the shapes of the densities of the standard solid and the input solid, respectively, by the $m_1 \times m_2 \times m_3$ pieces of element values of the original pattern matrix layer.

Incidentally, in the solid recognition, for example, in the case of measuring the density of a solid by use of a density of a three-dimensional computerized tomography (CT) image, even in the same solid, a density distribution varied for each measurement appears. Therefore, a method is usually adopted, in which the same solid is measured repeatedly, and a plurality of standard solids are registered for each solid. In this embodiment, the density distributions of the same solid registered as described above are defined as standard solids in the same category, and density distributions of a solid, which are different from these, are defined as standard solids in a different category.

Then, the similarity detection procedure for the moving images, which is described above, is applied to the original standard pattern matrix layer Ho and the original input pattern matrix layer No for the solid, which are created in the above, and thus the solid recognition is carried out.

Concretely, when the original standard pattern matrix layer having the feature quantity of the standard solid as an element and the original input pattern matrix layer having the feature quantity of the input solid as an element are created, in the case where the method for normalizing the density pattern of the solid is previously instructed, the density pattern of the solid is normalized by the instructed method to create the standard pattern matrix layer and the input pattern matrix layer. Moreover, the weighting vector having the value of the change rate of the kurtosis of the reference pattern vector as an element is created. Then, the weighted standard pattern matrix layer is created by the product-sum operation of the element value of the weighting vector and the element value of the standard pattern matrix layer. Independently thereof, the weighted input pattern matrix layer is created by the product-sum operation of the element value of the same weighting vector and the element value of the input pattern matrix layer. Next, the conventional calculation for the Euclid distance is carried out by use of these weighted standard pattern matrix layer and weighted input pattern matrix layer, and thus the geometric distance value between the standard pattern matrix layer and the input pattern matrix layer is calculated.

Furthermore, instead of the above-described weighting vector, the ratio value of the mean values, which is obtained by dividing the mean geometric distance value between the standard solids in the same category by the mean geometric distance value between the standard solids in the different categories, is obtained, and the weighting vector having the value of the weighting factor minimizing the above ratio value of the mean values as an element is created. By use of this weighting vector, the geometric distance value between the standard pattern matrix layer and the input pattern matrix layer can be calculated.

The geometric distance value thus obtained is compared with an arbitrarily set allowed value. When the geometric distance value is larger than the allowed value, the input solid is judged not to be the standard solid. When the geometric distance value is equal to/smaller than the allowed value, the input solid is judged to be the standard solid.

Meanwhile, when the original standard pattern matrix layer having the feature quantity of the standard solid as an element and the original input pattern matrix layer having the feature quantity of the input solid as an element are created, in the case where the method for normalizing the density pattern of the solid is not previously instructed, the density pattern of the solid is not normalized, and the original standard pattern matrix layer and the original input pattern matrix layer are used as they are. Moreover, the weighting vector having the value of the change rate of the kurtosis of the reference pattern vector as an element is created. Then, the original and weighted standard pattern matrix layer is created by the product-sum operation of the element value of the weighting vector and the element value of the original standard pattern matrix layer. Independently thereof, the original and weighted input pattern matrix layer is created by the product-sum operation of the element value of the same weighting vector and the element value of the original input pattern matrix layer. Next, the conventional calculation for the cosine of the angle is carried out by use of these original and weighted standard pattern matrix layer and original and weighted input pattern matrix layer, and thus the geometric distance value between the original standard pattern matrix layer and the original input pattern matrix layer is calculated.

Furthermore, instead of the above-described weighting vector, the difference value of the mean values, which is obtained by subtracting the mean geometric distance value between the standard solids in the different categories from the mean geometric distance value between the standard solids in the same category, is obtained, and the weighting vector having the value of the weighting factor maximizing the above difference value of the mean values as an element is created. By use of this weighting vector, the geometric distance value between the original standard pattern matrix layer and the original input pattern matrix layer can be calculated.

The geometric distance value thus obtained is compared with an arbitrarily set allowed value. When the geometric distance value is smaller than the allowed value, the input solid is judged not to be the standard solid. When the geometric distance value is equal to/larger than the allowed value, the input solid is judged to be the standard solid.

Embodiment (VI): Method for Recognizing Voice (One-Dimension)

Description will be made for the method for recognizing a voice by use of a detected value of a similarity between two pattern vectors (or original pattern vectors). In this embodiment, in order to recognize a voice, a power spectrum pattern of the voice is normalized by the entire energy of the power spectrum or the maximum value of the power spectrum, and thus a standard pattern vector and an input pattern vector are created. Moreover, a weighting vector having a value of a change rate in kurtosis of a reference pattern vector as an element is created. Then, an element value of the weighting vector and an element value of the standard pattern vector are subjected to a product-sum operation, and thus a weighting standard pattern vector is created. Independently thereof, the element value of the same weighting vector and an element value of the input pattern vector are subjected to the product-sum operation, and thus a weighted input pattern vector is created. Subsequently, a conventional calculation for the Euclid distance is carried out by use of these weighted standard pattern vector and weighted input pattern vector, and thus the similarity of the voices is detected.

Meanwhile, an original standard pattern vector and an original input pattern vector are created without normalizing the power spectrum pattern of the voice. Then, the element value of the above-described weighting vector and an element value of the original standard pattern vector are subjected to the product-sum operation, and thus an original and weighted standard pattern vector is created. Independently thereof, the element value of the same weighting vector and an element value of the original input pattern vector are subjected to the product-sum operation, and thus an original and weighted input pattern vector is created. Subsequently, a conventional calculation for the cosine of the angle is carried out by use of these original and weighted standard pattern vector and original and weighted input pattern vector, and thus the similarity of the voices is detected.

Furthermore, the element value of the above-described weighting vector is adjusted so that a distance between standard pattern vectors (or between original standard pattern vectors) in the same category can be shortened, and that a distance between standard pattern vectors (or between original standard pattern vectors) in different categories can be elongated simultaneously. Then, the similarity of the voices is detected by use of the weighting vector having been adjusted, and by use of a detected value thereof, the voice is recognized.

Here, the method for detecting a similarity between a standard pattern matrix and an input pattern matrix (or an original standard pattern matrix and an original input pattern matrix) with regard to the image, the voice, the oscillation wave and the like, which is previously described, is applied to the method for detecting a similarity between a standard pattern vector and an input pattern vector (or an original standard pattern vector and an original input pattern vector).

Note that, in the prior art (the gazette of Japanese Patent Laid-Open No. Hei 10(1998)-253444 (Japanese Patent Application No. Hei 9(1997)-61007)), the number of elements of the positive reference pattern vector and the negative reference pattern vector is equal to the number of elements of the standard pattern vector and the input pattern vector. Moreover, the value of variance of the normal distribution is always equal to 1 irrespective of the movement of the center of the normal curve.

On the contrary, in this embodiment, similarly to the related art (Japanese Patent Application No. 2000-277749), the number of elements of the positive reference pattern vector and the negative reference pattern vector is different from the number of elements of the standard pattern vector and the input pattern vector. Moreover, as the center of the normal curve is moved, the value of variance of the normal distribution is changed. Accordingly, prior to description for the embodiment of the present invention, amendment and addition shown below will be made for the prior art (the gazette of Japanese Patent Laid-Open No. Hei 10(1998)-253444 (Japanese Patent Application No. Hei 9(1997)-61007)).

First, in the equation of the paragraph [0041] of the prior art (the gazette of Japanese Patent Laid-Open No. Hei 10(1998)-253444 (Japanese Patent Application No. Hei 9(1997)-61007)), the number of elements of the standard pattern vector H and the input pattern vector N is m, which is amended as $m_1$.

Figure 68:
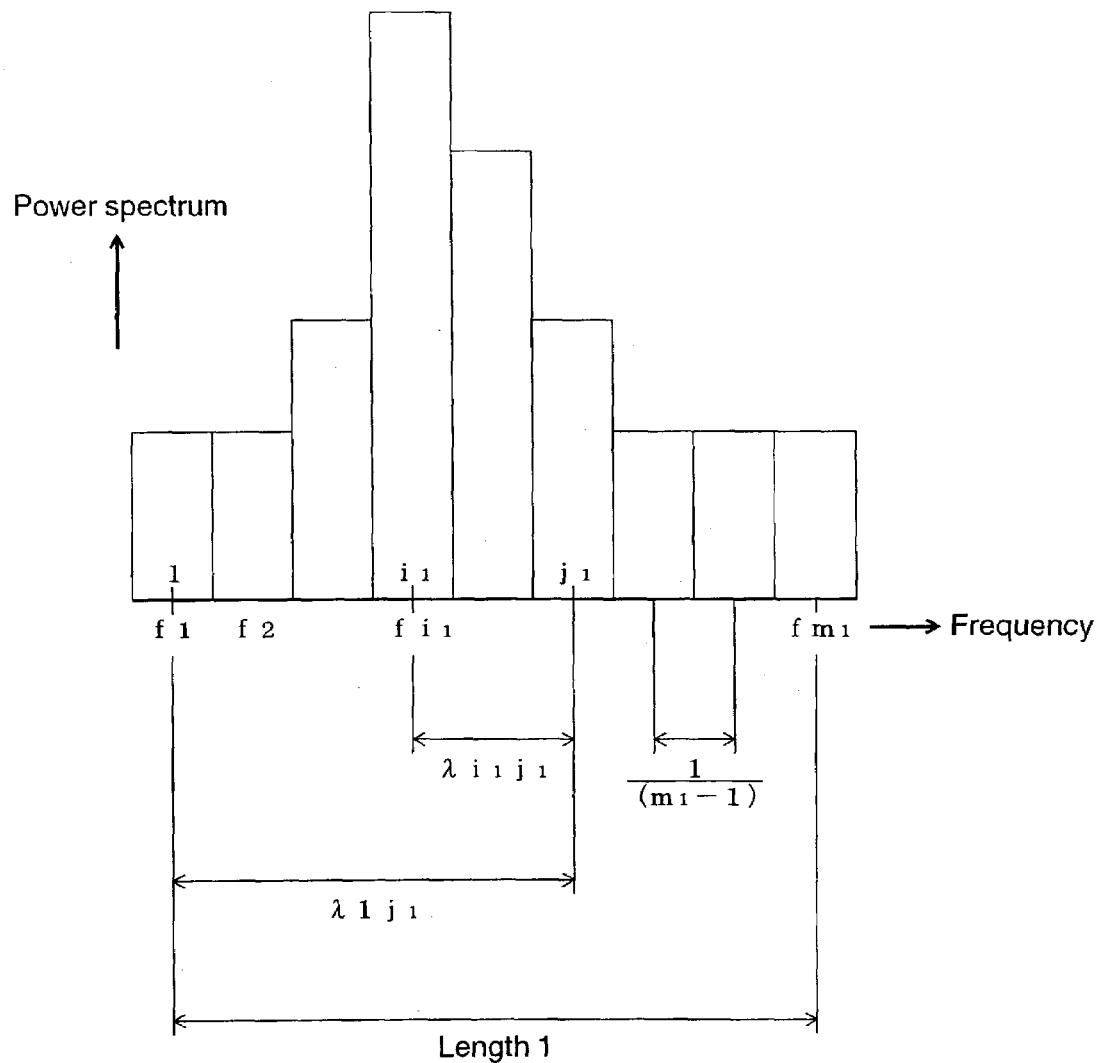
FIG. 68 is a diagram showing frequency-normalized segments.

Next, FIG. 68 is a schematic diagram of a voice power spectrum having the $m_1$ pieces of frequency bands, showing frequency-normalized segments with a length of a frequency axis set to 1. In this embodiment, in the case which bandwidths of the frequency bands are different each other, FIG. 68 was constructed so that the elements of the power spectrum are allocated in same pitch. Accordingly, as shown in FIG. 68, a length between the elements becomes $1/(m_1-1)$. In FIG. 68, a point $j_1$ and a point $i_1$ on the frequency-normalized segments are shown. Moreover, a point 1 that is the farthest from the point $j_1$ among the entire points on the same segments is also shown. Accordingly, a length $\lambda i_1 j_1$ between the point $j_1$ and the point $i_1$ can be calculated by the following equation 66. Similarly, a length $\lambda 1 j_1$ between the point $j_1$ and the point 1 can be calculated by the following equation 67. $\lambda 1 j_1$ is the maximum value of the length between the point $j_1$ and each point.

[Equation 66]

$$\lambda i_1 j_1 = \frac{|i_1 - j_1|}{|m_1 - 1|} \quad (66)$$

$$(j_1 = 1, 2, 3, \cdots, m_1)$$

[Equation 67]

$$\lambda 1 j_1 = \frac{|1 - j_1|}{|m_1 - 1|} \quad (67)$$

$$(j_1 = 1, 2, 3, \cdots, m_1)$$

Figure 69A:
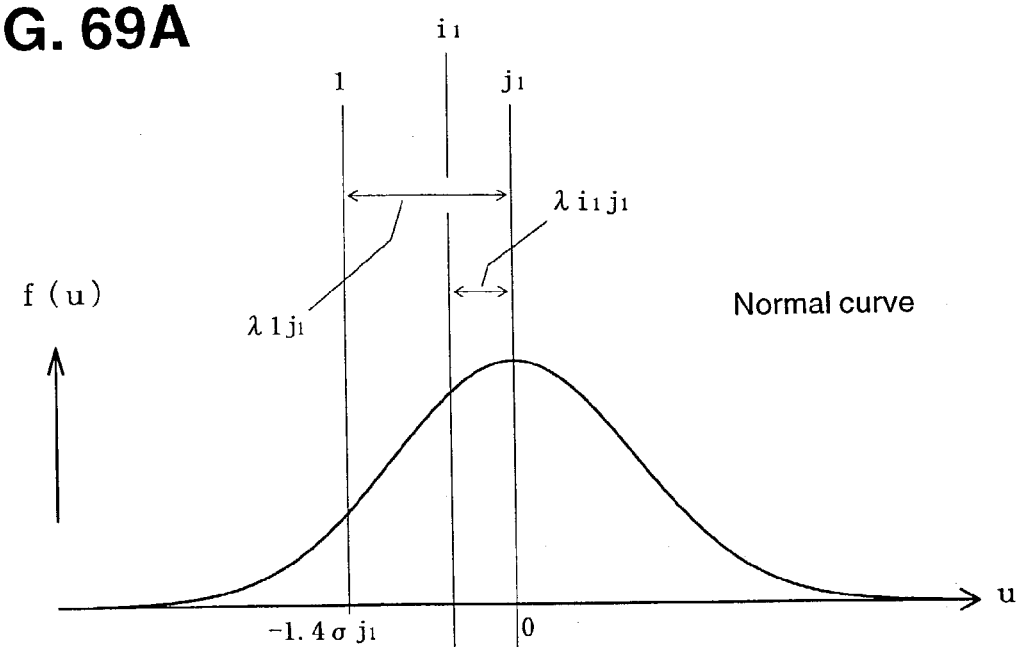
FIG. 69A is a diagram showing still another example of the normal curve.
Figure 69B:
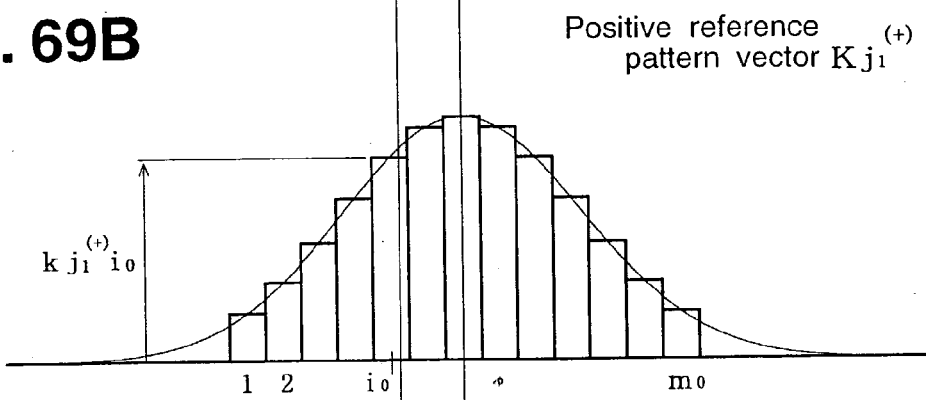
FIG. 69B is a diagram showing still another example of the positive reference pattern vector having the value of the normal curve as the element.
Figure 69C:
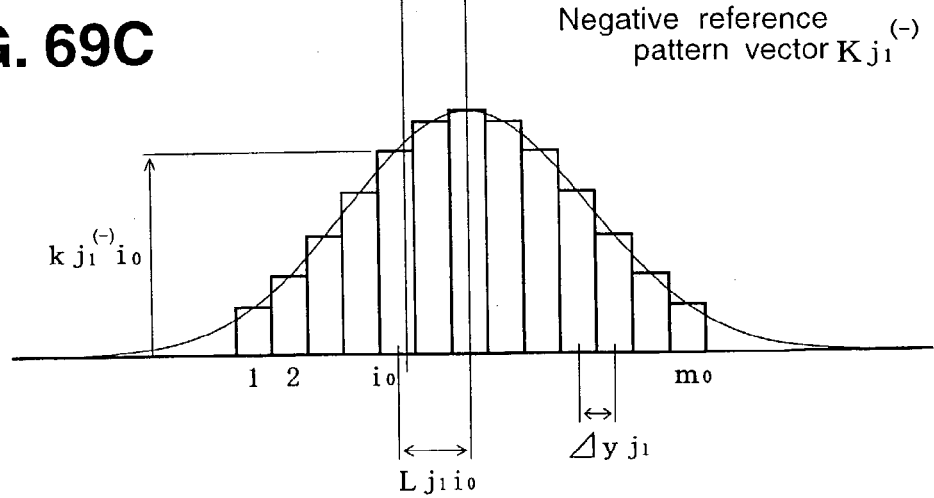
FIG. 69C is a diagram showing still another example of the negative reference pattern vector having the value of the normal curve as the element.

FIG. 69A shows a graph of a normal distribution (normal curve) when the mean value is set as: $\mu=0$ and the variance is set as $\sigma j_1^2$. Moreover, FIGS. 69B and 69C show bar graphs, each having a height equal to a function value of the normal curve. A positive reference pattern vector $Kj_1^{(+)}$ having a value of the height of this bar graph as an element is created as shown in FIG. 69B, and a negative reference pattern vector $Kj_1^{(-)}$ having the value of the height of the same bar graph as an element is created as shown in FIG. 69C, which are expressed as in the following equation 68. The equation 68 expresses shapes of the normal distribution by the $m_o$ pieces of element values of the vectors. While each of the standard pattern vector H and the input pattern vector N is a vector (one-dimension) having the $m_1$ pieces of element values, the equation 68 is vectors (one-dimension), each having the $m_o$ pieces of element values. As understood from FIGS. 69A to 69C, this pair of reference pattern vectors $Kj_1^{(+)}$ and $Kj_1^{(-)}$ are vectors equivalent to each other. Not that an index $j_1$ in the equation 68 corresponds to the point $j_1$ shown in FIG. 68, and that $m_o$ in the equation 68 may be an arbitrary natural number different from the number $m_1$ of elements of the standard pattern vector H and the input pattern vector N.

[Equation 68]
$Kj_1^{(+)} = (kj_1^{(+)}1, kj_1^{(+)}2, \ldots kj_1^{(+)}i_0, \ldots, k_{j1}^{(+)}m_0)$
$Kj_1^{(-)} = (kj_1^{(-)}1, kj_1^{(-)}2, \ldots kj_1^{(-)}i_0, \ldots, k_{j1}^{(-)}m_0)$
............ (68)
$(j_1=1,2,3,\ldots,m_1)$ In FIG. 69A, the point $j_1$ is made to correspond to u=0, and the point 1 is made to correspond to $u=-1.4\sigma j_1$. Accordingly, the point $i_1$ will correspond to a value of u between u=0 and $u=-1.4\sigma j_1$. Moreover, while the length $\lambda 1 j_1$ between the point $j_1$ and the point 1 can be calculated by the equation 67, the length $\lambda 1 j_1$ is also a length between 0 and $-1.4\sigma j_1$ on the u-axis, which are shown in FIG. 69A. Accordingly, the value of variance of the normal distribution can be calculated by the following equation 69.

[Equation 69]

$$\sigma j_1 = \frac{\lambda 1 j_1}{1.4} \quad (69)$$

$$(j_1 = 1, 2, 3, \cdots, m_1)$$

If the value of variance of the normal distribution is calculated by the above-described method, then a principal element of the normal distribution (range of: $-1.4\sigma j_1 \leq u \leq +1.4\sigma j_1$ in the case of the equation 69) can be made to cover the entire frequency-normalized segments. Specifically, the normal curve is decided by the value of variance of the normal distribution, which is obtained by the equation 69. Moreover, this normal curve is applied to FIGS. 69B and

69C and the equation 68, and thus the positive reference pattern vector $Kj_1^{(+)}$ and the negative reference pattern vector $Kj_1^{(-)}$ can be created.

Here, each $i_1$-th element ($i_1=1, 2, \ldots, m_1$) of the pattern vector will be considered after a $j_1$-th element is fixed on one value among: $j_1=1$ to $m_1$ as a specified element of the pattern vector. While the length $\lambda i_1 j_1$ between the point $j_1$ and the point $i_1$ can be calculated by the equation 66, $\lambda i_1 j_1$ is also a value of deviation from the mean value of the normal distribution as shown in FIG. 69A.

Moreover, as shown in FIG. 69C, when a length between the respective element numbers of the reference pattern vector is defined as $\Delta y j_1$, the value of deviation $L j_1 i_o$ from the mean value of the normal distribution, which corresponds to the element number $i_o$ ($i_o=1, 2, \ldots, m_o$), can be calculated by the following equation 70. Note that, here, consideration is made for the case where the length between the respective element numbers of the reference pattern vector is equal to the others. In the equation 70, $(m_o+1)/2$ is an element number of the center of the reference pattern vector.

[Equation 70]

$$L j_1 i_0 = \left| i_0 - \frac{m_0 + 1}{2} \right| \times \Delta y j_1 \quad (70)$$

$$(i_0 = 1, 2, 3, \cdots, m_0)$$
$$(j_1 = 1, 2, 3, \cdots, m_1)$$

FIGS. 69A to 69C show a relationship between the above-described $\lambda i_1 j_1$ and $L j_1 i_o$. FIG. 69A shows that $\lambda i_1 j_1$ is the length between the point $j_1$ and the point $i_1$. Moreover, FIGS. 69B and 69C show that each element number of the positive reference pattern vector and the negative reference pattern vector, which is proximate to the position apart, by $\lambda i_1 j_1$, from the center of the positive reference pattern vector or the negative reference pattern vector, is $i_o$. Moreover, FIGS. 69B and 69C show that the value of deviation from the mean value of the normal distribution, which corresponds to the element number $i_o$, is $L j_1 i_o$.

Specifically, when the $j_1$-th element and the $i_1$-th element of the pattern vector are given, the length $\lambda i_1 j_1$ between these two points is calculated by the equation 66, and then, with regard to the reference pattern vector, the element number $i_o$, the value of deviation $L j_1 i_o$ from the mean value of the normal distribution, and the element values $kj_1^{(+)} i_o$ and $kj_1^{(-)} i_o$ will be obtained.

Here, if the number $m_o$ of elements of the reference pattern vector is made sufficiently large ($\Delta y j_1$ is made sufficiently small), then an error between the value of $\lambda i_1 j_1$ and the value of $L j_1 i_o$ can be made sufficiently small, thus making it possible to obtain a highly precise calculation result. Moreover, since the element number $i_o$ and the element number $(m_o - i_o + 1)$ are symmetric to each other with respect to the mean value of the normal distribution, $(m_o - i_o + 1)$ may be used instead of $i_o$.

Next, the shape change between the standard pattern vector and the input pattern vector is substituted into shape changes of the positive reference pattern vector $Kj_1^{(+)}$ and the negative reference pattern vector $Kj_1^{(-)}$. Specifically, with regard to the $i_1$-th element ($i_1=1, 2, \ldots, m_1$) of the pattern vector, an absolute value of the variation between the element value $hi_1$ of the standard pattern vector and the element value $ni_1$ of the input pattern vector is $|ni_1 - hi_1|$. In this case, as shown in the following equation 71, when $ni_1$ is larger than $hi_1$, the element value $kj_1^{(+)} i_o$ of the positive reference pattern vector $Kj_1^{(+)}$ is increased by the absolute value $|ni_1 - hi_1|$ of this variation. And when $ni_1$ is smaller than $hi_1$, the element value $kj_1^{(-)} i_o$ of the negative reference pattern vector $Kj_1^{(-)}$ is increased by the absolute value $|ni_1 - hi_1|$ of this variation.

[Equation 71]

for $i_1 = 1, 2, 3, \ldots, m_1$:
   when $ni_1 > hi_1$,
     $kj_1^{(+)} i_0$ is increased by $|ni_1 - hi_1|$,
   when $ni_1 < hi_1$,
     $kj_1^{(-)} i_0$ is increased by $|ni_1 - hi_1|$.

$$\cdots \cdots \cdots (71)$$

$(j_1 = 1, 2, 3, \ldots, m_1)$

Accordingly, if the value of variance of the normal distribution is calculated by the equation 69, and the element values $kj_1^{(+)} i_o$ and $kj_1^{(-)} i_o$ of the reference pattern vectors are increased by the equation 71, then the value of the normal distribution can be increased in the range of: $-1.4\sigma j_1 \leq u \leq +1.4\sigma j_1$ for every combination of the $j_1$-th element and the $i_1$-th element of the pattern vector.

Moreover, in the case where the mean value of the normal distribution is sequentially moved to the respective element positions of the standard pattern vector shape, for each point $j_1$ ($j_1=1, 2, \ldots, m_1$), a point that is the farthest from the point $j_1$ among the entire points on the frequency-normalized segments is applied to the equation 67. Thus, the maximum value of the length between the point $j_1$ and each point is obtained. Then, the normal distribution having a value of variance, which is different for each point $j_1$, is created by the equation 69. Accordingly, the principal portion of the normal distribution can be made to always cover the entire segments described above irrespective of the position of the mean value of the normal distribution. Accompanied therewith, the positive reference pattern vector shape and the negative reference pattern vector shape, which correspond to the point $j_1$ ($j_1=1, 2, \ldots, m_1$), will be different for each point $j_1$.

As described above, the amendment and addition have been made for the prior art (the gazette of Japanese Patent Laid-Open No. Hei 10(1998)-253444 (Japanese Patent Application No. Hei 9(1997)-61007)). Then, description will be made below for the method for recognizing a voice by use of a detected value of a similarity between two pattern vectors (or original pattern vectors).

The prior art (the gazette of Japanese Patent Laid-Open No. Hei 10(1998)-253444 (Japanese Patent Application No. Hei 9(1997)-61007)) shows a method for calculating a power spectrum $Pi_1$ ($i_1=1, 2, \ldots, m_1$) in an $i_1$-th frequency band by the following equation 72 in order to extract a feature of a frequency distribution of the voice. Note that, in the equation 72, $Pi$ is read as $Pi_1$; $xi(t)$ as $xi_1(t)$; $i$ as $i_1$; and $m$ as $m_1$, respectively.

[Equation 72]

$$Pi = \sum_{t=0}^{T} \{xi(t)\}^2 \quad (72)$$

$$(i = 1, 2, 3, \cdots, m)$$

Accordingly, next, an original standard pattern vector Ho having a power spectrum $Pi_1$ ($i_1=1, 2, \ldots, m_1$) of a standard voice as an element and an original input pattern vector No having a power spectrum $Pi_1$ ($i_1=1, 2, \ldots, m_1$) of an input voice as an element are created. These original standard pattern vector Ho and original input pattern vector No are expressed as in the following equation 73 instead of the equation 1. Note that the equation 73 expresses the shapes of the power spectra of the standard voice and the input voice by the $m_1$ pieces of element values of the original pattern vector.

[Equation 73]

$$Ho=(ho1, ho2, \ldots, hoi_1, \ldots hom_1)$$

$$No=(no1, no2, \ldots, noi_1, \ldots, nom_1) \quad (73)$$

In the prior art (the gazette of Japanese Patent Laid-Open No. Hei 10(1998)-253444 (Japanese Patent Application No. Hei 9(1997)-61007)), as processing, the power spectrum $Pi_1$ ($i_1=1, 2, \ldots, m_1$) of the voice is normalized by the entire energy of the power spectrum. Namely, the normalized power spectrum $pi_1$ in the $i_1$-th frequency band is calculated by the following equation 74 instead of the equation 2.

[Equation 74] (74)

$$pi_1 = \frac{pi_1}{\sum_{j_1=1}^{m_1} Pj_1}$$

$$(i_1 = 1, 2, 3, \ldots, m_1)$$

Moreover, the power spectrum $Pi_1$ ($i_1=1, 2, \ldots, m_1$) of the voice may be normalized by the maximum value of the power spectrum. Specifically, the normalized power spectrum $pi_1$ in the $i_1$-th frequency band can be calculated by the following equation 75 instead of the equation 3. Note that a symbol $\max\{Pj_1\}$ in the equation 75 implies the maximum value of a power spectrum $Pj_1$ ($j_1=1, 2, \ldots, m_1$) of the voice.

[Equation 75]

$$pi_1 = \frac{Pi_1}{\max\{Pj_1\}} \quad (75)$$

$$(i_1 = 1, 2, 3, \cdots, m_1)$$

Here, the shape of the normalized power spectrum by the equation 74 and the shape of the normalized power spectrum by the equation 75 are similar to each other. Therefore, whichever of the equation 74 and the equation 75 may be used, a similar discussion to be described later is established.

Next, a standard pattern vector H having a normalized power spectrum $pi_1$ ($i_1=1, 2, \ldots, m_1$) of the standard voice as an element and an input pattern vector N having a normalized power spectrum $pi_1$ ($i_1=1, 2, \ldots, m_1$) of the input voice as an element are created. These standard pattern vector H and input pattern vector N are expressed as in the following equation 76 instead of the equation 4. Note that the equation 76 expresses the shapes of the normalized power spectra of the standard voice and the input voice by the $m_1$ pieces of element values of the pattern vectors.

[Equation 76]

$$H=(h1,h2, \ldots, hi_1, \ldots, hm_1)$$

$$N=(n1,n2, \ldots, ni_1, \ldots, nm_1) \quad (76)$$

In the prior art (the gazette of Japanese Patent Laid-Open No. Hei 10(1998)-253444 (Japanese Patent Application No. Hei 9(1997)-61007)), as shown in FIG. 69A, the graph of the normal distribution (normal curve), which has the mean value: $\mu=0$ and the value of variance of $\sigma j_1^2$, is created. Moreover, as shown in FIGS. 69B and 69C, the positive reference pattern vector $Kj_1^{(+)}$ and the negative reference pattern vector $Kj_1^{(-)}$, each of which has the value of the same normal distribution as an element, are created.

Next, in the equation 71, the shape change between the standard pattern vector H and the input pattern vector N is substituted with the shape changes of the positive reference pattern vector $Kj_1^{(+)}$ and the negative reference pattern vector $Kj_1^{(-)}$. Specifically, with regard to the $i_1$-th element ($i_1=1, 2, \ldots, m_1$) of the pattern vector, an absolute value of the variation between the element value $hi_1$ of the standard pattern vector H and the element value $ni_1$ of the input pattern vector N is $|ni_1-hi_1|$. In this case, as shown in the equation 71, when $ni_1$ is larger than $hi_1$, an element value $kj_1^{(+)}i_o$ of the positive reference pattern vector $Kj_1^{(+)}$ is increased by the absolute value $|ni_1-hi_1|$ of this variation. And when $ni_1$ is smaller than $hi_1$, an element value $kj_1^{(-)}i_o$ of the negative reference pattern vector $Kj_1^{(-)}$ is increased by the absolute value $|ni_1-hi_1|$ of this variation.

Subsequently, in the prior art (the gazette of Japanese Patent Laid-Open No. Hei 10(1998)-253444 (Japanese Patent Application No. Hei 9(1997)-61007)), with regard to the pair of reference pattern vectors (positive reference pattern vector $Kj_1^{(+)}$ and negative reference pattern vector $Kj_1^{(-)}$) changed in shape by the equation 71, a size of each shape change thereof is numerically evaluated as a variation in kurtosis by the following equation 77. Specifically, a kurtosis $Aj_1^{(+)}$ of the positive reference pattern vector $Kj_1^{(+)}$ and a kurtosis $Aj_1^{(-)}$ of the negative reference pattern vector $Kj_1^{(-)}$ are calculated by the equation 77. Note that, in the equation 77, $A^{(+)}$ is read as $Aj_1^{(+)}$; m as $m_o$; $i=1$ as $i_o=1$; $k^{(+)}i$ as $kj_1^{(+)}i_o$; Li as $Lj_1i_o$; $A^{(-)}$ as $Aj_1^{(-)}$; and $k^{(-)}i$ as $kj_1^{(-)}i_o$; respectively, and $j_1=1, 2, \ldots, m_1$ is set.

[Equation 77] (77)

$$A^{(+)} = \frac{\left\{\sum_{i=1}^{m} k^{(+)}i\right\}\left\{\sum_{i=1}^{m} (Li)^4 \cdot k^{(+)}i\right\}}{\left\{\sum_{i=1}^{m} (Li)^2 \cdot k^{(+)}i\right\}^2}$$

$$A^{(-)} = \frac{\left\{\sum_{i=1}^{m} k^{(-)}i\right\}\left\{\sum_{i=1}^{m} (Li)^4 \cdot k^{(-)}i\right\}}{\left\{\sum_{i=1}^{m} (Li)^2 \cdot k^{(-)}i\right\}^2}$$

Here, description will be made for the change rate in kurtosis of the reference pattern vector. The positive reference pattern vector $Kj_1^{(+)}$ and the negative reference pattern vector $Kj_1^{(-)}$, which are shown in FIGS. 69B and 69C, are vectors (one dimension), similarly to the positive reference pattern vector $Kj_1j_2^{(+)}$ and the negative reference pattern vector $Kj_1j_2^{(-)}$, which are shown in FIGS. 4B and 4C. Moreover, each of these vectors expresses the shape of the normal distribution by the $m_o$ pieces of element values of the vector. Accordingly, the description for the change rate of the kurtoses of the positive reference pattern vector $Kj_1j_2^{(+)}$ and the negative reference pattern vector $Kj_1j_2^{(-)}$ with reference to FIGS. 5A to 7B is established also for the positive reference pattern vector $Kj_1^{(+)}$ and the negative reference pattern vector $Kj_1^{(-)}$.

Accordingly, the change rate of kurtosis in each element of the positive reference pattern vector $Kj_1^{(+)}$ is previously calculated, and when only the $i_1$-th element of the input pattern vector is increased with respect to the standard pattern vector, and thus the $i_o$-th element ($i_o$=1, 2, ..., $m_o$) of the positive reference pattern vector is increased by the same value, then the change rate of kurtosis in the $i_o$-th element of the positive reference pattern vector is defined as $gj_1i_o$, and the absolute value of the variation between the element value of the standard pattern vector and the element value of the input pattern vector is defined as $|ni_1-hi_1|$. Then, by an upper conditional equation of the following equation 78 instead of the upper conditional equation of the equation 7, a value of a product of $gj_1i_o$ and $|ni_1-hi_1|$ can be obtained to calculate the kurtosis value $Aj_1^{(+)}$.

Similarly, when only the $i_1$-th element of the input pattern vector is decreased with respect to the standard pattern vector, and thus the $i_o$-th element ($i_o$=1, 2, ..., $m_o$) of the negative reference pattern vector is increased by the same value, then a value of a product of $gj_1i_o$ and $|ni_1-hi_1|$ can be obtained to calculate the kurtosis value $Aj_1^{(-)}$ by a lower conditional equation of the following equation 78 instead of the lower conditional equation of the equation 7. Note that the equation 78 is established only in the case where only one element of the positive reference pattern vector or the negative reference pattern vector is increased.

[Equation 78]

when $ni_1 > hi_1$,
$$Aj_1^{(+)} = 3 + gj_1i_0 \cdot |ni_1 - hi_1|$$
when $ni_1 < hi_1$,
$$Aj_1^{(-)} = 3 + gj_1i_0 \cdot |ni_1 - hi_1|$$
$$\ldots \ldots \ldots (78)$$
$$(j_1 = 1, 2, 3, \ldots, m_1)$$

In the equation 78, $|ni_1-hi_1|$ is substituted into $(ni_1-hi_1)$ while considering signs thereof, and thus the following equation 79 is obtained instead of the equation 8.

[Equation 79]

when $ni_1 > hi_1$,
$$Aj_1^{(+)} = 3 + gj_1i_0 \cdot (ni_1 - hi_1)$$
when $ni_1 < hi_1$,
$$Aj_1^{(-)} = 3 - gj_1i_0 \cdot (ni_1 - hi_1)$$
$$\ldots \ldots \ldots (79)$$
$$(j_1 = 1, 2, 3, \ldots, m_1)$$

Next, description will be made for a property of the change in kurtosis of the reference pattern vector. The positive reference pattern vector $Kj_1^{(+)}$ and the negative reference pattern vector $Kj_1^{(-)}$, which are shown in FIGS. 69B and 69C, are vectors (one dimension), similarly to the positive reference pattern vector $Kj_1j_2^{(+)}$ and the negative reference pattern vector $Kj_1j_2^{(-)}$, which are shown in FIGS. 4B and 4C. Moreover, each of these vectors expresses the shape of the normal distribution by the $m_o$ pieces of element values of the vector. Accordingly, the description for the property of the change in the kurtoses of the positive reference pattern vector $Kj_1j_2^{(+)}$ and the negative reference pattern vector $Kj_1j_2^{(-)}$ with reference to FIGS. 8A to 13B is established also for the positive reference pattern vector $Kj^{1(+)}$ and the negative reference pattern vector $Kj_1^{(-)}$.

Accordingly, with regard to the increased two elements of the positive reference pattern vector, by use of the same method as that in each FIGS. 5B, 6B and 7B, each variation of the kurtosis is obtained, and the sum value is obtained by adding thereto each variation of the kurtosis, and thus the kurtosis value $Aj_1^{(+)}$ can be calculated. Similarly, the kurtosis value $Aj_1^{(-)}$ can be calculated.

The above is established also in the case where three or more elements of the input pattern vector are simultaneously increased with respect to the standard pattern vector, and thus three or more elements of the positive reference pattern vector $Kj_1^{(+)}$ are simultaneously increased. Similarly, the above is established also in the case where three or more elements of the input pattern vector are simultaneously decreased with respect to the standard pattern vector, and thus three or more elements of the negative reference pattern vector $Kj_1^{(-)}$ are simultaneously increased.

Accordingly, in the case where plural elements of the input pattern vector are simultaneously increased with respect to the standard pattern vector, and thus plural elements of the positive reference pattern vector are simultaneously increased, the kurtosis value $Aj_1^{(+)}$ can be calculated by an upper conditional equation of the following equation 80 instead of the upper conditional equation of the equation 9. Namely, the change rate of kurtosis in the $i_o$-th element of the positive reference pattern vector is defined as $gj_1i_o$, and the variation between the element value of the standard pattern vector and the element value of the input pattern vector is defined as $(ni_1-hi_1)$. Then, a value of the product of $gj_1i_o$ and $(ni_1-hi_1)$ is obtained, and a value of the sum is obtained by adding the value of the product to the entire elements of the input pattern vector, which are increased with respect to the standard pattern vector, and thus the kurtosis value $Aj_1^{(+)}$ is calculated.

Similarly, in the case where plural elements of the input pattern vector are simultaneously decreased with respect to the standard pattern vector, and thus plural elements of the negative reference pattern vector are simultaneously increased, then, by a lower conditional equation of the following equation 80 instead of the lower conditional equation of the equation 9, a value of the product of $gj_1i_o$ and $(ni_1-hi_1)$ is obtained. Then, a value of the sum is obtained by adding the value of the product to the entire elements of the input pattern vector, which are decreased with respect to the standard pattern vector, and thus the kurtosis value $Aj_1^{(-)}$ is calculated.

[Equation 80] (80)

· for all $i_1$ where $ni_1 > hi_1$, $$Aj_1^{(+)} = 3 + \sum_{i_1=1}^{m_i} gj_1i_0 \cdot (ni_1 - hi_1)$$

· for all $i_1$ where $ni_1 < hi_1$, $$Aj_1^{(-)} = 3 - \sum_{i_1=1}^{m_i} gj_1i_0 \cdot (ni_1 - hi_1) \quad (j_1 = 1, 2, 3, \ldots, m_1)$$

Incidentally, in the prior art (the gazette of Japanese Patent Laid-Open No. Hei 10(1998)-253444 (Japanese Patent Application No. Hei 9(1997)-61007)), by use of the kurtosis $Aj_1^{(+)}$ of the positive reference pattern vector $Kj_1^{(+)}$ and the kurtosis $Aj_1^{(-)}$ of the negative reference pattern vector $Kj_1^{(-)}$, both of which are calculated by the equation 77, a shape variation $Dj_1$ is calculated by the following equation 81 instead of the equation 10. Specifically, the kurtosis values of the two reference pattern vectors $Kj_1^{(+)}$ and $Kj_1^{(-)}$ set initially to normal distribution shapes are both equal to 3. Therefore, the kurtosis variations of the positive and negative reference pattern vectors changed in shape by the equation 71 become $\{Aj_1^{(+)}-3\}$ and $\{Aj_1^{(-)}-3\}$, respectively. Accordingly, the variation in the positive direction becomes $\{Aj_1^{(+)}-3\}$, the variation in the negative direction becomes $\{Aj_1^{(-)}-3\}$, and the entire variation becomes a difference value therebetween. On the premise described above, the shape variation $Dj_1$ is calculated.

[Equation 81] (81)

$$Dj_1 = \{Aj_1^{(+)}-3\} - \{Aj_1^{(-)}-3\}$$
$$= Aj_1^{(+)} - Aj_1^{(-)}$$
$$(j_1 = 1, 2, 3, \ldots, m_1)$$

Accordingly, the equation 80 is assigned to the equation 81 to obtain the following equation 82 instead of the equation 11. Specifically, in the case where the plural elements of the input pattern vector are increased and decreased simultaneously with respect to the standard pattern vector, and thus the plural elements of the positive and negative reference pattern vectors are increased simultaneously, then, by the equation 82, the shape variation $Dj_1$ can be calculated.

[Equation 82] (82)

$$Dj_1 = \sum_{i_1=1}^{m_1} gj_1 i_0 \cdot (ni_1 - hi_1)$$
$$= \sum_{i_1=1}^{m_1} \{gj_1 i_0 \cdot ni_1 - gj_1 i_0 \cdot hi_1\}$$
$$= \sum_{i_1=1}^{m_1} gj_1 i_0 \cdot ni_1 - \sum_{i_1=1}^{m_1} gj_1 i_0 \cdot hi_1 \quad (j_1 = 1, 2, 3, \ldots, m_1)$$

From the equation 82, it is understood that the shape variation $Dj_1$ can be decomposed into a product-sum operation for the change rate $gj_1 i_o$ of the kurtosis in the reference pattern vector and the element value $hi_1$ of the standard pattern vector and a product-sum operation for the same change rate $gj_1 i_o$ and the element value $ni_1$ of the input pattern vector. In this connection, as shown in the following equation 83 instead of the equation 12, the respective product-sum values are defined as $hgj_1$ and $ngj_1$.

[Equation 83] (83)

$$hgj_1 = \sum_{i_1=1}^{m_1} gj_1 i_0 \cdot hi_1$$

$$ngj_1 = \sum_{i_1=1}^{m_1} gj_1 i_0 \cdot ni_1 \quad (j_1 = 1, 2, 3, \ldots, m_1)$$

Next, description will be made for a method for calculating the change rate $gj_1 i_o$ ($i_o=1, 2, \ldots, m_o$) of the kurtosis and calculating the element number $i_o$ in the equation 83. Note that the positive reference pattern vector $Kj_1^{(+)}$ and the negative reference pattern vector $Kj_1^{(-)}$ are vectors equivalent to each other. Therefore, the change rate of the kurtosis of the positive reference pattern vector $Kj_1^{(+)}$ and the change rate of the kurtosis of the negative reference pattern vector $Kj_1^{(-)}$ are equal to each other. Moreover, as shown in the equation 83, it is not necessary to distinguish these reference pattern vectors. Accordingly, in the description below, the positive and negative reference pattern vectors will be simply referred to as a reference pattern vector, excluding the signs $^{(+)}$ and $^{(-)}$.

Figure 70A:
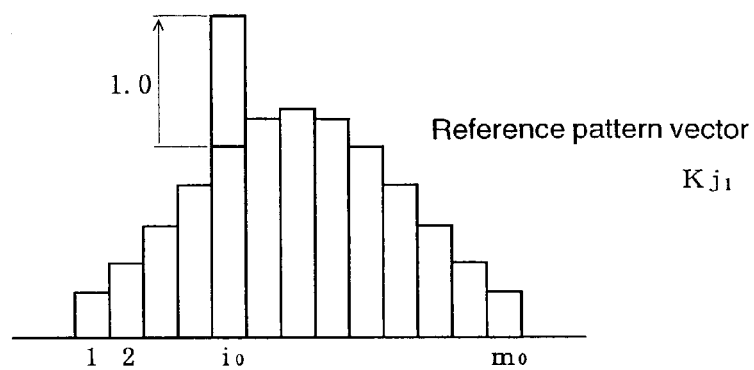
FIGS. 70A and 70B are diagrams showing still another example of creating the weighting vector based on the change rate of the kurtosis of the reference pattern vector.
Figure 70B:
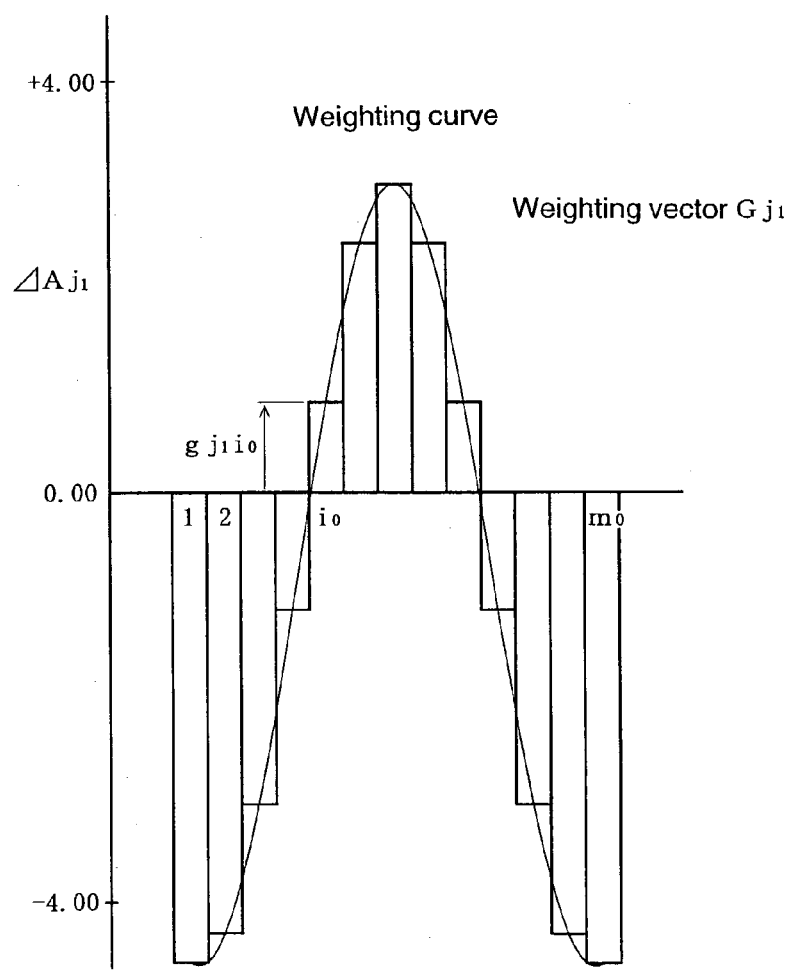

FIG. 70A is a schematic diagram showing an example where only the $i_o$-th element of the reference pattern vector $Kj_1$ is increased by 1.0. Moreover, FIG. 70B is a graph (weighting curve) showing a state where the variation $\Delta Aj_1$ of the kurtosis $Aj_1$ of the reference pattern vector changed in shape as shown in FIG. 70A is directly obtained by the equation 77 and plotted on the position $i_o$ in FIG. 70B, and then a calculated value $\Delta Aj_1$ of the kurtosis variation is changed when the $i_o$ is changed from 1 to $m_o$. Here in this weighting curve, the kurtosis variation when only the $i_o$-th element of the reference pattern vector is increased by 1.0 is plotted. Therefore, a function value of the weighting curve becomes equal to the change rate $gj_1 i_o$ of the kurtosis in the $i_o$-th element ($i_o=1, 2, \ldots, m_o$) of the reference pattern vector. Moreover, FIG. 70B also shows a bar graph of which height is equal to the function value of the weighting curve. A weighting vector $Gj_1$ having a height value of the bar graph as an element is created as shown in FIG. 70B, and is expressed as in the following equation 84 instead of the equation 13. The equation 84 expresses the change rate of the kurtosis of the reference pattern vector by the $m_o$ pieces of element values of the vector. While the equations 73 and 76 are vectors (one-dimension), each having the $m_1$ pieces of element values, the equation 84 is a vector (one-dimension) having the $m_o$ pieces of element values.

[Equation 84]

$$Gj_1 = (gj_1 1, gj_1 2, \ldots, gj_1 i_o, \ldots, gj_1 m_o)$$
$$\ldots \ldots \ldots (84)$$
$$(j_1 = 1, 2, 3, \ldots, m_1)$$

Next, the relationship between the normal curve and the weighting curve is shown, and the relationship between the reference pattern vector $Kj_1$ and the weighting vector $Gj_1$ is shown. The positive reference pattern vector $Kj_1^{(+)}$ and the negative reference pattern vector $Kj_1^{(-)}$, which are shown in FIGS. 69B and 69C, are vectors (one-dimension), similarly to the positive reference pattern vector $Kj_1j_2^{(+)}$ and the negative reference pattern vector $Kj_1j_2^{(-)}$, which are shown in FIGS. 4B and 4C. Moreover, each of these vectors expresses the shape of the normal distribution by the $m_o$ pieces of element values of the vector. Still more, the weighting vector $Gj_1$ shown in FIG. 70B is a vector (one-dimension), similarly to the weighting vector $Gj_1j_2$ shown in FIG. 14B, and expresses the change rate of the kurtosis of the reference pattern vector by the $m_o$ pieces of element values of the vector. Accordingly, the relationship between the normal curve and the weighting curve and the relationship between the reference pattern vector $Kj_1$ and the weighting vector $Gj_1$, which are with reference to FIGS. 70A and 70B, are equal to the relationship between the normal curve and the weighting curve and the relationship between the reference pattern vector $Kj_1j_2$ and the weighting vector $Gj_1j_2$, which are with reference to FIGS. 15A to 19, respectively.

Specifically, the normal curve and the weighting curve correspond to each other, the reference pattern vector $Kj_1$ and the weighting vector $Gj_1$ correspond to each other, and indices $j_1$, $i_o$ and $m_o$ of the reference pattern vector $Kj_1$ and indices $j_1$, $i_o$ and $m_o$ of the weighting vector $Gj_1$ have the same values, respectively.

Moreover, the movement of the center of the normal curve and the movement of the center of the weighting curve correspond to each other. Still more, the method for calculating the element number $i_o$ of the reference pattern vector proximate to the position apart from the center of the reference pattern vector by the length $\lambda i_1 j_1$ and the method for calculating the element number $i_o$ of the weighting vector proximate to the position apart from the center of the weighting vector by the length $\lambda i_1 j_1$ are the same. Accordingly, when the $j_1$-th element and the $i_1$-th element of the pattern vector are given, $i_o$ in the equation 83 is calculated based on the length between these two points on the frequency-normalized segments.

Specifically, $hgj_1$ shown in the left side of the equation 83 can be calculated as a product-sum value in such a manner that the length between the specified element and each element of the standard pattern vector is obtained, the element number $i_o$ of the weighting vector proximate to the position apart from the center of the weighting vector by the above-described length is calculated, the value of the product of the element value $gj_1 i_o$ of the above-described element number of the weighting vector and the element value $hi_1$ of each element of the standard pattern vector is obtained, and the above-described value of the product is added to each element of the standard pattern vector. Moreover, $ngj_1$ shown in the left side of the equation 83 can be calculated as a product-sum value in such a manner that the length between the specified element and each element of the input pattern vector is obtained, the element number $i_o$ of the weighting vector proximate to the position apart from the center of the weighting vector by the above-described length is calculated, the value of the product of the element value $gj_1 i_o$ of the above-described element number of the weighting vector and the element value $ni_1$ of each element of the input pattern vector is obtained, and the above-described value of the product is added to each element of the input pattern vector.

Next, a weighted standard pattern vector Hg having $hgj_1$ ($j_1=1, 2, \ldots, m_1$) in the equation 83 as an element and a weighted input pattern vector Ng having $ngj_1$ ($j_1=1, 2, \ldots, m_1$) in the equation 83 as an element are created. These weighted standard pattern vector Hg and weighted input pattern vector Ng are expressed as in the following equation 85 instead of the equation 14.

[Equation 85]

$$Hg = (hg1, hg2, \ldots, hgi_1, \ldots, hgm_1)$$

$$Ng = (ng1, ng2, \ldots, ngi_1, \ldots, ngm_1) \quad (85)$$

Moreover, the equation 83 is assigned to the equation 82 to obtain the following equation 86 instead of the equation 15. From the equation 86, it is understood that the shape variation $Dj_1$ is obtained by subtracting the element value $hgj_1$ of the weighted standard pattern vector Hg from the element value $ngj_1$ of the weighted input pattern vector Ng.

[Equation 86]

$$Dj_1 = ngh_1 - hgj_1$$

$$\ldots \ldots \ldots (86)$$

$$(j_1 = 1, 2, 3, \ldots, m_1)$$

In the prior art (the gazette of Japanese Patent Laid-Open No. Hei 10(1998)-253444 (Japanese Patent Application No. Hei 9(1997)-61007)), the square root of the square sum of the $m_1$ pieces of shape variations $Dj_1$ calculated by the equation 86 is defined as the value of the geometric distance. Accordingly, a geometric distance value $d_E$ can be calculated by the following equation 87 instead of the equation 16.

[Equation 87] (87)

$$d_E = \sqrt{\sum_{j_1=1}^{m_1} (Dj_1)^2}$$

$$= \sqrt{\sum_{j_1=1}^{m_1} (ngj_1 - hgj_1)^2}$$

Moreover, in the prior art (the gazette of Japanese Patent Laid-Open No. Hei 10(1998)-253444 (Japanese Patent Application No. Hei 9(1997)-61007)), the square sum of the $m_1$ pieces of shape variations $Dj_1$ calculated by the equation 86 is defined as the value of the geometric distance as it is. Accordingly, the geometric distance value $d_E$ can also be calculated by the following equation 88 instead of the equation 17.

[Equation 88] (88)

$$d_E = \sum_{j_1=1}^{m_1} (D_{j_1})^2$$

$$= \sum_{j_1=1}^{m_1} (ngj_1 - hgj_1)^2$$

Meanwhile, in the equation 83, the element value $hi_1$ of the standard pattern vector and the element value $ni_1$ of the input pattern vector are substituted into the element value $hoi_1$ of the original standard pattern vector and the element value $noi_1$ of the original input pattern vector, respectively. Then, as shown in the following equation 89 instead of the equation 18, the product-sum value of the change rate $gj_1 i_o$ of kurtosis in the reference pattern vector and the element value $hoi_1$ of the original standard pattern vector is defined as $hogj_1$, and the product-sum value of the same change rate $gj_1 i_o$ and the element value $noi_1$ of the original input pattern vector is defined as $nogj_1$.

[Equation 89] (89)

$$hogj_1 = \sum_{i_1=1}^{m_1} gj_1 i_0 \cdot hoi_1$$

$$nogj_1 = \sum_{i_1=1}^{m_1} gj_1 i_0 \cdot noi_1 \quad (j_1 = 1, 2, 3, \ldots, m_1)$$

Next, an original and weighted standard pattern vector Hog having $hogj_1$ ($j_1=1, 2, \ldots, m_1$) in the equation 89 as an element and an original and weighted input pattern vector Nog having $nogj_1$ ($j_1=1, 2, \ldots, m_1$) in the equation 89 as an element are created. These original and weighted standard pattern vector Hog and original and weighted input pattern vector Nog are expressed as in the following equation 90 instead of the equation 19.

[Equation 90]

$$Hog = (hog1, hog2, \ldots, hogi_1, \ldots, hogm_1)$$

$$Nog = (nog1, nog2, \ldots, nogi_1, \ldots, nogm_1) \quad (90)$$

Here, in the case where the original standard pattern vector Ho and the original input pattern vector No, which are shown in the equation 73, are normalized by the entire energy of the power spectrum by use of the equation 74, and thus the standard pattern vector H and the input pattern vector N, which are shown in the equation 76, are created, then the following equation 91 is established instead of the equation 20.

[Equation 91] (91)

$$hi_1 = \frac{hoi_1}{\sum_{j_1=1}^{m_1} hoj_1}$$

$$ni_1 = \frac{noi_1}{\sum_{j_1=1}^{m_1} noj_1} \quad (i_1 = 1, 2, 3, \ldots, m_1)$$

Moreover, in the case where the original standard pattern vector Ho and the original input pattern vector No, which are shown in the equation 73, are normalized by the maximum value of the power spectrum by use of the equation 75, and thus the standard pattern vector H and the input pattern vector N, which are shown in the equation 76, are created, then the following equation 92 is established instead of the equation 21.

[Equation 92] (92)

$$hi_1 = \frac{hoi}{\max\{hoj_1\}}$$

$$ni_1 = \frac{noi}{\max\{noj_1\}} \quad (i_1 = 1, 2, 3, \ldots, m_1)$$

Values of denominators in the right sides in the equation 91 are the entire energies of the power spectra of the standard voice and the input voice, respectively, which are constants. Moreover, values of denominators in the right sides in the equation 92 are the maximum values of the power spectra of the standard voice and the input voice, respectively, which are also constants. Accordingly, Ch and Cn are defined as constants, and the equation 91 and the equation 92 are integrated and represented as in the following equation 93 instead of the equation 22.

$$hi_1 = joi_1/Ch$$

$$ni_1 = noi_1/Cn$$

$$\ldots\ldots\ldots\ldots (93)$$

$$(i_1 = 1, 2, 3, \ldots, m_1)$$

The equation 93 is substituted into the equation 83, then the equation 89 is used, and thus the following equation 94 is obtained instead of the equation 23.

[Equation 94] (94)

$$hgj_1 = \sum_{I_1=1}^{m_1} gj_1 i_0 \cdot (hoi_1/Ch)$$

$$= hogj_1/Ch$$

$$hgj_1 = \sum_{I_1=1}^{m_1} gj_1 i_0 \cdot (noi_1/Cn)$$

$$= nogj_1/Cn \quad (j_1 = 1, 2, 3, \ldots, m_1)$$

From the equation 94, with regard to ($j_1 = 1, 2, \ldots, m_1$), it is understood that the element value $hgj_1$ of the weighted standard pattern vector is obtained by dividing the element value $hogj_1$ of the original and weighted standard pattern vector by the constant Ch, and that the element value $ngj_1$ of the weighted input pattern vector is obtained by dividing the element value $nogj_1$ of the original and weighted input pattern vector by the constant Cn.

FIG. 20 is a schematic diagram showing the relationships of the equation 94. Here, FIG. 20 is read to show arrows directed from the origin O to the point of the weighted standard pattern vector Hg, the point of the weighted input pattern vector Ng, the point of the original and weighted standard pattern vector Hog, and the point of the original and weighted input pattern vector Nog, respectively, in an $m_1$ dimension pattern space. In FIG. 20, a state is shown, where the origin O, the point of the weighted standard pattern vector Hg and the point of the original and weighted standard pattern vector Hog are arrayed on one straight line, and the origin O, the point of the weighted input pattern vector Ng and the point of the original and weighted input pattern vector Nog are arrayed on the other straight line, based on the relationships of the equation 94.

Moreover, from the equation 87, it is understood that the geometric distance $d_E$ can be calculated by carrying out the conventional calculation for the Euclid distance by use of the element value $hgj_1$ of the weighted standard pattern vector and the element value $ngj_1$ of the weighted input pattern vector. In this connection, FIG. 20 shows that the geometric distance $d_E$ becomes a Euclid distance between the point of the weighted standard pattern vector Hg and the point of the weighted input pattern vector Ng.

Meanwhile, in the case where judgment cannot be made as to which of the method for normalizing the power spectrum pattern of the voice by the maximum value of the power spectrum or the method for normalizing the power spectrum pattern thereof by the entire energy of the power spectrum is to be used for processing the input voice, then, the geometric distance value $d_E$ shown in the equation 87 will not be usable.

In this connection, with regard to the original and weighted standard pattern vector and the original and weighted input pattern vector, which are created without normalizing the power spectrum pattern of the voice, it is convenient if an angle between these two original and weighted pattern vectors, that is, an angle between the straight line OHog and the straight line ONog, can be used as a similarity scale in FIG. 20. Accordingly, the value of the geometric distance $d_A$ can be calculated as a cosine of the angle between the original and weighted standard pattern vector Hog and the original and weighted input pattern vector Nog by the following equation 95 instead of the equation 24. In the equation 95, the geometric distance value $d_A$ is set in a range: $-1 \leq d_A \leq +1$. Moreover, when the shape of the original standard pattern vector Ho and the shape of the original input pattern vector No are similar to each other, accordingly, when the shape of the original and weighted standard pattern vector Hog and the shape of the original and weighted input pattern vector Nog are similar to each other, then the value of the angle between these two original and weighted pattern vectors is reduced, and therefore, the geometric distance value $d_A$ becomes a value approximate to +1.

[Equation 95] (95)

$$d_A = \frac{\sum_{j_1=1}^{m_1} nogj_1 \cdot hogj_1}{\sqrt{\sum_{j_1=1}^{m_1} (nogj_1)^2} \sqrt{\sum_{j_1=1}^{m_1} (hogj_1)^2}}$$

The above description for the first subject of the present invention will be summarized as below. As shown in the equation 87 and FIG. 20, the geometric distance $d_E$ between the standard pattern vector H and the input pattern vector N can be calculated as the Euclid distance between the weighted standard pattern vector Hg and the weighted input pattern vector Ng. Meanwhile, as shown in the equation 95 and FIG. 20, the geometric distance $d_A$ between the original standard pattern vector Ho and the original input pattern vector No can be calculated as the cosine of the angle between the original and weighted standard pattern vector Hog and the original and weighted input pattern vector Nog. Note that, as being understood from FIG. 20, the value of the angle between the original and weighted standard pattern vector Hog and the original and weighted input pattern vector Nog is equal to the value of the angle between the weighted standard pattern vector Hg and the weighted input pattern vector Ng, and therefore, the geometric distance $d_A$ may be calculated as the cosine of the angle between the weighted standard pattern vector Hg and the weighted input pattern vector Ng.

As above, description has been made for the solving means for the first subject of the present invention. Next, description will be made for the solving means for the second subject of the present invention.

In the voice recognition, since voices having a power spectrum pattern varied for each uttering appear even in the same voice, a method is usually adopted, in which a large number of human beings utter the same voice repeatedly, and a plurality of standard voices are registered for each voice. In this embodiment, the same voices registered as described above are defined as standard voices in the same category, and voices different from these are defined as standard voices in a different category.

Here, if the distance between the standard voices in the same category is shortened, and simultaneously, the distance between the standard voices in the different categories is elongated, then, as a result, separation of the standard voice in the same category and the standard voice in the different category is improved, and thus recognition performance when an input voice is given is improved.

However, in the equation 69, the square of the ratio value obtained by dividing the maximum value $\lambda 1j_1$ of the length between the specified element and each element of the pattern vector by the constant of 1.4 is defined as the value of variance of the normal distribution. Moreover, in the equation 71, the entire element numbers of the positive reference pattern vector and the negative reference pattern vector are weighted by the constant of 1. Then, with regard to the $i_1$-th element ($i_1=1, 2, \ldots, m_1$) of the pattern vector, the absolute value $|ni_1-hi_1|$ of the variation between the element value $hi_1$ of the standard pattern vector and the element value $ni_1$ of the input pattern vector is substituted into the increasing quantity of the positive reference pattern vector or the negative reference pattern vector as it is irrespective of the element number of the reference pattern vector.

Specifically, in the method of the related art, the reference pattern vector is created by use of the normal distribution having a fixed value of variance, and the reference pattern vector is increased by use of the increasing means having a fixed value of weight. Therefore, the separation of the standard voice in the same category and the standard voice in the different category is fixed, and thus the recognition performance when the input voice is given cannot be improved.

In order to solve the above-described problem, in the present invention, instead of the fixed method of the related art, the reference pattern vector is created by use of the normal distribution having a variable value of variance, and the reference pattern vector is increased by use of the increasing means having a variable value of weight.

In this case, the creation of the reference pattern vector by use of the normal distribution having the variable value of variance and the simultaneous increase of the reference pattern vector by use of the increasing means having the variable value of weight are equivalent to the expansion and contraction of the weighting curve created based on the change rate of the kurtosis of the normal curve in the direction parallel to the u-axis and the simultaneous change of the weighting curve in the direction perpendicular to the u-axis. Therefore, the former one and the latter one can obtain the same effect. Here, the latter one that is simpler in calculation processing as compared with the former one will be used. Moreover, the latter one results in a matter of finding a weighting curve where the separation of the standard voice in the same category and the standard voice in the different category is improved most, that is, an optimal weighting curve.

Here, with regard to the case of the latter one, the expansion and contraction of the weighting curve in the direction parallel to the u-axis for changing the range of the weighting curve covering the entire frequency-normalized segments and the expansion and contraction of the weighting curve in the direction parallel to the u-axis as the center of the weighting curve moves on the frequency-normalized segments are matters of relative expansion and contraction of the weighting curve and the u-axis. Accordingly, in the actual calculation, instead of the expansion and contraction of the weighting curve with respect to the u-axis, the expansion and contraction of the u-axis with respect to the weighting curve may be performed contrarily, both of which are equivalent to each other.

Accordingly, next, with regard to the case of expanding and contracting the u-axis with respect to the weighting curve, description will be made for the method for obtaining the length between the specified element and each element of the pattern vector to calculate the element number $i_o$ of the weighting vector proximate to the position apart from the center of the weighting vector by the above-described length.

First, FIGS. 52A to 53C previously shown will be considered, applied to the one-dimensional frequency-normalized segments. In the equation 69, the range of the normal curve: $-1.4\sigma j_1 \leq u \leq +1.4\sigma j_1$ is made to cover the entire frequency-normalized segments. On the contrary, here, $1.4\sigma j_1$ is substituted into the variable Cg, and the range of the weighting curve: $-Cg \leq u \leq +Cg$ is made to cover the entire frequency-normalized segments. Then, as the value of the variable Cg is changed, the u-axis is expanded and contracted with respect to one weighting curve.

In this case, with regard to the expansion and contraction of the u-axis, the length $\lambda i_1 j_1$ between the point $j_1$ and the point $i_1$ is expanded and contracted in the same ratio as the length $\lambda 1 j_1$ between the point $j_1$ and the point 1 is expanded and contracted. Therefore, the value of a ratio obtained by dividing the length $\lambda i_1 j_1$ by the length $\lambda 1 j_1$ always becomes a constant value irrespective of the expansion and contraction of the u-axis. Accordingly, when a position on the u-axis, which corresponds to the point $i_1$, is defined as $u_o$, the position $u_o$ can be calculated by the following equation 96 instead of the equation 34.

[Equation 96] (96)

$$\text{for } i_1 = 1, 2, 3, \ldots, m_1:$$
$$u_0 = -Cg \times \frac{\lambda i_1 j_1}{\lambda 1 j_1} \qquad (j_1 = 1, 2, 3, \ldots, m_1)$$

Second, FIGS. 54A to 55B previously shown will be considered, applied to the one-dimensional frequency-normalized segments. Here, the u-axis is expanded and contracted with respect to one weighting curve as the center of the weighting curve is moved on the frequency-normalized segments. In this case, the value of the variable Cg (or variable Cg*) is the same irrespective of the movement of the center of the weighting curve. Accordingly, the position $u_o$ can be calculated by the equation 96.

From the above description, the following is understood with regard to the case of expanding and contracting the u-axis with respect to one weighting curve. Specifically, the value of the variable Cg is previously set so that the range of: $-Cg \leq u \leq +Cg$ of the weighting curve can cover the entire frequency-normalized segments. Subsequently, the length $\lambda i_1 j_1$ between the specified element and each element of the pattern vector and the maximum value $\lambda 1 j_1$ of the length between the specified element and each element are obtained, and these lengths are assigned into the equation 96 to obtain the position $u_o$. Thus, $i_o$ as the element number of the weighting vector proximate to the above-described position $u_o$ can be calculated. Moreover, according to the processing method as described above, even if the $m_1$ pieces of weighting vectors are not previously created with regard to the respective cases corresponding to the $j_1$-th elements ($j_1=1, 2, \ldots, m_1$), only by creating one weighting vector, calculation can be made for the $m_1$ pieces of element values $hg_{j_1}$ of the weighted standard pattern vector and the $m_1$ pieces of element values $ng_{j_1}$ of the weighted input pattern vector (or the $m_1$ pieces of element values $hog_{j_1}$ of the original and weighted standard pattern vector and the $m_1$ pieces of element values $nog_{j_1}$ of the original and weighted input pattern vector).

Incidentally, the optimal weighting curve is related to the power spectrum shapes of the entire registered standard voices, and therefore, in the case where the registered standard voices are different from each other, then the optimal weighting curves will differ from each other. Accordingly, it is necessary to find an optimal weighting curve among weighting curves of arbitrary shapes.

Accordingly, next, description will be made for a method for obtaining an optimal weighting curve and an optimal value of the variable Cg according to the optimal weighting curve among the weighting curves of arbitrary shapes with reference to FIGS. 56 to 59. Note that, in FIGS. 56 and 57, the standard image is read as the standard voice, and in Step Sc4 in FIG. 56, the equation 13 is read as the equation 84. Moreover, in Step Sc5-3 in FIG. 57, the equation 4, the equation 34, the equation 12, the equation 14 and the equation 16 are read as the equation 76, the equation 96, the equation 83, the equation 85 and the equation 87, respectively. In this case, FIGS. 56 and 57 become flowcharts showing processing procedures for calculating an optimal weighting curve and an optimal value of the variable Cg according to the optimal weighting curve with regard to the case of using the geometric distance $d_E$ as a similarity scale between the standard voices.

Specifically, as shown in FIGS. 56 and 57, a weighting curve is previously created based on the change rate of the kurtosis of the normal curve having a value of variance of 1, and the weighting curve is multiplied by positive values of weight to create a plurality of weighting curves with weight. Then, a weighting vector having a function value of one of the weighting curves as an element is created. Next, calculation is made for a ratio values $R_E(Cg)$ of mean values, which are obtained by dividing the mean geometric distance values between the standard voices in the same category by the mean geometric distance values between the standard voices in the different categories, while changing the value of the variable Cg. Thus, the minimum value of the ratio values $R_E(Cg)$ of the mean values is obtained. This minimum value is obtained repeatedly for the entire weighting curves described above, and a weighting curve corresponding to the minimum value among the minimum values of the ratio values $R_E(Cg)$ of the mean values is optimized, and a value of the variable Cg corresponding to the optimized weighting curve is defined as an optimal value of the variable Cg according to the optimal weighting curve.

Moreover, the function value of the optimal weighting curve obtained as described above is defined as a weighting factor, and the weighting vector having the value of the above-described weighting factor as an element is created. Thus, the distance between the standard voices in the same category can be shortened, and simultaneously the distance between the standard voices in the different categories can be elongated. As a result thereof, the separation of the standard voice in the same category and the standard voice in the different category is improved, and thus the recognition performance when an input voice is given is improved.

Meanwhile, in FIGS. 58 and 59, the standard image is read as the standard voice, and in Step Sd4 in FIG. 58, the equation 13 is read as the equation 84. Moreover, in Step Sd5-3 in FIG. 59, the equation 1, the equation 34, the equation 18, the equation 19 and the equation 24 are read as the equation 73, the equation 96, the equation 89, the equation 90 and the equation 95, respectively. In this case, FIGS. 58 and 59 become flowcharts showing processing procedures for calculating an optimal weighting curve and an optimal value of the variable Cg according to the optimal weighting curve with regard to the case of using the geometric distance $d_A$ as a similarity scale between the standard voices.

Specifically, as shown in FIGS. 58 and 59, a weighting curve is previously created based on the change rate of the kurtosis of the normal curve having a value of variance of 1, and the weighting curve is multiplied by positive values of weight to create a plurality of weighting curves with weight.

Then, a weighting vector having a function value of one of the weighting curves as an element is created. Next, calculation is made for a difference values $R_A(Cg)$ of mean values, which are obtained by subtracting the mean geometric distance values between the standard voices in the different categories from the mean geometric distance values between the standard voices in the same category, while changing the value of the variable Cg. Thus, the maximum value of the difference values $R_A(Cg)$ of the mean values is obtained. This maximum value is obtained repeatedly for the entire weighting curves described above, and a weighting curve corresponding to the maximum value among the maximum values of the difference values $R_A(Cg)$ of the mean values is optimized, and a value of the variable Cg corresponding to the optimized weighting curve is defined as an optimal value of the variable Cg according to the optimal weighting curve.

Moreover, the function value of the optimal weighting curve obtained as described above is defined as a weighting factor, and the weighting vector having the value of the above-described weighting factor as an element is created. Thus, the distance between the standard voices in the same category can be shortened, and simultaneously the distance between the standard voices in the different categories can be elongated. As a result thereof, the separation of the standard voice in the same category and the standard voice in the different category is improved, and thus the recognition performance when an input voice is given is improved.

Generally expressing the above-described matter, the obtainment of the optimal weighting curve and the optimal value of the variable Cg results in solving a question of optimization for obtaining values of $(m_o+1)$ pieces of variables minimizing or maximizing an objective function when the ratio value $R_E(Cg)$ of the mean values or the difference value $R_A(Cg)$ of the mean values is defined as the objective function, and the element values $gj_1 i_o$ ($i_o$=1, 2, . . . , $m_o$) of the weighting vector and the value of the variable Cg are defined as the $(m_o+1)$ pieces of variables. With regard to the question of optimization, in the field of the numerical calculation method, numerical solutions such as the method of steepest descent and the Newton's method are proposed. These numerical solutions change the values of the variables in a direction where the objective function is rapidly decreased or increased, thus the optimal value of the variable is calculated by a small number of the calculation times. Also in the present invention, by use of these numerical solutions, it is made possible to calculate the optimal weighting curve and the optimal value of the variable Cg efficiently. Accordingly, instead of previously creating the weighting curve with weight in Step Sc2 in FIG. 56 or in Step Sd2 in FIG. 58, alteration may be made so as to create the weighting curve with weight for each circulation of the loop in Step Sc4 in FIG. 56 or in Step Sd4 in FIG. 58, where the above-described numerical solutions may be utilized. Specifically, the count-th weighting curve with weight and the count-th value of the variable Cg may be changed in the direction where the ratio value $R_E(Cg)$ of the mean values or the difference value $R_A(Cg)$ of the mean values is rapidly decreased or increased to obtain the (count+1)-th weighting curve with weight and the (count+1)-th value of the variable Cg.

Moreover, for generally considering the above-described matter, next, description will be made for a relationship between the conventional Euclid distance and the geometric distance $d_E$ according to the present invention. In this embodiment, consideration is limitedly made for the case where, when the weighting curve is changed in the direction perpendicular to the u-axis, the functional value of the changed weighting curve when u=0 becomes positive, and the changed weighting curve intersects the u-axis on two points and becomes symmetric with respect to u=0 similarly to the curve shown in FIG. 46B. Here, consideration will be made for the case where the weighting curve particularly becomes the Dirac's delta function as a result of loosening the above-described limitation and changing the weighting curve in the direction perpendicular to the u-axis in the geometric distance $d_E$. Specifically, in the weighting vector, in the case where $gj_1 i_o$=1 when $i_o$=$(m_o+1)/2$ and $gj_1 i_o$=0 when $i_o \neq (m_o+1)/2$, the equation 83 is established as: $hgj_1$=$hj_1$ and $ngj_1$=$nj_1$ ($j_1$=1, 2, . . . , $m_1$). In this case, the weighted standard pattern vector and the weighted input pattern vector become the standard pattern vector and the input pattern vector, respectively. Therefore, in the above particular case, the geometric distance $d_E$ shown in the equation 87 becomes, equal to the conventional Euclid distance. Specifically, the geometric distance $d_E$ is placed as the one in which the conventional Euclid distance is expanded and generalized.

Meanwhile, description will be made for a relationship between the conventional cosine of the angle and the geometric distance $d_A$ according to the present invention. In this embodiment, consideration is limitedly made for the case where, when the weighting curve is changed in the direction perpendicular to the u-axis, the functional value of the changed weighting curve when u=0 becomes positive, and the changed weighting curve intersects the u-axis on two points and becomes symmetric with respect to u=0 similarly to the curve shown in FIG. 46B. Here, consideration will be made for the case where the weighting curve particularly becomes the Dirac's delta function as a result of loosening the above-described limitation and changing the weighting curve into the direction perpendicular to the u-axis in the geometric distance $d_A$. Specifically, in the weighting vector, in the case where $gj_1 i_o$=1 when $i_o$=$(m_o+1)/2$ and $gj_1 i_o$=0 when $i_o \neq (m_o+1)/2$, the equation 89 is established as: $hogj_1$=$hoj_1$ and $nogj_1$=$noj_1$ ($j_1$=1, 2, . . . , $m_1$). In this case, the original and weighted standard pattern vector and the original and weighted input pattern vector become equal to the original standard pattern vector and the original input pattern vector, respectively. Therefore, in the above particular case, the geometric distance $d_A$ shown in the equation 95 becomes equal to the conventional cosine of the angle. Specifically, the geometric distance $d_A$ is placed as the one in which the conventional cosine of the angle is expanded and generalized.

Moreover, consideration will be made for the above-described matter in comparison with the prior art. In the calculation processing of the geometric distance $d_E$, the weighted standard pattern vector is created by the product-sum operation of the element value of the weighting vector and the element value of the standard pattern vector. Independently of this creation, the weighted input pattern vector is created by the product-sum operation of the element value of the same weighting vector and the element value of the input pattern vector. Then, by use of the weighted standard pattern vector and the weighted input pattern vector, the conventional calculation for the Euclid distance is carried out. Here, in another expression of this calculation processing, the standard pattern vector undergoes digital filter processing by means of the weighting vector to create the weighed standard pattern vector. Independently of this creation, the input pattern vector undergoes digital filter processing by means of the same weighting vector to create the weighted input pattern vector. Then, by use of the weighted standard pattern vector and the weighted input pattern vector, the conventional calculation for the Euclid distance is carried out. Accordingly, the calculation processing of the geometric distance $d_E$ can be formally expressed as a combination of the digital filter processing and the Euclid distance. However, while the conventional digital filter and Euclid distance are conceived as single and individual each, in the calculation processing of the geometric distance $d_E$, as shown in FIG. 56, the weighting vector is created so that the ratio value $R_E(Cg)$ of the mean values can be minimum. Specifically, the calculation processing of the geometric distance $d_E$ can be said to be substantially a processing method different from the prior art in which the digital filter processing and the Euclid distance are closely related to each other even if the calculation processing is formally the combination thereof.

Meanwhile, in the calculation processing of the geometric distance $d_A$, the original and weighted standard pattern vector is created by the product-sum operation of the element value of the weighting vector and the element value of the original standard pattern vector. Independently of this creation, the original and weighted input pattern vector is created by the product-sum operation of the element value of the same weighting vector and the element value of the original input pattern vector. Then, by use of the original and weighted standard pattern vector and the original and weighted input pattern vector, the conventional calculation for the cosine of the angle is carried out. Here, in another expression of this calculation processing, the original standard pattern vector undergoes digital filter processing by means of the weighting vector to create the original and weighted standard pattern vector. Independently thereof, the original input pattern vector undergoes digital filter processing by means of the same weighting vector to create the original and weighted input pattern vector. Then, by use of the original and weighted standard pattern vector and the original and weighted input pattern vector, the conventional calculation for the cosine of the angle is carried out. Accordingly, the calculation processing of the geometric distance $d_A$ can be formally expressed as a combination of the digital filter processing and the cosine of the angle. However, while the conventional digital filter and cosine of the angle are conceived as single and individual each, in the calculation processing of the geometric distance $d_A$, as shown in FIG. 58, the weighting vector is created so that the difference value $R_A(Cg)$ of the mean values can be maximum. Specifically, the calculation processing of the geometric distance $d_A$ can be said to be substantially a processing method different from the prior art in which the digital filter processing and the cosine of the angle are closely related to each other even if the calculation processing is formally the combination of both of them.

The above description for the second subject of the present invention will be summarized as below. In the case of using the geometric distance $d_E$ as the similarity scale between the respective standard voices, while changing the weighting curve in the direction perpendicular to the u-axis and the direction parallel to the u-axis, the ratio value of the mean values is obtained by dividing the mean geometric distance value between the standard voices in the same category by the mean geometric distance value between the standard voices in the different categories, and thus the weighting curve minimizing the ratio value of the mean values is calculated. Then, the function value of the above-described weighting curve is defined as a weighting factor, and the weighting vector having the value of the above-described weighting factor as an element is created to calculate the geometric distance value. Thus, the distance between the standard voices in the same category can be shortened, and simultaneously the distance between the standard voices in the different categories can be elongated. As a result thereof, the separation of the standard voice in the same category and the standard voice in the different category is improved, and thus the recognition performance when an input voice is given is improved.

Meanwhile, in the case of using the geometric distance $d_A$ as the similarity scale between the respective standard voices, while changing the weighting curve in the direction perpendicular to the u-axis and the direction parallel to the u-axis, the difference value of the mean value is obtained by subtracting the mean geometric distance value between the standard voices in the different categories from the mean geometric distance value between the standard voices in the same category, and thus the weighting curve maximizing the difference value of the mean values is calculated. Then, the function value of the above-described weighting curve is defined as a weighting factor, and the weighting vector having the value of the above-described weighting factor as an element is created to calculate the geometric distance value. Thus, the distance between the standard voices in the same category can be shortened, and simultaneously distance between the standard voices in the different categories can be elongated. As a result thereof, the separation of the standard voice in the same category and the standard voice in the different category is improved, and thus the recognition performance when an input voice is given is improved.

The voice recognition is carried out by use of the geometric distance value $d_E$ between the standard pattern vector and the input pattern vector or the geometric distance value $d_A$ between the original standard pattern vector and the original input pattern vector, each of which is calculated as described above.

Concretely, when the original standard pattern vector having the feature quantity of the standard voice as an element and the original input pattern vector having the feature quantity of the input voice as an element are created, in the case where the method for normalizing the power spectrum pattern of the voice is previously instructed, the power spectrum patterns of the voice are normalized by the instructed method to create the standard pattern vector and the input pattern vector. Moreover, the weighting vector having the value of the change rate of the kurtosis in the reference pattern vector as an element is created. Then, the weighted standard pattern vector is created by the product-sum operation of the element value of the weighting vector and the element value of the standard pattern vector. And independently of this creation, the weighted input pattern vector is created by the product-sum operation of the element value of the same weighting vector and the element value of the input pattern vector. Next, the conventional calculation for the Euclid distance is carried out by use of these weighted standard pattern vector and weighted input pattern vector, and thus the geometric distance value between the standard pattern vector and the input pattern vector is calculated.

Furthermore, instead of the above-described weighting vector, the ratio value of the mean values is obtained by dividing the mean geometric distance value between the standard voices in the same category by the mean geometric distance value between the standard voices in the different categories, and the weighting vector having the value of the weighting factor minimizing the above ratio value of the mean values as an element is created. By use of this weighting vector, the geometric distance value between the standard pattern vector and the input pattern vector can be calculated.

The geometric distance value thus obtained is compared with an arbitrarily set allowed value. When the geometric distance value is larger than the allowed value, the input voice is judged not to be the standard voice. When the geometric distance value is equal to/smaller than the allowed value, the input voice is judged to be the standard voice.

Meanwhile, when the original standard pattern vector having the feature quantity of the standard voice as an element and the original input pattern vector having the feature quantity of the input voice as an element are created, in the case where the method for normalizing the power spectrum pattern of the voice is not previously instructed, the power spectrum pattern of the voice is not normalized, and the original standard pattern vector and the original input pattern vector are used as they are. Moreover, the weighting vector having the value of the change rate of the kurtosis in the reference pattern vector as an element is created. Then, the original and weighted standard pattern vector is created by the product-sum operation of the element value of the weighting vector and the element value of the original standard pattern vector. And independently of this creation, the original and weighted input pattern vector is created by the product-sum operation of the element value of the same weighting vector and the element value of the original input pattern vector. Next, the conventional calculation for the cosine of the angle is carried out by use of these original and weighted standard pattern vector and original and weighted input pattern vector, and thus the geometric distance value between the original standard pattern vector and the original input pattern vector is calculated.

Furthermore, instead of the above-described weighting vector, the difference value of the mean values is obtained by subtracting the mean geometric distance value between the standard voices in the different categories from the mean geometric distance value between the standard voices in the same category, and the weighting vector having the value of the weighting factor maximizing the above difference value of the mean values as an element is created. By use of this weighting vector, the geometric distance value between the original standard pattern vector and the original input pattern vector can be calculated.

The geometric distance value thus obtained is compared with an arbitrarily set allowed value. When the geometric distance value is smaller than the allowed value, the input voice is judged not to be the standard voice. When the geometric distance value is equal to/larger than the allowed value, the input voice is judged to be the standard voice.

Embodiment (VII): Method for Judging Abnormality in Machine (One-Dimension)

Next, description will be made for the method for judging an abnormality in a machine by use of a detected value of a similarity between two pattern vectors (or original pattern vectors). In this embodiment, in order to judge an abnormality in a machine, a power spectrum pattern of the oscillation waves is normalized by the entire energy of the power spectrum or the maximum value of the power spectrum, and thus a standard pattern vector and an input pattern vector are created. Moreover, a weighting vector having a value of a change rate of kurtosis in a reference pattern vector as an element is created. Then, an element value of the weighting vector and an element value of the standard pattern vector are subjected to a product-sum operation, and thus a weighted standard pattern vector is created. Independently thereof, the element value of the same weighting vector and an element value of the input pattern vector are subjected to the product-sum operation, and thus a weighted input pattern vector is created. Subsequently, a conventional calculation for the Euclid distance is carried out by use of these weighted standard pattern vector and weighted input pattern vector, and thus the similarity of the oscillation waves is detected.

Meanwhile, an original standard pattern vector and an original input pattern vector are created without normalizing the power spectrum pattern of the oscillation wave. Then, the element value of the weighting vector and an element value of the original standard pattern vector are subjected to the product-sum operation, and thus an original and weighted standard pattern vector is created. Independently thereof, the element value of the same weighting vector and an element value of the original input pattern vector are subjected to the product-sum operation, and thus an original and weighted input pattern vector is created. Subsequently, a conventional calculation for the cosine of the angle is carried out by use of these original and weighted standard pattern vector and original and weighted input pattern vector, and thus the similarity of the oscillation waves is detected.

Furthermore, the element value of the weighting vector is adjusted so that a distance between standard pattern vectors (or between original standard pattern vectors) in the same category can be shortened, and that a distance between standard pattern vectors (or between original standard pattern vectors) in different categories can be elongated simultaneously. Then, the similarity of the oscillation waves is detected by use of the weighting vector having been adjusted, and by use of a detected value thereof, the abnormality in a machine is judged.

The prior art (the gazette of Japanese Patent Laid-Open No. Hei 10(1998)-253444 (Japanese Patent Application No. Hei 9(1997)-61007)) shows a method for calculating a power spectrum $Pi_1$ ($i_1=1, 2, \ldots, m_1$) in an $i_1$-th frequency band by the equation 72 in order to extract a feature of a frequency distribution of the oscillation wave.

Accordingly, next, an original standard pattern vector Ho having a power spectrum $Pi_1$ ($i_1=1, 2, \ldots, m_1$) of a standard oscillation wave as an element and an original input pattern vector No having a power spectrum $Pi_1$ ($i_1=1, 2, \ldots, m_1$) of an input oscillation wave as an element are created. These original standard pattern vector Ho and original input pattern vector No are expressed as in the equation 73. Note that the equation 73 is read to express the shapes of the power spectra of the standard oscillation wave and the input oscillation wave by the $m_1$ pieces of element values of the original pattern vector.

Incidentally, in the abnormality judgment in a machine, even in the same machine, oscillation waves different for each operation mode are measured, and even in the same operation mode, oscillation waves having power spectrum patterns varied for each measurement appear. Therefore, a method is usually adopted, in which oscillation waves in the same operation mode are measured repeatedly, and a plurality of standard oscillation waves are registered for each operation mode. In this embodiment, the oscillation waves in the same operation mode, which are registered as described above, are defined as standard oscillation waves in the same category, and oscillation waves in an operation mode different from that are defined as standard oscillation waves in a different category.

Then, the similarity detection procedure for the voices, which is described above, is applied to the original standard pattern vector Ho and the original input pattern vector No for the oscillation wave, which are created in the above, and thus the abnormality in a machine is judged.

Concretely, when the original standard pattern vector having the feature quantity of the standard oscillation wave as an element and the original input pattern vector having the feature quantity of the input oscillation wave as an element are created, in the case where the method for normalizing the power spectrum pattern of the oscillation wave is previously instructed, the power spectrum pattern of the oscillation wave is normalized by the instructed method to create the standard pattern vector and the input pattern vector. Moreover, the weighting vector having the value of the change rate of the kurtosis of the reference pattern vector as an element is created. Then, the weighted standard pattern vector is created by the product-sum operation of the element value of the weighting vector and the element value of the standard pattern vector. Independently thereof, the weighted input pattern vector is created by the product-sum operation of the element value of the same weighting vector and the element value of the input pattern vector. Next, the conventional calculation for the Euclid distance is carried out by use of these weighted standard pattern vector and weighted input pattern vector, and thus the geometric distance value between the standard pattern vector and the input pattern vector is calculated.

Furthermore, instead of the above-described weighting vector, the ratio value of the mean values is obtained by dividing the mean geometric distance value between the standard oscillation waves in the same category by the mean geometric distance value between the standard oscillation waves in the different categories, and the weighting vector having the value of the weighting factor minimizing the above ratio value of the mean values as an element is created. By use of this weighting vector, the geometric distance value between the standard pattern vector and the input pattern vector can be calculated.

The geometric distance value thus obtained is compared with an arbitrarily set allowed value. When the geometric distance value is larger than the allowed value, the machine is judged to be abnormal. When the geometric distance value is equal to/smaller than the allowed value, the machine is judged to be normal.

Meanwhile, when the original standard pattern vector having the feature quantity of the standard oscillation wave as an element and the original input pattern vector having the feature quantity of the input oscillation wave as an element are created, in the case where the method for normalizing the power spectrum pattern of the oscillation wave is not previously instructed, the power spectrum pattern of the oscillation wave is not normalized, and the original standard pattern vector and the original input pattern vector are used as they are. Moreover, the weighting vector having the value of the change rate of the kurtosis in the reference pattern vector as an element is created. Then, the original and weighted standard pattern vector is created by the product-sum operation of the element value of the weighting vector and the element value of the original standard pattern vector. Independently of this creation, the original and weighted input pattern vector is created by the product-sum operation of the element value of the same weighting vector and the element value of the original input pattern vector. Next, the conventional calculation for the cosine of the angle is carried out by use of these original and weighted standard pattern vector and original and weighted input pattern vector, and thus the geometric distance value between the original standard pattern vector and the original input pattern vector is calculated.

Furthermore, instead of the above-described weighting vector, the difference value of the mean values is obtained by subtracting the mean geometric distance value between the standard oscillation waves in the different categories from the mean geometric distance value between the standard oscillation waves in the same category, and the weighting vector having the value of the weighting factor maximizing the above difference value of the mean values as an element is created. By use of this weighting vector, the geometric distance value between the original standard pattern vector and the original input pattern vector can be calculated.

The geometric distance value thus obtained is compared with an arbitrarily set allowed value. When the geometric distance value is smaller than the allowed value, the machine is judged to be abnormal. When the geometric distance value is equal to/larger than the allowed value, the machine is judged to be normal.

Up to the above, description is terminated for the respective methods: the method for recognizing an image, the method for recognizing a voice, and the method for judging an abnormality in a machine, all of which use a detected value of a similarity between two pattern matrices (or original pattern matrices); the method for recognizing a moving image, and the method for recognizing a solid, which use a detected value of a similarity between two pattern matrix layers (or original pattern matrix layers); and the method for recognizing a voice, and the method for judging an abnormality in a machine, which use a detected value of a similarity between two pattern vectors (or original pattern vectors).

Note that, in each of the above embodiments, the reference pattern vector is created by use of the normal distribution as a reference shape, and the weighting vector having the value of the change rate of the kurtosis in the reference pattern vector as an element is created. However, the reference pattern vector may be created by use of an arbitrary shape such as a rectangle as a reference shape, and the weighting vector having the value of the change rate of the kurtosis of the reference pattern vector as an element may be created.

The above matter can be understood for the reasons below. Specifically, in each B of FIGS. 5 to 7, each of the graphs denoted by the codes (i) to (iii) is approximately equal to a straight line. Moreover, in FIGS. 11B, 12B and 13B, gradients of the graphs denoted by the codes (vii), (viii) and (ix) are approximately equal to gradients of the graphs denoted by the codes (i), (ii) and (iii), respectively. Therefore, it is understood that the change rate $gj_1j_2i_o$ (or $gj_1j_2i_3i_o$, or $gj_1i_o$) of the kurtosis in the reference pattern vector, which is calculated based on the gradient of each graph, is not affected by the initial shape of the reference pattern vector.

Moreover, in each of the above embodiments, as elements of the original standard pattern matrix and the original input pattern matrix (or the original standard pattern matrix layer and the original input pattern matrix layer, or the original standard pattern vector and the original input pattern vector), the feature quantity as it is the measurement value is used to calculate the geometric distance value. However, as the elements of the original standard pattern matrix and the original input pattern matrix (or the original standard pattern matrix layer and the original input pattern matrix layer, or the original standard pattern vector and the original input pattern vector), a feature quantity generated by performing a variety of preprocessing for the measurement value may be used to calculate the geometric distance value.

In this case, as preprocessing, the measurement value may undergo noise removal, expansion, contraction, rotation, translation and the like according to needs. Moreover, a feature quantity obtained by subtracting a mean value of the entire measurement values from each measurement value is created, and thus the mean value of the original standard pattern matrix (or the original standard pattern matrix layer, or the original standard pattern vector) and the mean value of the original input pattern matrix (or the original input pattern matrix layer, or the original input pattern vector) may be set equal to 0.

Moreover, in each of the above embodiments, for an image, a voice, an oscillation wave, a moving image and a solid, the geometric distance value between the standard pattern matrix and the input pattern matrix (or the standard pattern matrix layer and the input pattern matrix layer, or the standard pattern vector and the input pattern vector) is calculated. Meanwhile, the geometric distance value between the original standard pattern matrix and the original input pattern matrix (or the original standard pattern matrix layer and the original input pattern matrix layer, or the original standard pattern vector and the original input pattern vector) is calculated. However, in general, for arbitrary figure and pattern irrespective of a plane, a space and a segment, the geometric distance value between the standard pattern matrix and the input pattern matrix (or the standard pattern matrix layer and the input pattern matrix layer, or the standard pattern vector and the input pattern vector) is calculated. Meanwhile, the geometric distance value between the original standard pattern matrix and the original input pattern matrix (or the original standard pattern matrix layer and the original input pattern matrix layer, or the original standard pattern vector and the original input pattern vector) is calculated. Then, by means of the obtained geometric distance value, the similarity of the figures or the patterns can be detected. Moreover, based on the detected value of the similarity, a variety of processing can be carried out, such as an analysis regarding the figure or the pattern.

As described above, in the method for detecting a similarity between images of the present invention, the shape change between the standard pattern matrix and the input pattern matrix is numerically evaluated as the Euclid distance between the weighted standard pattern matrix and the weighted input pattern matrix to be calculated as the geometric distance value. Meanwhile, the shape change between the original standard pattern matrix and the original input pattern matrix is numerically evaluated as the cosine of the angle between the original and weighted standard pattern matrix and the original and weighted input pattern matrix to be calculated as the geometric distance value. Therefore, no matter whether the density pattern of the image is normalized or not, the geometric distance value can be calculated from a shape difference between the pattern matrices or the original pattern matrices, and thus an accurate detected value of the similarity of the images can be obtained. Furthermore, since the optimal weighting vector is created to calculate the geometric distance value, the separation of the standard image in the same category and the standard image in the different category is improved, and thus the accurate detected value of the similarity of the images can be obtained.

Moreover, in the method for recognizing an image of the present invention, since the image is recognized based on the accurate detected value of the similarity of the images, there is an advantage in that a judgment criterion becomes highly reliable to make it possible to improve the precision of the image recognition significantly.

Next, in the method for detecting a similarity between voices of the present invention, the shape change between the standard pattern matrix and the input pattern matrix is numerically evaluated as the Euclid distance between the weighted standard pattern matrix and the weighted input pattern matrix to be calculated as the geometric distance value. Meanwhile, the shape change between the original standard pattern matrix and the original input pattern matrix is numerically evaluated as the cosine of the angle between the original and weighted standard pattern matrix and the original and weighted input pattern matrix to be calculated as the geometric distance value. Therefore, no matter whether the power spectrum pattern of the voice is normalized or not, the geometric distance value can be calculated from a shape difference between the pattern matrices or the original pattern matrices, and thus an accurate detected value of the similarity of the voices can be obtained. Furthermore, since the optimal weighting vector is created to calculate the geometric distance value, the separation of the standard voice in the same category and the standard voice in the different category is improved, and thus the accurate detected value of the similarity of the voices can be obtained.

Moreover, in the method for recognizing a voice of the present invention, since the voice is recognized based on the accurate detected value of the similarity of the voices, there is an advantage in that a judgment criterion becomes highly reliable to make it possible to improve the precision of the voice recognition significantly.

Next, in the method for detecting a similarity between oscillation waves of the present invention, the shape change between the standard pattern matrix and the input pattern matrix is numerically evaluated as the Euclid distance between the weighted standard pattern matrix and the weighted input pattern matrix to be calculated as the geometric distance value. Meanwhile, the shape change between the original standard pattern matrix and the original input pattern matrix is numerically evaluated as the cosine of the angle between the original and weighted standard pattern matrix and the original and weighted input pattern matrix to be calculated as the geometric distance value. Therefore, no matter whether the power spectrum pattern of the oscillation wave is normalized or not, the geometric distance value can be calculated from a shape difference between the pattern matrices or the original pattern matrices, and thus an accurate detected value of the similarity of the oscillation waves can be obtained. Furthermore, since the optimal weighting vector is created to calculate the geometric distance value, the separation of the standard oscillation wave in the same category and the standard oscillation wave in the different category is improved, and thus the accurate detected value of the similarity of the oscillation waves can be obtained.

Moreover, in the method for judging an abnormality in a machine of the present invention, since the abnormality is judged based on the accurate detected value of the similarity of the oscillation waves, there is an advantage in that a judgment criterion becomes highly reliable to make it possible to improve the precision of detecting the abnormality in the machine significantly.

Next, in the method for detecting a similarity between moving images of the present invention, the shape change between the standard pattern matrix layer and the input pattern matrix layer is numerically evaluated as the Euclid distance between the weighted standard pattern matrix layer and the weighted input pattern matrix layer to be calculated as the geometric distance value. Meanwhile, the shape change between the original standard pattern matrix layer and the original input pattern matrix layer is numerically evaluated as the cosine of the angle between the original and weighted standard pattern matrix layer and the original and weighted input pattern matrix layer to be calculated as the geometric distance value. Therefore, no matter whether the density pattern of the moving image is normalized or not, the geometric distance value can be calculated from a shape difference between the pattern matrix layers or the original pattern matrix layers, and thus an accurate detected value of the similarity of the moving images can be obtained. Furthermore, since the optimal weighting vector is created to calculate the geometric distance value, the separation of the standard moving image in the same category and the standard moving image in the different category is improved, and thus the accurate detected value of the similarity of the moving images can be obtained.

Moreover, in the method for recognizing a moving image of the present invention, since the moving image is recognized based on the accurate detected value of the similarity of the moving images, there is an advantage in that a judgment criterion becomes highly reliable to make it possible to improve the precision of the moving image recognition significantly.

Next, in the method for detecting a similarity between solids of the present invention, the shape change between the standard pattern matrix layer and the input pattern matrix layer is numerically evaluated as the Euclid distance between the weighted standard pattern matrix layer and the weighted input pattern matrix layer to be calculated as the geometric distance value. Meanwhile, the shape change between the original standard pattern matrix layer and the original input pattern matrix layer is numerically evaluated as the cosine of the angle between the original and weighted standard pattern matrix layer and the original and weighted input pattern matrix layer to be calculated as the geometric distance value. Therefore, no matter whether the density pattern of the solid is normalized or not, the geometric distance value can be calculated from a shape difference between the pattern matrix layers or the original pattern matrix layers, and thus an accurate detected value of the similarity of the solids can be obtained. Furthermore, since the optimal weighting vector is created to calculate the geometric distance value, the separation of the standard solid in the same category and the standard solid in the different category is improved, and thus the accurate detected value of the similarity of the solids can be obtained.

Moreover, in the method for recognizing a solid of the present invention, since the solid is recognized based on the accurate detected value of the similarity of the solids, there is an advantage in that a judgment criterion becomes highly reliable to make it possible to improve the precision of the solid recognition significantly.

Next, in the method for detecting a similarity between voices of the present invention, the shape change between the standard pattern vector and the input pattern vector is numerically evaluated as the Euclid distance between the weighted standard pattern vector and the weighted input pattern vector to be calculated as the geometric distance value. Meanwhile, the shape change between the original standard pattern vector and the original input pattern vector is numerically evaluated as the cosine of the angle between the original and weighted standard pattern vector and the original and weighted input pattern vector to be calculated as the geometric distance value. Therefore, no matter whether the power spectrum pattern of the voice is normalized or not, the geometric distance value can be calculated from a shape difference between the pattern vectors or the original pattern vectors, and thus an accurate detected value of the similarity of the voices can be obtained. Furthermore, since the optimal weighting vector is created to calculate the geometric distance value, the separation of the standard voice in the same category and the standard voice in the different category is improved, and thus the accurate detected value of the similarity of the voices can be obtained.

Moreover, in the method for recognizing a voice of the present invention, since the voice is recognized based on the accurate detected value of the similarity of the voices, there is an advantage in that a judgment criterion becomes highly reliable to make it possible to improve the precision of the voice recognition significantly.

Next, in the method for detecting a similarity between oscillation waves of the present invention, the shape change between the standard pattern vector and the input pattern vector is numerically evaluated as the Euclid distance between the weighted standard pattern vector and the weighted input pattern vector to be calculated as the geometric distance value. Meanwhile, the shape change between the original standard pattern vector and the original input pattern vector is numerically evaluated as the cosine of the angle between the original and weighted standard pattern vector and the original and weighted input pattern vector to be calculated as the geometric distance value. Therefore, no matter whether the power spectrum pattern of the oscillation wave is normalized or not, the geometric distance value can be calculated from a shape difference between the pattern vectors or the original pattern vectors, and thus an accurate detected value of the similarity of the oscillation waves can be obtained. Furthermore, since the optimal weighting vector is created to calculate the geometric distance value, the separation of the standard oscillation wave in the same category and the standard oscillation wave in the different category is improved, and thus the accurate detected value of the similarity of the oscillation waves can be obtained.

Moreover, in the method for judging an abnormality in a machine of the present invention, since the abnormality is judged based on the accurate detected value of the similarity of the oscillation waves, there is an advantage in that a judgment criterion becomes highly reliable to make it possible to improve the precision of detecting the abnormality in the machine significantly.

What is claimed is:

1. A method for detecting a similarity between images, comprising the steps of:

(a) creating a standard pattern matrix having a feature quantity of a standard image as an element and an input pattern matrix having a feature quantity of an input image as an element;

(b) creating an arbitrary reference shape such as a normal distribution and a rectangle, the reference shape having a different value of variance for each specified element of the pattern matrices, creating a reference pattern vector having a value of the reference shape as an element, and creating a weighting vector having a value of a change rate of a kurtosis of the reference pattern vector as an element;

(c) obtaining a length between the specified element and each element of the standard pattern matrix to calculate a weighting vector element number proximate to a position apart from a center of the weighting vector by the length, and obtaining a value of a product of an element value of the element number of the weighting vector and an element value of each element of the standard pattern matrix to calculate a product-sum value obtained by adding the value of the product to each element of the standard pattern matrix;

(d) when calculating the product-sum value, obtaining the product-sum value while moving the specified element of the standard pattern matrix to a position of each element thereof, and creating a weighted standard pattern matrix having the product-sum value as an element value of the specified element;

(e) obtaining a length between the specified element and each element of the input pattern matrix to calculate a weighting vector element number proximate to a position apart from a center of the weighting vector by the length, and obtaining a value of a product of an element value of the element number of the weighting vector and an element value of each element of the input pattern matrix to calculate a product-sum value obtained by adding the value of the product to each element of the input pattern matrix;

(f) when calculating the product-sum value, obtaining the product-sum value while moving the specified element of the input pattern matrix to a position of each element thereof, and creating a weighted input pattern matrix having the product-sum value as an element value of the specified element; and (g) defining any of a square sum and a square root of the square sum of a value of a difference between the weighted standard pattern matrix and the weighted input pattern matrix for each element as a geometric distance value between the standard pattern matrix and the input pattern matrix.

2. The method for detecting a similarity between images according to claim 1, wherein, instead of the weighting vector, a ratio value of mean values is obtained, the ratio value being obtained by dividing a mean geometric distance value between standard images in the same category by a mean geometric distance value between standard images in different categories, and a weighting vector having a value of a weighting factor minimizing the ratio value of the mean values as an element is created.

3. A method for recognizing an image, comprising the steps of:
   obtaining the geometric distance between the standard pattern matrix having the feature quantity of the standard image as an element and the input pattern matrix having the feature quantity of the input image as an element by the method for detecting a similarity between images according to any one of claims 1 and 2;
   comparing the obtained geometric distance value with an arbitrarily set allowed value; and
   judging the input image not to be the standard image when the geometric distance value is larger than the allowed value, and judging the input image to be the standard image when the geometric distance value is equal to/smaller than the allowed value.

4. A method for detecting a similarity between images, comprising the steps of:
   (a) creating an original standard pattern matrix having a feature quantity of a standard image as an element and an original input pattern matrix having a feature quantity of an input image as an element;
   (b) creating an arbitrary reference shape such as a normal distribution and a rectangle, the reference shape having a different value of variance for each specified element of the original pattern matrices, creating a reference pattern vector having a value of the reference shape as an element, and creating a weighting vector having a value of a change rate of a kurtosis of the reference pattern vector as an element;

(c) obtaining a length between the specified element and each element of the original standard pattern matrix to calculate a weighting vector element number proximate to a position apart from a center of the weighting vector by the length, and obtaining a value of a product of an element value of the element number of the weighting vector and an element value of each element of the original standard pattern matrix to calculate a product-sum value obtained by adding the value of the product to each element of the original standard pattern matrix;

(d) when calculating the product-sum value, obtaining the product-sum value while moving the specified element of the original standard pattern matrix to a position of each element thereof, and creating an original and weighted standard pattern matrix having the product-sum value as an element value of the specified element;

(e) obtaining a length between the specified element and each element of the original input pattern matrix to calculate a weighting vector element number proximate to a position apart from a center of the weighting vector by the length, and obtaining a value of a product of an element value of the element number of the weighting vector and an element value of each element of the original input pattern matrix to calculate a product-sum value obtained by adding the value of the product to each element of the original input pattern matrix;

(f) when calculating the product-sum value, obtaining the product-sum value while moving the specified element of the original input pattern matrix to a position of each element thereof, and creating an original and weighted input pattern matrix having the product-sum value as an element value of the specified element; and (g) defining a ratio value as a geometric distance value between the original standard pattern matrix and the original input pattern matrix, the ratio value being obtained by dividing a product-sum value of the original and weighted standard pattern matrix and the original and weighted input pattern matrix for each element by a square root of a square sum of each element of the original and weighted standard pattern matrix and a square root of a square sum of each element of the original and weighted input pattern matrix.

5. The method for detecting a similarity between images according to claim 4, wherein, instead of the weighting vector, a difference value of mean values is obtained, the difference value being obtained by subtracting a mean geometric distance value between standard images in different categories from a mean geometric distance value between standard images in the same category, and a weighting vector having a value of a weighting factor maximizing the difference value of the mean values as an element is created.

6. A method for recognizing an image, comprising the steps of:
   obtaining the geometric distance between the original standard pattern matrix having the feature quantity of the standard image as an element and the original input pattern matrix having the feature quantity of the input image as an element by the method for detecting a similarity between images according to any one of claims 4 and 5;
   comparing the obtained geometric distance value with an arbitrarily set allowed value; and judging the input image not to be the standard image when the geometric distance value is smaller than the allowed value, and judging the input image to be the standard image when the geometric distance value is equal to/larger than the allowed value.

7. A method for detecting a similarity between voices, comprising the steps of:
(a) creating a standard pattern matrix having a feature quantity of a standard voice as an element and an input pattern matrix having a feature quantity of an input voice as an element;
(b) creating an arbitrary reference shape such as a normal distribution and a rectangle, the reference shape having a different value of variance for each specified element of the pattern matrices, creating a reference pattern vector having a value of the reference shape as an element, and creating a weighting vector having a value of a change rate of a kurtosis of the reference pattern vector as an element;
(c) obtaining a length between the specified element and each element of the standard pattern matrix to calculate a weighting vector element number proximate to a position apart from a center of the weighting vector by the length, and obtaining a value of a product of an element value of the element number of the weighting vector and an element value of each element of the standard pattern matrix to calculate a product-sum value obtained by adding the value of the product to each element of the standard pattern matrix;
(d) when calculating the product-sum value, obtaining the product-sum value while moving the specified element of the standard pattern matrix to a position of each element thereof, and creating a weighted standard pattern matrix having the product-sum value as an element value of the specified element;
(e) obtaining a length between the specified element and each element of the input pattern matrix to calculate a weighting vector element number proximate to a position apart from a center of the weighting vector by the length, and obtaining a value of a product of an element value of the element number of the weighting vector and an element value of each element of the input pattern matrix to calculate a product-sum value obtained by adding the value of the product to each element of the input pattern matrix;
(f) when calculating the product-sum value, obtaining the product-sum value while moving the specified element of the input pattern matrix to a position of each element thereof, and creating a weighted input pattern matrix having the product-sum value as an element value of the specified element; and
(g) defining any of a square sum and a square root of the square sum of a value of a difference between the weighted standard pattern matrix and the weighted input pattern matrix for each element as a geometric distance value between the standard pattern matrix and the input pattern matrix.

8. The method for detecting a similarity between voices according to claim 7, wherein, instead of the weighting vector, a ratio value of mean values is obtained, the ratio value being obtained by dividing a mean geometric distance value between standard voices in the same category by a mean geometric distance value between standard voices in different categories, and a weighting vector having a value of a weighting factor minimizing the ratio value of the mean values as an element is created.

9. A method for recognizing a voice, comprising the steps of:
obtaining the geometric distance between the standard pattern matrix having the feature quantity of the standard voice as an element and the input pattern matrix having the feature quantity of the input voice as an element by the method for detecting a similarity between voices according to any one of claims 7 and 8;
comparing the obtained geometric distance value with an arbitrarily set allowed value; and
judging the input voice not to be the standard voice when the geometric distance value is larger than the allowed value, and judging the input voice to be the standard voice when the geometric distance value is equal to/smaller than the allowed value.

10. A method for detecting a similarity between voices, comprising the steps of:
(a) creating an original standard pattern matrix having a feature quantity of a standard voice as an element and an original input pattern matrix having a feature quantity of an input voice as an element;
(b) creating an arbitrary reference shape such as a normal distribution and a rectangle, the reference shape having a different value of variance for each specified element of the original pattern matrices, creating a reference pattern vector having a value of the reference shape as an element, and creating a weighting vector having a value of a change rate of a kurtosis of the reference pattern vector as an element;
(c) obtaining a length between the specified element and each element of the original standard pattern matrix to calculate a weighting vector element number proximate to a position apart from a center of the weighting vector by the length, and obtaining a value of a product of an element value of the element number of the weighting vector and an element value of each element of the original standard pattern matrix to calculate a product-sum value obtained by adding the value of the product to each element of the original standard pattern matrix;
(d) when calculating the product-sum value, obtaining the product-sum value while moving the specified element of the original standard pattern matrix to a position of each element thereof, and creating an original and weighted standard pattern matrix having the product-sum value as an element value of the specified element;
(e) obtaining a length between the specified element and each element of the original input pattern matrix to calculate a weighting vector element number proximate to a position apart from a center of the weighting vector by the length, and obtaining a value of a product of an element value of the element number of the weighting vector and an element value of each element of the original input pattern matrix to calculate a product-sum value obtained by adding the value of the product to each element of the original input pattern matrix;
(f) when calculating the product-sum value, obtaining the product-sum value while moving the specified element of the original input pattern matrix to a position of each element thereof, and creating an original and weighted input pattern matrix having the product-sum value as an element value of the specified element; and
(g) defining a ratio value as a geometric distance value between the original standard pattern matrix and the original input pattern matrix, the ratio value being obtained by dividing a product-sum value of the original and weighted standard pattern matrix and the original and weighted input pattern matrix for each element by a square root of a square sum of each element of the original and weighted standard pattern matrix and a square root of a square sum of each element of the original and weighted input pattern matrix.

11. The method for detecting a similarity between voices according to claim 10, wherein, instead of the weighting vector, a difference value of mean values is obtained, the difference value being obtained by subtracting a mean geometric distance value between standard voices in different categories from a mean geometric distance value between standard voices in the same category, and a weighting vector having a value of a weighting factor maximizing the difference value of the mean values as an element is created.

12. A method for recognizing a voice, comprising the steps of:
obtaining the geometric distance between the original standard pattern matrix having the feature quantity of the standard voice as an element and the original input pattern matrix having the feature quantity of the input voice as an element by the method for detecting a similarity between voices according to any one of claims 10 and 11;
comparing the obtained geometric distance value with an arbitrarily set allowed value; and
judging the input voice not to be the standard voice when the geometric distance value is smaller than the allowed value, and judging the input voice to be the standard voice when the geometric distance value is equal to/larger than the allowed value.

13. A method for detecting a similarity between oscillation waves, comprising the steps of:
(a) creating a standard pattern matrix having a feature quantity of a standard oscillation wave as an element and an input pattern matrix having a feature quantity of an input oscillation wave as an element;
(b) creating an arbitrary reference shape such as a normal distribution and a rectangle, the reference shape having a different value of
variance for each specified element of the pattern matrices, creating a reference pattern vector having a value of the reference shape as an element, and creating a weighting vector having a value of a change rate of a kurtosis of the reference pattern vector as an element;
(c) obtaining a length between the specified element and each element of the standard pattern matrix to calculate a weighting vector element number proximate to a position apart from a center of the weighting vector by the length, and obtaining a value of a product of an element value of the element number of the weighting vector and an element value of each element of the standard pattern matrix to calculate a product-sum value obtained by adding the value of the product to each element of the standard pattern matrix;
(d) when calculating the product-sum value, obtaining the product-sum value while moving the specified element of the standard pattern matrix to a position of each element thereof, and creating a weighted standard pattern matrix having the product-sum value as an element value of the specified element;
(e) obtaining a length between the specified element and each element of the input pattern matrix to calculate a weighting vector element number proximate to a position apart from a center of the weighting vector by the length, and obtaining a value of a product of an element value of the element number of the weighting vector and an element value of each element of the input pattern matrix to calculate a product-sum value obtained by adding the value of the product to each element of the input pattern matrix;
(f) when calculating the product-sum value, obtaining the product-sum value while moving the specified element of the input pattern matrix to a position of each element thereof, and creating a weighted input pattern matrix having the product-sum value as an element value of the specified element; and
(g) defining any of a square sum and a square root of the square sum of a value of a difference between the weighted standard pattern matrix and the weighted input pattern matrix for each element as a geometric distance value between the standard pattern matrix and the input pattern matrix.

14. The method for detecting a similarity between oscillation waves according to claim 13, wherein, instead of the weighting vector, a ratio value of mean values is obtained, the ratio value being obtained by dividing a mean geometric distance value between standard oscillation waves in the same category by a mean geometric distance value between standard oscillation waves in different categories, and a weighting vector having a value of a weighting factor minimizing the ratio value of the mean values as an element is created.

15. A method for judging an abnormality in a machine, comprising the steps of:
obtaining the geometric distance between the standard pattern matrix having the feature quantity of the standard oscillation wave as an element and the input pattern matrix having the feature quantity of the input oscillation wave as an element by the method for detecting a similarity between oscillation waves according to any one of claims 13 and 14;
comparing the obtained geometric distance value with an arbitrarily set allowed value; and
judging the machine to be abnormal when the geometric distance value is larger than the allowed value, and judging the machine to be normal when the geometric distance value is equal to/smaller than the allowed value.

16. A method for detecting a similarity between oscillation waves, comprising the steps of:
(a) creating an original standard pattern matrix having a feature quantity of a standard oscillation wave as an element and an original input pattern matrix having a feature quantity of an input oscillation wave as an element;
(b) creating an arbitrary reference shape such as a normal distribution and a rectangle, the reference shape having a different value of
variance for each specified element of the original pattern matrices, creating a reference pattern vector having a value of the reference shape as an element, and creating a weighting vector having a value of a change rate of a kurtosis of the reference pattern vector as an element;
(c) obtaining a length between the specified element and each element of the original standard pattern matrix to calculate a weighting vector element number proximate to a position apart from a center of the weighting vector by the length, and obtaining a value of a product of an element value of the element number of the weighting vector and an element value of each element of the original standard pattern matrix to calculate a product-sum value obtained by adding the value of the product to each element of the original standard pattern matrix;

(d) when calculating the product-sum value, obtaining the product-sum value while moving the specified element of the original standard pattern matrix to a position of each element thereof, and creating an original and weighted standard pattern matrix having the product-sum value as an element value of the specified element;

(e) obtaining a length between the specified element and each element of the original input pattern matrix to calculate a weighting vector element number proximate to a position apart from a center of the weighting vector by the length, and obtaining a value of a product of an element value of the element number of the weighting vector and an element value of each element of the original input pattern matrix to calculate a product-sum value obtained by adding the value of the product to each element of the original input pattern matrix;

(f) when calculating the product-sum value, obtaining the product-sum value while moving the specified element of the original input pattern matrix to a position of each element thereof, and creating an original and weighted input pattern matrix having the product-sum value as an element value of the specified element; and (g) defining a ratio value as a geometric distance value between the original standard pattern matrix and the original input pattern matrix, the ratio value being obtained by dividing a product-sum value of the original and weighted standard pattern matrix and the original and weighted input pattern matrix for each element by a square root of a square sum of each element of the original and weighted standard pattern matrix and a square root of a square sum of each element of the original and weighted input pattern matrix.

17. The method for detecting a similarity between oscillation waves according to claim 16, wherein, instead of the weighting vector, a difference value of mean values is obtained, the difference value being obtained by subtracting a mean geometric distance value between standard oscillation waves in different categories from a mean geometric distance value between standard oscillation waves in the same category, and a weighting vector having a value of a weighting factor maximizing the difference value of the mean values as an element is created.

18. A method for judging an abnormality in a machine, comprising the steps of:
obtaining the geometric distance between the original standard pattern matrix having the feature quantity of the standard oscillation wave as an element and the original input pattern matrix having the feature quantity of the input oscillation wave as an element by the method for detecting a similarity between oscillation waves according to any one of claims 16 and 17;
comparing the obtained geometric distance value with an arbitrarily set allowed value; and
judging the machine to be abnormal when the geometric distance value is smaller than the allowed value, and judging the machine to be normal when the geometric distance value is equal to/larger than the allowed value.

19. A method for detecting a similarity between moving images, comprising the steps of:
(a) creating a standard pattern matrix layer having a feature quantity of a standard moving image as an element and an input pattern matrix layer having a feature quantity of an input moving image as an element;
(b) creating an arbitrary reference shape such as a normal distribution and a rectangle, the reference shape having a different value of variance for each specified element of the pattern matrix layers, creating a reference pattern vector having a value of the reference shape as an element, and creating a weighting vector having a value of a change rate of a kurtosis of the reference pattern vector as an element;

(c) obtaining a length between the specified element and each element of the standard pattern matrix layer to calculate a weighting vector element number proximate to a position apart from a center of the weighting vector by the length, and obtaining a value of a product of an element value of the element number of the weighting vector and an element value of each element of the standard pattern matrix layer to calculate a product-sum value obtained by adding the value of the product to each element of the standard pattern matrix layer;

(d) when calculating the product-sum value, obtaining the product-sum value while moving the specified element of the standard pattern matrix layer to a position of each element thereof, and creating a weighted standard pattern matrix layer having the product-sum value as an element value of the specified element;

(e) obtaining a length between the specified element and each element of the input pattern matrix layer to calculate a weighting vector element number proximate to a position apart from a center of the weighting vector by the length, and obtaining a value of a product of an element value of the element number of the weighting vector and an element value of each element of the input pattern matrix layer to calculate a product-sum value obtained by adding the value of the product to each element of the input pattern matrix layer;

(f) when calculating the product-sum value, obtaining the product-sum value while moving the specified element of the input pattern matrix layer to a position of each element thereof, and creating a weighted input pattern matrix layer having the product-sum value as an element value of the specified element; and (g) defining any of a square sum and a square root of the square sum of a value of a difference between the weighted standard pattern matrix layer and the weighted input pattern matrix layer for each element as a geometric distance value between the standard pattern matrix layer and the input pattern matrix layer.

20. The method for detecting a similarity between moving images according to claim 19, wherein, instead of the weighting vector, a ratio value of mean values is obtained, the ratio value being obtained by dividing a mean geometric distance value between standard moving images in the same category by a mean geometric distance value between standard moving images in different categories, and a weighting vector having a value of a weighting factor minimizing the ratio value of the mean values as an element is created.

21. A method for recognizing a moving image, comprising the steps of:
obtaining the geometric distance between the standard pattern matrix layer having the feature quantity of the standard moving image as an element and the input pattern matrix layer having the feature quantity of the input moving image as an element by the method for detecting a similarity between moving images according to any one of claims 19 and 20;
comparing the obtained geometric distance value with an arbitrarily set allowed value; and
judging the input moving image not to be the standard moving image when the geometric distance value is larger than the allowed value, and judging the input moving image to be the standard moving image when the geometric distance value is equal to/smaller than the allowed value.

22. A method for detecting a similarity between moving images, comprising the steps of:
(a) creating an original standard pattern matrix layer having a feature quantity of a standard moving image as an element and an original input pattern matrix layer having a feature quantity of an input moving image as an element;
(b) creating an arbitrary reference shape such as a normal distribution and a rectangle, the reference shape having a different value of variance for each specified element of the original pattern matrix layers, creating a reference pattern vector having a value of the reference shape as an element, and creating a weighting vector having a value of a change rate of a kurtosis of the reference pattern vector as an element;
(c) obtaining a length between the specified element and each element of the original standard pattern matrix layer to calculate a weighting vector element number proximate to a position apart from a center of the weighting vector by the length, and obtaining a value of a product of an element value of the element number of the weighting vector and an element value of each element of the original standard pattern matrix layer to calculate a product-sum value obtained by adding the value of the product to each element of the original standard pattern matrix layer;
(d) when calculating the product-sum value, obtaining the product-sum value while moving the specified element of the original standard pattern matrix layer to a position of each element thereof, and creating an original and weighted standard pattern matrix layer having the product-sum value as an element value of the specified element;
(e) obtaining a length between the specified element and each element of the original input pattern matrix layer to calculate a weighting vector element number proximate to a position apart from a center of the weighting vector by the length, and obtaining a value of a product of an element value of the element number of the weighting vector and an element value of each element of the original input pattern matrix layer to calculate a product-sum value obtained by adding the value of the product to each element of the original input pattern matrix layer;
(f) when calculating the product-sum value, obtaining the product-sum value while moving the specified element of the original input pattern matrix layer to a position of each element thereof, and creating an original and weighted input pattern matrix layer having the product-sum value as an element value of the specified element; and
(g) defining a ratio value as a geometric distance value between the original standard pattern matrix layer and the original input pattern matrix layer, the ratio value being obtained by dividing a product-sum value of the original and weighted standard pattern matrix layer and the original and weighted input pattern matrix layer for each element by a square root of a square sum of each element of the original and weighted standard pattern matrix layer and a square root of a square sum of each element of the original and weighted input pattern matrix layer.

23. The method for detecting a similarity between moving images according to claim 22, wherein, instead of the weighting vector, a difference value of mean values is obtained, the difference value being obtained by subtracting a mean geometric distance value between standard moving images in different categories from a mean geometric distance value between standard moving images in the same category, and a weighting vector having a value of a weighting factor maximizing the difference value of the mean values as an element is created.

24. A method for recognizing a moving image, comprising the steps of:
obtaining the geometric distance between the original standard pattern matrix layer having the feature quantity of the standard moving image as an element and the original input pattern matrix layer having the feature quantity of the input moving image as an element by the method for detecting a similarity between moving images according to any one of claims 22 and 23;
comparing the obtained geometric distance value with an arbitrarily set allowed value; and
judging the input moving image not be the standard moving image when the geometric distance value is smaller than the allowed value, and judging the input moving image to be the standard moving image when the geometric distance value is equal to/larger than the allowed value.

25. A method for detecting a similarity between solids, comprising the steps of:
(a) creating a standard pattern matrix layer having a feature quantity of a standard solid as an element and an input pattern matrix layer having a feature quantity of an input solid as an element;
(b) creating an arbitrary reference shape such as a normal distribution and a rectangle, the reference shape having a different value of variance for each specified element of the pattern matrix layers, creating a reference pattern vector having a value of the reference shape as an element, and creating a weighting vector having a value of a change rate of a kurtosis of the reference pattern vector as an element;
(c) obtaining a length between the specified element and each element of the standard pattern matrix layer to calculate a weighting vector element number proximate to a position apart from a center of the weighting vector by the length, and obtaining a value of a product of an element value of the element number of the weighting vector and an element value of each element of the standard pattern matrix layer to calculate a product-sum value obtained by adding the value of the product to each element of the standard pattern matrix layer;
(d) when calculating the product-sum value, obtaining the product-sum value while moving the specified element of the standard pattern matrix layer to a position of each element thereof, and creating a weighted standard pattern matrix layer having the product-sum value as an element value of the specified element;
(e) obtaining a length between the specified element and each element of the input pattern matrix layer to calculate a weighting vector element number proximate to a position apart from a center of the weighting vector by the length, and obtaining a value of a product of an element value of the element number of the weighting vector and an element value of each element of the input pattern matrix layer to calculate a product-sum value obtained by adding the value of the product to each element of the input pattern matrix layer;
(f) when calculating the product-sum value, obtaining the product-sum value while moving the specified element of the input pattern matrix layer to a position of each element thereof, and creating a weighted input pattern matrix layer having the product-sum value as an element value of the specified element; and (g) defining any of a square sum and a square root of the square sum of a value of a difference between the weighted standard pattern matrix layer and the weighted input pattern matrix layer for each element as a geometric distance value between the standard pattern matrix layer and the input pattern matrix layer.

26. The method for detecting a similarity between solids according to claim 25, wherein, instead of the weighting vector, a ratio value of mean values is obtained, the ratio value being obtained by dividing a mean geometric distance value between standard solids in the same category by a mean geometric distance value between standard solids in different categories, and a weighting vector having a value of a weighting factor minimizing the ratio value of the mean values as an element is created.

27. A method for recognizing a solid, comprising the steps of:

obtaining the geometric distance between the standard pattern matrix layer having the feature quantity of the standard solid as an element and the input pattern matrix layer having the feature quantity of the input solid as an element by the method for detecting a similarity between solids according to any one of claims 25 and 26;

comparing the obtained geometric distance value with an arbitrarily set allowed value; and judging the input solid not to be the standard solid when the geometric distance value is larger than the allowed value, and judging the input solid to be the standard solid when the geometric distance value is equal to/smaller than the allowed value.

28. A method for detecting a similarity between solids, comprising the steps of:

(a) creating an original standard pattern matrix layer having a feature quantity of a standard solid as an element and an original input pattern matrix layer having a feature quantity of an input solid as an element;

(b) creating an arbitrary reference shape such as a normal distribution and a rectangle, the reference shape having a different value of variance for each specified element of the original pattern matrix layers, creating a reference pattern vector having a value of the reference shape as an element, and creating a weighting vector having a value of a change rate of a kurtosis of the reference pattern vector as an element;

(c) obtaining a length between the specified element and each element of the original standard pattern matrix layer to calculate a weighting vector element number proximate to a position apart from a center of the weighting vector by the length, and obtaining a value of a product of an element value of the element number of the weighting vector and an element value of each element of the original standard pattern matrix layer to calculate a product-sum value obtained by adding the value of the product to each element of the original standard pattern matrix layer;

(d) when calculating the product-sum value, obtaining the product-sum value while moving the specified element of the original standard pattern matrix layer to a position of each element thereof, and creating an original and weighted standard pattern matrix layer having the product-sum value as an element value of the specified element;

(e) obtaining a length between the specified element and each element of the original input pattern matrix layer to calculate a weighting vector element number proximate to a position apart from a center of the weighting vector by the length, and obtaining a value of a product of an element value of the element number of the weighting vector and an element value of each element of the original input pattern matrix layer to calculate a product-sum value obtained by adding the value of the product to each element of the original input pattern matrix layer;

(f) when calculating the product-sum value, obtaining the product-sum value while moving the specified element of the original input pattern matrix layer to a position of each element thereof, and creating an original and weighted input pattern matrix layer having the product-sum value as an element value of the specified element; and (g) defining a ratio value as a geometric distance value between the original standard pattern matrix layer and the original input pattern matrix layer, the ratio value being obtained by dividing a product-sum value of the original and weighted standard pattern matrix layer and the original and weighted input pattern matrix layer for each element by a square root of a square sum of each element of the original and weighted standard pattern matrix layer and a square root of a square sum of each element of the original and weighted input pattern matrix layer.

29. The method for detecting a similarity between solids according to claim 28, wherein, instead of the weighting vector, a difference value of mean values is obtained, the difference value being obtained by subtracting a mean geometric distance value between standard solids in different categories from a mean geometric distance value between standard solids in the same category, and a weighting vector having a value of a weighting factor maximizing the difference value of the mean values as an element is created.

30. A method for recognizing a solid, comprising the steps of:

obtaining the geometric distance between the original standard pattern matrix layer having the feature quantity of the standard solid as an element and the original input pattern matrix layer having the feature quantity of the input solid as an element by the method for detecting a similarity between solids according to any one of claims 28 and 29;

comparing the obtained geometric distance value with an arbitrarily set allowed value; and judging the input solid not be the standard solid when the geometric distance value is smaller than the allowed value, and judging the input solid to be the standard image solid when the geometric distance value is equal to/larger than the allowed value.

31. A method for detecting a similarity between voices, comprising the steps of:

(a) creating a standard pattern vector having a feature quantity of a standard voice as an element and an input pattern vector having a feature quantity of an input voice as an element;

(b) creating an arbitrary reference shape such as a normal distribution and a rectangle, the reference shape having a different value of variance for each specified element of the pattern vectors, creating a reference pattern vector having a value of the reference shape as an element, and creating a weighting vector having a value of a change rate of a kurtosis of the reference pattern vector as an element;

(c) obtaining a length between the specified element and each element of the standard pattern vector to calculate a weighting vector element number proximate to a position apart from a center of the weighting vector by the length, and obtaining a value of a product of an element value of the element number of the weighting vector and an element value of each element of the standard pattern vector to calculate a product-sum value obtained by adding the value of the product to each element of the standard pattern vector;

(d) when calculating the product-sum value, obtaining the product-sum value while moving the specified element of the standard pattern vector to a position of each element thereof, and creating a weighted standard pattern vector having the product-sum value as an element value of the specified element;

(e) obtaining a length between the specified element and each element of the input pattern vector to calculate a weighting vector element number proximate to a position apart from a center of the weighting vector by the length, and obtaining a value of a product of an element value of the element number of the weighting vector and an element value of each element of the input pattern vector to calculate a product-sum value obtained by adding the value of the product to each element of the input pattern vector;

(f) when calculating the product-sum value, obtaining the product-sum value while moving the specified element of the input pattern vector to a position of each element thereof, and creating a weighted input pattern vector having the product-sum value as an element value of the specified element; and (g) defining any of a square sum and a square root of the square sum of a value of a difference between the weighted standard pattern vector and the weighted input pattern vector for each element as a geometric distance value between the standard pattern vector and the input pattern vector.

32. The method for detecting a similarity between voices according to claim 31, wherein, instead of the weighting vector, a ratio value of mean values is obtained, the ratio value being obtained by dividing a mean geometric distance value between standard voices in the same category by a mean geometric distance value between standard voices in different categories, and a weighting vector having a value of a weighting factor minimizing the ratio value of the mean values as an element is created.

33. A method for recognizing a voice, comprising the steps of:
obtaining the geometric distance between the standard pattern vector having the feature quantity of the standard voice as an element and the input pattern vector having the feature quantity of the input voice as an element by the method for detecting a similarity between voices according to any one of claims 31 and 32;
comparing the obtained geometric distance value with an arbitrarily set allowed value; and
judging the input voice not to be the standard voice when the geometric distance value is larger than the allowed value, and judging the input voice to be the standard voice when the geometric distance value is equal to/smaller than the allowed value.

34. A method for detecting a similarity between voices, comprising the steps of:

(a) creating an original standard pattern vector having a feature quantity of a standard voice as an element and an original input pattern vector having a feature quantity of an input voice as an element;

(b) creating an arbitrary reference shape such as a normal distribution and a rectangle, the reference shape having a different value of variance for each specified element of the original pattern vectors, creating a reference pattern vector having a value of the reference shape as an element, and creating a weighting vector having a value of a change rate of a kurtosis of the reference pattern vector as an element;

(c) obtaining a length between the specified element and each element of the original standard pattern vector to calculate a weighting vector element number proximate to a position apart from a center of the weighting vector by the length, and obtaining a value of a product of an element value of the element number of the weighting vector and an element value of each element of the original standard pattern vector to calculate a product-sum value obtained by adding the value of the product to each element of the original standard pattern vector;

(d) when calculating the product-sum value, obtaining the product-sum value while moving the specified element of the original standard pattern vector to a position of each element thereof, and creating an original and weighted standard pattern vector having the product-sum value as an element value of the specified element;

(e) obtaining a length between the specified element and each element of the original input pattern vector to calculate a weighting vector element number proximate to a position apart from a center of the weighting vector by the length, and obtaining a value of a product of an element value of the element number of the weighting vector and an element value of each element of the original input pattern vector to calculate a product-sum value obtained by adding the value of the product to each element of the original input pattern vector;

(f) when calculating the product-sum value, obtaining the product-sum value while moving the specified element of the original input pattern vector to a position of each element thereof, and creating an original and weighted input pattern vector having the product-sum value as an element value of the specified element; and (g) defining a ratio value as a geometric distance value between the original standard pattern vector and the original input pattern vector, the ratio value being obtained by dividing a product-sum value of the original and weighted standard pattern vector and the original and weighted input pattern vector for each element by a square root of a square sum of each element of the original and weighted standard pattern vector and a square root of a square sum of each element of the original and weighted input pattern vector.

35. The method for detecting a similarity between voices according to claim 34, wherein, instead of the weighting vector, a difference value of mean values is obtained, the difference value being obtained by subtracting a mean geometric distance value between standard voices in different categories from a mean geometric distance value between standard voices in the same category, and a weighting vector having a value of a weighting factor maximizing the difference value of the mean values as an element is created.

36. A method for recognizing a voice, comprising the steps of:
obtaining the geometric distance between the original standard pattern vector having the feature quantity of the standard voice as an element and the original input pattern vector having the feature quantity of the input voice as an element by the method for detecting a similarity between voices according to any one of claims 34 and 35;
comparing the obtained geometric distance value with an arbitrarily set allowed value; and
judging the input voice not to be the standard voice when the geometric distance value is smaller than the allowed value, and judging the input voice to be the standard voice when the geometric distance value is equal to/larger than the allowed value.

37. A method for detecting a similarity between oscillation waves, comprising the steps of:
(a) creating a standard pattern vector having a feature quantity of a standard oscillation wave as an element and an input pattern vector having a feature quantity of an input oscillation wave as an element;
(b) creating an arbitrary reference shape such as a normal distribution and a rectangle, the reference shape having a different value of variance for each specified element of the pattern vectors, creating a reference pattern vector having a value of the reference shape as an element, and creating a weighting vector having a value of a change rate of a kurtosis of the reference pattern vector as an element;
(c) obtaining a length between the specified element and each element of the standard pattern vector to calculate a weighting vector element number proximate to a position apart from a center of the weighting vector by the length, and obtaining a value of a product of an element value of the element number of the weighting vector and an element value of each element of the standard pattern vector to calculate a product-sum value obtained by adding the value of the product to each element of the standard pattern vector;
(d) when calculating the product-sum value, obtaining the product-sum value while moving the specified element of the standard pattern vector to a position of each element thereof, and creating a weighted standard pattern vector having the product-sum value as an element value of the specified element;
(e) obtaining a length between the specified element and each element of the input pattern vector to calculate a weighting vector element number proximate to a position apart from a center of the weighting vector by the length, and obtaining a value of a product of an element value of the element number of the weighting vector and an element value of each element of the input pattern vector to calculate a product-sum value obtained by adding the value of the product to each element of the input pattern vector;
(f) when calculating the product-sum value, obtaining the product-sum value while moving the specified element of the input pattern vector to a position of each element thereof, and creating a weighted input pattern vector having the product-sum value as an element value of the specified element; and
(g) defining any of a square sum and a square root of the square sum of a value of a difference between the weighted standard pattern vector and the weighted input pattern vector for each element as a geometric distance value between the standard pattern vector and the input pattern vector.

38. The method for detecting a similarity between oscillation waves according to claim 37, wherein, instead of the weighting vector, a ratio value of mean values is obtained, the ratio value being obtained by dividing a mean geometric distance value between standard oscillation waves in the same category by a mean geometric distance value between standard oscillation waves in different categories, and a weighting vector having a value of a weighting factor minimizing the ratio value of the mean values as an element is created.

39. A method for judging an abnormality in a machine, comprising the steps of:
obtaining the geometric distance between the standard pattern vector having the feature quantity of the standard oscillation wave as an element and the input pattern vector having the feature quantity of the input oscillation wave as an element by the method for detecting a similarity between oscillation waves according to any one of claims 37 and 38;
comparing the obtained geometric distance value with an arbitrarily set allowed value; and
judging the machine to be abnormal when the geometric distance value is larger than the allowed value, and judging the machine to be normal when the geometric distance value is equal to/smaller than the allowed value.

40. A method for detecting a similarity between oscillation waves, comprising the steps of:
(a) creating an original standard pattern vector having a feature quantity of a standard oscillation wave as an element and an original input pattern vector having a feature quantity of an input oscillation wave as an element;
(b) creating an arbitrary reference shape such as a normal distribution and a rectangle, the reference shape having a different value of
variance for each specified element of the original pattern vectors, creating a reference pattern vector having a value of the reference shape as an element, and creating a weighting vector having a value of a change rate of a kurtosis of the reference pattern vector as an element;
(c) obtaining a length between the specified element and each element of the original standard pattern vector to calculate a weighting vector element number proximate to a position apart from a center of the weighting vector by the length, and obtaining a value of a product of an element value of the element number of the weighting vector and an element value of each element of the original standard pattern vector to calculate a product-sum value obtained by adding the value of the product to each element of the original standard pattern vector;
(d) when calculating the product-sum value, obtaining the product-sum value while moving the specified element of the original standard pattern vector to a position of each element thereof, and creating an original and weighted standard pattern vector having the product-sum value as an element value of the specified element;
(e) obtaining a length between the specified element and each element of the original input pattern vector to calculate a weighting vector element number proximate to a position apart from a center of the weighting vector by the length, and obtaining a value of a product of an element value of the element number of the weighting vector and an element value of each element of the original input pattern vector to calculate a product-sum value obtained by adding the value of the product to each element of the original input pattern vector;

(f) when calculating the product-sum value, obtaining the product-sum value while moving the specified element of the original input pattern vector to a position of each element thereof, and creating an original and weighted input pattern vector having the product-sum value as an element value of the specified element; and (g) defining a ratio value as a geometric distance value between the original standard pattern vector and the original input pattern vector, the ratio value being obtained by dividing a product-sum value of the original and weighted standard pattern vector and the original and weighted input pattern vector for each element by a square root of a square sum of each element of the original and weighted standard pattern vector and a square root of a square sum of each element of the original and weighted input pattern vector.

41. The method for detecting a similarity between oscillation waves according to claim 40, wherein, instead of the weighting vector, a difference value of mean values is obtained, the difference value being obtained by subtracting a mean geometric distance value between standard oscillation waves in different categories from a mean geometric distance value between standard oscillation waves in the same category, and a weighting vector having a value of a weighting factor maximizing the difference value of the mean values as an element is created.

42. A method for judging an abnormality in a machine, comprising the steps of:

obtaining the geometric distance between the original standard pattern vector having the feature quantity of the standard oscillation wave as an element and the original input pattern vector having the feature quantity of the input oscillation wave as an element by the method for detecting a similarity between oscillation waves according to any one of claims 40 and 41;

comparing the obtained geometric distance value with an arbitrarily set allowed value; and judging the machine to be abnormal when the geometric distance value is smaller than the allowed value, and judging the machine to be normal when the geometric distance value is equal to/larger than the allowed value.

* * * * *